United States Patent
McCaig et al.

(10) Patent No.: US 12,261,887 B2
(45) Date of Patent: Mar. 25, 2025

(54) MONITORING DEVICE DATA AND GATEWAY DATA

(71) Applicant: Comcast Cable Communications, LLC, Philadelphia, PA (US)

(72) Inventors: Rhys McCaig, Portland, OR (US); Seetharaman Ramasubramani, Saratoga, CA (US); Gaurav Khandpur, Santa Clara, CA (US); Paddy Vishnubhatt, Los Altos, CA (US); Evan Kaverman, San Francisco, CA (US); Eric Bertrand, Montreal (CA); Andrea Peiro, Burlingame, CA (US); Jeffrey Barberio, San Jose, CA (US); Remko Vos, San Mateo, CA (US); Jeremy Clark, Mountain View, CA (US); Steven Leardi, New York, NY (US); Albert Ribe Costa, San Mateo, CA (US); Thomas Fad, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 402 days.

(21) Appl. No.: 15/920,049

(22) Filed: Mar. 13, 2018

(65) Prior Publication Data
US 2018/0262533 A1 Sep. 13, 2018

Related U.S. Application Data

(60) Provisional application No. 62/614,926, filed on Jan. 8, 2018, provisional application No. 62/470,818, filed on Mar. 13, 2017.

(51) Int. Cl.
*H04L 9/40* (2022.01)
*H04W 12/122* (2021.01)
*H04W 84/12* (2009.01)

(52) U.S. Cl.
CPC .......... *H04L 63/20* (2013.01); *H04L 63/0209* (2013.01); *H04L 63/0227* (2013.01);
(Continued)

(58) Field of Classification Search
CPC . H04L 63/20; H04L 63/0227; H04L 63/0209; H04L 63/1408; H04L 63/1441; H04W 12/1204; H04W 84/12
See application file for complete search history.

(56) References Cited

U.S. PATENT DOCUMENTS

| | | | |
|---|---|---|---|
| 6,629,145 B1 * | 9/2003 | Pham | H04L 29/06 707/999.002 |
| 7,316,029 B1 * | 1/2008 | Parker | H04L 63/0272 370/428 |

(Continued)

OTHER PUBLICATIONS

W. Yassin, N. I. Udzir, Z. Muda, A. Abdullah and M. T. Abdullah, "A Cloud-based Intrusion Detection Service framework," Proceedings Title: 2012 International Conference on Cyber Security, Cyber Warfare and Digital Forensic (CyberSec), 2012, pp. 213-218, doi: 10.1109/CyberSec.2012.6246098. (Year: 2012).*

(Continued)

*Primary Examiner* — Robert B Leung
(74) *Attorney, Agent, or Firm* — Banner & Witcoff, Ltd.

(57) ABSTRACT

Systems, apparatuses, and methods are described for monitoring device data and/or gateway data. Devices may be connected to a network via a gateway device. Data transmitted and/or received by one or more of the devices may be captured and monitored to determine various parameters associated with the one or more devices. Data associated with the gateway device may also be captured and monitored. Signal strengths, device statuses, network security, and/or other metrics may be determined based on monitored data.

25 Claims, 93 Drawing Sheets

(52) U.S. Cl.
CPC ...... *H04L 63/1408* (2013.01); *H04L 63/1441* (2013.01); *H04W 12/122* (2021.01); *H04W 84/12* (2013.01)

(56) References Cited

U.S. PATENT DOCUMENTS

| | | | | |
|---|---|---|---|---|
| 9,716,701 | B1* | 7/2017 | Wang | H04L 63/1408 |
| 10,320,813 | B1* | 6/2019 | Ahmed | H04L 63/1416 |
| 2005/0235360 | A1* | 10/2005 | Pearson | H04L 63/1408 726/23 |
| 2006/0206940 | A1* | 9/2006 | Strauss | G06F 21/55 709/224 |
| 2007/0042769 | A1* | 2/2007 | Thommana | H04L 63/20 455/422.1 |
| 2011/0225647 | A1* | 9/2011 | Dilley | H04L 63/16 726/14 |
| 2012/0159572 | A1* | 6/2012 | Patel | G06F 21/6218 726/3 |
| 2012/0306788 | A1* | 12/2012 | Chen | G06F 3/0482 345/173 |
| 2014/0366118 | A1* | 12/2014 | Yin | H04L 63/1416 726/12 |
| 2015/0087258 | A1* | 3/2015 | Barnes | H04W 4/90 455/404.2 |
| 2015/0089062 | A1* | 3/2015 | Reiter | G06F 9/505 709/226 |
| 2016/0127379 | A1* | 5/2016 | Nayshtut | H04W 12/37 726/1 |
| 2016/0248811 | A1* | 8/2016 | Chen | G06F 9/45558 |
| 2019/0108470 | A1* | 4/2019 | Jain | G06Q 10/063118 |

OTHER PUBLICATIONS

D. H. Sharma, C. A. Dhote and M. M. Potey, "Implementing Intrusion Management as Security-as-a-service from cloud," 2016 International Conference on Computation System and Information Technology for Sustainable Solutions (CSITSS), 2016, pp. 363-366, doi: 10.1109/CSITSS.2016.7779387. (Year: 2016).*

A. Meddahi, K. MaSmoudi, H. Afifi, A. M'Hamed and I. Hajeh, "Enabling secure third party control on wireless home networks," 2004 4th Workshop on Applications and Services in Wireless Networks, 2004. ASWN 2004., Boston, MA, USA, 2004, pp. 46-54, doi: 10.1109/ASWN.2004.185154. (Year: 2004).*

RDK Central, "Reference Design Kit", retrieved from http://RDKcentral.com/about-rdk/ on Feb. 28, 2017.

Amazon Web Services, "Amazon Kinesis", retrieved from https://aws.amazon.com/kinesis/ on Mar. 12, 2017.

Amazon Web Services, "Amazon Simple Storage Service (S3)—Cloud Storage", retrieved from https://aws.amazon.com/s3/ on Feb. 28, 2017.

Amazon Web Services, "Amazon Virtual Private Cloud (VPC)" retrieved from https://aws.amazon.com/vpc/ on Feb. 28, 2017.

Amazon Web Services, "Cloud Computing Services", retrieved from https://aws.amazon.com/ on Feb. 28, 2017.

Anicas, Mitchell, "An Introduction to HAProxy and Load Balancing Concepts", Digitial Ocean, May 13, 2014, retrieved from https://www.digitalocean.com/community/tutorials/an-introduction-to-haproxy-and-load-balancing-concepts.

Tableau Software, "Answer questions as fast as you can think of them with Tableau", retrieved from https://www.tableau.com/trial/tableau-software on Feb. 28, 2017.

Wikipedia, "Apache Cassandra", article retrieved Feb. 28, 2017.

Wikipedia, "Apache Spark", article retrieved Feb. 28, 2017.

D3.js, "Data-Driven Documents", retrieved from https://d3js.org/ on Feb. 28, 2017.

NGINX, "Deploying Global Server Load Balancing (GSLB)", retrieved from https://www.nginx.com/resources/glossary/global-server-load-balancing/ on Feb. 28, 2017.

Wikipedia, "Django (web framework)", article retrieved Feb. 28, 2017.

Fingerbank: Device Fingerprints, retrieved from https://fingerbank.org/learn_more.html on Mar. 9, 2017.

GitHub, "uber/ringpop-node: Scalable, fault-tolerant application-layer sharding for Node.js applications", retrieved from https://github.com/uber/ringpop-node on Mar. 13, 2017.

IBM, "What is Avro?", retrieved from https://www-01.ibm.com/software/data/infosphere/hadoop/avro on Feb. 28, 2017.

"Kafka in a Nutshell", Sep. 25, 2015, retrieved from https://sookocheff.com/post/kafka/kafka-in-a-nutshell/.

Quantenna, "Unparalleled performance—at play or work", retrieved from http://www.quantenna.com/products on Feb. 28, 2017.

RabbitMQ, "What can RabbitMQ do for you?", retrieved from https://www.rabbitmq.com/features.html on Feb. 28, 2017.

Redis, retrieved from https://redis.io/ on Feb. 28, 2017.

S. Alexander and R. Droms, "DHCP Options and BOOTP Vendor Extensions", IETF, Mar. 1997, retrieved from https://www.ietf.org/rfc/rfc2132.txt.

The Broadband Forum: Technical Report, "TR-181, Device Data Model for TR-069", Issue 2, Amendment 2, Feb. 2011.

Cloudera, "Using Kafka with Flume", retrieved from https://www.coudera.com/documentation/kafka/latest/topics/kafka_flume.html on Mar. 9, 2017.

Wikipedia, "Virtual private cloud", article retrieved Mar. 9, 2017.

Apache Flume, "Welcome to Apache Flume", retrieved from https://flume.apache.org on Mar. 12, 2017.

* cited by examiner

3102

3104

3106

3108

3110

3112

3114

3116

3118

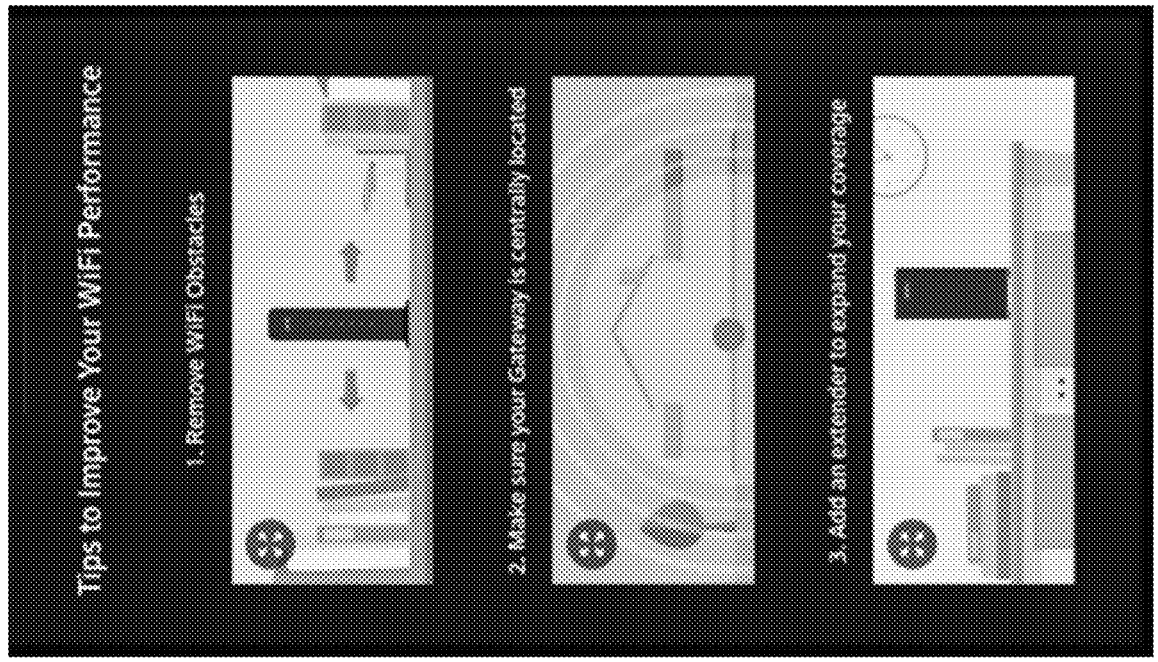
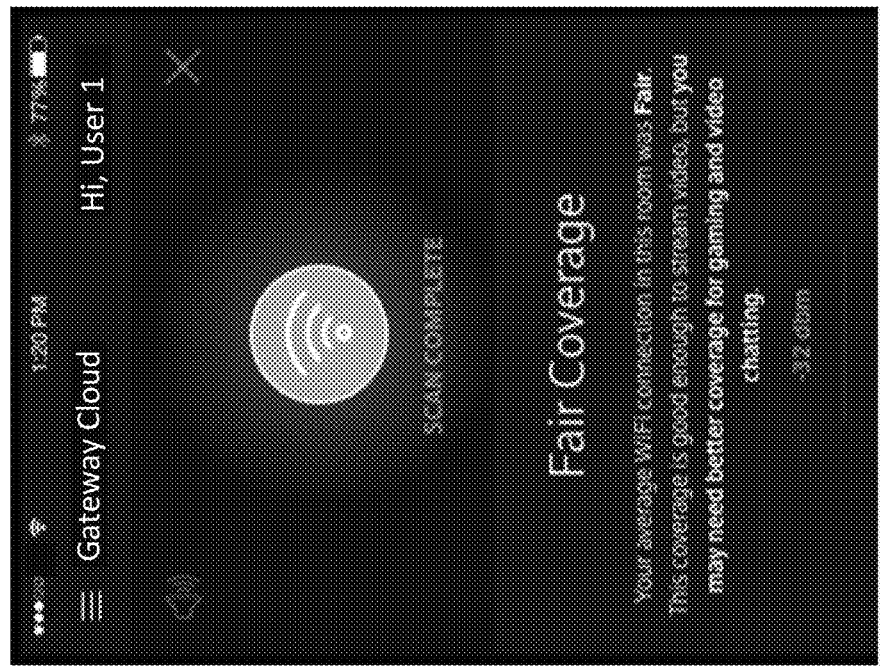
Fig. 31J

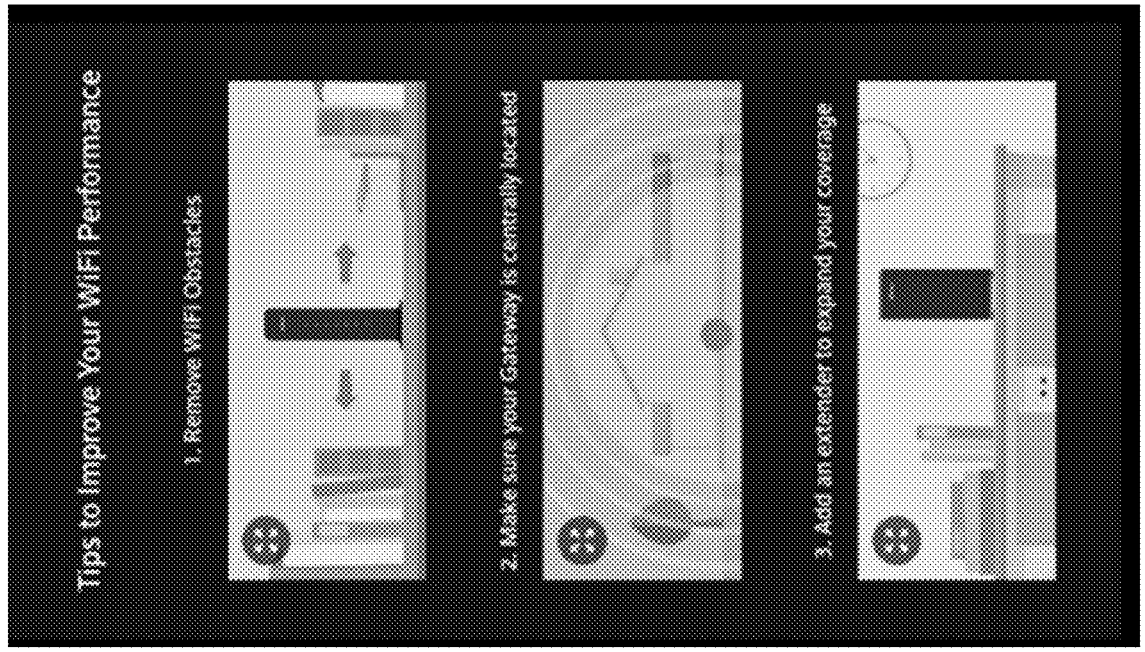
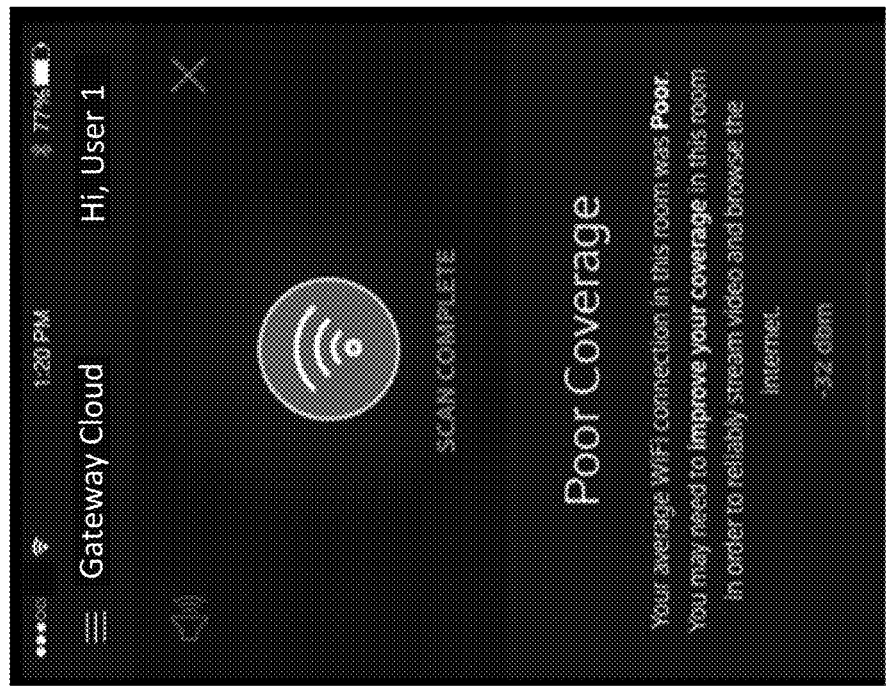
Fig. 31K

3202

3204

3206

3208

3210

3212

3214

3304

3306

3308

3310

3312

3314

3316

3318

3320

3322

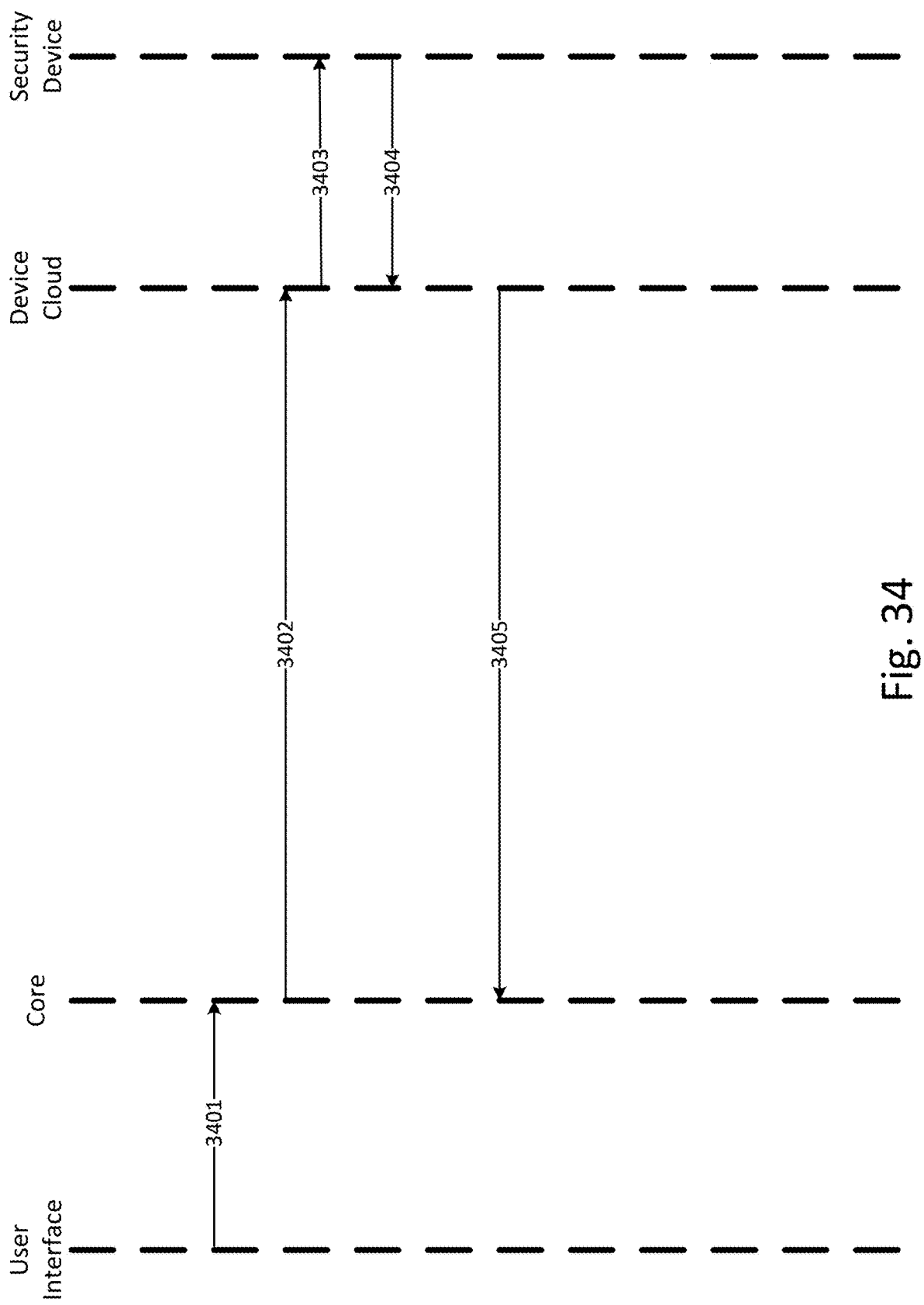

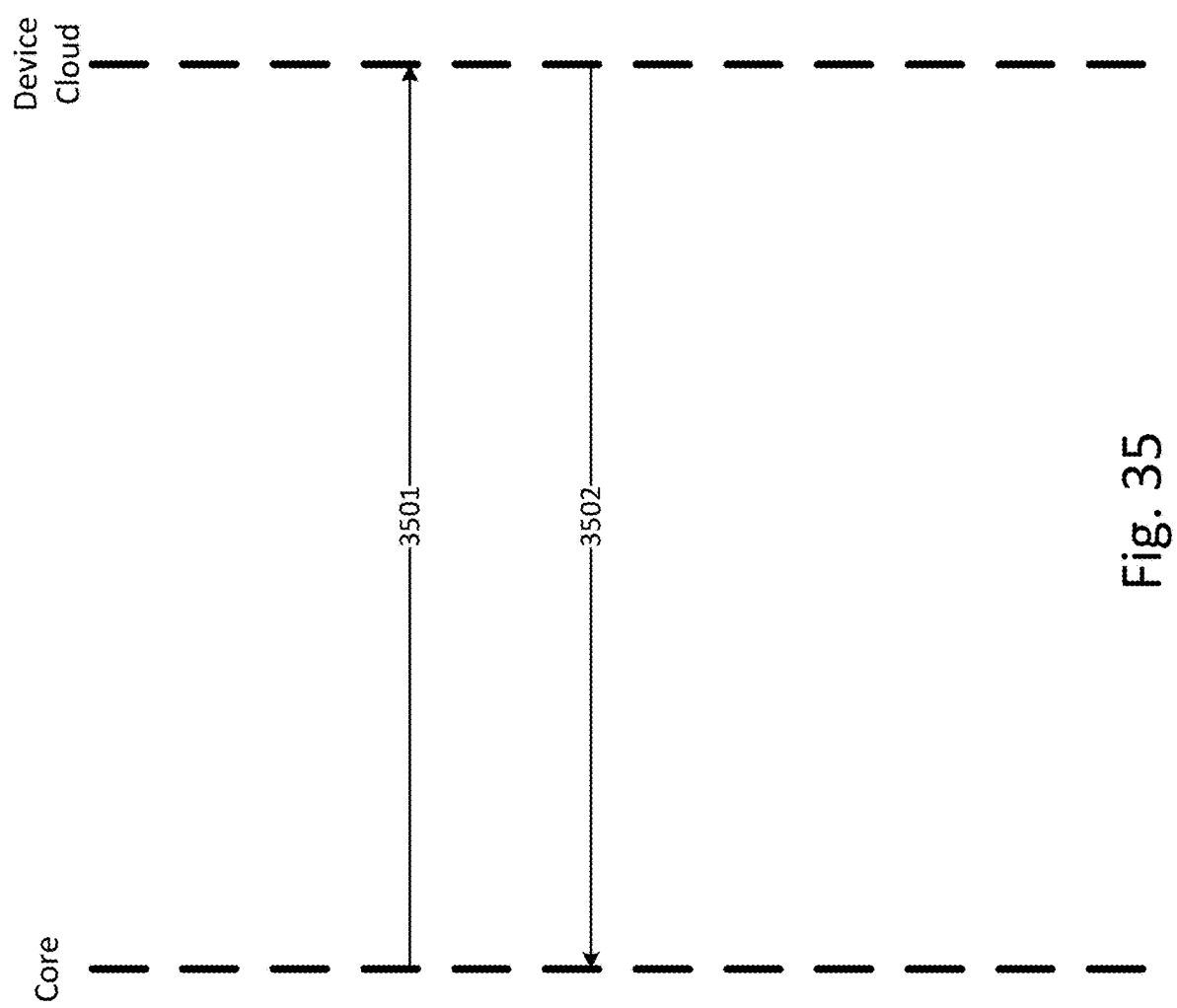

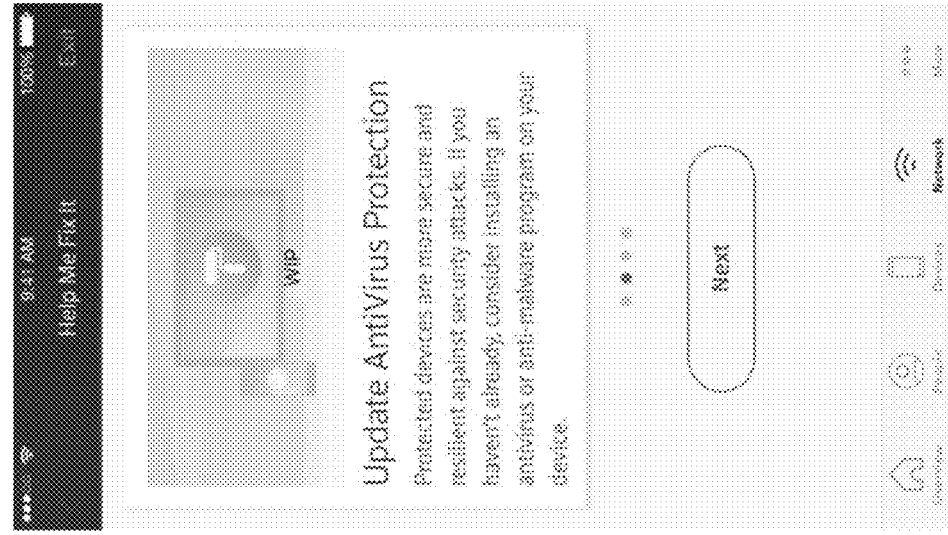
Fig. 45B
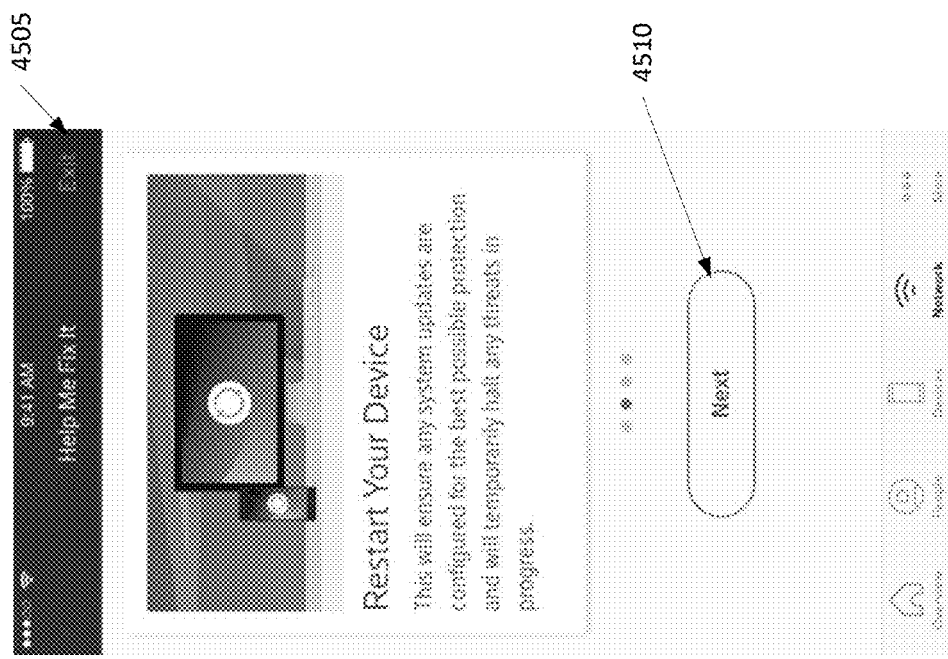
Fig. 45A

Fig. 45D
Fig. 45C

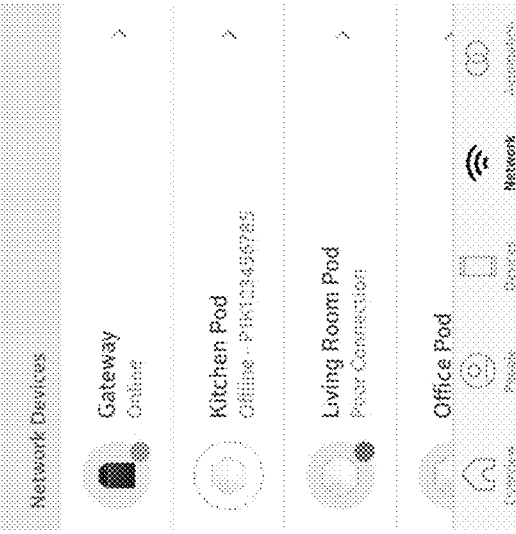
Fig. 55B
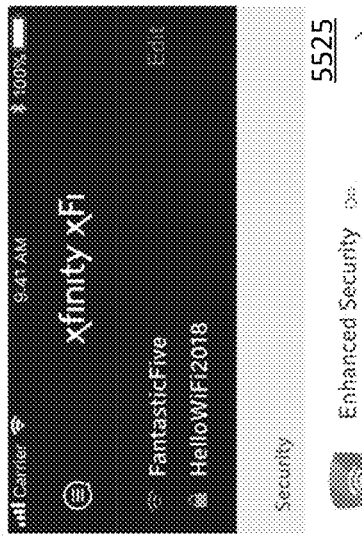
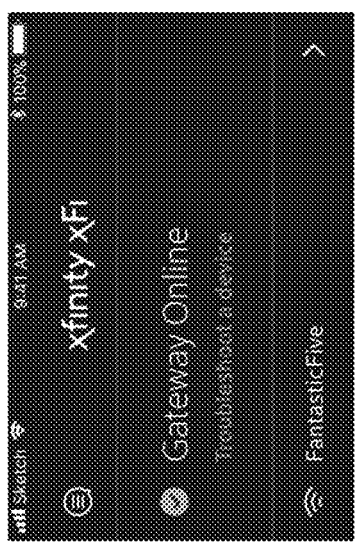
Fig. 55A

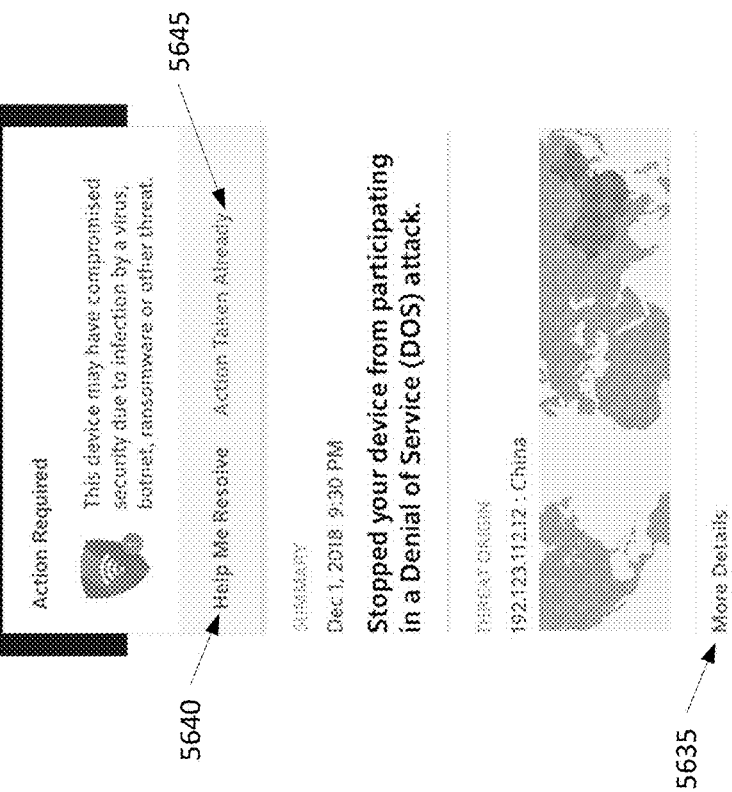
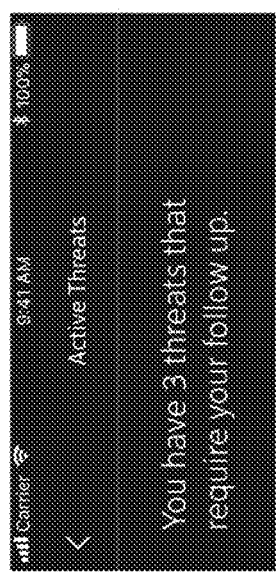
Fig. 56B
Fig. 56A

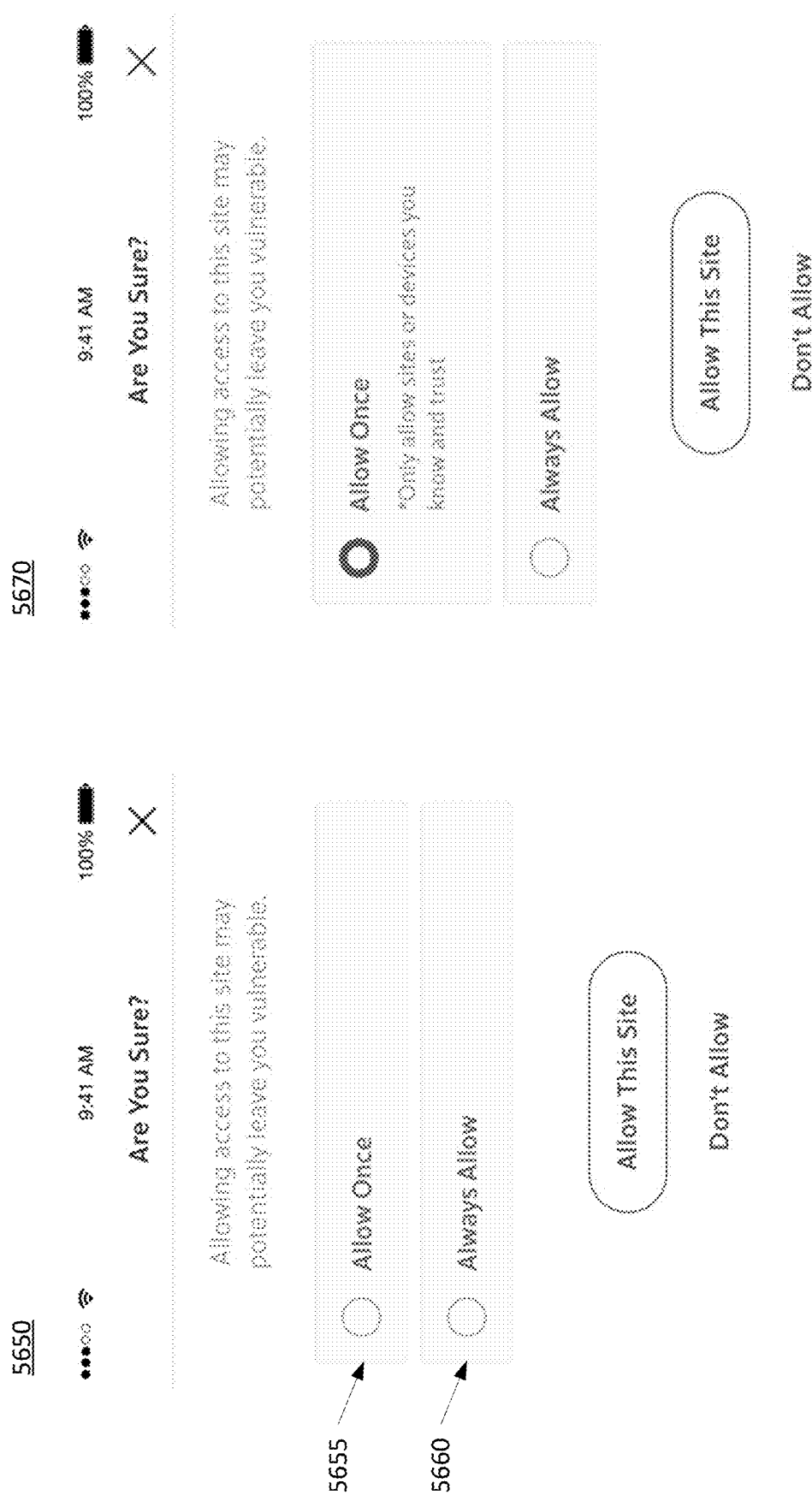

MONITORING DEVICE DATA AND GATEWAY DATA

CROSS-REFERENCE TO RELATED APPLICATIONS

This application claims priority to U.S. Provisional Patent Application Ser. No. 62/470,818, filed Mar. 13, 2017 and entitled "Monitoring Device Data to Determine Network Conditions" and claims priority to U.S. Provisional Patent Application Ser. No. 62/614,926, filed Jan. 8, 2018 and entitled "Device Protection and Security." Each of the prior applications is incorporated herein by reference in its entirety.

BACKGROUND

Various kinds of computing devices, from personal computers to mobile devices, are becoming increasingly popular. In addition, more of these devices are being connected to local area networks. This may cause users to encounter situations where network management has become difficult. As these devices continue to grow in popularity and users continue to use them for an ever-growing number of reasons, the users of these devices have demanded and will continue to demand better ways of managing network devices, securing those devices, and connecting new devices and technologies.

SUMMARY

The following summary presents a simplified summary of certain features. The summary is not an extensive overview and is not intended to identify key or critical elements.

Systems, apparatuses, and methods are described for monitoring device data and/or gateway data. Devices may be connected to a network via a gateway device. Data transmitted and/or received by one or more of the devices may be captured and monitored to determine various parameters associated with the one or more devices. Data associated with the gateway device may also be captured and monitored. Signal strengths, device statuses, network security, and/or other metrics may be determined based on monitored data.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIGS. 31A-K show exemplary user interfaces for determining and displaying signal strength.

FIG. 34 shows an example system and method of adding a security device.

FIG. 35 shows an example system and method of authentication and user creation in a security device cloud.

FIGS. 45A-D show user interfaces indicating tips.

FIG. 55A shows a user interface displaying an overview of enhanced security features.

FIG. 55B shows a user interface displaying one or more network devices.

FIG. 56A shows a user interface displaying one or more threats.

FIG. 56B shows a user interface displaying one or more recommended actions and/or threat details.

FIGS. 56C-D show user interfaces displaying one or more options for allowing events.

DETAILED DESCRIPTION

Figure 1:
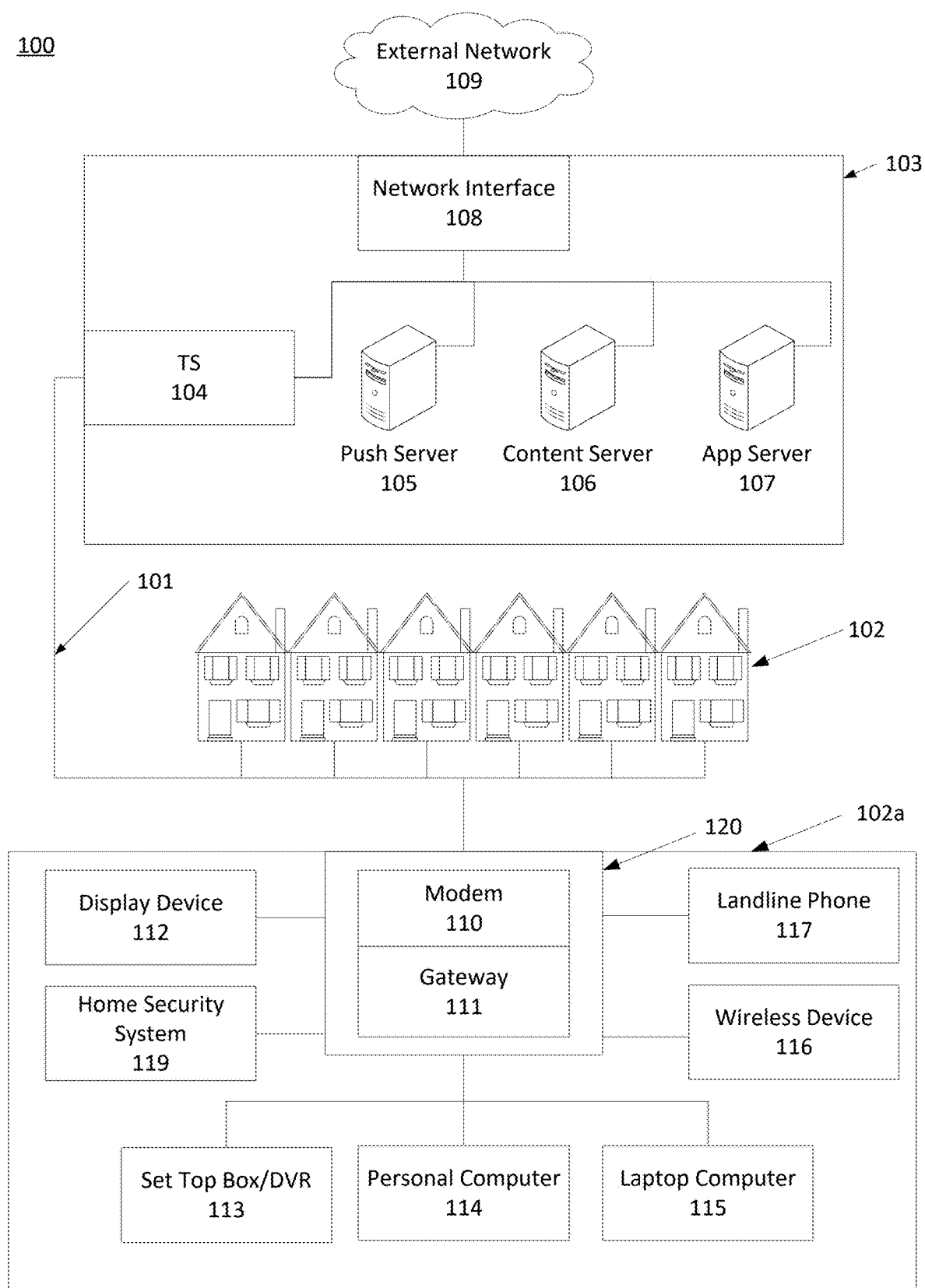
FIG. 1 shows an example communication network.

FIG. 1 shows an example communication network in which one or more of the various features described herein may be implemented. The communication network is only one example of a network and is not intended to suggest any limitation as to the scope of use or functionality of the disclosure. The communication network should not be interpreted as having any dependency or requirement relating to any component or combination of components in a communication network.

A network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, the network 100 may be a cellular broadband network communicating with multiple communications access points, such as a wireless communications tower 130. The network 100 may be a coaxial system comprising a Cable Modem Termination System (CMTS) communicating with numerous gateway interface devices (e.g., a gateway 111 in an example home 102a). The network 100 may be a fiber-optic system comprising optical fibers extending from an Optical Line Terminal (OLT) to numerous Optical Network Terminals (ONTs) communicatively coupled with various gateway interface devices. The network 100 may be a Digital Subscriber Line (DSL) system that includes a local office 103 communicating with numerous gateway interface devices. The network 100 may be an HFC network in which Internet traffic is routed over both optical and coaxial communication paths to a gateway interface device in or near a user's home. Various examples of the disclosure may operate on one or more of the networks described herein or any other network architectures now known or later developed.

The network 100 may use a series of interconnected communication links 101 (e.g., coaxial cables, optical fibers, wireless links, etc.) to connect a premises 102 (e.g., a home or other user environment) to the local office 103. The communication links 101 may include any wired communication links, wireless communication links, communications networks, or combinations thereof. For example, portions of the communication links 101 may be implemented with fiber-optic cable, while other portions of the communication links 101 may be implemented with coaxial cable. The communication links 101 may also include various communications components such as splitters, filters, amplifiers, wireless components, and other components for communicating data. Data may include, for example, Internet data, voice data, weather data, media content, and any other information. Media content may include, for example, video content, audio content, media on demand, video on demand, streaming video, television programs, text listings, graphics, advertisements, and other content. A media content item may represent an individual piece of media content, such as a particular movie, television episode, online video clip, song, audio recording, image, or any other data. A media content item may be fragmented into segments, such as a plurality of two-second video fragments that may be separately addressed and retrieved.

The local office 103 may transmit downstream information signals onto the communication links 101, and one or more of the premises 102 may receive and process those signals. In certain implementations, the communication links 101 may originate from the local office 103 as a single communications path, and may be split into any number of communication links to distribute data to the premises 102 and various other destinations. Although the term premises is used by way of example, the premises 102 may include any type of user environment, such as single family homes, apartment complexes, businesses, schools, hospitals, parks, and other environments and combinations of environments.

The local office 103 may include an interface 104, which may be a computing device configured to manage communications between devices on the network of the communication links 101 and backend devices, such as a server. For example, the interface 104 may be a CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in the premises 102, and to receive upstream communications from those modems on one or more upstream frequencies.

The local office 103 may include one or more network interfaces 108 for communicating with one or more external networks 109. The one or more external networks 109 may include, for example, one or more telecommunications networks, Internet Protocol (IP) networks, cellular communications networks (e.g., Global System for Mobile Communications (GSM), Code Division Multiple Access (CDMA), and any other 2nd, 3rd, 4th, or higher generation cellular communications networks), cellular broadband networks, radio access networks, fiber-optic networks, local wireless networks (e.g., Wi-Fi, WiMAX), satellite networks, and any other networks or combinations of networks.

The local office 103 may include a variety of servers that may be configured to perform various functions. The local office 103 may include a push server 105 for generating push notifications to deliver data, instructions, or both to devices that are configured to detect such notifications. The local office 103 may include a content server 106 configured to provide content (e.g., media content) to devices. The local office 103 may also include an application server 107.

The premises 102, such as the example home 102a, may include an interface 120, which may include a modem 110 (or any device), for communicating on the communication links 101 with the local office 103, the one or more external networks 109, or both. For example, the modem 110 may be a coaxial cable modem (for coaxial cable links), a broadband modem (for DSL links), a fiber interface node (for fiber-optic links), or any other device or combination of devices. The modem 110 may be a part of, or communicatively coupled to, the gateway 111. The gateway 111 may be, for example, a wireless router, a set-top box, a computer server, or any other computing device or combination.

The gateway 111 may be any computing device for communicating with the modem 110 to allow one or more other devices in the example home 102a to communicate with the local office 103, the one or more external networks 109, or other devices communicatively coupled thereto. The gateway 111 may include local network interfaces to provide communication signals to client devices in or near the example home 102a, such as a television 112, a set-top box 113, a personal computer 114, a laptop computer 115, a wireless device 116 (e.g., a wireless laptop, a tablet computer, a mobile phone, a portable gaming device a vehicular computing system, a mobile computing system, a navigation system, an entertainment system in an automobile, marine vessel, aircraft, or the like), or any other device.

Figure 2:
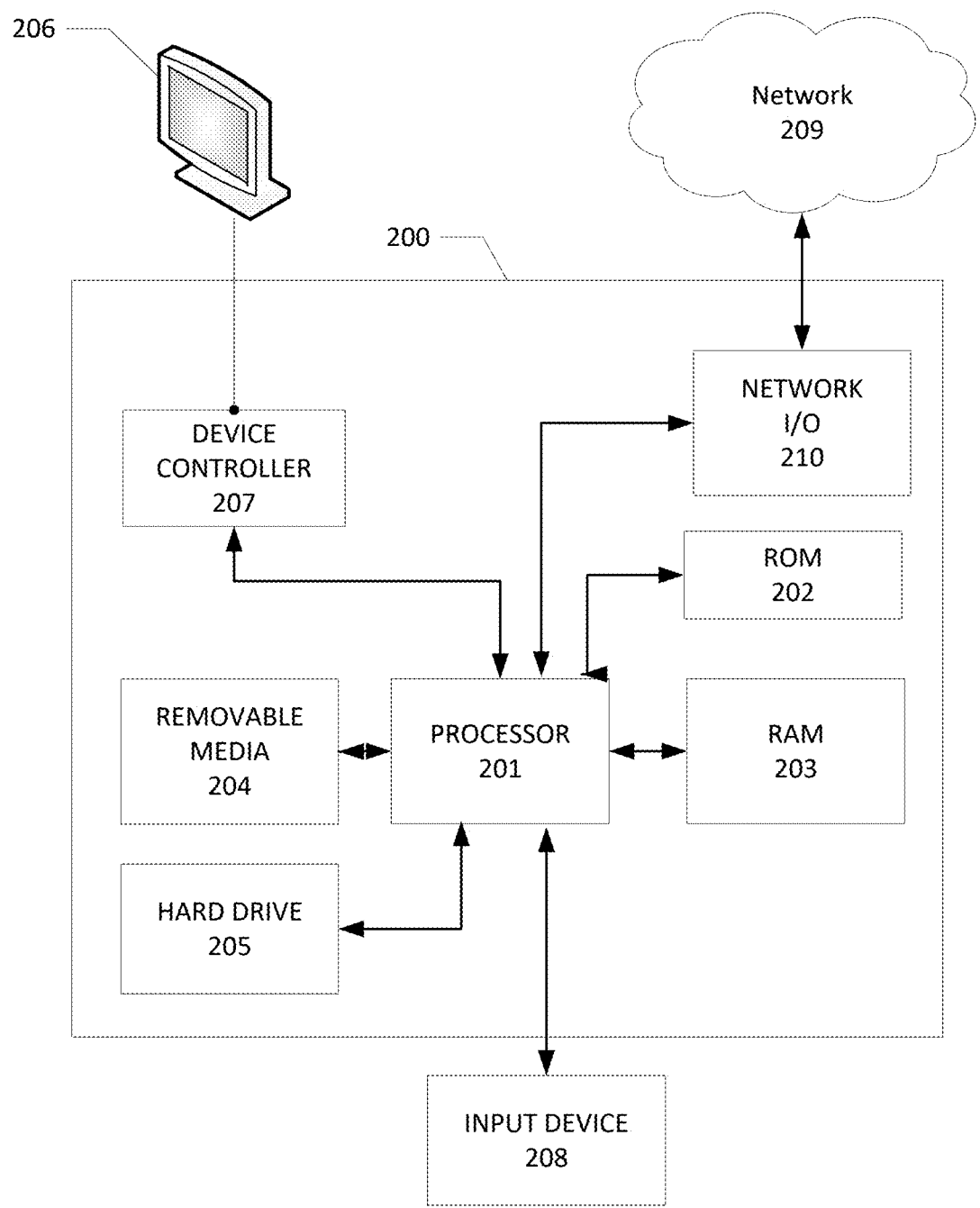
FIG. 2 shows hardware elements of a computing device.

FIG. 2 shows general hardware elements and software elements that may be used to implement any of the various computing devices, servers, encoders, caches, and/or software discussed herein. A device 200 may include a processor 201, which may execute instructions of a computer program to perform any of the functions and steps described herein. The instructions may be stored in any type of computer-readable medium or memory to configure the operation of the processor 201. For example, instructions may be stored in a Read-Only Memory (ROM) 202, a Random Access Memory (RAM) 203, a removable media 204, such as a Universal Serial Bus (USB) drive, Compact Disk (CD) or Digital Versatile Disk (DVD), hard drive, floppy disk, or any other desired electronic storage medium. Instructions may also be stored in a hard drive 205, which may be an internal or external hard drive.

The device 200 may include one or more output devices, such as a display 206 (e.g., an integrated or external display, monitor, or television), and may include a device controller 207, such as a video processor. The device 200 may include an input device 208, such as a remote control, keyboard, mouse, touch screen, microphone, motion sensing input device, and/or any other input device.

The device 200 may also include one or more network interfaces, such as a network Input/Output (I/O) interface 210 to communicate with a network 209. The network interface may be a wired interface, wireless interface, or a combination of the two. The network I/O interface 210 may include a cable modem, and the network 209 may include the communication links 101 shown in FIG. 1, the one or more external networks 109, an in-home network, a provider's wireless, coaxial, fiber, or hybrid fiber/coaxial distribution system (e.g., a DOCSIS network), and/or any other desired network.

In order to provide clear information, insights, and control of networks (e.g., in-home Wi-Fi networks), the system described herein aims to solve existing or potential user's problems relating to network (e.g., home Wi-Fi) connectivity, coverage, or bandwidth issues by gathering, analyzing and distilling Wi-Fi telemetry data to give users actionable insights and solutions while providing clear visibility of home network functions. The system described herein may increase user engagement and understanding of their networks (e.g., home network) while decreasing volume or duration of user care calls related to Wi-Fi issues and dissatisfaction.

Systems and methods described herein may relate to the collection, transmission, storage, analysis, and presentation of network (e.g., Wi-Fi network) related information (e.g., Wi-Fi data) from gateways, such as reference design kit (RDK) gateways (e.g., RDK-B gateways). Systems described herein may comprise a unified platform for automated Wi-Fi telemetry extraction, delivery, and control for multiple internal and external applications. The platform may act as a common interface for Wi-Fi data of gateway devices. The platform may extract data from connected user devices, extract data from radio scans, and implement messaging and/or interface specifications. A device may be considered connected to a gateway and/or network after association to a gateway (e.g., Wi-Fi hotspot) service set identifier (SSID), has been online recently enough (e.g., within a threshold timeframe), is reachable by an address resolution protocol (ARP), is responsive to an ARP ping and/or cache refresh, or in other scenarios.

The systems described herein may comprise a collection of applications that consume, analyze, and present data provided by the platform to demonstrate viability and usefulness of the platform and prototype various network features. The applications may be used to improve connectivity of user devices. For example, the applications may process and/or store data collected by the platform, detect patterns, represent patterns in user interfaces, and/or issue alerts based on collected data.

Various network and gateway metrics and data may be collected (e.g., Wi-Fi metrics). Wi-Fi metrics may be captured on a per-gateway basis. Accordingly, for example, a transmission rate field may indicate the transmission rate of the gateway, and not necessarily a connected device. The collected data may be stored in a database, such as a distributed database management system. The data may be collected at various rates, such as 1 poll per minute. Various database tables may be used to store the collected data.

A data table may contain a row for each data metric collected. If, for example, data is collected at a data collection rate of 1 poll per minute and about 6 devices are connected to the gateway, approximately 10K rows may be added to the database per day, per gateway. The data table may store, for example, a media access control (MAC) address of gateway, a timestamp of when the data was captured, a MAC address of the connected device, a gateway interface MAC that the device is connected to, the type of network that the interface is connected to (e.g., a private network or a public network), a SSID of the Wi-Fi network at the time of data collection, a Wi-Fi radio channel, a signal strength received by the gateway from the device (e.g., in dBm), PHY TX rate from the gateway to the connected device (e.g., in Mbps), a PHY RX rate (e.g., in Mbps), an interface type (e.g., Wi-Fi or Ethernet or multimedia over coax (MOCA)), a Wi-Fi operating standard (e.g., a, b, g, n, ac), and/or a Wi-Fi channel bandwidth (e.g., 20 MHz, 40 MHz, 80 MHz, 160 MHz, etc.). Another data table may contain a single entry for each connected device/network combination. This may provide a quick look into the current state of the Wi-Fi network without having to perform a large table scan or provide a very granular data range.

Consuming applications may access one or more application programming interfaces (APIs) for retrieving Wi-Fi metrics from the database table(s). The application may request metrics for a specific gateway (e.g., via an Hypertext Transfer Protocol (HTTP) GET). The request may include, for example, start time for the query, end time for the query, one or more device MACs, one or more interface MACs, one or more service types (e.g., private, public, home security, etc.), and/or one or more interface types. The response may return, from one or more of the database tables, data (e.g., all data) for a specific gateway MAC over a given time period. The returned data may comprise one or more of a MAC address of gateway, a timestamp of when the data was captured, a MAC address of the connected device, a gateway interface MAC that the device is connected to, the type of network that the interface is connected to (e.g., a private network or a public network), a SSID of the Wi-Fi network at the time of data collection, a Wi-Fi radio channel, a signal strength received by the gateway from the device (e.g., in dBm), PHY TX rate from the gateway to the connected device (e.g., in Mbps), a PHY RX rate (e.g., in Mbps), an interface type (e.g., Wi-Fi or Ethernet or MOCA), a Wi-Fi operating standard (e.g., a, b, g, n, ac), or a Wi-Fi channel bandwidth (e.g., 20 MHz, 40 MHz, 80 MHz, 160 MHz, etc.).

One or more tables may pertain to connected devices. These database tables for connected devices may be stored in a distributed database management system on, for example, a per-gateway basis. A device host version table may store, for example, a host gateway's MAC address and the host gateway's hardware version. A device host history table may store, for example, connected device histories for each gateway, such as, the host gateway's MAC address, the host gateway's hardware version, the connected device's MAC address, the interface the device is connecting through (e.g., Wi-Fi 2.4 GHz, Wi-Fi 5 GHz, Ethernet, MOCA, etc.), the IPv4 address of the connected device, the IPv6 address of the connected device, the hostname of the connected device, the status of the device (e.g., offline or online), the type of the device (e.g., extender or client device), the parent of the device (e.g., MAC address of gateway or extender), and the like. A device status table may store each connected device's status for each host gateway, such as, the host gateway's MAC address, the connected device's MAC address, the interface the device is connecting through (e.g., Wi-Fi 2.4 GHz, Wi-Fi 5 GHz, Ethernet, MOCA, etc.), the status of the connected device, the last seen online timestamp of the device (e.g., epoch time in seconds), whether the device's notification attempt is enable or disable, the last seen IP address of the device, the last seen hostname of the device, the type of the device (e.g., extender or client device), the parent of the device (e.g., MAC address of gateway or extender), the manufacturer name of the device, and the like.

An API for retrieving the connected device summary for the specific gateway may be provided. For example, a request (e.g., via an HTTP GET request) may request a summary for connected devices (e.g., all connected devices) for a specific gateway (e.g., specified by MAC). The API may return a summary of the connected devices for a specific gateway.

An API for triggering a sync operation for a notification (e.g., a TR-181 notification) may be provided. For example, a request (e.g., via a POST request) may request a notification and trigger a sync operation. The API may return the version of the gateway after synchronizing the DB with the latest devices summary. A request (e.g., via a GET request) may request the current version of the gateway in the device host version table. The API may return the version of the gateway in the DB. The request might not trigger a sync operation.

An API for device status may be provided. For example, a request (e.g., a GET request) may request to get a specific device and interface type on a gateway. The API may return the details of a specific device and interface type on a gateway. One or more APIs may also be used to remove (e.g., delete) data for specific devices, interface types, and/or gateways.

Various APIs for accessing interface data may be provided. For example, the system may get the latest information about the connected devices for a given gateway, which may be specified by, for example, MAC address. The system may get the latest information about the connected device for given gateway MAC and device MAC. The system may get the latest information about the connected devices for given gateway for a time duration (e.g., the last 1 hour). Clients may be enabled to do a filtering search with filtering query parameters (e.g., device MAC, interface MAC, interface type, service type, start time, end time, etc.).

Various APIs for accessing summary data may be provided. For example, the system may list device summary information (e.g., for one or more, such as all, devices). The system may list devices based on a given start time. The system may list devices based on a given device type (e.g., client device or extender).

Various APIs for accessing or modifying device identities may be provided. For example, the system may get device identities on a gateway (e.g., all devices on the gateway). The system may create an identity for a list of MACs. The system may delete identities for devices on the gateway (e.g., all devices on the gateway). The system may get a specific device's identity MAC information. The system may update device identities with MAC information.

Various APIs for device management may be provided. For example, the system may block a device using a device identifier, such as a device MAC (e.g., for parental control or other purposes). The system may get the status of device information after it is blocked. The system may allow the device using the device MAC. The system may get the status of device information after it is allowed. The system may delete the device with a status as block or allow.

Various APIs for accessing traffic data may be provided. For example, the system may get device traffic data count (e.g., all device traffic data count). The system may get a device-specific traffic count. The system may get an hour specific traffic count for one or more (e.g., all) devices.

APIs (e.g., representational state transfer (REST) APIs) for the configuration and management of gateway settings may be provided. The platform may be designed to support multiple tenants, and a tenant ID may be used to access the APIs. The tenant ID may be determined and given out to clients by the platform. For example, a tenant may comprise a service provider. In order to streamline the process and control of gateways, configuration changes and management may go through a virtual gateway controller. This API may be designed to enable a wireless (e.g., Wi-Fi) intelligence and control platform criteria for managing gateway settings. The APIs may provide programmatic access to configure, inform and report relevant device, Wi-Fi, and radio parameters. Abstraction may be provided so that API clients might not have awareness or knowledge of the underlying protocols used to manage and obtain information about devices connected to gateways. The systems described herein may maintain configuration settings, which may represent the current operating configuration on the physical gateway. The APIs may be used to manage the radio configuration sets associated to a gateway. The system may provide a mechanism to store and manage configuration settings indexed by gateway MAC. API users may make configuration changes using the gateway MAC. If a gateway does not exist in the platform, an error may be returned. The system may maintain the current operating configuration of the gateway. After a device has been on boarded or registered into the system, the device may be managed using the gateway MAC as a key. The gateway MAC for the purpose of these APIs may be a cable modem (CM) MAC.

Data may be formatted in JavaScript object notation (JSON) format. The HTTP method operations GET, POST, PUT and DELETE may be used to correspond to create, read, update, delete operations, respectively. A GET or DELETE request may be made to a resource (or sub resource) on the base uniform resource identifier (URI). It may contain one or more URI parameters. A POST or PUT request may be made to a resource (or sub resource) on the base URI. It may contain one or more URI parameters and a JSON body with additional resource specific parameters. Success or failure responses may be included.

GET: a client may get information about the requested resource using a GET method on a resource. The URI of the resource and URI parameters (if any) may be supplied by the client. The server may return either a success or failure response of the format described below. If the call is successful, the data object field may return the requested data fields and values. Otherwise, a failure error code may be returned, with no data field in the response. GET success response parameters may include, for example, status (e.g., an HTTP status code that reflects the success/failure state of the query), message (e.g., detailed information about the state of this query based on status code), and/or data (e.g., if the API call is a success, data may be included in the response, with the format varying for different APIs). GET failure response parameters may include, for example, status (e.g., an HTTP status code that reflects the success/failure state of the query), error code (e.g., an error code that specifies actual cause of failure), and/or message (e.g., a textual description of the nature and reason of the error).

POST: a server may create the supplied entity as a new subordinate of the resource or use the entity to modify the resource if such resources exist already using a POST method on a URI resource. During this operation, the client may send the data according to the specification. Each API may have fields mentioned as mandatory, optional, or conditional. After it is called, a success or failure response may be returned. A predefined error code may be established for validation failure of input fields. This predefined error code may be used under such validation failure circumstances. POST success response parameters may include, for example, status (e.g., one of a plurality of predefined HTTP status codes that reflects the success/failure state of this query) and/or a message (e.g., detailed information about the state of the query based on status code). POST failure response parameters may include, for example, status (e.g., one of a plurality of predefined HTTP status codes that reflects the success/failure state of the query), error code (e.g., an error code that specifies actual cause of failure), a message (e.g., a textual description of the nature and reason of the error), and/or errors (e.g., describing specific error associated with failure). POST object error parameters may include, for example, code (e.g., an error code that specifies actual cause of failure), field (e.g., name of field where validation failed), and/or message (e.g., a textual description of the nature and reason of the error). Some parameters in a POST request may be mandatory (e.g., if the parameter is be specified in API), optional (e.g., if the parameter may or may not be specified in the API), conditional mandatory (e.g., if the parameter is to be specified under certain conditions of dependent parameter), optional mandatory (e.g., if the parameter is to be specified based on the optional presence of dependent parameter), and/or read only (e.g., if the parameter is part of the GET request and is not valid for a POST/PUT operation).

A success response format may have a JSON body with the fields status, message, and/or data:

```
Success Response Format
{
    "status": <http status code>,
    "message": <message>,
    "data": { <data> }
}
```

A failure response format may have a JSON body with the fields status, error code, and/or message:

```
Failure Response Format
{
    "status": <http status code>,
    "error_code": <error code>,
    "message": <descriptive message>
}
```

If there is a validation failure of the client input parameters on a POST, PUT on any resource, the server may return a JSON body with following format:

```
{
"status": 400,
"error_code": 4000, "message": <message>, "errors": [
    {
        "code": <additionalerrorcode>, "field": <nameofparameterfield>,
        "message": <textualdescriptionoferror>
    },
    {
        "code": <additionalerrorcode>, "field": <nameofparameterfield>,
        "message": <textualdescriptionoferror>
    }
]
}
```

A system described herein may comprise one or more computing devices configured to provide a radio management functionality of wireless intelligence and control. A virtual gateway controller may maintain configuration settings, which may represent the current operating configuration on the physical gateway. The APIs may be used to manage the radio configuration sets associated a gateway. The virtual gateway controller may provide a mechanism to store and manage configuration settings indexed by gateway MAC. API users may make configuration changes using gateway MAC. If the gateway does not exist in the platform, an error may be returned. The virtual gateway controller may maintain the current operating configuration of the gateway. Once a device has been on boarded or registered, the device may be managed using the gateway MAC as a key. The gateway MAC for the purpose of these APIs may be cable modem (CM) MAC.

Groups may be configured to manage various parameters, such as radio-related parameters. A group ID for group radio 2 g configuration may be used to manage the 2 GHz radio related parameter on the gateway. Clients may supply the valid channel and channel width based mapping provided by wireless intelligence and control. A GET may get the associated radio configuration. The obtained parameters may include, for example, radio enabled (e.g., on: true, off: false), channel (e.g., 1, 2, 3, 4, 5, 6, 7, 8, 9, 10, or 11), operating standards (e.g., b,g,n, g,n, etc.), channel width (e.g., 20 MHz, 40 MHz, etc.), extension channel (e.g., extension channel for the radio), dfs_enabled (e.g., on: true, off: false), TX power (e.g., 12%, 25%, 50%, 75%, 100%), beacon interval (e.g., a value in minutes), minimum basic rate (e.g., 1—Default, 2—1-2 Mbps, 3—All). A POST may set the associated radio configuration and may utilizes one or more of the same parameters as GET method above.

A group ID for group radio 5 g configuration may be used to manage the 5 GHz radio related parameter on the gateway. Clients may supply the valid channel and channel width based mapping provided by wireless intelligence and control. A GET may get the associated radio configuration. The obtained parameters may include, for example, radio enabled (e.g., on: true, off: false), channel (e.g., 36, 40, 44, 48, 149, 153, 157, 161, 165), operating standards (e.g., n,ac, a,n,ac, ac, n, etc.), channel width (e.g., 20 MHz, 40 MHz, 80 MHz, etc.), extension channel (e.g., extension channel for the radio), dfs_enabled (e.g., on: true, off: false), TX power (e.g., 12%, 25%, 50%, 75%, 100%), beacon interval (e.g., a value in minutes), minimum basic rate (e.g., 1—Default, 2—1-2 Mbps, 3—All). A POST may set the associated radio configuration and may utilizes one or more of the same parameters as GET method above.

A Group ID for group harvester configuration may be used to provide harvester configuration information and also may allow the user to change the Wi-Fi harvester settings. A GET may retrieve the harvester configuration information. The obtained parameters may include, for example, associated device scan enabled (e.g., true or false, turns associated device scan on or off), associated device scan polling interval (e.g., time value in seconds), and/or associated device scan upload interval (e.g., time value in seconds). A POST may set the associated radio configuration and may utilize one or more of the same parameters as GET method above.

Figure 41:
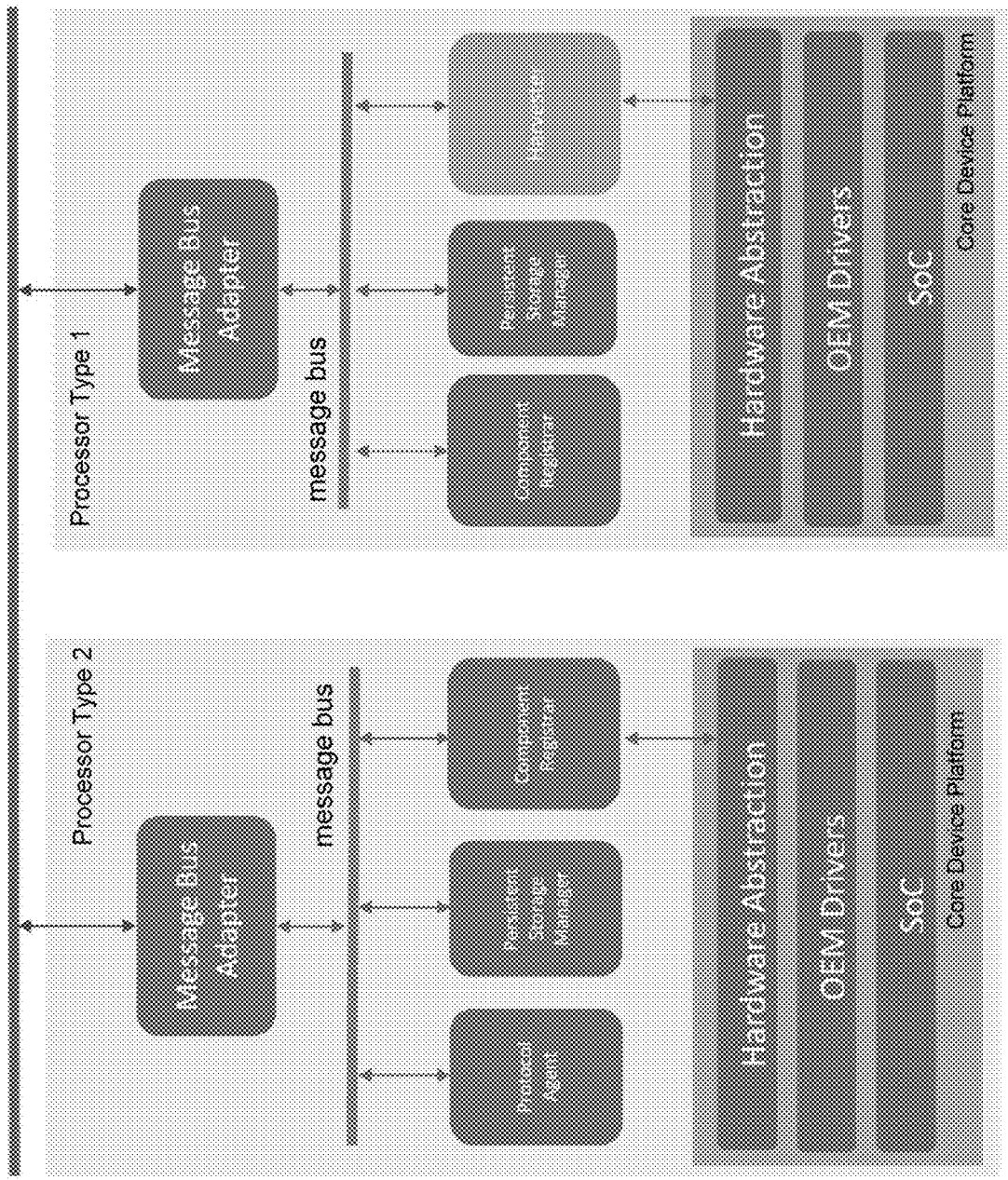
FIG. 41 shows a device architecture for the harvester agent.

A harvester agent may handle configuration parameters to control data extraction from gateway devices. The agent may define the parameters according to a data model (e.g., as TR-181 objects, which may be configured using TR-069 commands). The harvester agent may comprise a Wi-Fi harvester agent. The harvester agent may run on the gateway to collect data from a Wi-Fi driver. For example, the harvester agent may collect data for associated devices, radio traffic, and/or neighboring wireless networks. FIG. 41 shows a device architecture for the harvester agent. A gateway may comprise a plurality of processor types, such as a processor of type 1 and/or a processor of type 2. The harvester may run on a type 1 processor of the gateway device. The harvester may poll a hardware abstraction layer (HAL), such as a Wi-Fi HAL, for information for each report to generate, and may store multiple polls for bulk transmission.

The harvester may use one or more parameters for generating reports. Parameters may be stored in the harvester or may be stored at a different location that is accessible to the harvester. An associated device scan enable parameter may comprise a boolean parameter (e.g., TRUE or FALSE) stored in the harvester to enable or disable associated device data collection. A neighboring access point (AP) scan enable parameter may comprise a boolean parameter stored in the harvester to enable or disable scan data collection from neighboring APs. A radio traffic scan enable parameter may comprise a boolean parameter stored in the harvester to enable or disable radio traffic data collection. An associated device polling interval parameter may comprise an unsigned integer parameter that stores the associated device's polling time interval in seconds. If the polling interval is set, the associated device accel timeout value may be reset to default. The timeout value may be changed by setting the corresponding object. An associated device reporting interval may comprise an unsigned integer parameter that stores the associated device's reporting time interval in seconds. If the reporting interval is set, the associated device accel timeout value may be reset to default. The timeout value may be changed by setting the corresponding object. An associated device polling interval default may comprise an unsigned integer parameter that stores the associated devices polling time default interval in seconds. An associated device reporting interval default may comprise an unsigned integer parameter that stores the associated devices reporting time default interval in seconds. A neighboring AP polling interval may comprise an unsigned integer parameter that stores the neighboring AP polling time interval in seconds. A neighboring AP reporting interval may comprise an unsigned integer parameter that stores the neighboring AP reporting time interval in seconds. If the reporting interval is set, the neighboring AP accel timeout value may be set to, for example, twice the reporting interval. The timeout value may be changed by setting the corresponding object. A neighboring AP polling interval default may comprise an unsigned integer parameter that stores the neighboring AP polling time default interval in seconds. A neighboring AP reporting interval default may comprise an unsigned integer parameter that stores the neighboring AP reporting time default interval in seconds. A radio traffic polling interval may comprise an unsigned integer parameter that stores the radio traffic polling time interval in seconds. If the polling interval is set, the radio traffic accel timeout value may be reset to default. The timeout value may be changed by setting the corresponding object. A radio traffic reporting interval may comprise an unsigned integer parameter that stores the radio traffic reporting time interval in seconds. If the reporting interval is set, the radio traffic accel timeout value may be reset to default. The timeout value may be changed by setting the corresponding object. A radio traffic polling interval default may comprise an unsigned integer parameter that stores the radio traffic polling time default interval in seconds. A radio traffic reporting interval default may comprise an unsigned integer parameter that stores the radio traffic reporting time default interval in seconds. An associated device accel timeout may comprise an unsigned integer parameter that stores the time in seconds after which the increased polling frequency for associated device scans may go back to default value. A neighboring AP accel timeout may comprise an unsigned integer parameter that stores the time in seconds after which the increased polling frequency for neighboring AP scans may go back to default value. A radio traffic accel timeout may comprise an unsigned integer parameter that stores the time in seconds after which the increased polling frequency for radio traffic scans may go back to default value. A neighboring AP last scan data may comprise a string parameter that returns the base64 encoded string of the last encoded binary payload of neighboring AP scan data which was sent to the cloud. This object may return the string as base64 encoded if the message bus does not handle the normal ASCII strings correctly. If a neighboring scan has not been run yet, the buffer may return the message: "NeighborAP Buffer is empty" as the return string. A neighboring AP on demand scan enable may comprise a boolean parameter which, if set to TRUE, may enable the collection of neighboring AP scan data once and sends it to the cloud. Once the collection and sending of data is done, the parameter value may back to FALSE. If the parameter is set to TRUE and while the data is being collected, the client may again set the parameter to TRUE, and nothing might happen and vice versa.

Polling and/or reporting intervals may be configured. An associated device polling interval may be set to a value from a list of values. Exemplary values include, but are not limited to, the following values in seconds: 1, 5, 15, 30, 60, 300, 900, 1800, 3600, 10800, 21600, 43200, and/or 86400. A new associated device polling interval might not be set greater than the current associated device polling interval so that the existing client (who may be depending on the quicker frequency) is not denied data due to the new request.

An associated device reporting interval may be set to a value from a list of allowed values. Exemplary values include, but are not limited to, the following values in seconds: 1, 5, 15, 30, 60, 300, 900, 1800, 3600, 10800, 21600, 43200, and/or 86400. The new associated device reporting interval might not be set to less than the current associated device polling interval in some examples. The new associated device reporting interval might not be set greater than the current associated device reporting interval in some examples so that the existing client (who may be depending on the quicker frequency) is not denied data due to the new request.

A neighboring AP polling interval may be set to a value from a list of allowed values. Exemplary values include, but are not limited to, the following values in seconds: 300, 900, 1800, 3600, 10800, 21600, 43200, and/or 86400. The new neighboring AP polling interval might not be set greater than the current neighboring AP polling interval so that the existing client (who may be depending on the quicker frequency) is not denied data due to the new request.

A neighboring AP reporting interval may be set to a value from a list of allowed values. Exemplary values include, but are not limited to, the following values in seconds: 300, 900, 1800, 3600, 10800, 21600, 43200, and/or 86400. A new neighboring AP reporting interval might not be set to less than the current neighboring AP polling interval. The new neighboring AP reporting interval might not be set greater than the current neighboring AP reporting interval so that the existing client (who may be depending on the quicker frequency) is not denied data due to the new request.

A radio traffic polling interval may be set to a value from a list of allowed values. Exemplary values include, but are not limited to, the following values in seconds: 1, 5, 15, 30, 60, 300, 900, 1800, 3600, 10800, 21600, 43200, and/or 86400. The new radio traffic polling interval might not be set greater than the current radio traffic polling interval so that the existing client (who may be depending on the quicker frequency) is not denied data due to the new request.

A radio traffic reporting interval may be set to a value from a list of allowed values. Exemplary values include, but are not limited to, the following values in seconds: 1, 5, 15, 30, 60, 300, 900, 1800, 3600, 10800, 21600, 43200, and/or 86400. The new radio traffic reporting interval might not be set to less than the current radio traffic polling interval. The new radio traffic reporting interval might not be set greater than the current radio traffic reporting interval so that the existing client (who may be depending on the quicker frequency) is not denied data due to the new request.

Various types of device reports may be generated, such as by using data collected by the data harvester. Examples of reports include (0) an associated devices report, (1) an interface devices Wi-Fi report, (2) a radio interfaces statistics report, (3) a neighboring AP report, (4) a network device status report, (5) a network devices traffic report, (6) an interface devices Wi-Fi extender report, (7) a high frequency interface devices Wi-Fi report, and/or other reports.

(0) An associated devices report may be generated. A complete poll may contain 1 or more connected devices, and a complete report may contain 1 or more polls. Various types of data may be collected for each connected device, including, for example, a timestamp, a radio BSSID, a radio channel (e.g., 3), a radio frequency band (e.g., 2.4 GHz), an SSID name, an SSID MAC address, a device MAC address, a device IP address, a device authentication state (e.g., true), a device last data downlink rate (e.g., 25), a device last data uplink rate (e.g., 7), a device signal strength (e.g., −55), device retransmissions, whether device is active (e.g., true or false), device operating standard, device operating channel bandwidth (e.g., 20 MHz), device SNR (e.g., 20), device interference sources, device data frames sent ack, device data frames sent no ack, device bytes sent, device bytes received, device RSSI (e.g., 45), device minimum RSSI, device maximum RSSI, device disassociations, device authentication failures, etc.

(1) An interfaces devices Wi-Fi report may be generated. The interface devices Wi-Fi report may be used to send Wi-Fi metrics data for the devices connected to the gateway harvested from the Wi-Fi HAL. This report may be generated by the harvester component, which may run on a processor of the gateway device (e.g., the processor of type 1 shown in FIG. 41). It may support various parameters to control, for example, a harvesting periodicity, schema identification, and/or default values for the various intervals. Intervals may be set to a defined set of values, which may be in seconds. Exemplary values may comprise, for example, 1, 5, 10, 15, 30, 60, 300, 900, 1800, 3600, 10800, 21600, 43200, and/or 86400. Below are exemplary TR-181 parameters supported by the report.

Various types of data may be collected for each connected device, including, for example, a timestamp, radio BSSID, radio channel (e.g., 3), radio frequency band (e.g., 2.4 GHz), SSID name, SSID MAC address, device MAC address, device IP address, device last data downlink rate (e.g., 25), device last data uplink rate (e.g., 7), device signal strength (e.g., −55), device retransmissions, device operating standard, device operating channel bandwidth (e.g., 20 MHz), device SNR (e.g., 20), device data frames sent ack, device data frames sent no ack, device bytes sent, device bytes received, device RSSI (e.g., 45), etc.

One or more parameters may be used to generate the interfaces devices Wi-Fi report. An enabled parameter may comprise a boolean parameter to control the state of harvesting for the report. This parameter may be persistent across reboots. For example, the parameter may remain stored in the harvester component or at a location accessible to the harvester component even after the gateway device is rebooted. A polling period parameter may comprise an unsigned integer parameter, which may determine how frequently the harvester component polls the underlying Wi-Fi HAL for associated device data connected to the gateway. Polling periods may be set to a defined set of values defined above. This parameter may be persistent across reboots. A reporting period parameter may comprise an unsigned integer parameter, which may be used to determine how frequently the harvester component sends the report to the client. The reporting period may be set to one of a defined set of values. This parameter may be persistent across reboots. A schema parameter may comprise a string parameter, which may output the structure (e.g., schema) used to encode the payload of the report. This may comprise a read only parameter. A schema ID may comprise a string parameter, which may define the universally unique identifier (UUID)/hash of the report used to generate the payload. This may comprise a read only parameter. A default polling period parameter may comprise an unsigned integer parameter used to define the default polling period of the report. The polling period may revert back to this value after override TTL seconds. This parameter may be persistent across reboots. A default reporting period may comprise an unsigned integer parameter used to define the default reporting period of the report. The reporting period may revert back to this value after override TTL seconds. This parameter may be persistent across reboots. A default override TTL parameter may comprise an unsigned integer parameter used to define the default time after which the polling and reporting parameters revert back to default polling and default reporting periods. This may comprise a read only parameter.

An interface devices Wi-Fi report may comprise a periodic report that contains a list of zero of more reports for each device connected to a Wi-Fi interface (e.g., 2.4 g, 5 g), which may include information about device connection status and interface metrics (e.g., signal strength).

An interface devices Ethernet report may comprise a periodic report that contains a list of zero or more reports for each device connected to an Ethernet interface, which may include information about device connection status and interface metrics.

An interface devices MoCA report may comprise a periodic report that contains a list of zero or more reports for each device connected to a MoCA interface, which may include information about device connection status and interface metrics.

(2) A radio interfaces statistics report may be used to send Wi-Fi radio data for the gateway. This report may be generated by the harvester component, which may run on a particular type of processor, such as an ATOM processor or an ARM processor. It may support various parameters to control the harvesting periodicity, schema identification and/or default values for the various periods. Each period may be set to a defined set of values, which may be in seconds. Allowed values may comprise, for example, 1, 5, 15, 30, 60, 300, 900, 1800, 3600, 10800, 21600, 43200, 86400, or other values.

Various types of data may be collected for a radio traffic report, including, for example, timestamp, radio BSSID, radio channel (e.g., 3), radio frequency band (e.g., 2.4 GHz), radio operating channel bandwidth (e.g., 40 Mhz), radio activity factor (e.g., 2), radio carrier sense threshold exceeded (e.g., 20), radio noise floor (e.g., −99), radio median noise floor on channel, etc.

The radio interfaces statistics report may support one or more parameters. An enabled parameter may comprise a boolean parameter to control the state of harvesting for the report. This parameter may be persistent across reboots. A polling period parameter may comprise an unsigned integer parameter, which may determine how frequently the harvester component polls the underlying HAL for radio related data connected to the gateway. Polling periods may be set to one of a defined set of values. This parameter may be persistent across reboots. A reporting period may comprise an unsigned integer parameter, which may determine how frequently the harvester component sends the report to the client. Reporting period may be set to one of a defined set of values. This parameter may be persistent across reboots. A schema parameter may comprise a string parameter, which may output the structure (e.g., schema) used to encode the payload of the report. This may comprise a read only parameter. A schema ID parameter may comprise a string parameter, which may define the UUID/hash of the report used to generate the payload. This may comprise a read only parameter. A default polling period parameter may comprise an unsigned integer parameter used to define the default polling period of the report. The polling period may revert back to this value after override TTL seconds. This parameter may be persistent across reboots. A default reporting period may comprise an unsigned integer parameter used to define the default reporting period of the report. The reporting period may revert back to this value after override TTL seconds. This parameter may be persistent across reboots. A default override TTL parameter may comprise an unsigned integer parameter used to define the default time after which the polling and reporting parameters revert back to default polling and default reporting periods. This may comprise a read only parameter.

(3) A neighboring AP report may be used to send data about one or more (e.g., all) the neighboring access points from the gateway. This report may be generated by the harvester Component, which may run on a first type of processor. It may support various parameters to control the harvesting periodicity, schema identification, and default values for the various periods. Each period may be set to one of a defined set of values which are in seconds, such as 300, 900, 1800, 3600, 10800, 21600, 43200, and/or 86400.

Various types of data may be collected for a radio traffic report, including, for example, timestamp, device MAC address, AP SSID name, AP SSID MAC address, AP mode infrastructure, AP channel (e.g., 1), AP signal strength (e.g., −39), AP security mode enabled (e.g., WPA-WPA2), AP encryption mode (e.g., AES, TKIP, etc.), AP operating frequency band (e.g., 2.4 GHz), AP supported standards (e.g., b, g, n, etc.), AP operating standards (e.g., n), AP operating channel bandwidth (e.g., 20), AP beacon period (e.g., 100), AP noise (e.g., −95), AP basic data transfer rates, such as 1, 2, 5, 6, 11, 12, 24, etc.), AP supported data transfer rates (e.g., 9, 18, 36, 48, 54, ACTUAL). AP DTIM period (e.g., 1), AP channel utilization.

The neighboring AP report may support one or more parameters. An enabled parameter may comprise a boolean parameter to control the state of harvesting for the report. This parameter may be persistent across reboots. A polling period parameter may comprise an unsigned integer parameter, which may determine how frequently the harvester component polls the underlying HAL for neighboring AP data connected to the gateway. Polling periods may be set to one of a defined set of values. This parameter may be persistent across reboots. A reporting period parameter may comprise an unsigned integer parameter, which may determine how frequently the harvester component sends the report to the client. The reporting period may be set to one of a defined set of values. This parameter may be persistent across reboots. A schema parameter may comprise a string parameter, which may output the structure (e.g., schema) used to encode the payload of the report. This may comprise a read only parameter. A schema ID parameter may comprise a string parameter, which may define the UUID/hash of the report used to generate the payload. This may comprise a read only parameter. A default polling period parameter may comprise an unsigned integer parameter used to define the default polling period of the report. The polling period may revert back to this value after override TTL seconds. This parameter may be persistent across reboots. A default reporting period may comprise an unsigned integer parameter used to define the default reporting period of the report. The reporting period may revert back to this value after override TTL seconds. This parameter may be persistent across reboots. A default override TTL parameter may comprise an unsigned integer parameter used to define the default time after which the polling and reporting parameters revert back to default polling and default reporting periods. This may comprise a read only parameter. A last scan data parameter may comprise a string parameter that returns the base64 encoded string of the last encoded binary payload of neighboring AP scan data that was sent to the cloud. This object may return the string as base64 encoded since the message bus might not handle the normal ASCII strings correctly. If a neighboring scan has not been run yet, the buffer may return the message: "NeighborAP Buffer is empty" as the return string. An on demand scan parameter may comprise a boolean parameter which, if set to TRUE, enables the collection of neighboring AP scan data once and sends it to the cloud. Once the collection and sending of data is done, the parameter value may go back to FALSE. If the parameter is set to TRUE and while the data is being collected, the client may again set the parameter to TRUE, nothing happens and vice versa.

(4) The network devices status report may send the status (e.g., online or offline) data for the devices connected to the gateway. This report may be generated by a component running on, for example, an ARM processor. The report may support various parameters to control the harvesting periodicity, schema identification and/or default values for the various intervals. Each interval may be set to one of a defined set of values (which may be in seconds). Exemplary values include 5, 10, 15, 30, 60, 300, 900, 1800, 3600, 10800, 21600, 43200, 86400.

The network devices status report may support one or more parameters. An enabled parameter may comprise a boolean parameter to control the state of harvesting for the report. This parameter may be persistent across reboots. A polling period parameter may comprise an unsigned integer parameter, which may determine how frequently a component polls the data from a device hosts table for devices connected to the gateway. Polling periods may be set to one of a defined set of values. This parameter may be persistent across reboots. A reporting period parameter may comprise an unsigned integer parameter, which may determine how frequently the component sends the report to the client. The reporting period may be set to a defined set of values. This parameter may be persistent across reboots. A schema parameter may comprise a string parameter, which may output the structure (e.g., schema) used to encode the payload of the report. This may comprise a read only parameter. A schema ID parameter may comprise a string parameter, which may define the UUID/hash of the report used to generate the payload. This may comprise a read only parameter. A default polling period parameter may comprise an unsigned integer parameter used to define the default polling period of the report. The polling period may revert back to this value after override TTL seconds. This parameter may be persistent across reboots. A default reporting period parameter may comprise an unsigned integer parameter used to define the default reporting period of the report. The reporting period may revert back to this value after override TTL seconds. This parameter may be persistent across reboots. A default override TTL parameter may comprise an unsigned integer parameter used to define the default time after which the polling and reporting parameters revert back to default polling and default reporting periods.

A network devices status report may comprise a periodic report that contains a list of zero or more reports for each device connected per interface (e.g., Wi-Fi, Ethernet, MoCA), which may include status information (e.g., online or offline) about the device.

(5) A network devices traffic report may send the traffic (e.g., bytes up, bytes down, etc.) data for the devices connected to the gateway. This report may be generated by the component which runs on, for example, the ARM processor. The report may support various parameters to control the harvesting periodicity, schema identification, and default values for the various intervals. Each interval may be set to one of a defined set of values which may be in seconds. Exemplary values include, for example, 30, 60, 300, 900, 1800, 3600, 10800, 21600, 43200, 86400.

The network devices traffic report may support one or more parameters. An enabled parameter may comprise a boolean parameter to control the state of harvesting for the report. This parameter may be persistent across reboots. A polling period parameter may comprise an unsigned integer parameter, which may determine how frequently the component polls the data from the device hosts table for devices connected to the gateway. Polling periods may be set to a defined set of values. This parameter may be persistent across reboots. A reporting period parameter may comprise an unsigned integer parameter, which may determine how frequently the component sends the report to the client. The reporting period may be set to one of a defined set of values. This parameter may be persistent across reboots. A schema parameter may comprise a string parameter, which may output the structure (e.g., schema) used to encode the payload of the report. This may comprise a read only parameter. A schema ID may comprise a string parameter, which may define the UUID/hash of the report used to generate the payload. This may comprise a read only parameter. A default polling period may comprise an unsigned integer parameter used to define the default polling period of the report. The polling period may revert back to this value after override TTL seconds. This parameter may be persistent across reboots. A default reporting period may comprise an unsigned integer parameter used to define the default reporting period of the report. The reporting period may revert back to this value after override TTL seconds. This parameter may be persistent across reboots. A default override TTL parameter may comprise an unsigned integer parameter used to define the default time after which the polling and reporting parameters revert back to default polling and default reporting periods.

A network devices traffic report may comprise a periodic report that contains a list of zero or more reports for each device connected per interface (e.g., Wi-Fi, Ethernet, MoCA), which may include information about network data usage stats to/from the Internet (or other WAN).

(6) An interface devices Wi-Fi extender report may be used to send Wi-Fi metrics data for the devices connected to a network extender. This report may be generated by a component, which may run on an ARM processor. The report may support various parameters to control the harvesting periodicity, schema identification and/or default values for the various intervals. Each interval may be set to one of a defined set of values, which may be in seconds. Exemplary values include, for example, 1, 5, 10, 15, 30, 60, 300, 900, 1800, 3600, 10800, 21600, 43200, 86400.

The interface devices Wi-Fi extender report may support one or more parameters. An enabled parameter may comprise a boolean parameter to control the state of harvesting for the report. This parameter may be persistent across reboots. A polling period parameter may comprise an unsigned integer parameter, which may determine how frequently the component polls the Moca HAL for devices connected to the extender. Polling periods may be set to one of a defined set of values. This parameter may be persistent across reboots. A reporting period parameter may comprise an unsigned integer parameter, which may determine how frequently the component sends the report to the client. A reporting period may be set to a defined set of values. This parameter may be persistent across reboots. A schema parameter may comprise a string parameter, which may output the structure (e.g., schema) used to encode the payload of the report. This may comprise a read only parameter. A schema ID parameter may comprise a string parameter, which may define the UUID/hash of the report used to generate the payload. This may comprise a read only parameter. A default polling period may comprise an unsigned integer parameter used to define the default polling period of the report. The polling period may revert back to this value after override TTL seconds. This parameter may be persistent across reboots. A default reporting period may comprise an unsigned integer parameter used to define the default reporting period of the report. The reporting period may revert back to this value after override TTL seconds. This parameter may be persistent across reboots. A default override TTL may comprise an unsigned integer parameter used to define the default time after which the polling and reporting parameters revert back to default polling and default reporting periods.

An interface devices Wi-Fi extender report may comprise a periodic report that contains a list of zero or more reports for each device connected to an extender Wi-Fi interface (e.g., 2.4 g, 5 g, etc.), which may include information about device connection status and interface metrics (e.g., signal strength).

(7) A high frequency interface devices Wi-Fi report may be generated. Various types of data may be collected for a radio traffic report, including, for example, timestamp, radio BSSID, radio channel (e.g., 3), radio frequency band (e.g., 2.4 GHz), SSID name, SSID MAC address, device MAC address, device last data downlink rate (e.g., 25), device last data uplink rate (e.g., 7), device signal strength (e.g., −55), device retransmissions, device operating standard, device operating channel bandwidth (e.g., 20 MHz), device SNR (e.g., 20), device data frames sent ack, device data frames sent no ack, device bytes sent, device bytes received, and/or device RSSI.

The harvester may be tuned and set to accomplish different goals, and allow multiple applications to obtain the data desired. The harvester may be controlled with one or more settings. Report on/off: the harvester provides the ability to turn individual reports (e.g., device, radio, neighbor scan) on and off. Polling frequency: the harvester provides the ability to change how often it queries the Hardware Access Layer (HAL) on a per report basis. Reporting frequency: the harvester provides the ability to change how often reports are sent to the cloud. Exemplary settings include associated device report: ON, polling frequency: 1 minute, reporting frequency: 5 minutes. Using these settings, the harvester may poll the hardware for connected devices every minute for 5 minutes, buffering the data locally, before sending a report to the cloud.

The harvester may poll the Hardware Access Layer and may report the connected devices every 5 minutes if enabled. The polling and/or reporting speed may be accelerated (e.g., increased), such as via an API. For example, polling may be set to 5 secs, and reporting may be set to 15 seconds. Once a request is made and accepted, the harvester may operate at the faster speed for, for example, 5 minutes before returning to its default speed. If accelerated polling/reporting is requested for a longer period, the consuming application may make an additional API call. This call may reset the accelerated polling time to 5 minutes. Requests for slower polling/reporting intervals might be rejected. In a first example, the harvester may reject requests to poll/report slower than a default (e.g., P:5 min/R:5 min), such as P:10 min, R:60 min. In a second example, the harvester may reject a request for P:15 sec, R: 1 min if it is currently in an accelerated state (e.g., P: 5 sec, R:5 sec). In a third example, the harvester may accept a request for P:5 sec, R:5 sec if a current state is P:5 sec, R:5 sec. P:5 sec, R:5 sec may remain in effect for 5 minutes (or some other duration) unless another request for P:5 sec, R:5 sec is received before 5 minutes has elapsed.

Various parameters may be used for each device report. A report name parameter may indicate the short name of the report. A schema parameter may indicate the schema definition associated with report. A schema ID parameter may indicate a UUID/hash of the schema. An enabled parameter may indicate whether the report is enabled by default. A reporting period parameter may indicate the frequency (e.g., in seconds) that the report is sent for storage in a database. This parameter might be null or not set for event-driven reports. A polling period parameter may indicate the period (e.g., in seconds) that new data elements are collected and added into the report array. The polling period may be the same as, or less than the reporting period. This parameter might be null or not set for event-driven reports or if one element exists. A default reporting period parameter may indicate the default period (e.g., in seconds) that the report may be sent for storage in a database. This parameter might be null or not set for event-driven reports. A default polling period parameter may indicate the default period (e.g., in seconds) that new data elements are collected and added into the report array. The default polling period may be the same as, or less than the reporting period. This parameter might be null or not set for event-driven reports or if one element exists. A default override TTL may indicate the time (e.g., in seconds) that either the reporting period, the polling period, or both, can be increased for, before dropping back to the default settings.

A harvester agent may periodically retrieve operational data about devices connected to a gateway every X minutes (e.g., every 1 minute). The data may be stored in a buffer, before being saved to a report and sent for storage in a database every Y minutes (e.g., every 5 minutes). For example, if three devices are connected to a gateway, the resulting payload may have 15 data entries in a particular schema. If a device connects to the network in the middle of a reporting period, there might be entries in the payload for the polling intervals for which it was connected. If a user wishes to temporarily increase the polling and reporting period (e.g., in order to perform a fine grained health check), the user could request a change to these parameters (e.g., set both the reporting and polling period to 1 second intervals instead of 5 second intervals). After an override TTL period, the harvester agent may revert back to the default values (e.g., of every 1 and 5 minutes).

Figure 9A:
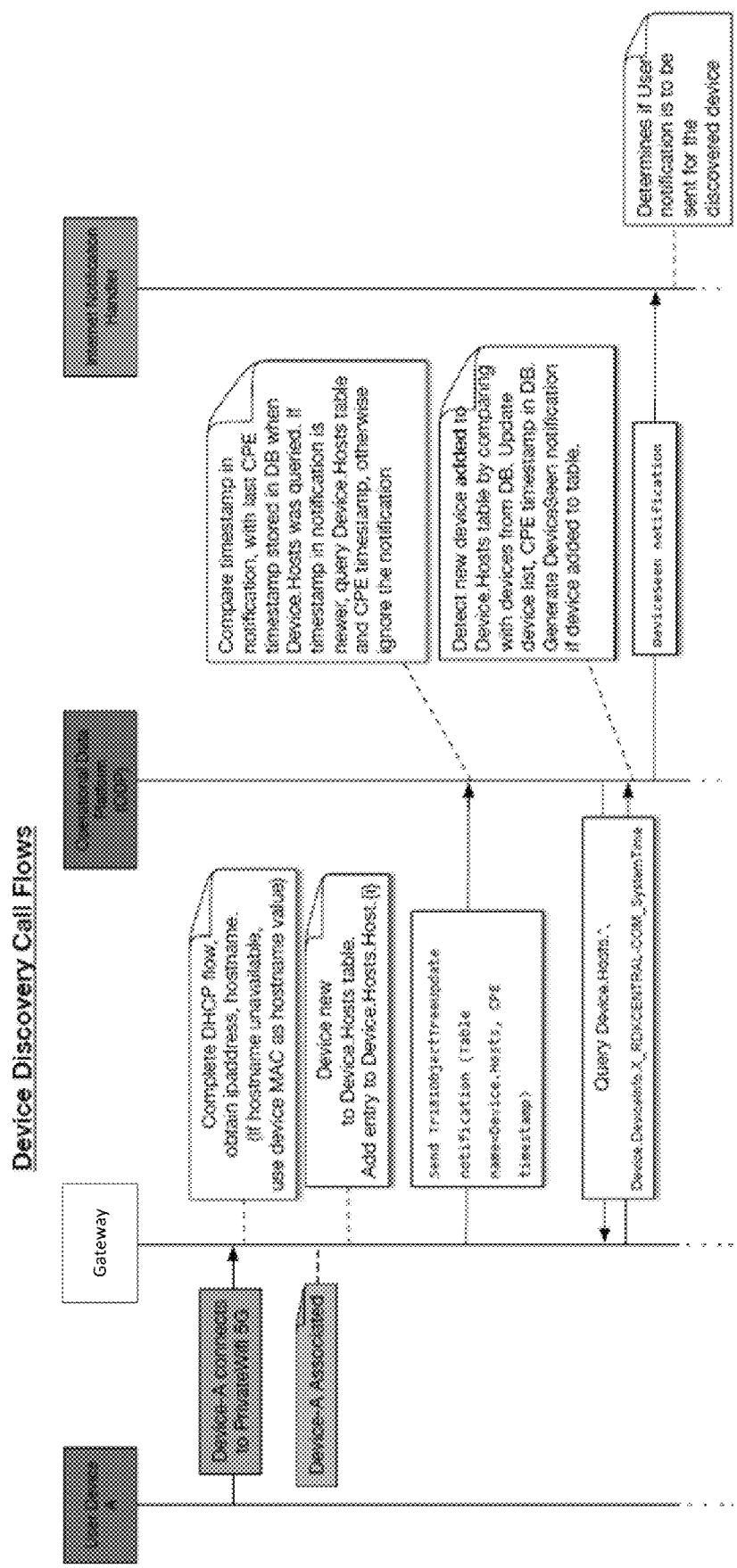
FIGS. 9a-b show an example system and method for device discovery.
Figure 9B:
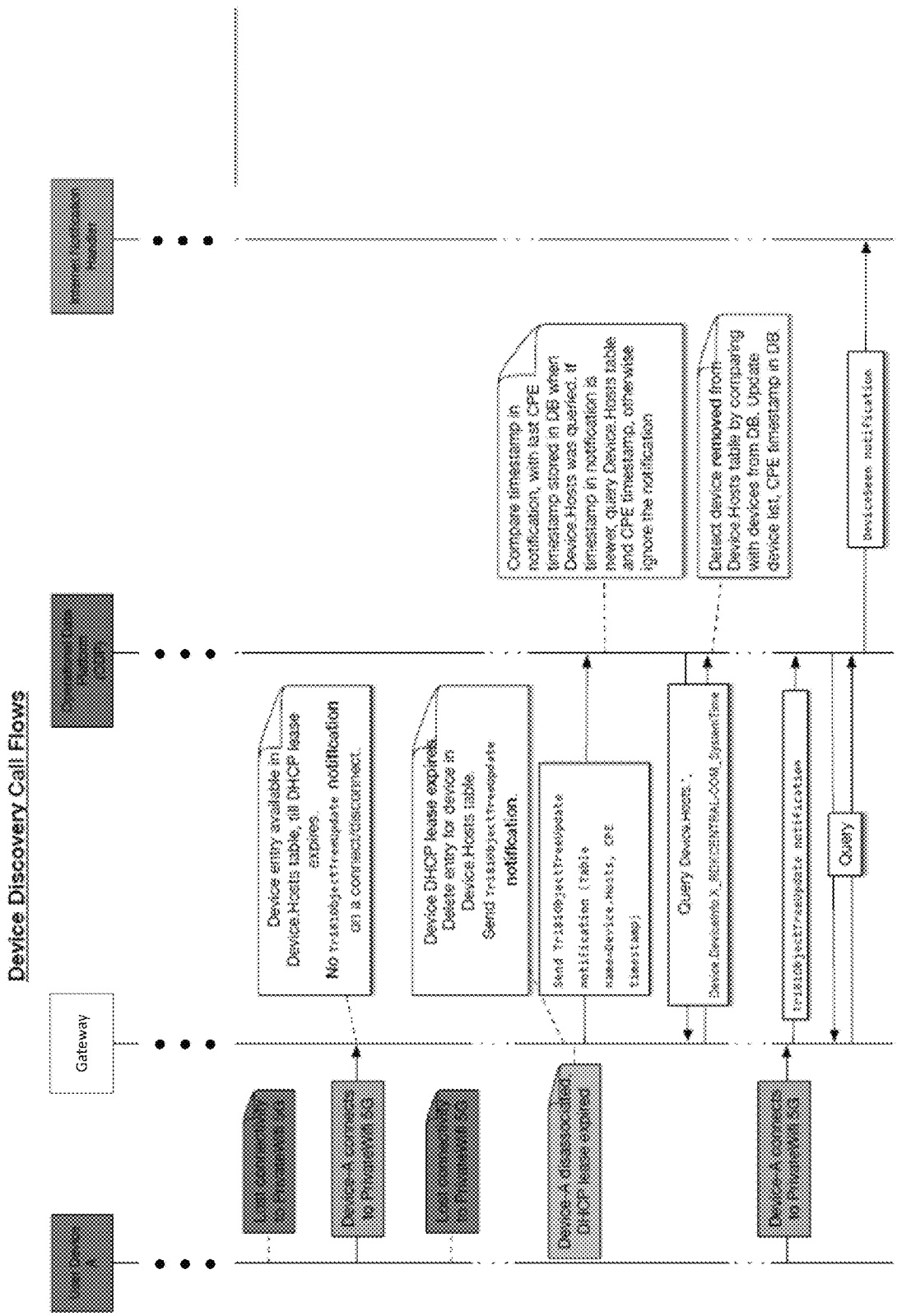

FIGS. 9a-b show an example system and method for device discovery. The system and methods described herein may enable real time visibility of Wi-Fi data for connected devices. Wi-Fi connection data about a device may be retrieved on, for example, an order of less than or equal to 2 second intervals from the gateway. This information may be available directly to the user front end with minimal delays from batch processing, storage, or polling requirements. This may accomplish the goal of providing a real time experience to the user to visualize Wi-Fi connection data with minimal processing or transport delay.

Figure 10A:
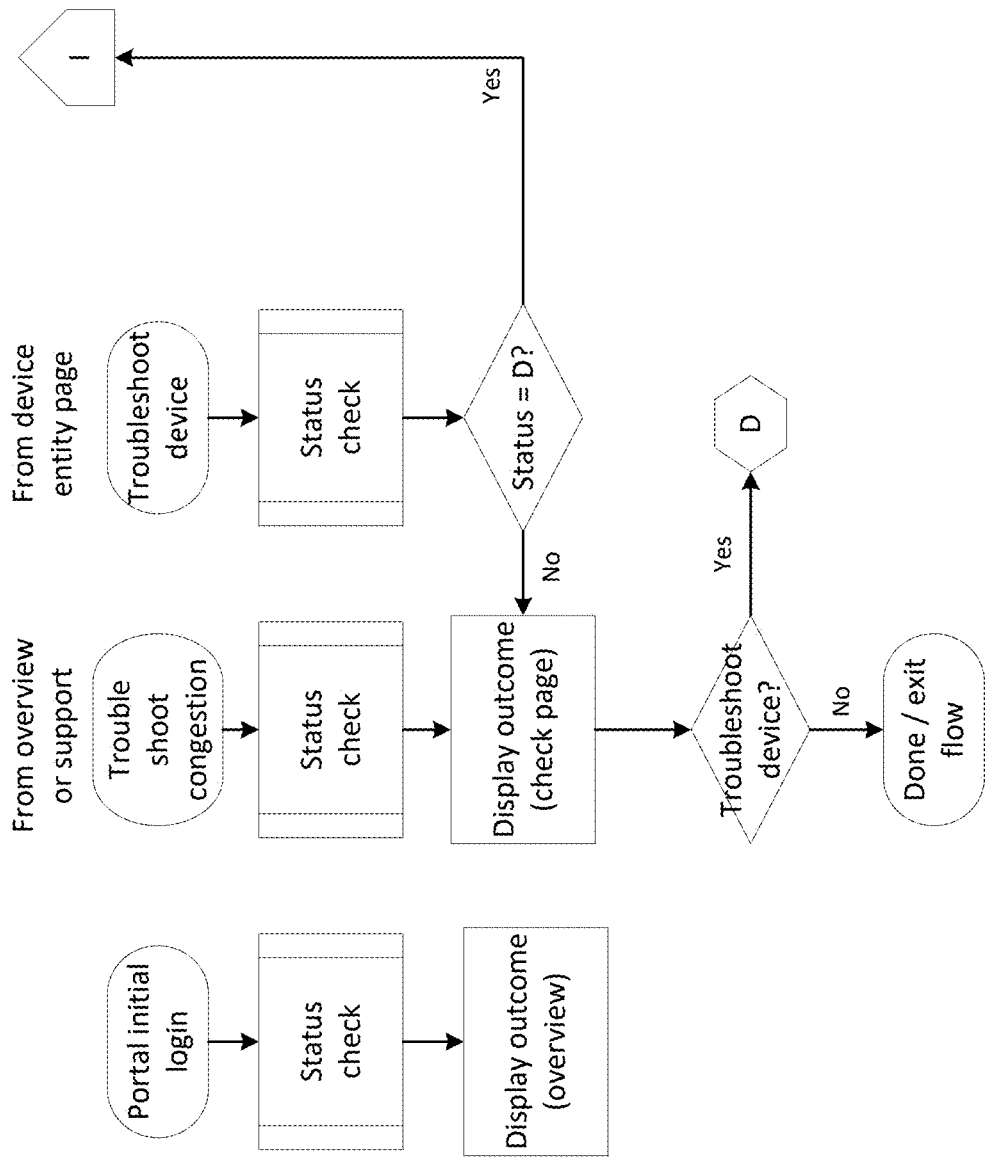
FIGS. 10a-c show an example method for checking connection status and troubleshooting.
Figure 10B:
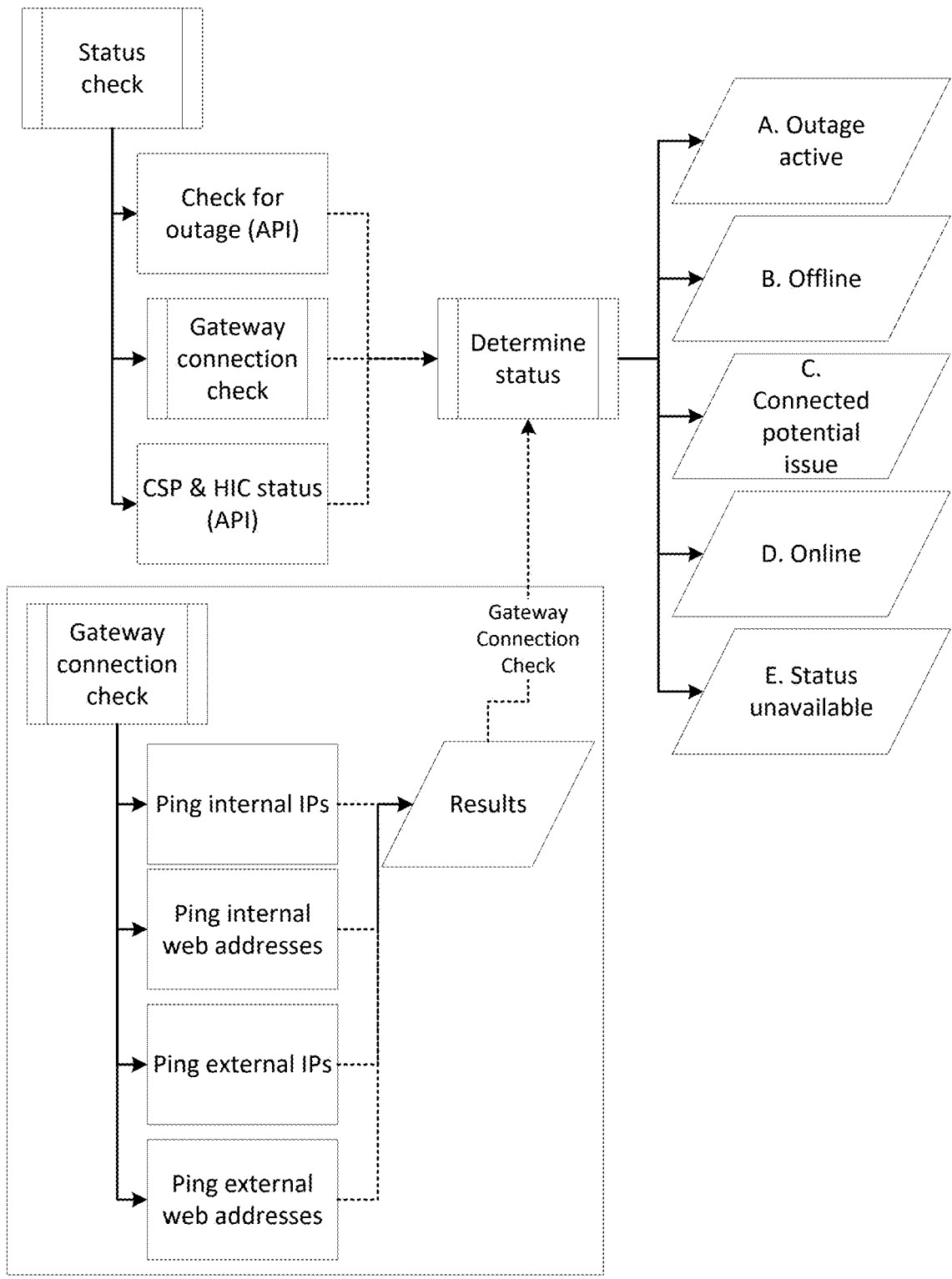
Figure 10C:
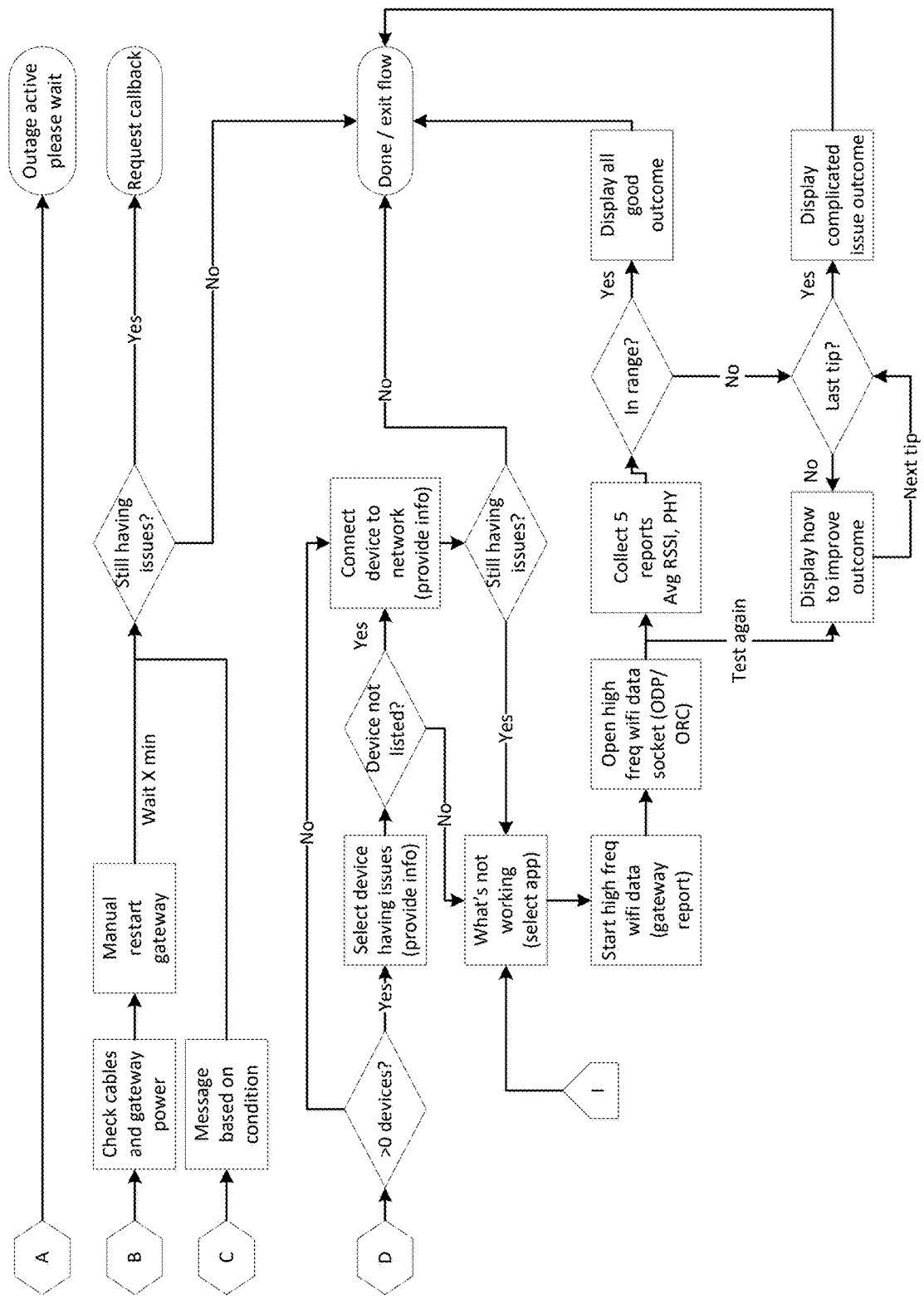

FIGS. 10a-c show an example method for checking connection status and troubleshooting. A connection assistant tool may provide a summary connection status of a user's network states at portal or application login or on demand. The user may access the connection helper tool from multiple points within an application running on a device associated with the user, such as a personal computer 114, a laptop computer 115, a wireless device 116, or another user device. For example, the user may access the connection helper tool on login to the portal/application (e.g., the connection checks (of gateway and network) may be initiated and results displayed in the interface). The user may access the connection helper tool on user selection of the connection helper tool from any point in the portal/app (e.g., overview page, support page), or by selecting a "connection issue with this device" link from, for example, a device entity page. To create a network status, a series of checks may be initiated at launch of the app/portal or after the user requests connection help. These checks may be conducted transparently to the user, and results may be displayed in a clear and concise way indicating success or failure. For example, a number of devices currently connected to the gateway and/or the Wi-Fi connection quality based on real time Wi-Fi metrics gathered about one or more devices may be determined.

The connection assistant tool may provide network and gateway connectivity information, such as outages, provisioning issues, delinquent or suspended account, bad or loose connection (e.g., cabling issues), gateway offline, and/or protocol agent status (e.g., ability to manage settings through a portal). The connection assistant tool may provide device connectivity information, such as Wi-Fi connection capability based on individual device and the selected application, devices not connected to a user's private SSID (e.g., provide connection information), paused devices, Ethernet connected device issue, etc.

The connection assistant tool may provide resolution steps for the user's network issues including network and gateway connectivity resolutions, such as expected resolution time (e.g., for an outage), requesting a callback, address in home wiring (e.g., tighten cables, remove splitters, etc.), and/or gateway restart (e.g., automatic or manual). The connection assistant tool may provide resolution steps for the user's network issues including device connectivity resolutions, such as providing connection information, unpause a paused device, try new cable, different port, or check drivers (e.g., for Ethernet issues), Wi-Fi connection improvement tips, etc.

Device issue resolution: if there are no outages and the gateway is online, the user may be presented with an option to troubleshoot a device. On selecting this option, the user may be taken through a flow. First, the user may select the device the user wishes to troubleshoot or may select "Device Not Listed." If "Device not listed" is selected, the user may be presented with a list of currently paused devices (if any) and instructions for how to connect a device to their SSID (e.g., provide SSIDs & passwords). A gateway may prevent a paused device from accessing, for example, the internet after the paused device is connected to an in-home network via the gateway. The user (or another user) may have previously paused the device by selecting, via a user interface, an option to pause the device. After the user is presented with the list of currently paused devices, the user may select one of the paused devices. If the user selects a paused device, the user may be presented with an option to un-pause the device (e.g., and moves to next step), or keep it paused (e.g., exits flow). The user may select if the user is still having issues with a device. If yes, the flow may move to the next step. If not, the flow may be exited.

Second, the user may select the application the user is trying to use. For example, the user may be having trouble using a weather forecast application on their mobile phone. Third, the user may be presented with a screen showing a test of the user's connection related to the selected application. If successful (e.g., requirements met), display a success message and provide a link to exit the flow. The user may be provided with tip information as an optional education factor. If unsuccessful (e.g., requirements not met), display a message indicating the lack of capability, and provide carousel of tips the user may scan through to improve signal, and a link to retest. Clicking "retest" may initiate the test again and display the new result in step 3.

The system may provide the user with one or more connection improvement tips. For example, the user may be instructed to move the device closer to the gateway. If it is a static device, the user may be instructed to place it in the open away from obstacles or place in clear line of sight. If 2.4/5 GHz bands are split, the user may be instructed to switch the device to the 5 GHz SSID. If channel is not set to auto, the user may be instructed to consider changing the channel or using auto channel selection. The user may be instructed to restart the device. For example, sometimes the device may have issues with Wi-Fi, and restarting it may resolve these issues. The user may be instructed to improve the gateway signal by removing obstacles from around the gateway (e.g., large items, items with lots of metal or water, etc.). The user may be instructed to remove interfering devices (e.g., placing the gateway away from cordless phones, baby monitors, etc.). The user may be instructed to place the gateway higher and away from obstacles (e.g., on a shelf or stand, off the ground, out from behind furniture, etc.). The user may be instructed to hardwire the device. If the device has an Ethernet port, the user may be instructed to consider hardwiring the device to ensure the best connection. The user may be instructed to restart the gateway. Restarting the gateway may resolve many issues, and may be recommended before trying the next steps. The user may be instructed to move the gateway to a central location in the home to ensure signals cover as much of your home as possible. The user may be instructed to check for coax and power near the center of the home. The user may be asked whether to request a callback to resolve the issue. While the user waits, the user may view technical connection details for this device (e.g., provide a link to technical details). The user may be requested to consider a Wi-Fi extender. The user may be requested to conduct a Wi-Fi room scan to optimize gateway placement.

The system may confirm gateway status in one or more areas, such as whether a gateway is connected to the CMTS/Network, whether the gateway is able to resolve DNS to IP addresses, whether the gateway is able to reach the Internet and retrieve a website, and/or whether the gateway is able to connect to a cloud network (e.g., via a protocol agent).

Network and gateway status and troubleshoot solutions are described herein. The status of a user's connection may be indicated at a holistic level. Users may be provided with actionable steps to remedy issues. A visual representation of connection status at portal login may be provided. A connection status check may be performed to isolate the location of an issue (e.g., outage, gateway issue, device issue, etc.). An ability to fix an issue or troubleshoot connection issues with a specific device may be provided. Accordingly, connection problems may be solved. Peace of mind of what is working, and where the issue is located may be provided. An understanding of how Wi-Fi relates to device performance and how to improve performance may be provided.

Device connection and troubleshooting solutions are described herein. The status of a user's connection for each specific device (e.g., based on Wi-Fi connection) may be indicated. Users may be provided with actionable steps to remedy Wi-Fi issues. A user may be prompted to identify a device, and the application having trouble. Wi-Fi data may be gathered in real time to understand the capabilities of a specific device given current connection quality. Whether an application will work/will not work given Wi-Fi telemetry may be indicated. Specific actions for a user to improve Wi-Fi quality may be shown. Accordingly, Wi-Fi connection problems may be solved. An understanding of how Wi-Fi relates to device performance and how to improve performance may be provided.

Wi-Fi data may be used to allow advanced users to explore signal levels in their homes and assess signal quality for individual devices with detailed metrics. Additional Wi-Fi information in technical details modal may be provided. Visuals of Wi-Fi signal quality in real time, and as time series metrics may be provided. Connection details, such as IP, connection type, PHY rates, RSSI, etc. may be provided. Historical data, such as signal strength (RSSI), data rate (RX and TX PHY) may be provided. A useful tool for power users to understand Wi-Fi Signal quality in their homes may be provided. Users may make a judgement on the quality of their connections based on the raw data and their existing knowledge. A platform for room scan and save, device placement, and network setup may be provided. Examples of a room scan will be described in further detail below, and examples of user interfaces used for a room scan are shown in FIGS. 31C-K. Network connections may be improved by changing the location of an access point or network extender in a premise (e.g., a home) or by adding an access point or network extender in the premise. The system may recommend, such as via a user interface, that the user change the location of an access point and/or network extender or add another access point or network extender.

Various components of a system may be used to implement connection assistance. A gateway may generate high frequency interface devices Wi-Fi reports. An operational data platform (ODP) and/or virtual gateway controller may handle requests and responses for connection checks (e.g., may make request to the protocol agent and send the response to the U/I), provide a high frequency Wi-Fi report data path (e.g., initiate high frequency Wi-Fi report to the gateway, develop & maintain the data path of protocol agent to U/I and web socket. A UI may be used to initiate a connection status check on portal login or on demand, determine results & correlated actions (e.g., on overview or status pages), develop other entry points in UI, enable troubleshoot device connection flow (e.g., request Wi-Fi data, establish connection to receive Wi-Fi report data from ODP (web socket), gather return & calculate if value is in range for selected application.

Figure 11:
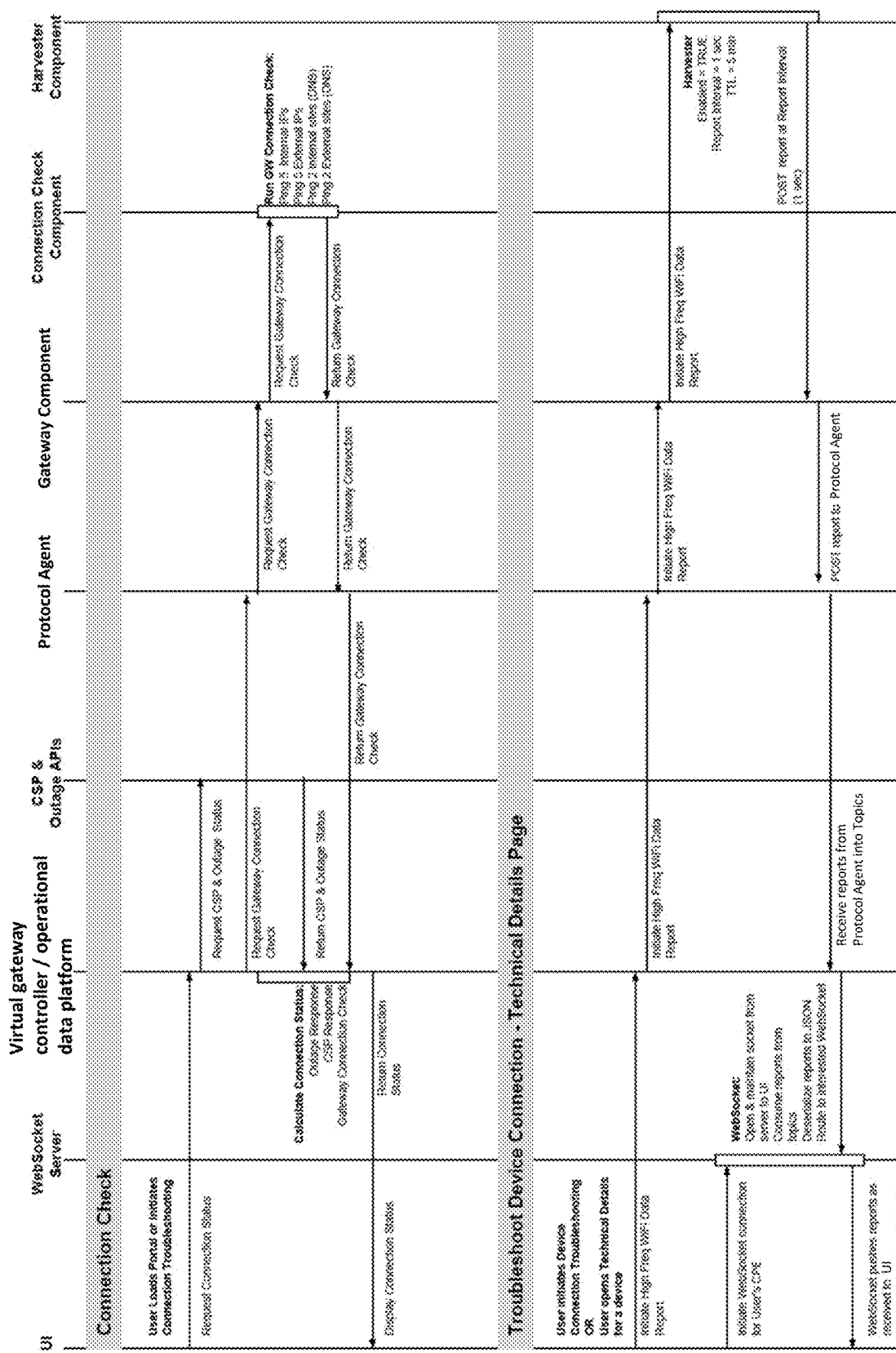
FIG. 11 shows an example system and method for checking a connection and troubleshooting device connection issues.

FIG. 11 shows an example system and method for checking a connection and troubleshooting device connection issues.

A real time feed may utilize a high frequency devices Wi-Fi report to enable reporting in a separate data path from an interface devices Wi-Fi report, which may be used for analytic data gathering. One or more of the following may occur in any order. As an example, in a first item, a user may navigate to a Wi-Fi meter application, which may use a plurality of user interfaces to assist the user in measuring and/or improving network connections in the home. Examples of user interfaces for the Wi-Fi meter application are shown in FIGS. 31C-K. In a second item, a high frequency devices Wi-Fi report may be enabled in the data harvester. The reporting period and a TTL period may be set. An Enabled object may be set to Enabled. There may be a default TTL and reporting interval to be set as part of this request, the default TTL and reporting interval are configurable objects. In a third item, the report may send data to a protocol agent at the configured reporting period (e.g., 1 second) until the TTL period is reached (e.g., 5 minutes). One or more of the previous may occur in any order.

An architecture for generating a report will now be described. A harvester component may periodically poll a network (e.g., Wi-Fi) driver to gather the appropriate data, and construct a proper data collection payload to be delivered over the protocol agent. A web hook may be configured within the operational data platform to push these events into an appropriately named topic (e.g., KAFKA topic).

The architecture may comprise a real time event bridge. The real time event bridge may consume topics identified as low latency (e.g., real time). The real time event bridge may deliver interesting messages from these topics to interested users. The real time event bridge may provide a model by which an application may consume a small number of interesting keys from the topic. For example, for the Wi-Fi meter, an interesting topic may describe a Wi-Fi connection data for gateways within a specific household. A consuming application may be interested in a single key from the messages to the topic, and it might not be as efficient for the application to consume messages (e.g., all messages) within a topic. The real time event bridge may therefore be responsible for routing messages between a messaging bus and a varying number of application consumers.

A system described herein may comprise one or more messaging bus consumers (e.g., users who consume messages from a specific messaging bus topic). The system may comprise a web socket interface for consuming applications to subscribe to messages for a specific gateway, which may be identified by MAC address. Messages consumed from the messaging bus that are for the gateway MAC that a client application has subscribed to are de-serialized from a particular data collection format, and sent to the consuming application, e.g., as JSON over a web socket.

The real time event bridge application may be able to scale horizontally to handle loads. A consistent hash ring with each member owning a MAC address may be implemented. Both events and web socket connections may be forwarded to the owner host. For reliability, the system may be deployed in a plurality of data centers. A global view of data may be provided. Aggregate cluster(s) may be implemented to provide a global view of data. Cluster members may consume from alternate (e.g., one of 2) messaging bus clusters and allow the hashing algorithm to handle delivery.

Systems may be used to ensure that the server side components are not overloaded with superfluous messages. A harvester on the gateway may be configured to have these high frequency reports turned off by default. A parameter may be toggled to modify the reporting interval (e.g., default of 1 second) and to start the reporting process. A maximum TTL may be set for reporting. Reports may be on demand, and high frequency reports may default to off, and be able to be toggled on for a brief period of time, which may be configurable. In the Wi-Fi meter use case, reports may be toggled on for up to 5 minutes after a user starts the Wi-Fi meter functionality. At a default reporting interval of 1 message per second, the bandwidth usage to deliver the report may be determined by the number of currently connected devices. For example, a gateway with 10 devices connected may result in traffic of about 1.5-2 kb/s from the gateway to the protocol agent service.

A web socket interface may be provided for clients to consume events from a gateway with minimal delay (e.g., less than 1 second) between event generation and delivery to the client application. Events may be delivered to a messaging bus, using an operational data platform pipeline. For example, a harvester may generate an event, and the event may be published to protocol agent. A hook may sort incoming protocol agent messages into appropriate topics. Latency for these steps may be minimal. For example, an event may be ready for consumption from the messaging bus between 100-300 ms after event generation on the gateway.

A real time data access layer may provide quick access to data with reduced latency. For example, a web socket interface may be provided for clients to connect to the server and to request events for a given account or gateway. Events from messaging bus topics may be consumed. Messages in topics may be deserialized (e.g., converted to JSON), and messages may be routed to any interested client web socket connections.

A consistent hash ring may be provided to allow the server to scale horizontally. For example, a gossip protocol (e.g., SWIM) may be used to determine ring membership. For incoming connections (e.g., web socket), or events (e.g., messaging bus), forward them to the current owner node according to a consistent hash function. The owner node may implement the logic described above to deliver events to the client in JSON format.

Various example applications exist. For example, a single node on a local machine may connect to a server on the local host. A node (e.g., within a single node process) cluster may be started on the local machine. Each node may connect to one of a plurality of messaging bus clusters. A client application may be launched, which authenticates with the server (e.g., using JWT), and prints any events for the MAC address it is subscribed to, to the console. A command line tool to simulate a gateway device send events to the messaging bus may be provided.

Various configuration options may be set after starting up nodes, such as application name, a port number to start using for this app instance, client secret for authentication, a server secret to accept incoming events from the messaging bus component, an IP address to bind ringpop to, increment shared baseport by this number to get the ringpop port to bind to, array of host:port for ringpop servers to bootstrap from (e.g., may include itself), IP address to bind the web socket proxy server to, increment shared baseport by this number to get the web socket proxy port to bind to, IP address to bind the web server to (e.g., accepts events and proxy connections), increment shared baseport by this number to get the web server port to bind to, application group ID for coordinating messaging bus consumers, an array of host:port brokers to bootstrap the messaging bus connection from, and/or a topic to consume.

Figure 3:
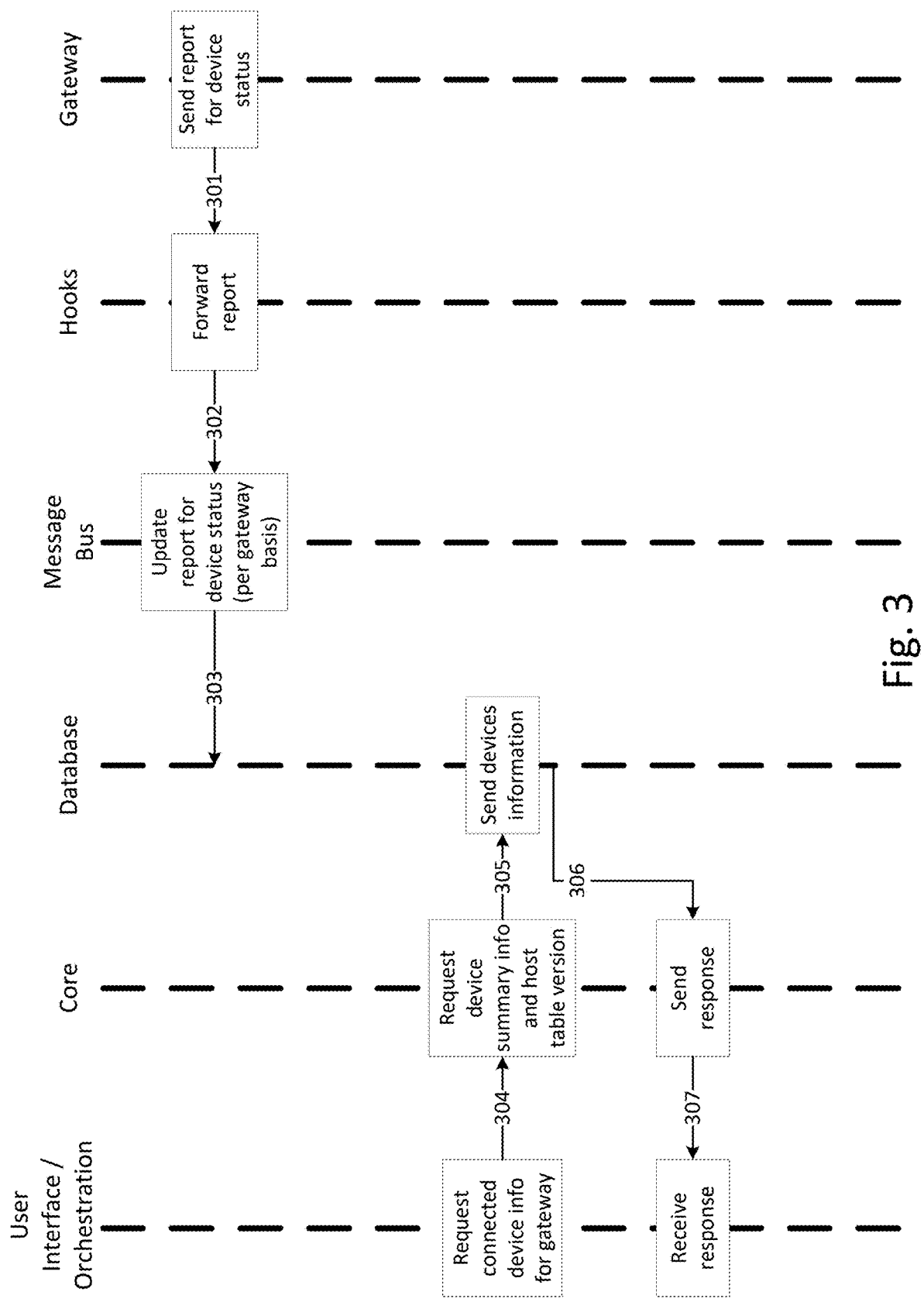
FIG. 3 shows an example system for requesting and receiving connected device data in a first scenario.

A user may interact with ODP using an application on a user device, such as via one or more user interfaces displayed by the application. User requests may be received by the user interface, and may be sent to orchestration, which may comprise middleware for interacting with ODP. Orchestration may send the user request to ODP. Similarly, the user device may receive, via orchestration, data from ODP. ODP may comprise a plurality of components, such as a core, a database, a sync module, a message bus, hooks, and/or other components. FIG. 3 shows an example system for requesting and receiving connected device data in a first scenario (e.g., a sunny day scenario). One or more of the following may occur in any order.

301: a gateway may send, to one or more hooks, a periodic report for device status

302: hooks may forward the reports, from the gateway, to a message bus

303: message bus may update periodic reports for device status, such as on a per gateway basis. The reports may be stored and updated in a database.

The gateway may periodically generate and/or cause storage of the data (e.g., in 301, 302, and 303), such as every 15 minutes or a different timeframe.

304: a user device, such as via a user interface, may receive, from a user, a request for connected device information for a gateway. The user device may send, to a core, a call to get the connected device information for the gateway. For example, a request (e.g., via an HTTP GET request) may request a summary for connected devices (e.g., all connected devices) for a specific gateway (e.g., specified by MAC).

305: the core may send, to the database, a request (e.g., a get request) for the device information and/or a host table version.

306: the database may return, to the core, the connected devices information.

307: the core may respond, to the user device (e.g., via the user interface), with the connected devices information, such as in a JSON body (or other data format). The response may include, for example, a summary comprising device ID, last seen time, device parent (e.g., MAC address of the gateway that this device is connected to, e.g., gateway MAC or extender MAC), device type, IP address, manufacturer, connection interface, hostname, service type, RSSI, device MAC, etc. for each connected device.

Figure 4:
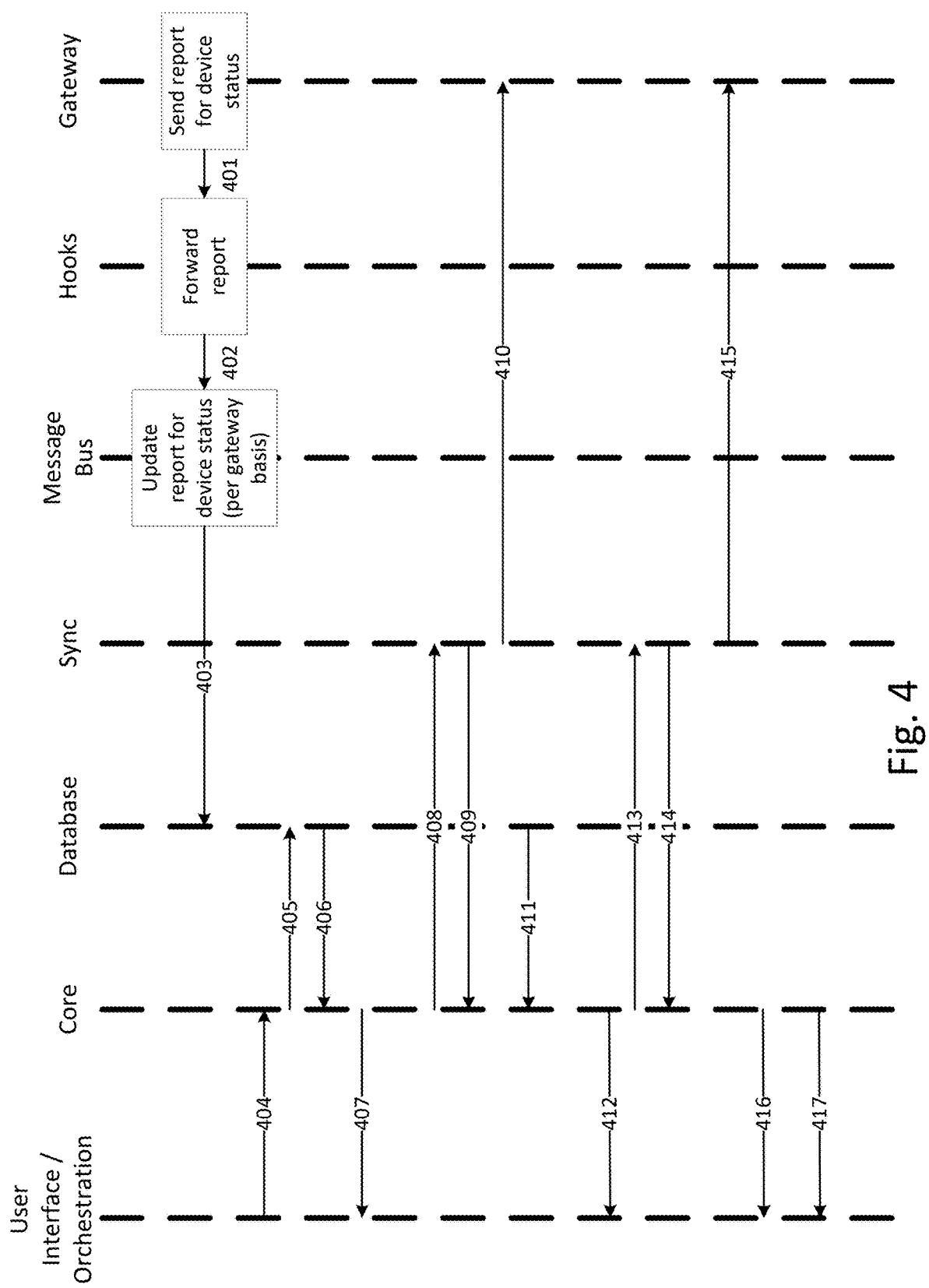
FIG. 4 shows an example system for requesting and receiving connected device data in a second scenario

FIG. 4 shows an example system for requesting and receiving connected device data in a second scenario (e.g., if data for the gateway is not in the database and/or the report is obsolete). One or more of the following may occur in any order.

401: a gateway may send, to one or more hooks, a periodic report for device status

402: hooks may forward the reports, from the gateway, to a message bus

403: message bus may update periodic reports for device status, such as on a per gateway basis. The reports may be stored and updated in a database.

The gateway may periodically generate and/or cause storage of the data (e.g., in 401, 402, and 403), such as every 15 minutes or a different timeframe.

404: a user device, such as via a user interface, may receive, from a user, a request for connected device information for a gateway. The user device may send, to a core, a call to get the connected device information for the gateway. For example, a request (e.g., via an HTTP GET request) may request a summary for connected devices (e.g., all connected devices) for a specific gateway (e.g., specified by MAC).

405: the core may send, to the database, a request (e.g., a get request) for the device information and/or a host table version.

The gateway might not be found in the database. Various functions may be performed in these scenarios:

406: the database may send, to the core, an indication that the gateway is not found in database

407: the core may forward, to the user device, an indication that the gateway entry does not exist in database. Because the gateway device summary is not available in the database, the core may call an internal API to enable device status report and also to speed up the reports from the gateway.

408: the core may send, to sync, a request for to speed up the gateway reporting status information

409: sync may send, to the core, an acknowledgment, which may comprise an asynchronous response

410: sync may send, to the gateway, a request to enable device status report and accelerate reporting and polling interval to an updated timeframe (e.g., 30 seconds).

411: after a gateway is found in the database, the database may respond, to the core, with the reports. The core may check the last speed up time and last report time.

The last speed up time may be greater than a threshold (e.g., greater than 5 minutes) or the last report time may be greater than a threshold (e.g., greater than 45 seconds). Various functions may be performed in these scenarios:

412: the core may send, to the user device, a successful response.

413: the core may send, to sync, a request for gateway status speed up

414: sync may send, to the core, an acknowledgment, which may comprise an asynchronous response

415: sync may send, to the gateway, a request to enable device status report and accelerate reporting and polling interval to an updated timeframe (e.g., 30 seconds).

416: the core may send, to the user device, a successful response.

The last speed up time may be less than a threshold (e.g., less than 5 minutes) and the last report time may be less than a threshold (e.g., less than 45 seconds). Various functions may be performed in these scenarios:

417: the core may send, to the user device, a successful response

Figure 5:
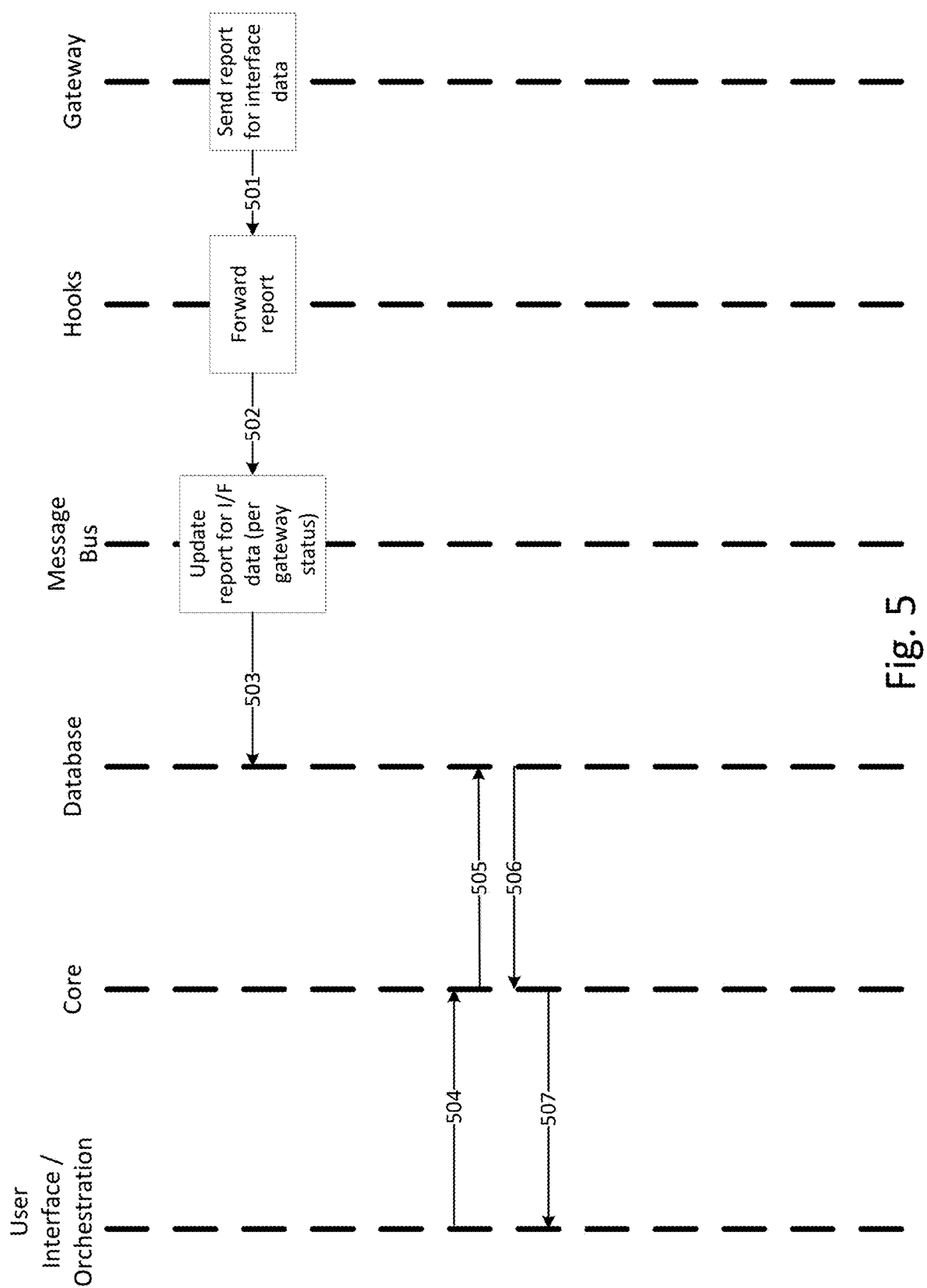
FIG. 5 shows an example system for requesting and receiving interface data in a third scenario.

FIG. 5 shows an example system for requesting and receiving interface data in a third scenario (e.g., a sunny day scenario). One or more of the following may occur in any order.

501: a gateway may send, to one or more hooks, a periodic report for interface data

502: hooks may forward the reports, from the gateway, to a message bus

503: message bus may update periodic reports for interface data, such as on a per gateway basis. The reports may be stored and updated in a database.

The gateway may periodically generate and/or cause storage of the data (e.g., in 501, 502, and 503), such as every 15 minutes or a different timeframe.

504: a user device, such as via a user interface, may receive, from a user, a request for interface data information for a gateway. The user device may send, to a core, a call to get the interface data information for the gateway. For example, a request (e.g., a GET request) may request to get a specific device and interface type on a gateway.

505: the core may send, to the database, a request (e.g., a get request) for the interface data for a particular gateway MAC.

506: the database may return, to the core, the interface data information.

507: the core may respond, to the user device (e.g., via the user interface), with the interface data information, such as in a JSON body (or other data format). The response may include, for example, a summary comprising timestamp, device MAC, interface MAC, service type, SSID, RSSI, phy TX rate, phy RX rate, radio channel, interface type, Wi-Fi operating standard, and/or Wi-Fi channel bandwidth.

Figure 6:
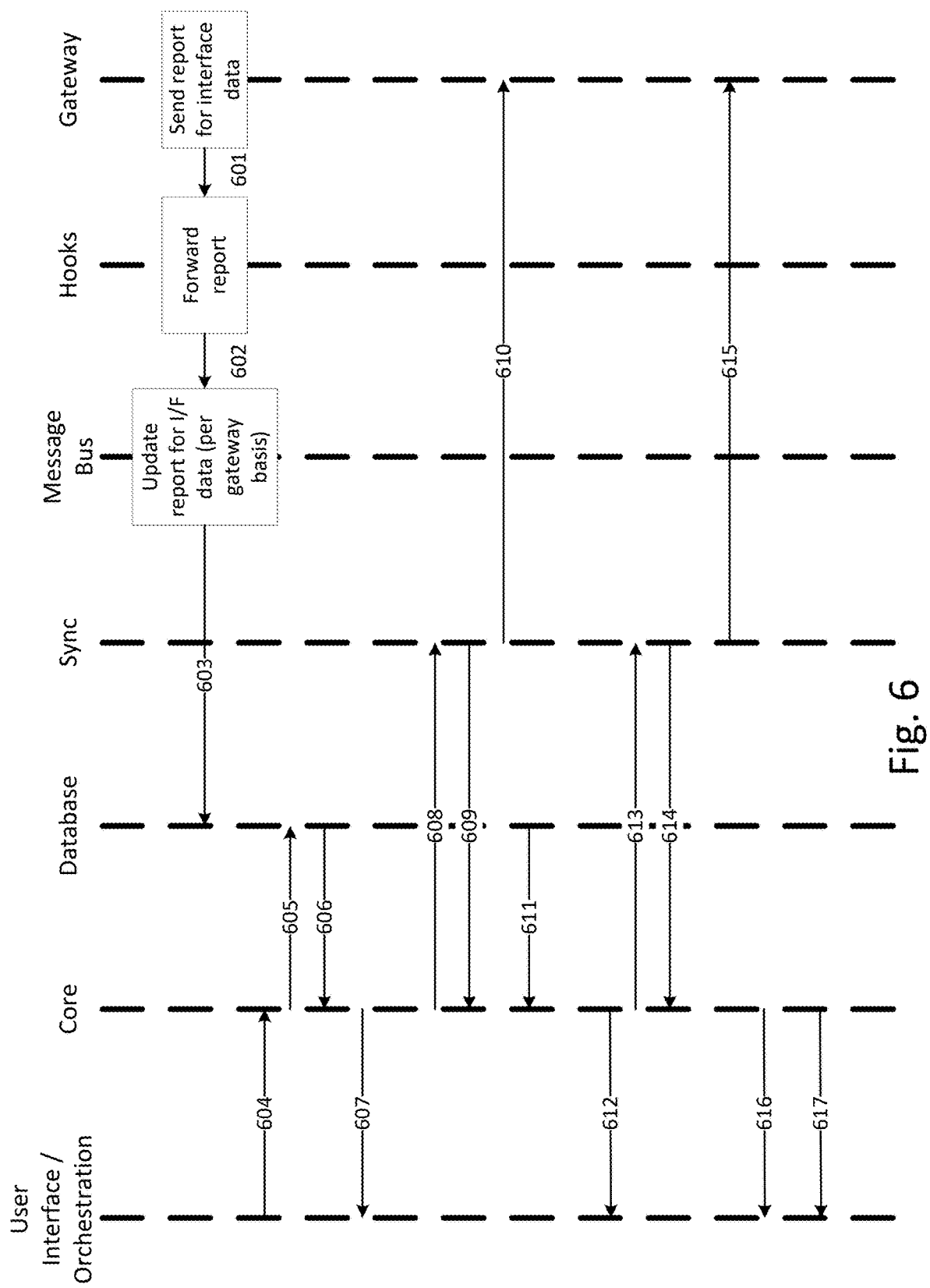
FIG. 6 shows an example system for requesting and receiving interface data in a fourth scenario.

FIG. 6 shows an example system for requesting and receiving interface data in a fourth scenario (e.g., if data for the gateway is not in the database and/or the data is obsolete). One or more of the following may occur in any order.

601: a gateway may send, to one or more hooks, a periodic report for interface data

602: hooks may forward the reports, from the gateway, to a message bus

603: message bus may update periodic reports for device status, such as on a per gateway basis. The reports may be stored and updated in a database.

The gateway may periodically generate and/or cause storage of the data (e.g., in 601, 602, and 603), such as every 15 minutes or a different timeframe.

604: a user device, such as via a user interface, may receive, from a user, a request for interface data information for a gateway. The user device may send, to a core, a call to get the interface data information for the gateway. For example, a request (e.g., a GET request) may request to get a specific device and interface type on a gateway.

605: the core may send, to the database, a request (e.g., a get request) for the interface data information and/or a host table version.

The gateway might not be found in the database. Various functions may be performed in these scenarios:

606: the database may send, to the core, an indication that the gateway is not found in database

607: the core may forward, to the user device, an indication that the gateway entry does not exist in database. Because the interface data is not available in the database, the core may call an internal API to enable interface data report and also to speed up (e.g., increase the frequency of) the reports from the gateway.

608: the core may send, to sync, a request for gateway status speed up

609: sync may send, to the core, an acknowledgment, which may comprise an asynchronous response

610: sync may send, to the gateway, a request to enable interface data report and accelerate reporting and polling interval to an updated timeframe (e.g., 30 seconds).

611: after a gateway is found in database, the database may respond, to the core, with the reports. The core may check the last speed up time and last report time.

The last speed up time may be greater than a threshold (e.g., greater than 5 minutes) or the last report time may be greater than a threshold (e.g., greater than 45 seconds). Various functions may be performed in these scenarios:

612: the core may send, to the user device, a successful response.

613: the core may send, to sync, a request for gateway status speed up

614: sync may send, to the core, an acknowledgment, which may comprise an asynchronous response

615: sync may send, to the gateway, a request to enable interface data report and accelerate reporting and polling interval to an updated timeframe (e.g., 30 seconds).

616: the core may send, to the user device, a successful response.

The last speed up time may be less than a threshold (e.g., less than 5 minutes) and the last report time may be less than a threshold (e.g., less than 45 seconds). Various functions may be performed in these scenarios:

617: the core may send, to the user device, a successful response

Figure 7:
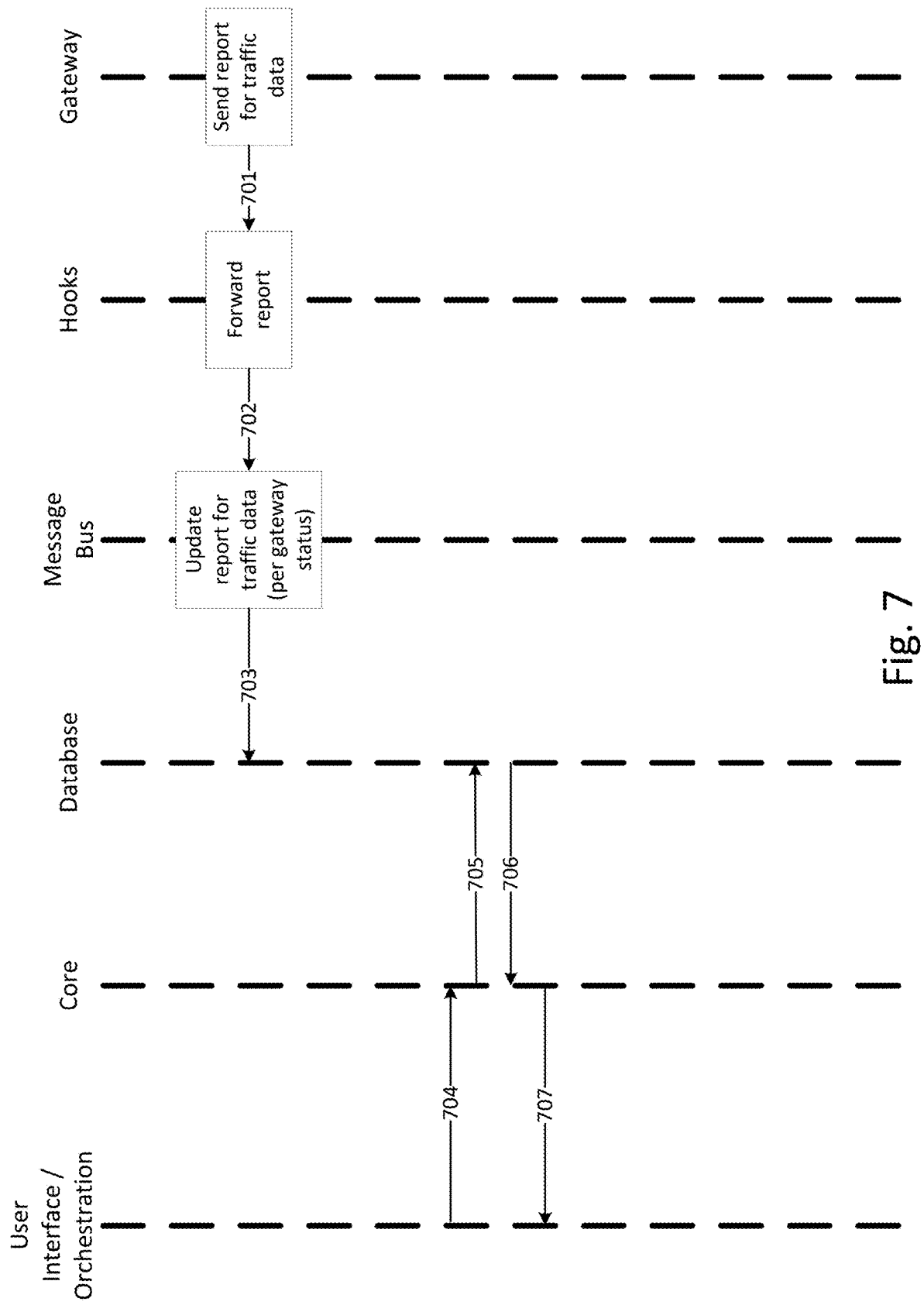
FIG. 7 shows an example system for requesting and receiving traffic data in a fifth scenario.

FIG. 7 shows an example system for requesting and receiving traffic data in a fifth scenario (e.g., a sunny day scenario). One or more of the following may occur in any order.

701: a gateway may send, to one or more hooks, a periodic report for traffic data

702: hooks may forward the reports, from the gateway, to a message bus

703: message bus may update periodic reports for traffic data, such as on a per gateway basis. The reports may be stored and updated in a database.

The gateway may periodically generate and/or cause storage of the data (e.g., in 701, 702, and 703), such as every 15 minutes or a different timeframe.

704: a user device, such as via a user interface, may receive, from a user, a request for traffic data information for a gateway. The user device may send, to a core, a call to get the traffic data information for the gateway. For example, a request (e.g., a GET request) may request to get traffic data for a gateway.

705: the core may send, to the database, a request (e.g., a get request) for the traffic data information.

706: the database may return, to the core, the traffic data information.

707: the core may respond, to the user device (e.g., via the user interface), with the traffic data information, such as in a JSON body (or other data format). The response may include, for example, gateway usage (e.g., data down and/or data up) and/or connected device usage (e.g., data up and/or data down).

Figure 8:
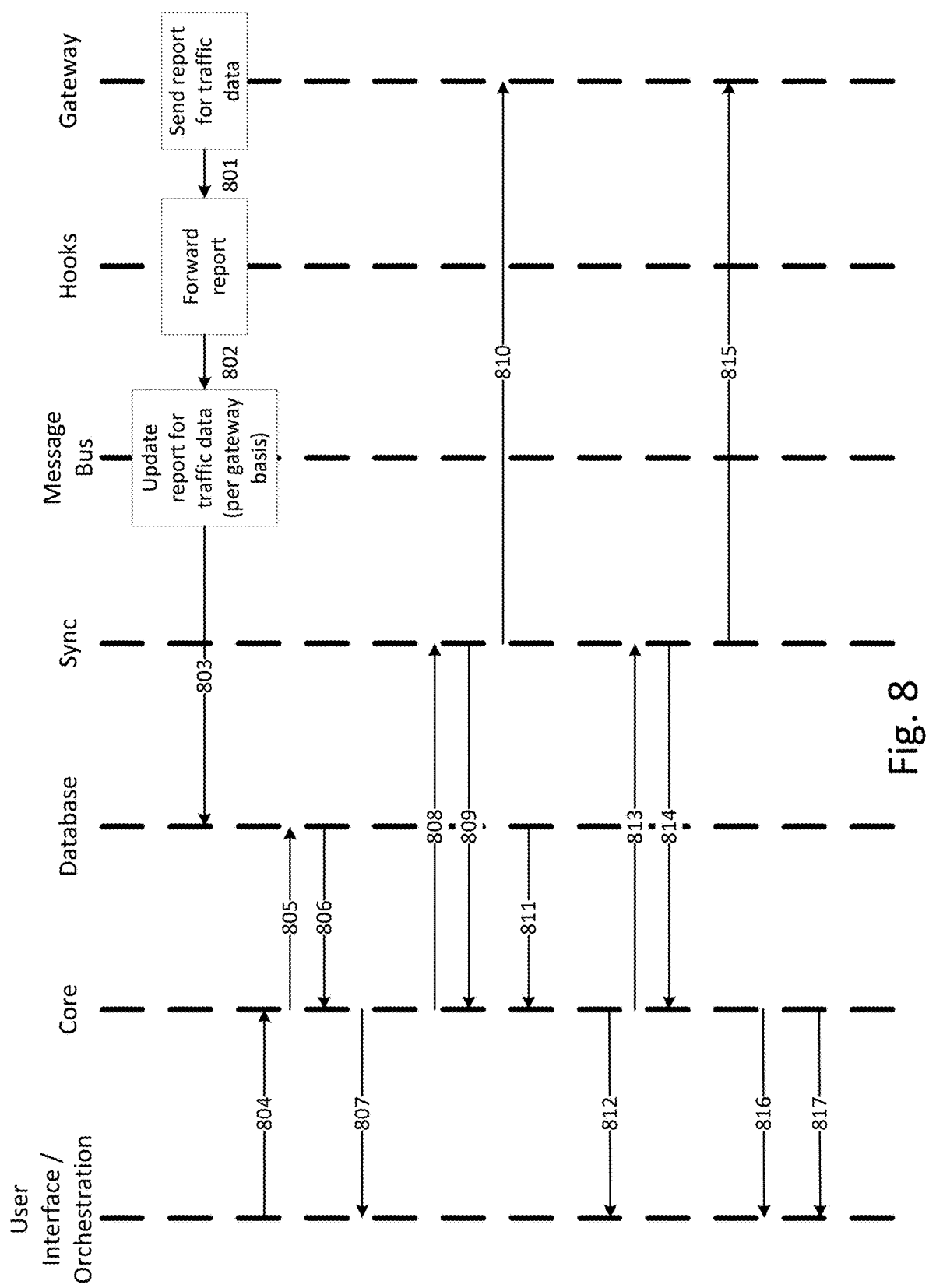
FIG. 8 shows an example system for requesting and receiving traffic data in a sixth scenario.

FIG. 8 shows an example system for requesting and receiving traffic data in a sixth scenario (e.g., if data for the gateway is not in the database and/or the data is obsolete). One or more of the following may occur in any order.

801: a gateway may send, to one or more hooks, a periodic report for traffic data

802: hooks may forward the reports, from the gateway, to a message bus

803: message bus may update periodic reports for traffic data, such as on a per gateway basis. The reports may be stored and updated in a database.

The gateway may periodically generate and/or cause storage of the data (e.g., in 801, 802, and 803), such as every 15 minutes or a different timeframe.

804: a user device, such as via a user interface, may receive, from a user, a request for traffic data information for a gateway. The user device may send, to a core, a call to get the traffic data information for the gateway. For example, a request (e.g., a GET request) may request to get traffic data for a gateway.

805: the core may send, to the database, a request (e.g., a get request) for the traffic data information.

The gateway might not be found in the database. Various functions may be performed in these scenarios:

806: the database may send, to the core, an indication that the gateway is not found in database

807: the core may forward, to the user device, an indication that the gateway entry does not exist in database. Because the traffic data is not available in the database, the core may call an internal API to enable traffic data report.

808: the core may send, to sync, a request enabling traffic report for gateway

809: sync may send, to the core, an acknowledgment, which may comprise an asynchronous response

810: sync may send, to the gateway, a request to enable traffic data report.

811: after a gateway is found in the database, the database may respond, to the core, with the reports.

The last report time may be greater than a threshold (e.g., greater than 15 minutes). Various functions may be performed in these scenarios:

812: the core may send, to the user device, a successful response.

813: the core may send, to sync, a request enabling traffic report for gateway

814: sync may send, to the core, an acknowledgment, which may comprise an asynchronous response

815: sync may send, to the gateway, a request to enable traffic data report.

816: the core may send, to the user device, a successful response.

The last report time may be less than a threshold (e.g., less than 15 minutes). Various functions may be performed in these scenarios:

817: the core may send, to the user device, a successful response

ODP may maintain a cloud based schedule database which stores recurring bedtime schedules on behalf of millions of gateways. The platform may be responsible for applying the schedules in each gateway per the flows described below. An end time may be greater than the start time and less than or equal to 23:59. The end time may be considered to be in the same calendar day as the start time. Alternatively, the end time may be less than the start time. The end time may be considered to be the subsequent calendar day than the start time.

A scheduler operation may provide, for example, two resources. Clients may do GET, POST against these two resource URLs to block, allow, and set schedule to control network (e.g., Internet) access for one or more sets of attached devices on a gateway. A plurality of commands may be supported in these two resource API calls: action block to block internet access, on-demand, action allow to allow internet access, on-demand, and set bedtime schedule configuration (e.g., action wakeup to wake up from bedtime schedule). A user may set a bedtime schedule for one or more devices connected to a gateway. The bedtime schedule may include a timeframe, such as 10 PM to 7 AM. During bedtime hours, one or more specified devices may be blocked from accessing a network, such as the internet (e.g., for parental control purposes), via the gateway. A plurality of bedtime configuration change operations may be supported in these two resource API calls: set bedtime to setup or replace bedtime schedule or delete bedtime to cleanup an existing bedtime schedule. A plurality of informational states corresponding to each device may be returned for each API. One may reflect Internet connection state and the second may indicate bedtime state. 1. connection state: {block, allow} (e.g., block: Internet connection blocked; allow: Internet connection is allowed) and 2. bedtime state: {off, asleep, awake, cancelled} (e.g., off: device is not in bedtime schedule time range yet or there is no bedtime schedule; asleep: device is in bedtime and connection state is block; awake: device is in bedtime and connection state is allow; cancelled: the current bedtime schedule has been cancelled due to an on-demand request such as allow or block).

POST may be used to set the block, allow, establish or change bedtime schedule configuration in the cloud and on the host gateway. Exemplary actions may include block, allow, set bedtime, delete bedtime, and/or wakeup. Action block may block Internet connection. If a bedtime schedule has been established, this call may delete the schedule for the day and may result in bedtime state being set to cancelled. If a bedtime schedule was previously set, a subsequent call to allow may re-establish the prior schedule. Bedtime schedules may use day of the week, start time, and/or end time as keys.

Action wakeup may allow device Internet connection if bedtime state is on. A wakeup may last from the time of invocation until the end of the bedtime for the current day. A wakeup for a specified duration may last from the time of invocation for specified duration. If there is bedtime schedule, and the request time is not in scope of bedtime schedule, an HTTP 400 error may be returned to request. Wakeup may override a bedtime schedule and may allow device Internet connection until the end of the wakeup time or until another API call to block the connection is made. The wakeup action may cancel the bedtime schedule for the day. Note that the wakeup call may override the bedtime schedule for the day of the week in which the call is invoked (e.g., the bedtime schedule for the same day in subsequent weeks might not be affected). The cloud scheduler may ensure that the schedule in the gateway may be restored, as needed. A wakeup action may override a bedtime schedule and may allow a device Internet connection for a specified duration, e.g., in minutes. After the specified duration, the previously existing bedtime schedule may be restored, resulting in the device Internet connection being blocked at the end of wakeup time.

A group scheduler (e.g., bedtime) API may be used to retrieve, create or delete device basic scheduler configuration for a group of devices from the cloud and host gateway. A GET may get one or more (e.g., all) the attached device Internet connection information and bedtime configuration for the host gateway. The GET call may return the device management rules as an array of JSON object. A POST may set the block, allow and establish bedtime schedule configuration to the host gateway for a group of devices. The list of devices may be composed as a JSON array.

In a first scenario, the system may block a set of devices for a particular bed time, such as for parental control purposes. Bed time may limit the ability of a device to access the Internet during bedtime portions of the schedule. A bed time schedule may be created for one or more connected devices. For example, the weekday bedtime may be Monday through Friday from 9 PM to 6 AM, and the weekend bedtime may be Saturday through Sunday from 11 PM to 8 AM.

Figure 12:
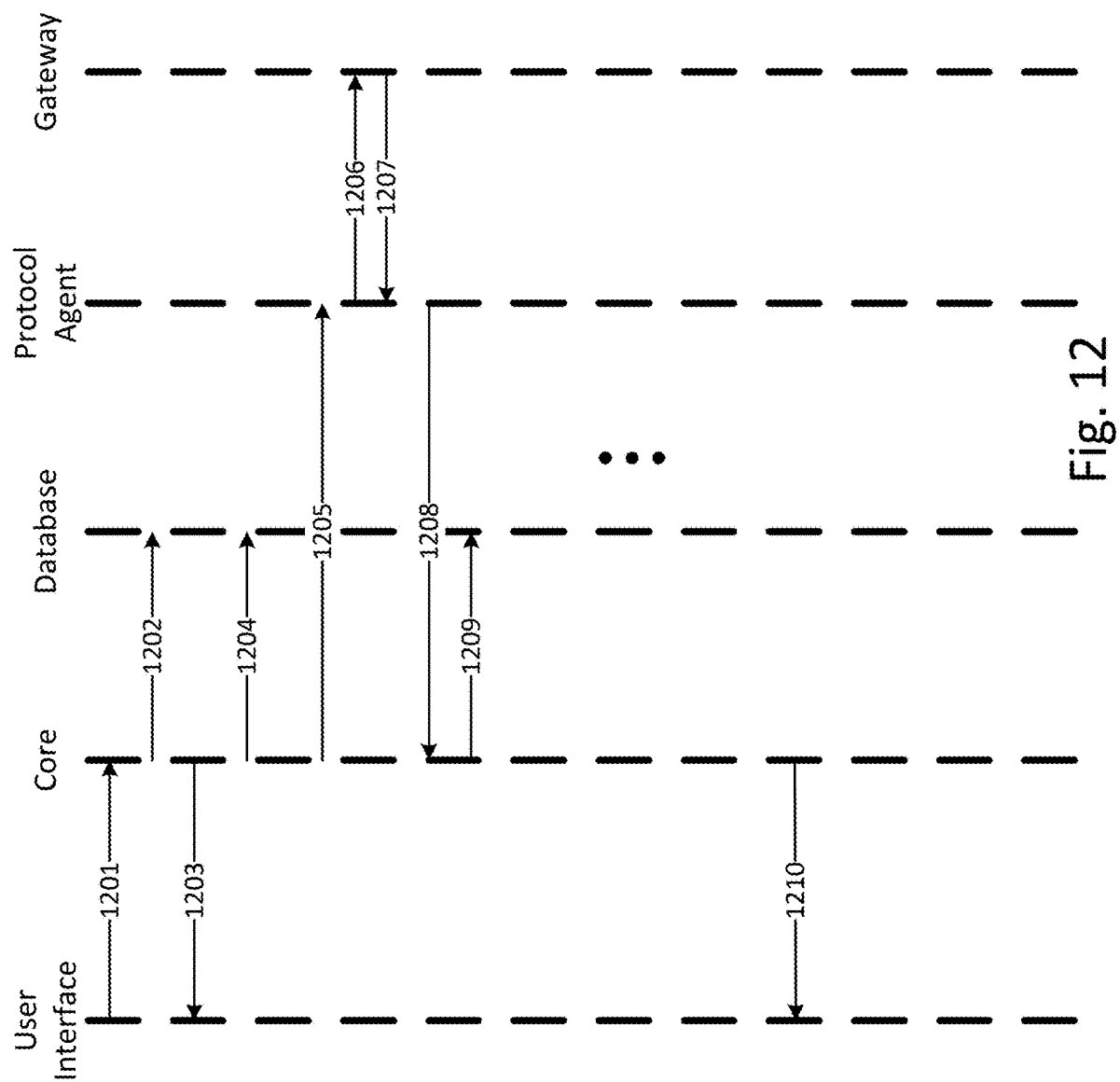
FIG. 12 shows an example system for generating a schedule in a first scenario.

In one example, a schedule may be sent to the gateway for each day of the week. Moreover, the schedule may be divided into two sets for each day of the week, such as 9 PM to 11:59 PM and 12:00 AM to 6:00 AM for weekdays and 11 PM to 11:59 PM and 12:00 AM to 8:00 AM for weekends. For example, the system may issue a total of 14 rules for a given device. FIG. 12 shows an example system for generating a schedule in a first scenario. One or more of the following may occur in any order.

1201: send a device management configuration message

1202: verify if there is an existing schedule in the database

1203: if a schedule already exists in the database, return a message indicating that the schedule already exists

1204: if a schedule does not exist in the database, store the schedule in a cloud schedule table

1205: For each rule (governing a different segment of time), the core may send parameters for the rule to the protocol agent (e.g., via a POST message), such as the type (e.g., block usage), device identifier (e.g., MAC address), whether to always block (e.g., true or false), the start time (e.g., 21:00), the end time (e.g., 23:59), and/or the applicable blocked day (e.g., Monday).

1206: send (e.g., POST) for applicable day and time segment (e.g., a first part of the schedule)

1207: the gateway may respond with an acknowledgment and with an index for that particular schedule

1208: the core may receive the index

1209: save the schedule in a gateway schedule table

The system may, for example, repeat 1205-1209 for each different segment of time, which may be 14 total times if two schedules are created for each day of the week (e.g., (1) M from 9-11:59 PM, (2) M from 12-6 AM, (3) T from 9-11:59 PM, (4) T from 12-6 AM, (5) W from 9-11:59 PM, (6) W from 12-6 AM, (7) Th from 9-11:59 PM, (8) Th from 12-6 AM, (9) F from 9-11:59 PM, (10) F from 12-6 AM, (11) Sa from 11-11:59 PM, (12) Sa from 12-8 AM, (13) Su from 11-11:59 PM, and (14) Su from 12-8 AM).

1210: once the schedules for each time segment have been sent to the gateway and stored in the database, the core may send an acknowledgment message.

Figure 13:
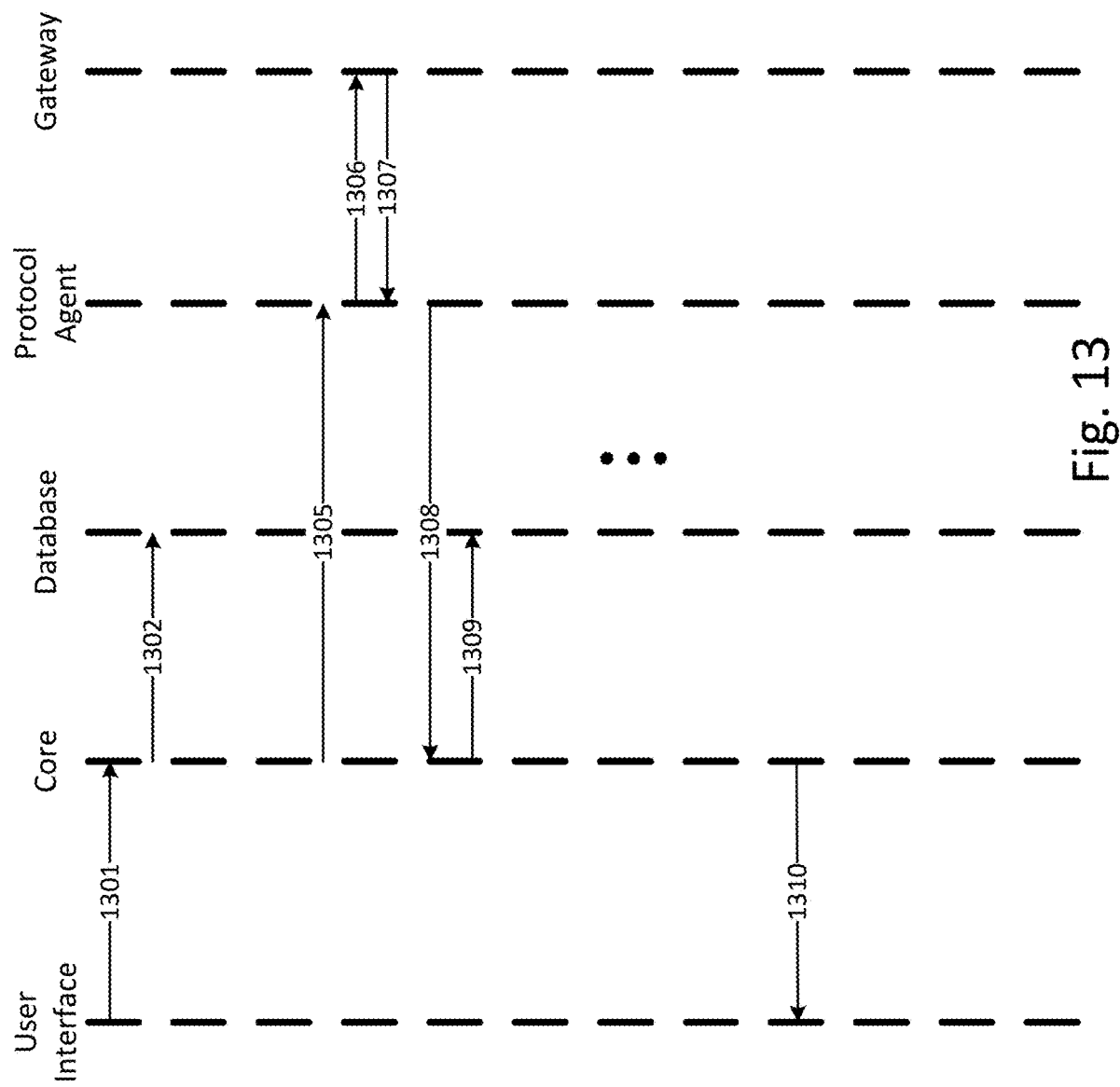
FIG. 13 shows an example system for generating a schedule in a first scenario.

Alternatively, a schedule may be sent to the gateway for each type of day of the week (e.g., weekday or weekend). As noted above, the schedule may be divided into two sets for each day of the week, such as 9 PM to 11:59 PM and 12:00 AM to 6:00 AM on weekdays and 11 PM to 11:59 PM and 12:00 AM to 8:00 AM for weekends. For example, the system may issue a total of 4 rules for a given device. FIG. 13 shows an example system for generating a schedule in a first scenario. One or more of the following may occur in any order.

1301: send a device management configuration message

1302: verify if there is an existing schedule in the database

If a schedule exists, the core may return a message to the user interface indicating that a schedule already exists (not shown). If a schedule does not exist, the core may send a request to the database to store the schedule in a temporary cloud schedule table (not shown).

1305: For each rule, the core may send parameters for the rule to the protocol agent (e.g., via a POST message), such as the type (e.g., block usage), device identifier (e.g., MAC address), whether to always block (e.g., true or false), the start time (e.g., 21:00), the end time (e.g., 23:59), and/or the applicable blocked days (e.g., Monday, Tuesday, Wednesday, Thursday, and Friday).

1306: send (e.g., POST) for applicable day and time segment (e.g., a first part of the schedule)

1307: the gateway may respond with an acknowledgment and with an index for that particular schedule.

1308: The core may receive the index

1309: save the schedule in a gateway schedule table. If a temporary cloud schedule table is used, the schedule may be saved in the temporary gateway schedule table (e.g., instead of a permanent database) (not shown).

The system may, for example, repeat 1305-1309 for each different segment of time, which may be 4 total times if two schedules are created for each type of day (e.g., (1) M, T, W, Th, F from 9-11:59 PM, (2) T, W, Th, F, Sa from 12-6 AM, (3) Sa, Su from 9-11:59 PM, (4) Su, M from 12-6 AM).

If a temporary cloud schedule table is used, the database may move the gateway schedule table and the cloud schedule table from the temporary database to the permanent database (not shown).

1310: once the schedules for each time segment have been sent to the gateway and stored in the database, the core may send an acknowledgment message.

Figure 14:
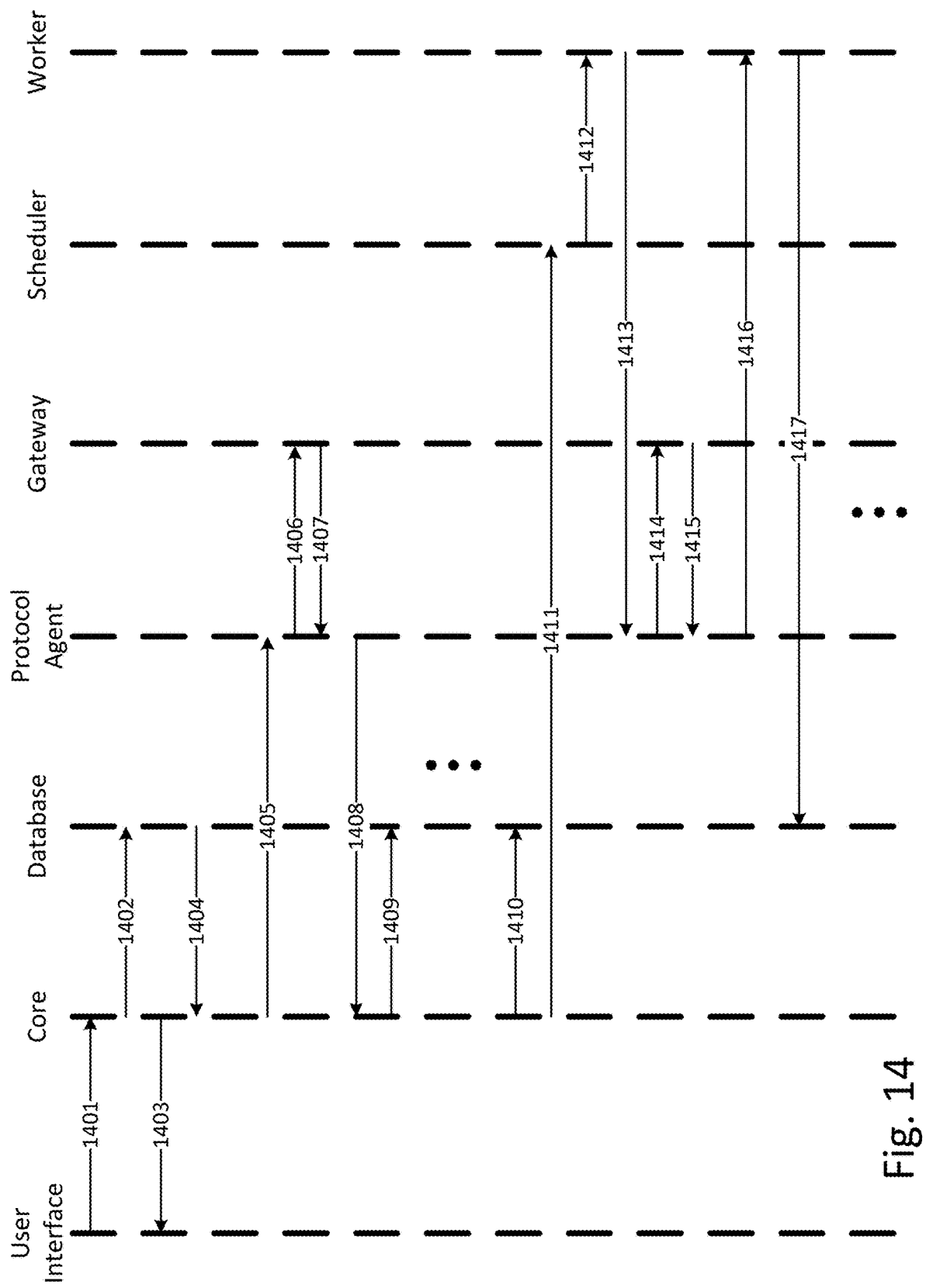
FIG. 14 shows an example system for generating a schedule in a second scenario.

In a second scenario, the system may send a wakeup call, such as for a current day (e.g., Monday). FIG. 14 shows an example system for generating a schedule in a second scenario. One or more of the following may occur in any order.

1401: send a device management configuration message

1402: verify if there is an existing schedule in the database for the current day (e.g., Monday).

1403: if a schedule does not exist in the database (e.g., in a cloud schedule table), return a message indicating that the schedule does not exist

1404: if a schedule already exists in the database, return one or more indexes for the segments of time for the current day (e.g., two indexes x and y if two schedules exist for Monday)

1405: send, to the corresponding gateway, a delete request to delete at least a first portion of the schedule (e.g., send a delete schedule message for the first index, such as index x for a first part of the Monday schedule)

1406: forward delete schedule message

1407: acknowledge deletion (e.g., a 200 OK message)

1408: acknowledge deletion

1409: delete schedule from gateway schedule table

The system may, for example, repeat 1405-1409 for each different segment of time for the current day, which may be 2 total times if two schedules are created for the current day (e.g., (1) M from 9-11:59 PM and (2) M from 12-6 AM).

1410: request to add the entry in a cloud schedule wake up table.

1411: POST current schedule of the day to queue to initiate a restore of the bed time after the end time of the schedule, for example, within 24 hours. Moreover, the core may send parameters for the rule to the protocol agent (e.g., via a POST message), such as the type (e.g., block usage), device identifier (e.g., MAC address), whether to always block (e.g., true or false), the start time (e.g., 21:00), the end time (e.g., 06:00), and/or the applicable blocked day (e.g., day x).

1412: scheduler sends the request to a worker

1413: POST for first part of schedule (e.g., Monday from 21:00 to 23:59). The POST may comprise parameters, such as the type (e.g., block usage), device identifier (e.g., MAC address), whether to always block (e.g., true or false), the start time (e.g., 21:00), the end time (e.g., 23:59), and/or the applicable blocked day (e.g., day x).

1414: POST for weekends first part of schedule

1415: acknowledge (e.g., via a 200 OK message) the request, with an index for the first part of the schedule

1416: acknowledge message, with an index for the first part of the schedule

1417: store the index for this schedule in gateway schedule database, and/or remove the entry from the cloud schedule wake up table The system may, for example, repeat 1413-1417 for each different segment of time for the current day, which may be 2 total times if two schedules are created for the current day (e.g., (1) M from 9-11:59 PM and (2) Tu from 12-8 AM).

Figure 15:
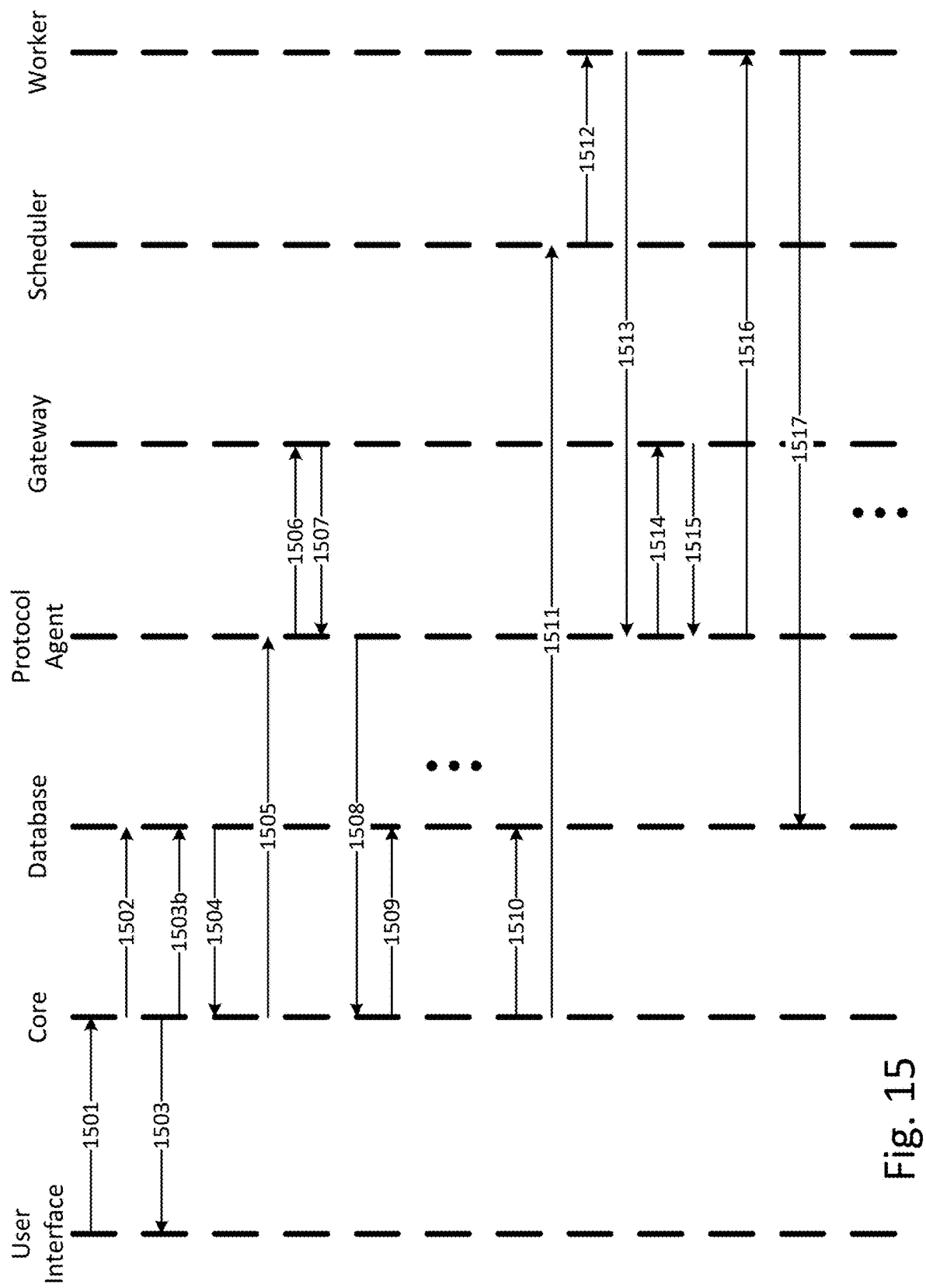
FIG. 15 shows an example system for generating a schedule in a third scenario.

In a third scenario, the system may send a wakeup call, such as for a time period during a particular day (e.g., 120 minutes for Monday). FIG. 15 shows an example system for generating a schedule in a third scenario. One or more of the following may occur in any order.

1501: send a device management configuration message

1502: verify if there is an existing schedule in the database for the current day (e.g., Monday).

1503: if a schedule does not exist in the database (e.g., in a cloud schedule table), return a message indicating that the schedule does not exist (e.g., 400 error code)

1503b: if a schedule already exists in the database, request indexes for Monday schedule from a gateway schedule database

1504: return one or more indexes for the segments of time for the current day (e.g., two indexes x and y if two schedules exist for Monday), which may be stored in a gateway schedule database

1505: send, to the corresponding gateway, a delete request to delete at least a first portion of the schedule (e.g., send a delete schedule message for the first index, such as index x for a first part of the Monday schedule)

1506: forward delete schedule message

1507: acknowledge deletion (e.g., a 200 OK message)

1508: acknowledge deletion

1509: remove entry from gateway schedule table

The system may, for example, repeat 1505-1509 for each different segment of time for the current day, which may be 2 total times if two schedules are created for the current day (e.g., (1) M from 9-11:59 PM and (2) Tu from 12-6 AM).

1510: request to add the Monday schedule in a cloud schedule wake up table.

1511: POST current schedule of the day to queue to initiate a restore of the bed time after the specified time period (e.g., 120 minutes). Moreover, the core may send parameters for the rule to the protocol agent (e.g., via a POST message), such as the type (e.g., block usage), device identifier (e.g., MAC address), whether to always block (e.g., true or false), the start time (e.g., 21:00), the end time (e.g., 06:00), and/or the applicable blocked day (e.g., day x).

1512: scheduler sends the request to a worker after the time period (e.g., after 120 minutes)

1513: POST for first part of schedule (e.g., Monday from 21:00 to 23:59). The POST may comprise parameters, such as the type (e.g., block usage), device identifier (e.g., MAC address), whether to always block (e.g., true or false), the start time (e.g., 21:00), the end time (e.g., 23:59), and/or the applicable blocked day (e.g., day x).

1514: POST for weekends first part of schedule

1515: acknowledge (e.g., via a 200 OK message) the request, with an index for the first part of the schedule

1516: acknowledge message, with an index for the first part of the schedule

1517: add the index for this schedule in gateway schedule database

The system may, for example, repeat 1513-1517 for each different segment of time for the current day, which may be 2 total times if two schedules are created for the current day (e.g., (1) M from 9-11:59 PM and (2) Tu from 12-8 AM).

Figure 20:
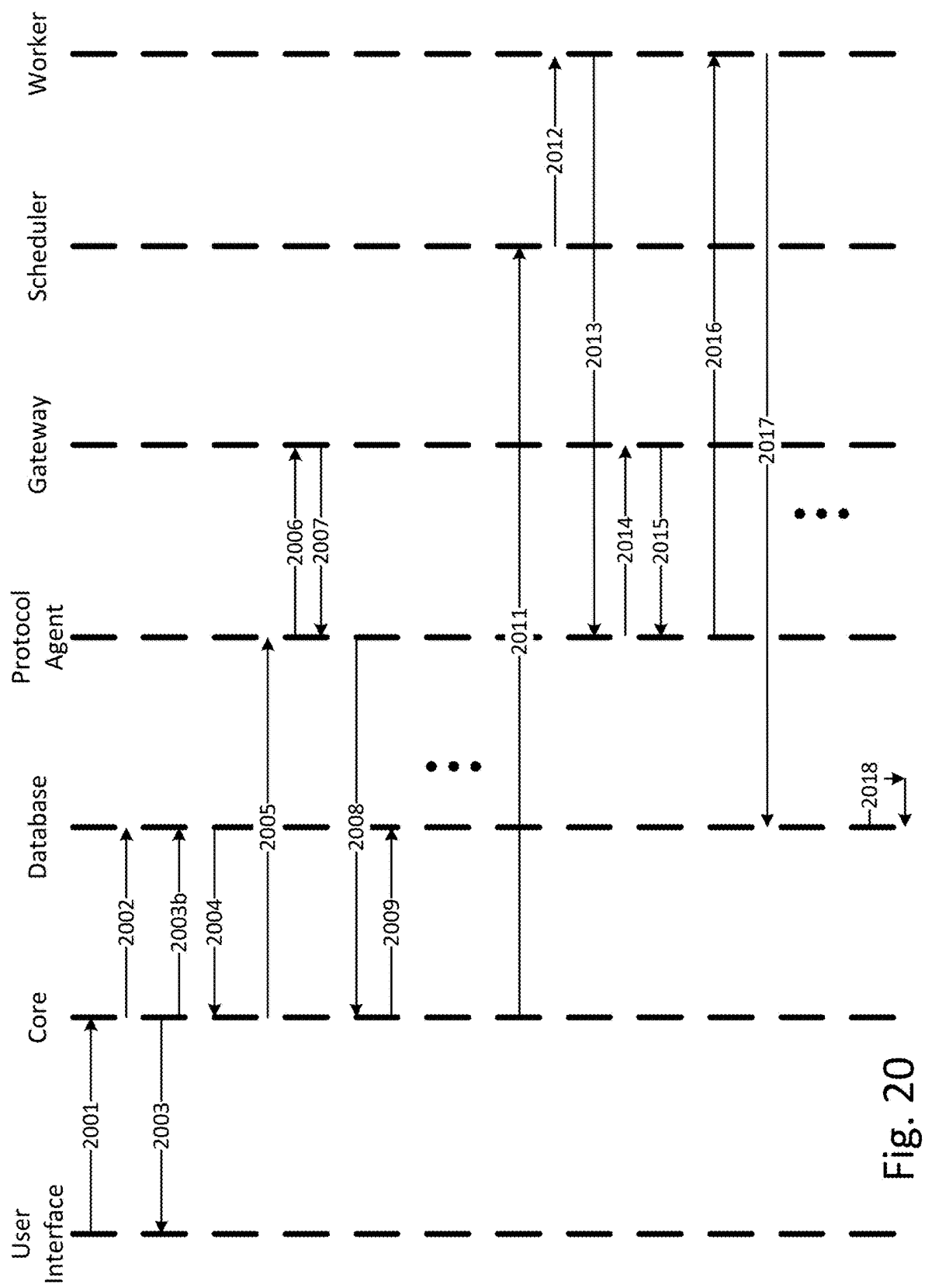
FIG. 20 shows an example system for generating a schedule in the other third scenario.

In another third scenario, the system may send a wakeup call, such as for a time period during a particular day (e.g., 60 minutes for Monday at 9 PM). FIG. 20 shows an example system for generating a schedule in the other third scenario. One or more of the following may occur in any order.

2001: send a device management configuration message
2002: verify if there is an existing schedule in the database for the current day (e.g., Monday).
2003: if a schedule does not exist in the database (e.g., in a cloud schedule table), return a message indicating that the schedule does not exist (e.g., 400 error code)
2003*b*: if a schedule already exists in the database, request indexes for Monday schedule from a gateway schedule database
2004: return one or more indexes for the segments of time for the current day (e.g., two indexes x and y if two schedules exist for Monday), which may be stored in a gateway schedule database
2005: send, to the corresponding gateway, an update request to update at least a first portion of the schedule (e.g., update a first part of the Monday schedule). The update request may include, for example, an updated start time (e.g., 22:00), an updated end time (e.g., 23:59), and/or an updated day of the week (e.g., Monday).
2006: forward update schedule message
2007: acknowledge deletion (e.g., a 200 OK message)
2008: acknowledge deletion
2009: add the entry in temporary gateway schedule table The system may, for example, repeat 2005-2009 for each different segment of time for the current day, which may be 2 total times if two schedules are created for the current day (e.g., (1) M from 22:00-23:59 and (2) Tu from 00:00-08:00).

2011: POST current schedule of the day to queue to initiate a restore of the bed time after a specified time period (e.g., after 24 hours). Moreover, the core may send parameters for the rule to the protocol agent (e.g., via a POST message), such as the updated start time (e.g., 21:00), an updated end time (e.g., 23:59), and/or an updated day of the week (e.g., Monday).
2012: scheduler sends the request to a worker after the time period (e.g., after 24 hours)
2013: POST for first part of schedule (e.g., Monday from 21:00 to 23:59). The POST may comprise parameters, such as the updated start time (e.g., 21:00), an updated end time (e.g., 23:59), and/or an updated day of the week (e.g., Monday).
2014: POST for weekends first part of schedule
2015: acknowledge (e.g., via a 200 OK message) the request, with an index for the first part of the schedule
2016: acknowledge message, with an index for the first part of the schedule
2017: add the index for this schedule in the temporary gateway schedule database The system may, for example, repeat 2013-2017 for each different segment of time for the current day, which may be 2 total times if two schedules are created for the current day (e.g., (1) M from 21:00 PM to 23:59 PM and (2) Tu from 0:00 AM to 08:00 AM).

Figure 16:
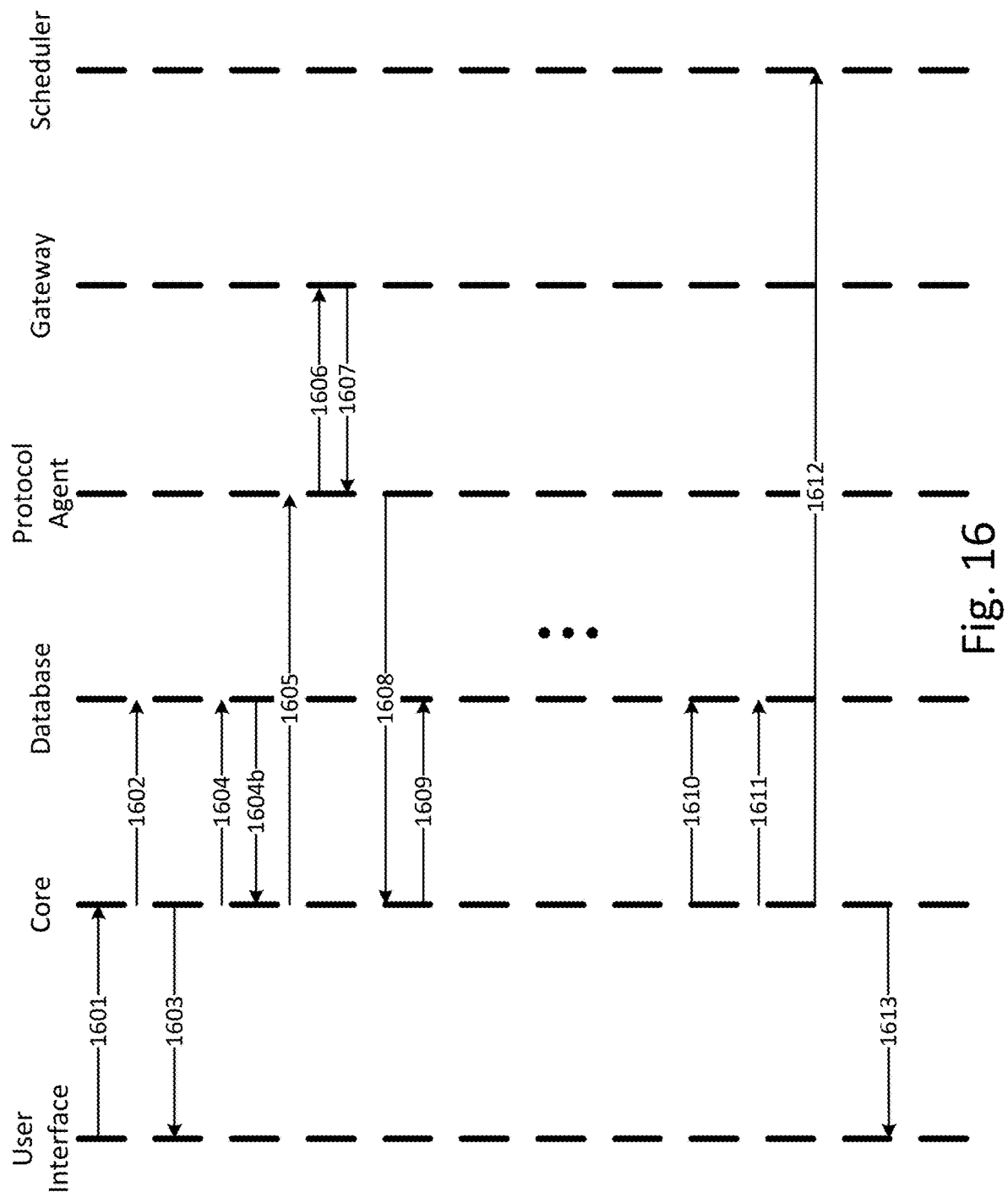
FIG. 16 shows an example system for generating a schedule in a fourth scenario.

2018: move the gateway schedule table from temporary database to permanent database In a fourth scenario, the system may delete a time schedule (e.g., a bed time schedule) for a given connected device. For example, the weekday bedtime may be Monday through Friday from 9 PM to 6 AM, and the weekend bedtime may be Saturday through Sunday from 11 PM to 8 AM. FIG. 16 shows an example system for generating a schedule in a fourth scenario. One or more of the following may occur in any order.

1601: send a device management configuration message indicating deletion of one or more schedules
1602: verify if there is an existing schedule in the database
1603: if a schedule does not exist in the database, return a message indicating that the schedule does not exist
1604: if a schedule already exists in the database, get the index values for weekdays and weekends of the schedule
1604*b*: return a message indicating that a record exists and return the indexes for weekdays and weekends
1605: The core may send a deletion request for a first part of the schedule (e.g., Monday, 9 PM to 6 AM).
1606: forward delete request for first part of schedule to gateway
1607: the gateway may respond with an acknowledgment of the delete request
1608: send acknowledgement message
1609: delete the first part of schedule from the gateway schedule table The system may, for example, repeat 1605-1609 for each different segment of time, which may be 14 total times if two schedules are created for each day of the week (e.g., (1) M from 9-11:59 PM, (2) M from 12-6 AM, (3) T from 9-11:59 PM, (4) T from 12-6 AM, (5) W from 9-11:59 PM, (6) W from 12-6 AM, (7) Th from 9-11:59 PM, (8) Th from 12-6 AM, (9) F from 9-11:59 PM, (10) F from 12-6 AM, (11) Sa from 11-11:59 PM, (12) Sa from 12-8 AM, (13) Su from 11-11:59 PM, and (14) Su from 12-8 AM).

Figure 17:
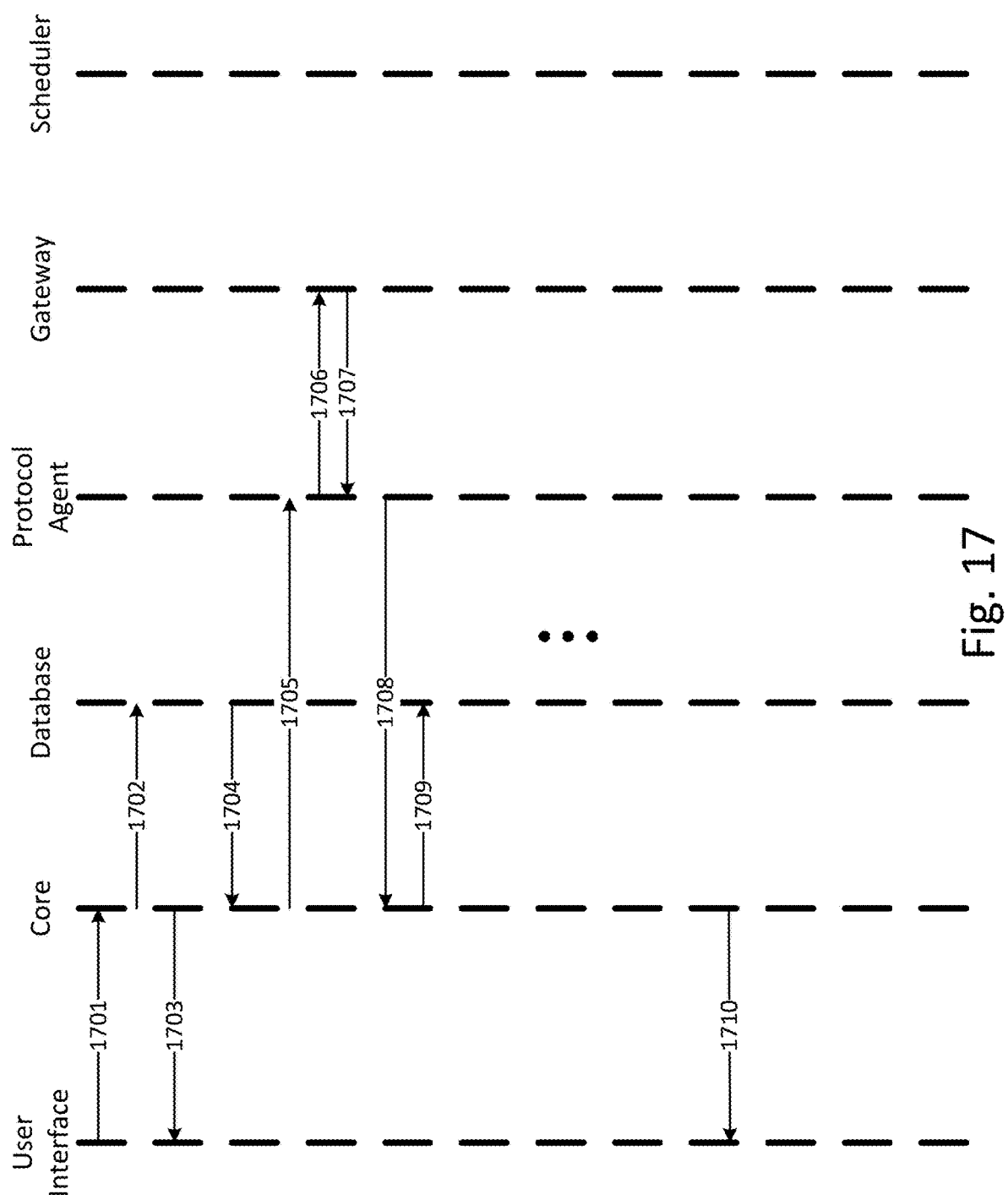
FIG. 17 shows an example system for generating a schedule in a first scenario.

1610: request to remove the schedules from the cloud schedule table for weekends and weekdays.
1611: if any entry exists in wake up schedule related to the bed time schedule
1612: if any wake up schedule present for the wake up schedule, remove the wake up schedule(s)
1613: acknowledgment In a fifth scenario, the system may modify a time schedule (e.g., a bed time schedule) for a given connected device. For example, the weekday bedtime may be Monday through Friday from 9 PM to 6 AM, and the weekend bedtime may be Saturday through Sunday from 11 PM to 8 AM. FIG. 17 shows an example system for generating a schedule in a first scenario. One or more of the following may occur in any order.

1701: send a device management configuration message indicating modification of one or more schedules
1702: verify if there is an existing schedule in the database
1703: if a schedule does not exist in the database, return a message indicating that the schedule does not exist (e.g., a 400 error)
1704: return a message indicating that a record exists and return the indexes for weekdays and weekends
1705: The core may send a modification request (e.g., a patch request) for a first part of the schedule (e.g., Monday, 9 PM to 6 AM). The request may comprise one or more parameters, such as a new start time (e.g., 8 PM or 20:00) for the first part of the schedule
1706: forward modification request for first part of schedule to gateway
1707: the gateway may respond with an acknowledgment of the modification request

1708: send acknowledgement message, which may be with or without index for the first part of the schedule

1709: update the first part of schedule in the gateway schedule table

The system may, for example, repeat 1705-1709 for each different segment of time, which may be 14 total times if two schedules were created for each day of the week (e.g., (1) M from 9-11:59 PM, (2) M from 12-6 AM, (3) T from 9-11:59 PM, (4) T from 12-6 AM, (5) W from 9-11:59 PM, (6) W from 12-6 AM, (7) Th from 9-11:59 PM, (8) Th from 12-6 AM, (9) F from 9-11:59 PM, (10) F from 12-6 AM, (11) Sa from 11-11:59 PM, (12) Sa from 12-8 AM, (13) Su from 11-11:59 PM, and (14) Su from 12-8 AM). The portions of the schedule may be modified to update the start time, end time, or other parameters.

1710: acknowledgment

If any entry exists in the cloud wake up schedule for this bed time schedule, send a request to modify the cloud wake up schedule according to the new bed time schedule.

Figure 18:
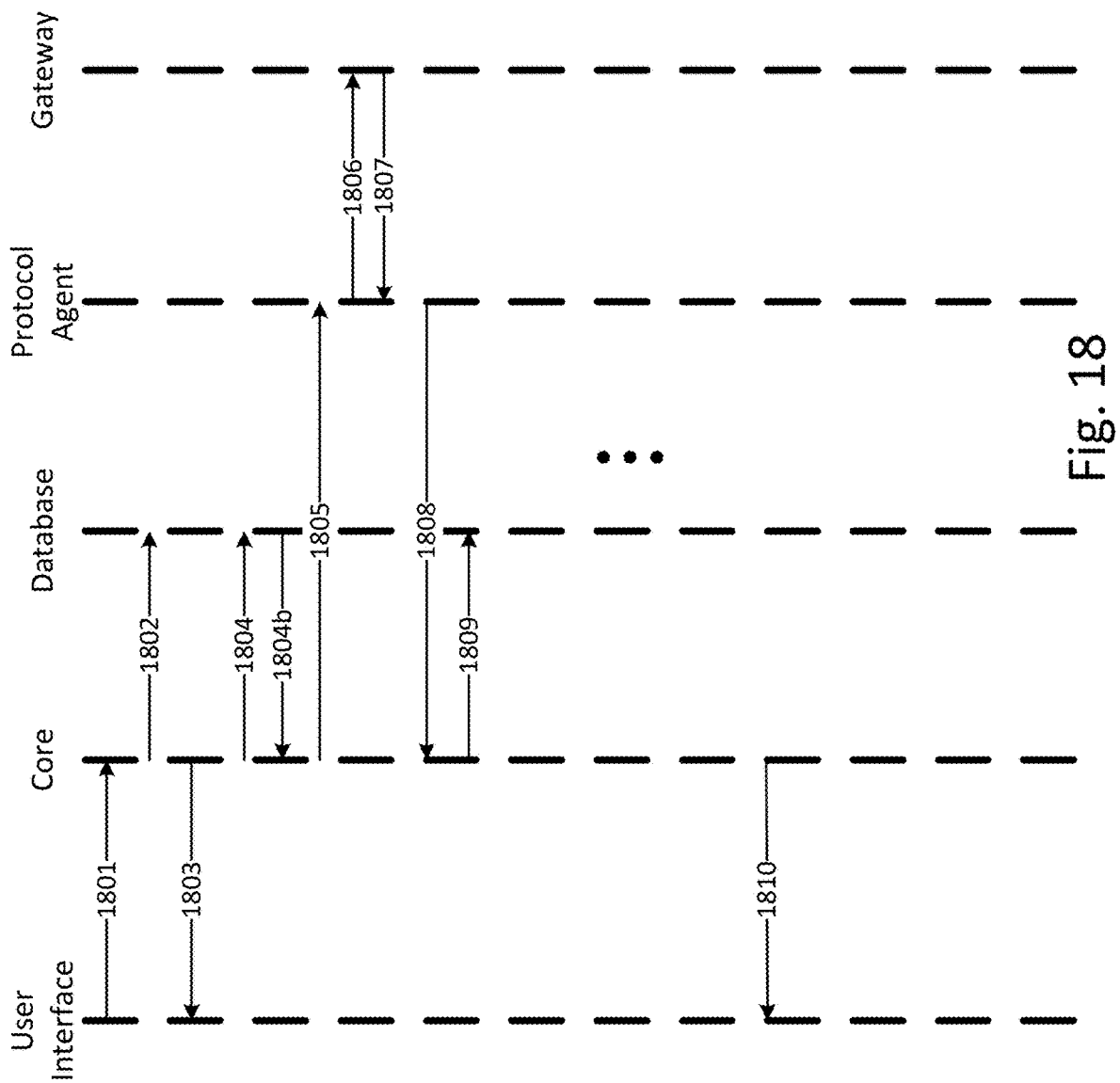
FIG. 18 shows an example system for generating a schedule in a fourth scenario.

In a sixth scenario, the system may pause a time schedule (e.g., a bed time schedule) for a given connected device during a time period, such as Monday. FIG. 18 shows an example system for generating a schedule in a fourth scenario. One or more of the following may occur in any order.

1801: send a device management configuration message indicating a pause of one or more schedules

1802: verify if there is an existing schedule in the database

1803: if a schedule does not exist in the database, return a message indicating that the schedule does not exist (e.g., a 400 error code)

1804: if a schedule already exists in the database, get the index values for a first day (e.g., Monday) schedule from the gateway schedule database

1804b: return a message with the indexes for one or more schedules (e.g., two schedules) for the first day (e.g., Monday)

1805: The core may send a pause schedule request for a first part of the schedule (e.g., Monday, 12:00 AM to 11:59 AM).

1806: send update schedule request for a first part of schedule to the gateway

1807: the gateway may respond with an acknowledgment of the update request

1808: send acknowledgement message

1809: update the index in the gateway schedule table

The system may, for example, repeat 1805-1809 for each different segment of time, which may be 14 total times if two schedules are created for each day of the week (e.g., (1) M from 12-11:59 AM, (2) M from 12-23:59 PM, (3) T from 12-11:59 AM, (4) T from 12-23:59 PM, (5) W from 12-11:59 AM, (6) W from 12-23:59 PM, (7) Th from 12-11:59 AM, (8) Th from 12-23:59 PM, (9) F from 12-11:59 AM, (10) F from 12-23:59 PM, (11) Sa from 12-11:59 AM, (12) Sa from 12-23:59 PM, (13) Su from 12-11:59 AM, (14) Su from 12-23:59 PM). The core may also request and receive indexes for each of the schedules (e.g., similar to 1804 and 1804b, but for each of the remaining days).

1810: acknowledgment

Figure 19:
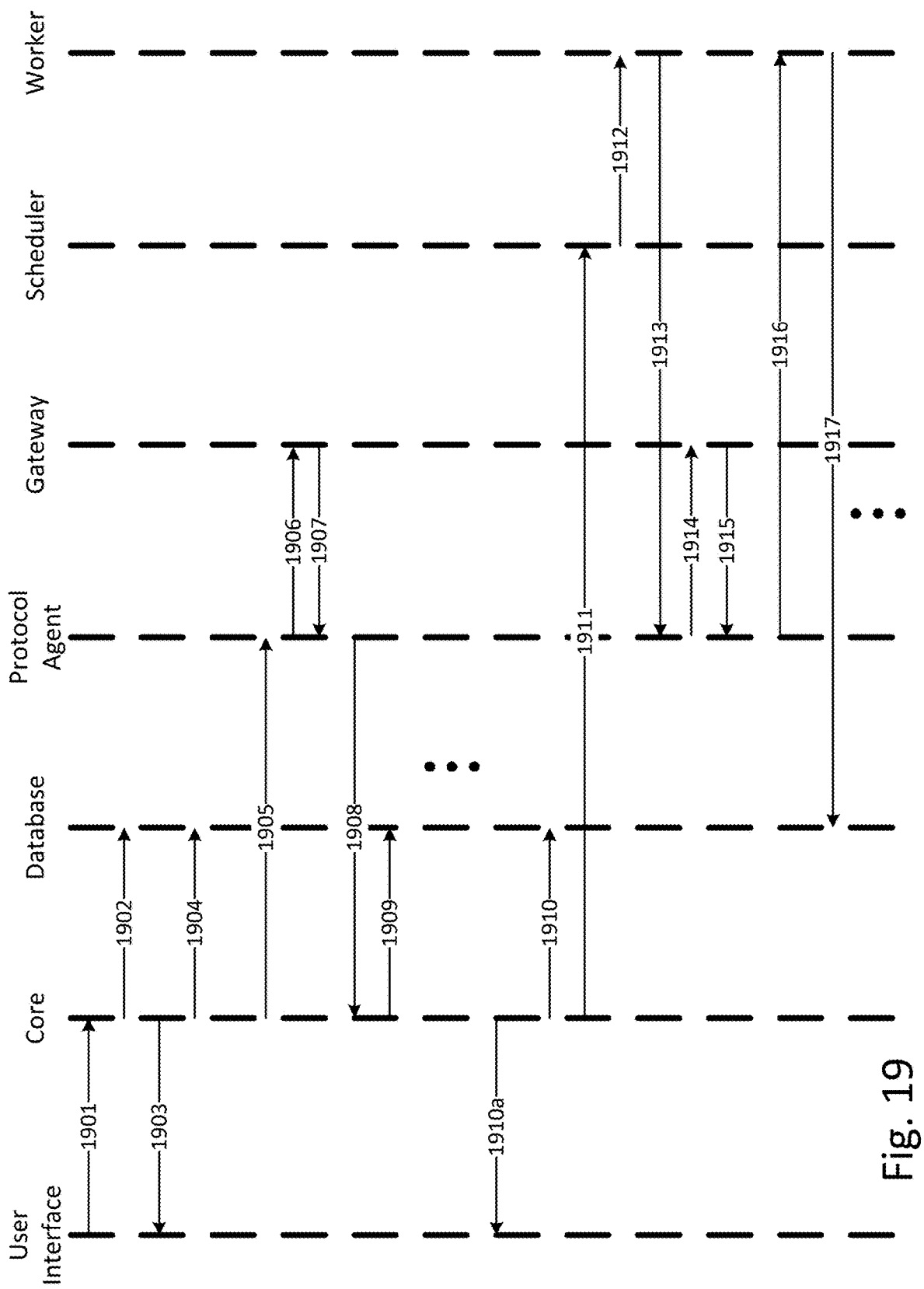
FIG. 19 shows an example system for generating a schedule in a second scenario.

In a seventh scenario, the system may unblock (e.g. allow) a device to connect for a portion of the schedule, such as for a current day (e.g., Monday). FIG. 19 shows an example system for generating a schedule in a second scenario. One or more of the following may occur in any order.

1901: send a device management configuration message indicating a request to unblock a portion of the schedule (e.g., a portion of the Monday schedule).

1902: verify if there is an existing schedule in the database for the current day (e.g., Monday).

1903: if a schedule does not exist in the database, return a message indicating that the schedule does not exist

1904: if a schedule already exists in the database, get the Monday schedule from the cloud schedule table.

1905: send, to the protocol agent of a corresponding gateway, an unpause schedule for at least a first portion of the schedule (e.g., Monday from 09:00 to 11:59 AM)

1906: send update schedule message

1907: acknowledge message (e.g., a 200 OK message)

1908: acknowledge message

1909: update the index in the gateway schedule table for the first portion of the schedule (e.g., Monday from 09:00 to 11:59 AM)

The system may, for example, repeat 1905-1909 for each different segment of time (e.g., (1) M from 09:00-11:59, (2) M from 00:00-06:00, (3) Tu from 09:00-11:59, etc.). There may be a total of 14 posts for a particular device.

1910a: acknowledge message (e.g., 200 OK message).

1910: request to add the entry in a cloud schedule wake up table.

1911: POST current schedule of the day to queue to initiate a restore of the bed time after the end time of the schedule, for example, within 24 hours. Moreover, the core may send parameters for the rule to the scheduler, such as a cloud scheduler (e.g., via a POST message), such as the type (e.g., block usage), device identifier (e.g., MAC address), whether to always block (e.g., true or false), the start time (e.g., 21:00), the end time (e.g., 06:00), and/or the applicable blocked day (e.g., day x).

1912: scheduler sends the request to a worker

1913: POST for first part of schedule (e.g., Monday from 21:00 to 23:59). The POST may comprise parameters, such as the type (e.g., block usage), device identifier (e.g., MAC address), whether to always block (e.g., true or false), the start time (e.g., 21:00), the end time (e.g., 23:59), and/or the applicable blocked day (e.g., day x).

1914: POST for weekends first part of schedule

1915: acknowledge (e.g., via a 200 OK message) the request, with an index for the first part of the schedule

1916: acknowledge message, with an index for the first part of the schedule

1917: store the index for this schedule in gateway schedule database, and/or remove the entry from the cloud schedule wake up table The system may, for example, repeat 1913-1917 for each different segment of time for the current day (e.g., (1) M from 21:00 PM to 23:59 PM and (2) Tu from 00:00 AM to 08:00 AM).

Figure 21:
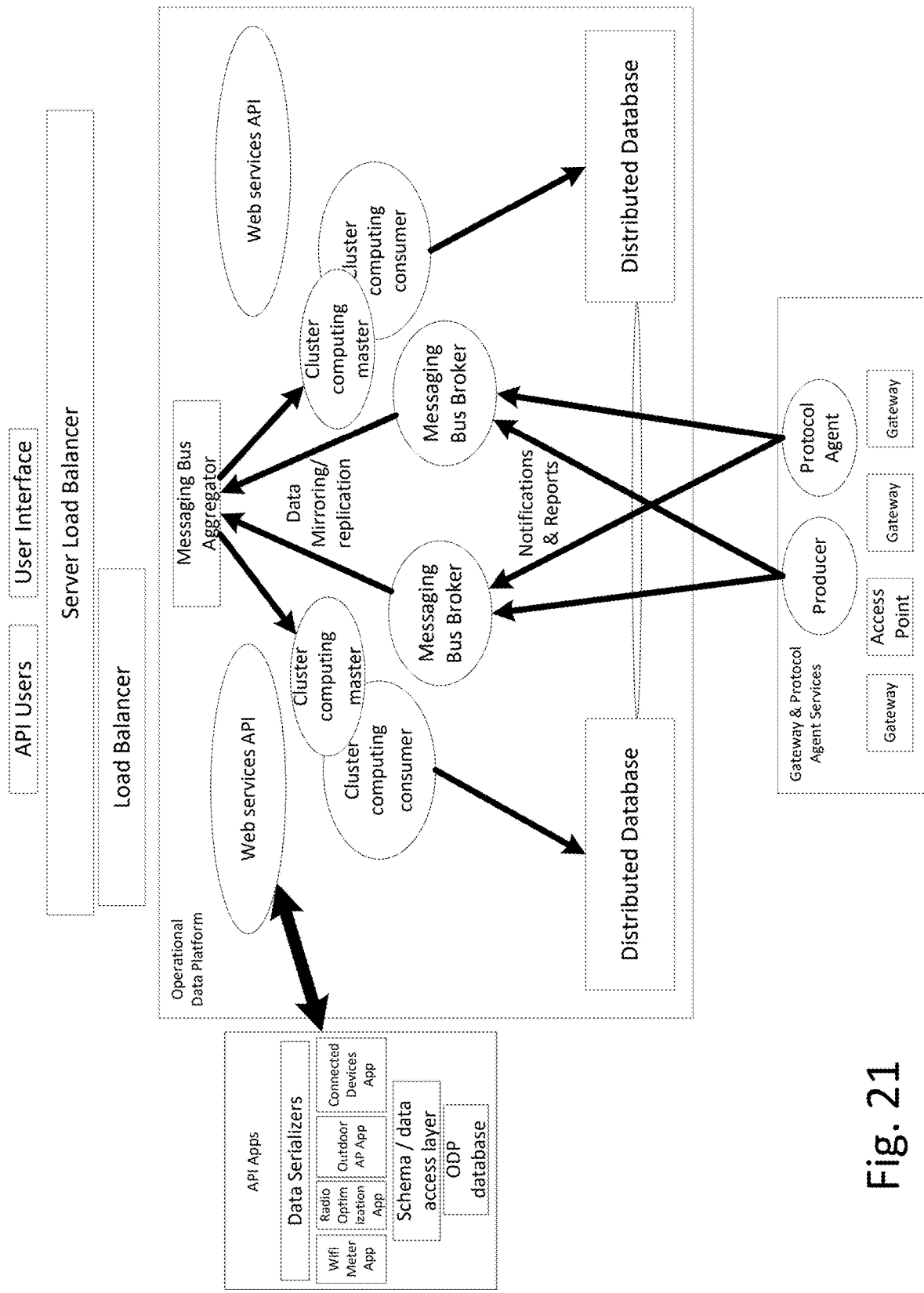
FIG. 21 shows an example of an operational data platform system.

FIG. 21 shows an example of an operational data platform system. The system may be implemented in a single node or a multi-node environment. The system may be deployed in a plurality of geographical regions, and each of the geographical regions may have one or more zone. Moreover, the servers and/or nodes shown in FIG. 21 may be used for, for example, logging, monitoring, authentication, time synchronization, URL resolution, time/series data for reports, monitoring and reporting, deploying or upgrading applications, performing inventory or audits, etc. The servers and/or nodes may use various protocols for communication, such as HTTPS, TCP, HTTP, NTP, UDP, DNS, SPDB, among other protocols. One or more ports may be used by each component for communication with other components in the system.

The system may comprise an operational data platform (ODP). ODP may comprise a cloud based platform that gathers and aggregates telemetry data from many (e.g., millions of) gateways.

The operational data platform may comprise a messaging bus aggregator, which may be a distributed streaming platform for publishing and subscribing to streams of data.

The operational data platform may comprise one or more web services API. The web services API may comprise, for example, a representational state transfer (REST) web services computer system farm.

The operational data platform may comprise one or more cluster computing masters.

The operational data platform may comprise one or more cluster computing consumers.

The operational data platform may comprise one or more messaging bus broker.

The operational data platform may comprise one or more distributed database.

Each of the systems and/or devices of the operational data platform may comprise one or more nodes for receiving, storing, transmitting, and/or processing data.

The system may comprise gateway and protocol agent services and their corresponding devices. The devices may comprise one or more gateways and/or one or more access points (e.g., wireless gateways or access points, such as Wi-Fi access points). The gateways may comprise a plurality of different types of gateways (e.g., running different versions of software, such as different versions of RDK software). The devices may also comprise one or more data producers. The devices may also comprise one or more protocol agents for interfacing between access points and/or gateways and the operational data platform. The producers and/or gateway devices may generate or receive notifications, reports (e.g., periodic reports), and/or data associated therewith.

The system may comprise one or more load balancers. For example, the system may comprise one or more High Availability proxy (HAproxy) load balancers. The system may comprise a server load balancer, which may comprise a global server load balancing services for distributing traffic across resources in a plurality of different geographies.

The system may comprise one or more API users, such as a Wi-Fi meter user, an outdoor AP user, and the like.

The system may comprise one or more user interface users, such as for requesting updates, deletion, or generation of one or more gateway schedules or portions thereof.

The system may comprise a plurality of API applications, such as REST API applications. The API applications may comprise one or more data serializers. The data serializers may be used to translate data into formats that may be stored. The API applications may also comprise a Wi-Fi meter app, radio optimization app, outdoor AP app, and/or a connected devices app. The API applications may comprise a schema or data access layer. The API applications may comprise one or more databases, such as an ODP database.

Figure 22:
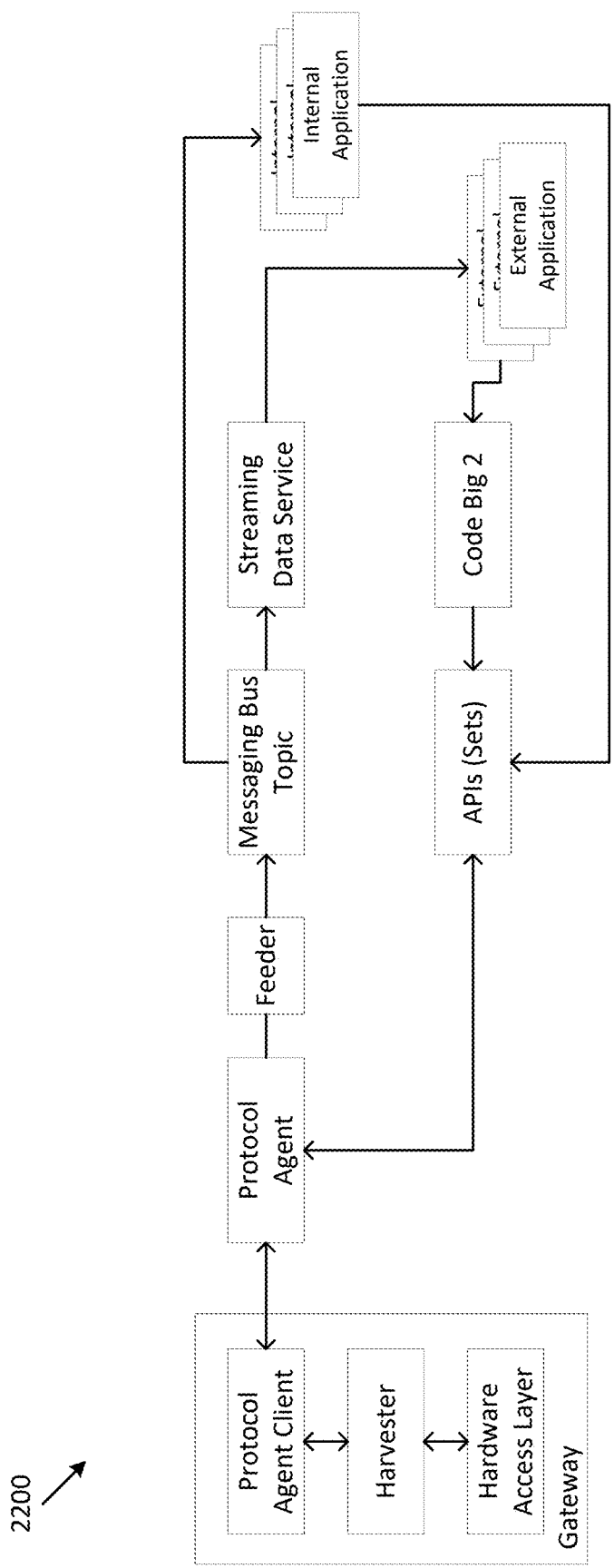
FIG. 22 shows an example system for gateway and/or network data collection.

FIG. 22 shows an example system 2200 for gateway and/or network data collection. For example, the system 2200 may be used for automated data (e.g., Wi-Fi telemetry data) extraction, delivery, and control for a plurality of internal and external applications. The system may act as a common interface to Wi-Fi data of gateway devices. The system may be used for automated data extraction and radio configuration, which may be consumed by internal users and/or third party users. The system 2200 may comprise one or more interfaces for stream data, such as Wi-Fi telemetry data and/or sets (e.g., radio control) to support multiple concurrent users. Third parties may connect to standardized interfaces. One or more internal applications may connect to the system to obtain and use gateway and/or network data.

Figure 23:
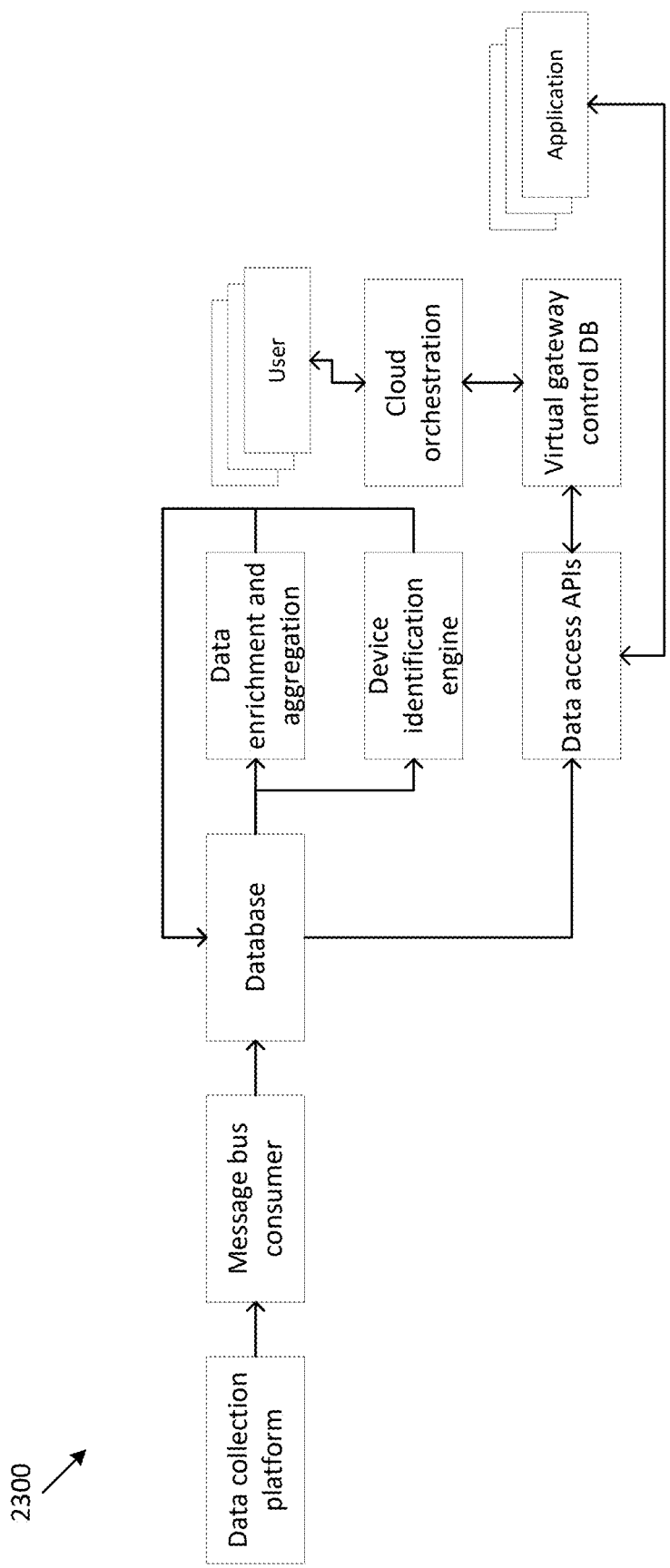
FIG. 23 shows an example system for measuring and accessing device operational data.

FIG. 23 shows an example system 2300 for measuring and accessing device operational data, such as a device operational data platform. The system may be used to measure and access device operational data, such as time series data related to operational KPIs, such as RSSI, PHY Rate, tonnage, etc.

The system may use one or more data capture rates. The polling/reporting frequency for connected devices may be, for example, 5 minutes/15 minutes (or any other duration). Polling/reporting frequency may be increased for any gateway, at any time for up to a certain number of minutes (e.g., 5 minutes). This frequency may be set to every second, in the event that a network is under a real time scan. Requests for increased polling/reporting may be renewed to extend the 5-minute timeout. Gateways may report connected device information every 1-5 minutes, with some spikes to 1-5 seconds.

A variety of use cases may be supported, and several non-limiting examples will now be provided. In a first use case, a user may view Wi-Fi performance over a period of time. A user or a tech/care agent may visually inspect a past history of Wi-Fi performance over a past interval (e.g., 1 hour, 1 day, 1 month). This may be useful to determine how current or recent Wi-Fi performance is compared to a baseline. The service account may be used for accessing the data, as over a period of days or weeks, a gateway may be swapped in or out of a household. Data rollups may be used, such as in 5 minute, 1 hour, 1 day intervals, to provide graphs of analysis. A small delay in making the most recent data (e.g., the last 1-2 rollup intervals) available does not have a large impact on the value of the data, as trends may still be displayed.

The user may view real-time household Wi-Fi performance (e.g., current network health or site survey). This may involve tracking device report data at a high frequency (e.g., less than 30 second intervals), for one or more connected device within a household. This may be useful for a user, tech, or care agent attempting to investigate a potential issue or do a site survey.

The system may collect and infer device information (e.g., metadata). The system may determine derived or inferred information about a certain device or account based on user input, data/trend analysis, additional information sources, or other insights. These may be useful for developing device intelligence profiles and fingerprints. This may utilize service account to identify one or more devices connected to a gateway within a period (e.g., week, month, year, etc.). The device information may comprise, for example, type of device, manufacturer, physical location, static vs. moving, streaming device, internet of things (IoT) device, etc.

The system may collect Wi-Fi data, such as signal strength, frequency band, channel, etc. The data model used by the system may be extensible, as additional parameters are measured (e.g., bytes downloaded, SNR, etc.). Data collected may be placed into a real time/raw table, which may contain the individual timestamped device report data. The raw data table may also include a retention period. The table may comprise entries for timestamp rounded down to the nearest hour, identifying MAC address of gateway, timestamp of when the data was captured, MAC address of the connected device, gateway interface MAC device is connected to, interface identifier (e.g., SSID or VLAN ID), and/or individual metrics captured in the report.

A regular query may be used to retrieve data for the current (or last) hour (or last X 5 minute batches) for one or more (e.g., all) devices so that rollups may be generated shortly after data is collected. Using a timestamp rounded to the current hour as the first component of the partition key may optimize query time if performing a data rollup for one or more (e.g., all) gateways for a specific hour or 5 minute interval. Daily rollups are possible. Ad-hoc requests for data for a specific MAC address may be fast, as the usage pattern for these requests might use recent data, such as the last 1-2 hours of data.

Data collected in the real time/raw table may be periodically aggregated into rollup tables. These tables may contain data from the raw table, normalized into standardized time periods. The tables may be similar to the real time/raw table schema, but may use a service account ID as the primary key. The table may comprise entries for service account of user account, timestamp of when the data was captured, MAC address of the connected device, gateway interface MAC device is connected to, interface identifier (e.g., SSID or VLAN ID), and/or individual metrics captured in the report. The service account ID may be used as the primary key. There may be multiple gateways on the one account. A query may be at the service account level, and may be for one or more connected devices within a household, so the connected devices may be group by service account.

The system may also use or generate a service account lookup table. Incoming device report data may contain a gateway ID (e.g., MAC), which may be mapped to a service account ID (e.g., a unique account identifier). A data join operation across database tables may be performed. A lookup table to map between a gateway MAC and a service account ID may be used. Gateways may move across accounts over time, so the system may also track the start and end time validity time for the mapping. The service account lookup table may comprise entries for a gateway MAC address, start timestamp of the MAC→service account association, end timestamp of the MAC→service account association, and/or service account ID of the associated account.

An update mechanism may be provided. The service account lookup table may be kept up to date by a process that listens to account/device change notifications. An additional process may periodically run to reconcile any gateway mac→service account associations that were missed.

Figure 24:
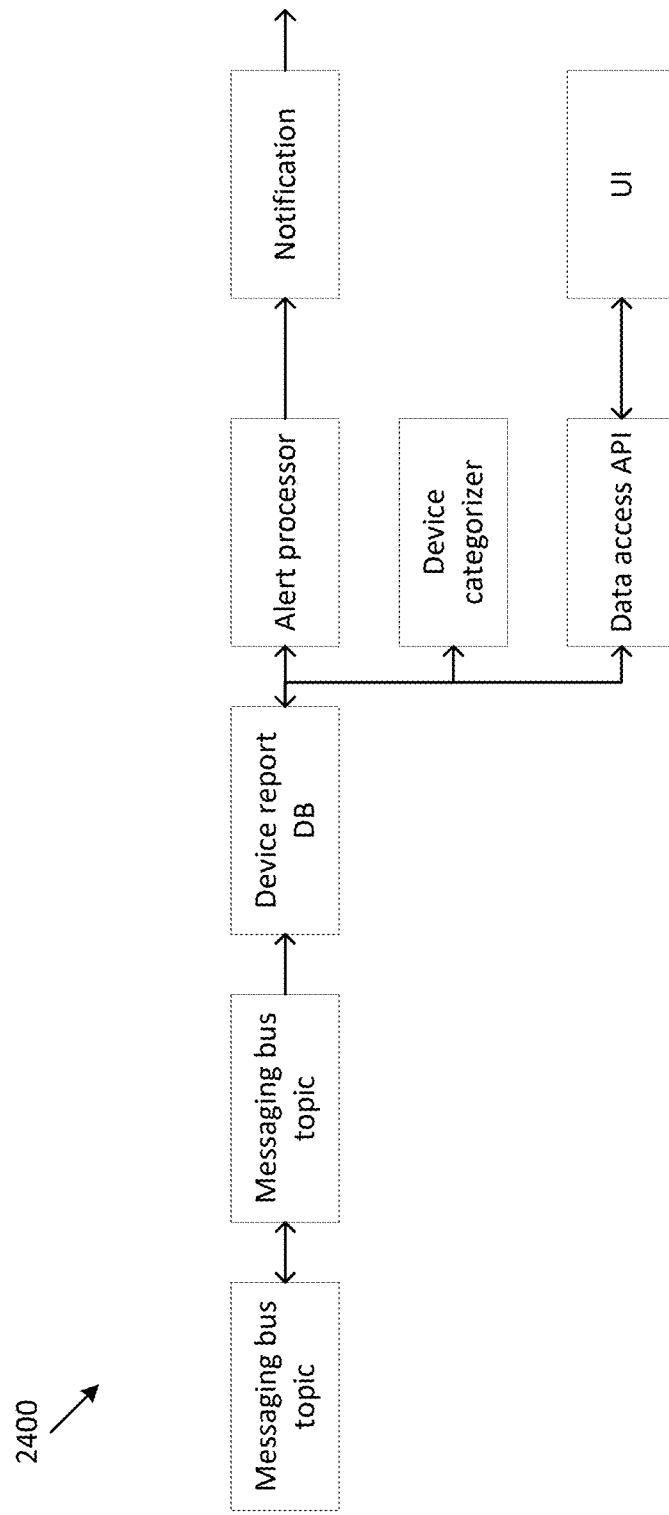
FIG. 24 shows an example system for improving device connectivity.

FIG. 24 shows an example system 2400 for improving device connectivity. The system may comprise or interface with applications that consume, analyze, and present data provided by the system.

Figure 25:
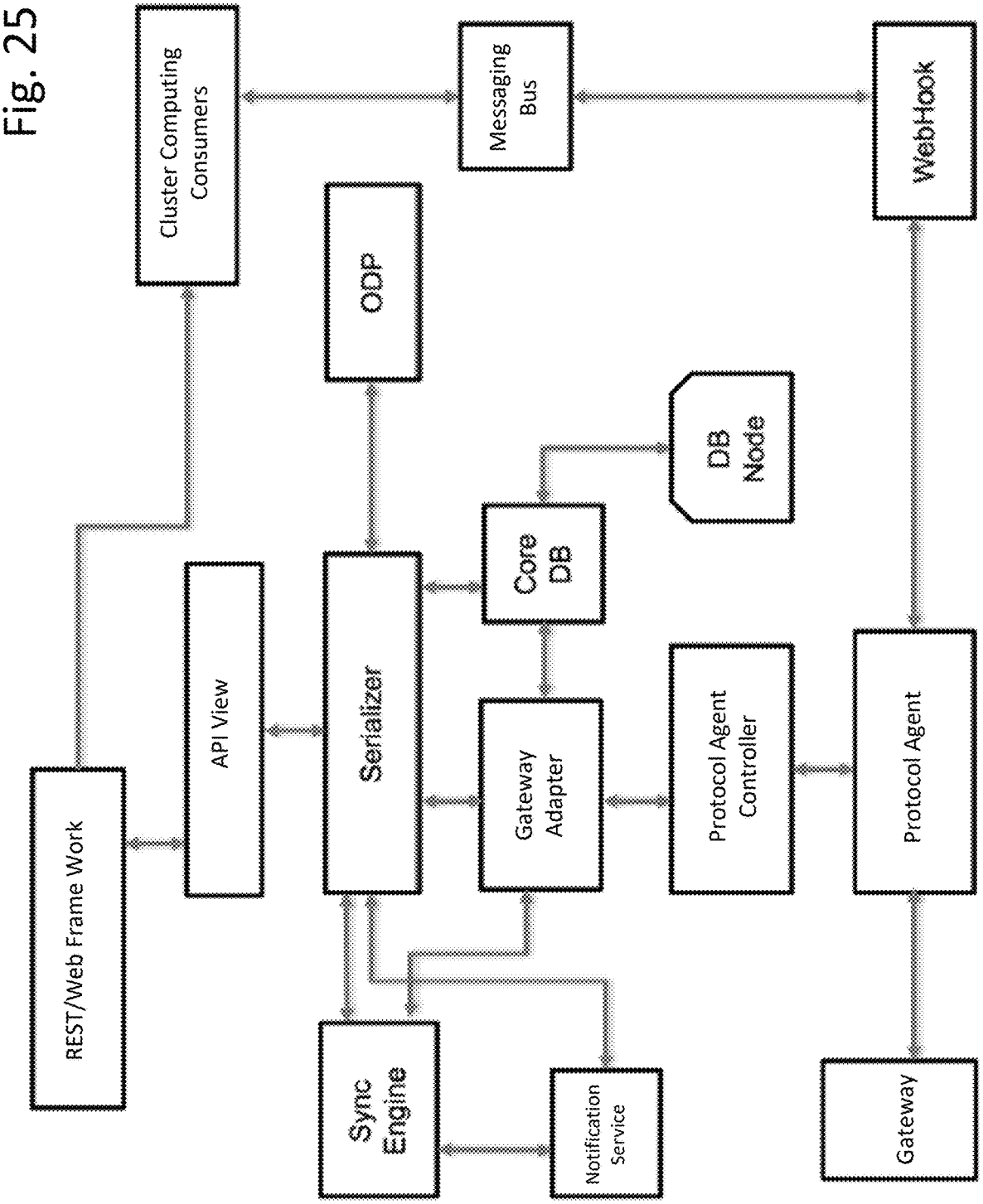
FIG. 25 shows an example architecture for a virtual gateway controller.

FIG. 25 shows an example architecture for a virtual gateway controller.

Figure 26:
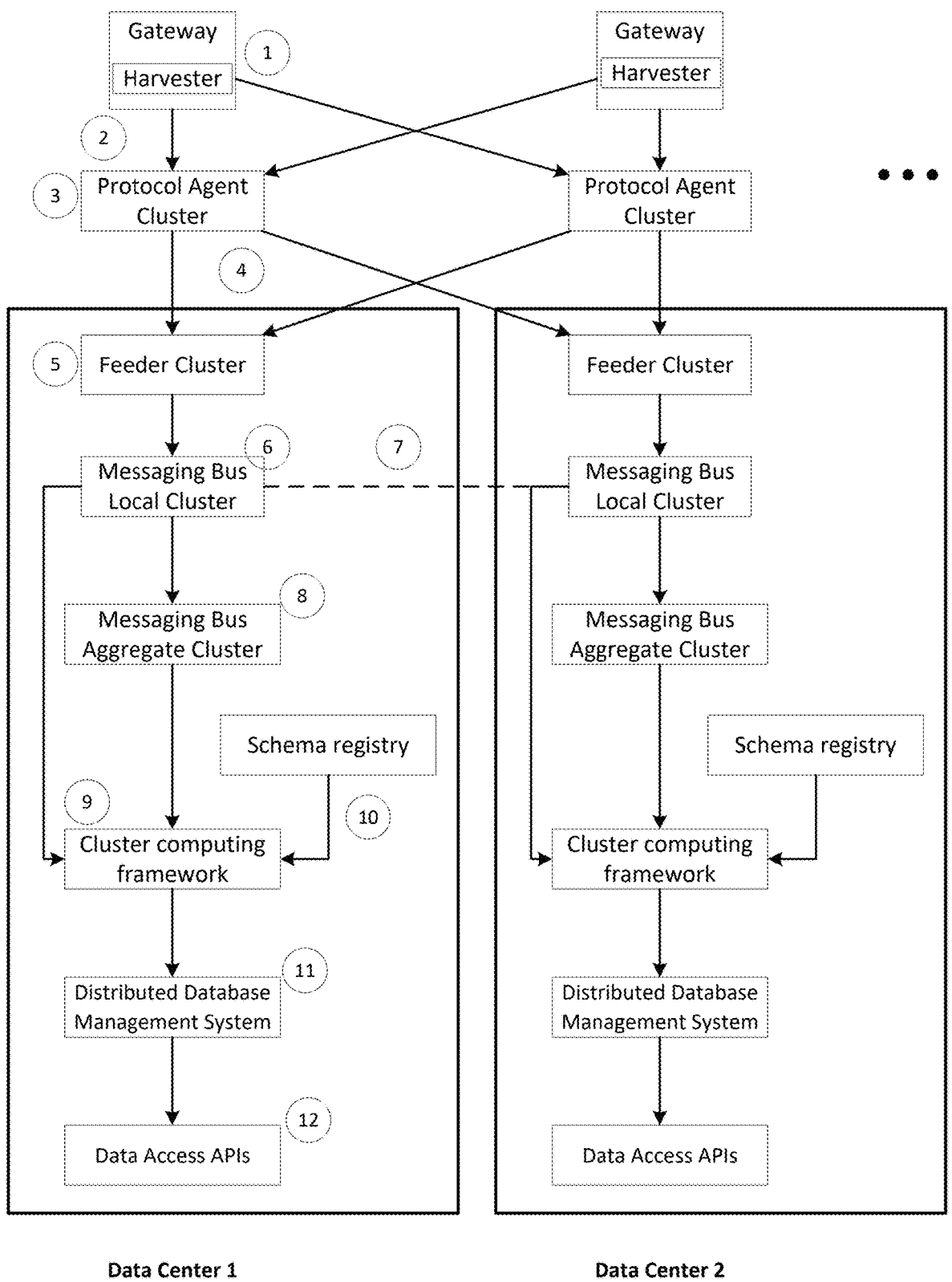
FIG. 26 shows an example architecture for a system for gateway and/or network data collection and for improving device connectivity.

FIG. 26 shows an example architecture for a system for gateway and/or network data collection and for improving device connectivity. FIG. 26 shows two data centers, but the system may comprise more than two data centers. One or more of the following may occur in any order.

1: Gateway (e.g., via a harvester agent) may collect data about the current state of a network (e.g., a household Wi-Fi network) and connected devices, such as at a regular interval (which may be configurable).

2: The harvester may periodically send collected Wi-Fi information to a protocol agent server cluster. The gateway may maintain a connection with the protocol agent cluster while online.

3: The protocol agent cluster may receive the message and determine whether any hosts have registered web hooks for the specific message type.

4: The protocol agent cluster may post the message to each registered web hook for this message, including the feeder cluster.

5: The feeder cluster may inspect the message metadata and route the messages to the appropriate topic (e.g., KAFKA topic).

6: The messaging bus local cluster may accept messages from data producers, such as data producers in the same datacenter. Consumers may consume the data from the local cluster.

7: Topics on local clusters may be mirrored to one or more aggregate clusters using a mirroring or replication tool.

8: The aggregate cluster (which may be hosted in one or more data centers) may receive messages from one or more of the local clusters. Topics may be mirrored on a topic-by-topic basis. Producers might not directly send messages to aggregate clusters.

9: The cluster computing framework may process data from the messaging bus local cluster and/or the messaging bus aggregate cluster. The cluster computing framework may be made larger if it is expected to consume from both local and aggregate topics.

10: A schema registry service may provide the cluster computing framework (or other interested devices or services) with a mapping between a message schema ID and the particular schema for messages consumed from the messaging bus.

11: each data center may have one or more distributed database management system (e.g., a cluster or ring of nodes) for fast local access to the data. Each cluster or ring may contain a full data set, and changes to data may be replicated between each data center.

12: Data access APIs may be deployed in each data center to reduce request latency.

An alert processor described herein may analyze the connectivity quality of a device over a particular time duration (e.g., over the last 3 minutes), and may initiate an alert to a user (e.g., via a user interface, to the user's phone, email, etc.). The alert processor may determine which alerts to generate and push them to the user interface. The user interface may deliver the notification to a user device (e.g., via SMS, email, television user interface, etc.).

An exemplary process for notifications will now be described. One or more of the following may occur in any order. In 1, a good or bad signal logic may determine if a device is in good or bad network (e.g., Wi-Fi) coverage for each device. The computing device may retrieve signal strength values for a previous time duration (e.g., the past 3 minutes of signal strength values). If more than a threshold percent (e.g., 80%) of the signal strength values are below a threshold signal strength (e.g., −80 dBm), the computing device may determine that the device is in poor coverage. Otherwise, the computing device may determine that the device is in good coverage.

In 2, the computing device may send the state of each device (e.g., good coverage or bad coverage) to an alert generator. The message may be tagged with a topic, such as an "alerts" topic.

In 3, the alert generator may compare the state received in the message to a last known status, which may be stored in the database.

In 4, the alert generator may issue alerts based, at least in part, on the following logic:

| Previous | Current | Message |
|----------|---------|---------|
| bad | bad | |
| good | bad | Device X is now in poor coverage |
| bad | good | Device X has returned to good coverage |
| good | good | |

In 5, the alert generator may update the state in the database to the new value.

In 6, the alert generator may send (e.g., post) a message (e.g., a JSON message) to a user interface for notification to the user.

In 7, a rules engine may process the message and send a notification (e.g., via SMS, email, television user interface, etc.) to a user device.

A device categorizer described herein may be used to determine whether a device is a static device or a mobile device, which may be used to categorize and/or identify the device. Whether the device is static or mobile may be based, at least in part, on a standard deviation of signal strength over a particular time period (e.g., the past 7 days), with a minimum time online. This metric may be used to identify whether a device is a static device that is in a chronic poor coverage, which may be a good candidate for user notification and/or remediation.

A device may be considered static if the standard deviation is less than a threshold (e.g., less than 5) and a time online is greater than a threshold (e.g., 6 hours). Otherwise, the device may be categorized as a mobile device. The device categorizer may also calculate a static confidence score, which may be between, for example, −5 (very static) and +5 (very mobile). The confidence may increase with time and based on the standard deviation. The device categorizer may also calculate the average signal over a time period (e.g., over the past 7 days). The device categorizer may also use data transfer patterns of the static device to determine if the device is a streaming/media device or an Internet of Things (IOT) device.

An exemplary process for device categorization will now be described. A device may be categorized as static or mobile, and/or a level of mobility may be determined for the device. Based on the device's categorization, recommendations for improving a network connection between the device and a gateway may be generated. For example, if the device comprises a static device, one or more recommendations (e.g., moving the device, moving the gateway, removing obstructions, etc.) may be recommended to the user via a user device.

Figure 30A:
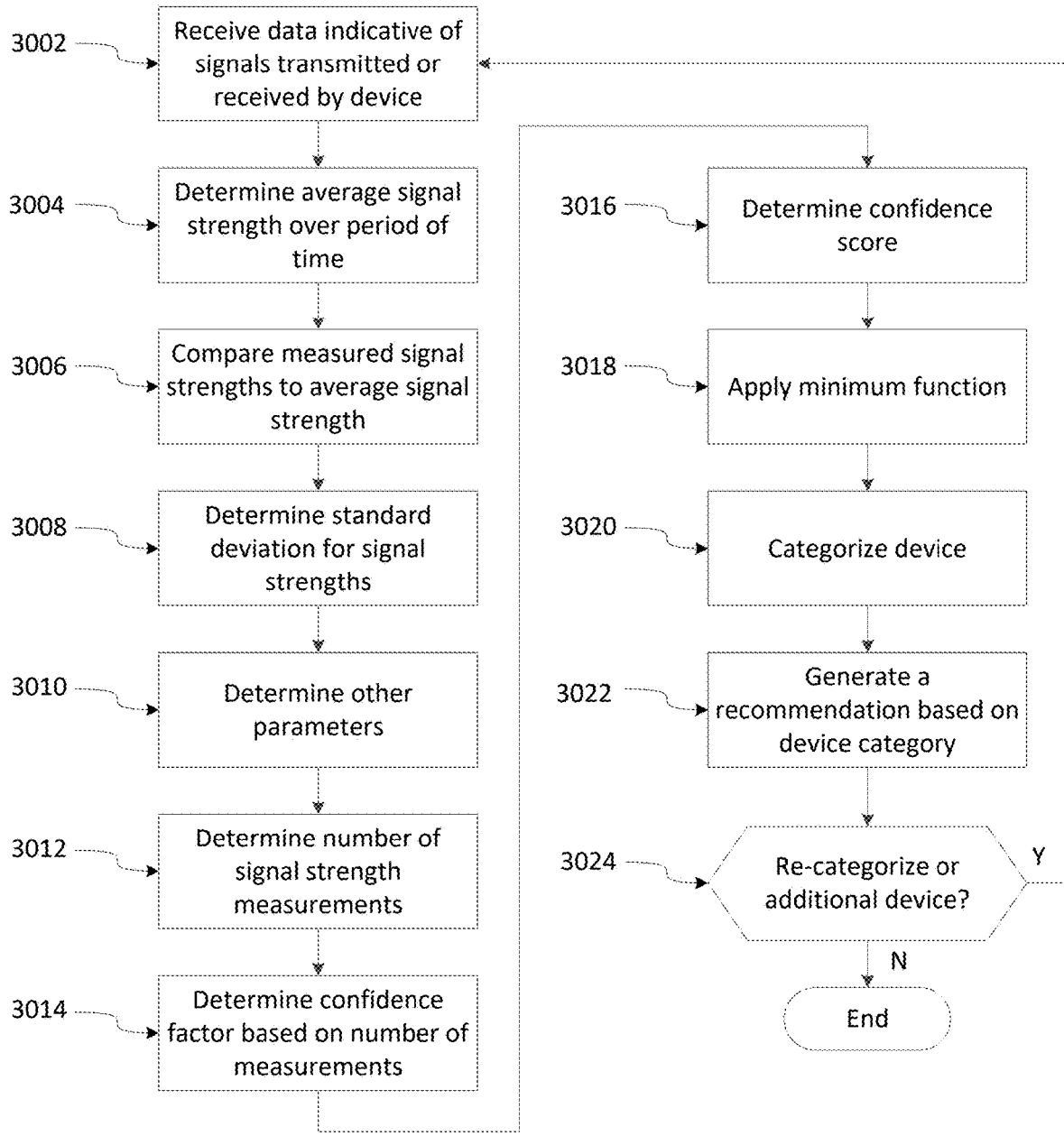
FIG. 30a is a flow chart showing an example method for categorizing one or more devices.

FIG. 30a is a flow chart showing an example method for categorizing one or more devices. In step 3002, the device categorizer may receive data indicative of signals transmitted or received by a device, such as received signal strength (e.g., received signal strength indicators (RSSIs)) or transmitted signal strength. The device categorizer may periodically take samples, such as each second, five seconds, minute, etc. The samples may be taken over a particular time period (e.g., the past 7 days). In step 3004, the device categorizer may determine an average signal strength of signals transmitted or received by the device over a period of time. In step 3006, the device categorizer may compare each of the measured signal strengths with the average signal strength. In step 3008, the device categorizer may determine a standard deviation of the collected signal strength data. Based on the comparison (e.g., the standard deviation), the device categorizer may determine whether the device is a static device or a mobile device and/or a degree thereof. Larger differences between the measured signals strengths and the average signal strength may indicate a mobile device. On the other hand, smaller differences between the measured signal strengths and the average signal strength may indicate a static device. For example, if the standard deviation is less than a threshold standard deviation (e.g., 5), the device categorizer may determine that the device is a static device. If the standard deviation is more than a threshold standard deviation, the device categorizer may determine that the device is a mobile device.

In step 3010, the device categorizer may consider other parameters to determine whether a device is static or mobile and/or a degree thereof. The device categorizer may consider the amount of time the device has been connected to the gateway (e.g., time online). For example, if the standard deviation is less than a threshold standard deviation (e.g., 5), and the amount of time the device has been connected to the gateway is greater than a threshold time (e.g., 6 hours), the device categorizer may determine that the device is a static device. Otherwise, the device categorizer may determine that the device is a mobile device. The device categorizer may categorize the device based on a number of packets sent or received by the device over a period of time. For example, if the number of packets is low, the device categorizer may determine that the device is static, even if the standard deviation is higher (e.g., greater than a threshold). The device categorizer may also determine the type of static (or mobile device) based on the number of data packets sent or received. For example, the device that transmits a low number of packets but has a higher standard deviation may be an outdoor device (e.g., a wireless security camera, a wireless weather station, etc.) because house obstructions (e.g., walls, windows, doors, etc.) and outdoor weather conditions may affect the signal strength of the outdoor device over time, resulting in higher standard deviation of signal strength. The device categorizer may also consider the amount of data (e.g., number of bytes) sent or received by the device and/or the size of each packet or data stream sent or received by the device. The device categorizer may categorize a device as a static media device (e.g., a game console, a set-top box, etc.) if the standard deviation of signal strengths is below a threshold standard deviation and the amount of data and/or size of each packet or data stream is above a threshold.

Figure 30B:
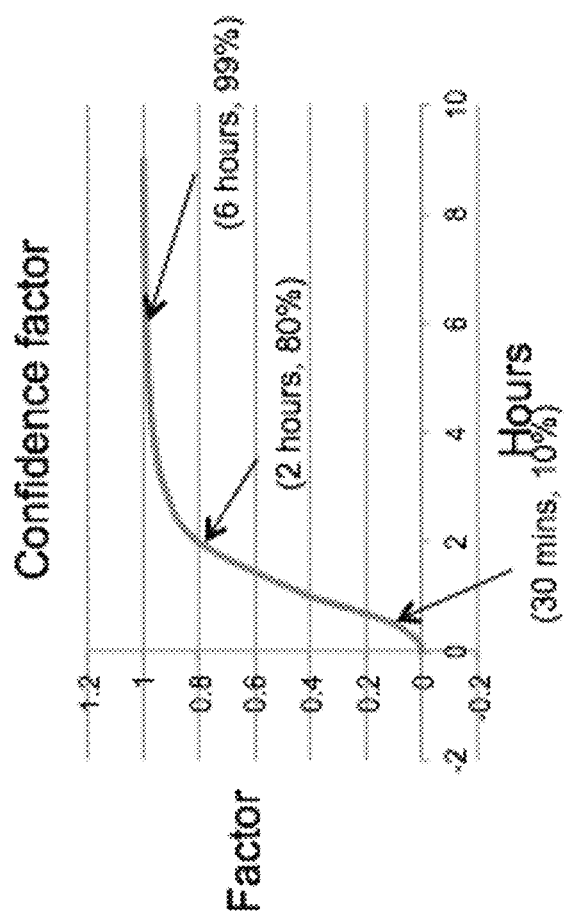
FIG. 30b shows an exemplary confidence curve.

The device categorizer may determine a static confidence score based on the standard deviation and/or a number of signal measurement samples used to determine the standard deviation. In step 3012, the device categorizer may determine the number of signal measurement samples. In step 3014, the device categorizer may determine, based on the number of samples, a confidence factor, which may indicate the confidence level that the device is static or mobile. For example, the confidence factor may comprise a weight, which may be between 0 and 1, and may depend on the number of signal strength samples used to calculate the standard deviation. The confidence factor may vary from 0 to 1 (e.g., asymptotically), as the number of samples increases. An example algorithm for determining the confidence factor may be $(n^{2.6})/(n^{2.6}+40,500,000)$, where n may comprise the number of samples of signal strength measurements over a period of time (e.g., 7 days). As previously explained, samples may be taken periodically, such as every 5 seconds. If there are no samples n, the confidence score may be 0 (e.g., the system does not know if the device is mobile or static). If n is low, the confidence factor may be low (e.g., close to 0). As the number of samples n grows, the confidence score may approach 1. If n is high, the confidence factor may be high (e.g., close to 1). Use of the above algorithm may result in the exemplary confidence factor curve shown in FIG. 30b. For example, assume the system has 30 minutes of samples (e.g., 360 samples if a sample is collected every 5 seconds). The device categorizer may determine a confidence factor of 0.1. If the system has 2 hours of usage, the factor may be 0.8 (and 0.985 at 6 hours). Other algorithms for determining the confidence factor and with parameter values different from 2.6 and 40,500,000 may be used.

Returning to FIG. 30a, in step 3016, the device categorizer may determine a static confidence score based on the standard deviation and the confidence factor, such as by multiplying the confidence factor by the standard deviation, which may include an offset factor. For example, the device categorizer may determine a static confidence score according to the following algorithm: static confidence score= $(n^{2.6})/(n^{2.6}+40,500,000)*(X-A)$. n may comprise the number of samples, X may comprise the standard deviation of a plurality of signal strength measurements over a period of time, and A may comprise the offset.

In step 3018, the device categorizer may apply a minimum function to keep the static confidence score between two values. For example, assume that the static confidence score is determined according to the following algorithm: $MIN[(n^{2.6})/(n^{2.6}+40,500,000)*(X-5), 5]$. The offset may be 5 to keep the static confidence score above 5. The minimum function may keep the static confidence score below 5. In step 3020, the device categorizer may determine, based on the confidence score (which may be modified by a minimum function) whether the device is a static device or a mobile device and/or a degree thereof. The algorithm may assign a confidence score of between −5 (e.g., very sure the device is static) to +5 (e.g., very sure the device is mobile), with 0 being unknown. The higher the absolute value of the static confidence score, the more confident the system is in the static or mobile nature of the device, where negative numbers may be static and positive numbers may be mobile. An initial estimate may be made: (−5) may re-center the graph around a standard dev of 5. Devices with standard deviations about 5 may have a positive score (e.g., more mobile) and those below may have a negative score (e.g., more static).

As an example, if the usage a user has on a laptop during the week is a 30 minute streaming session with X=2 (e.g., very low since the device might not be moved), the static confidence score may be calculated, according to the above algorithm, as $(360^{2.6})/(360^{2.6}+40,500,000)*(2-5)=0.1*-3=-0.3$. The score may be close to zero because 30 minutes might not be enough time to judge if the device is static or not. Without the confidence factor, the device categorizer may calculate a score of −3 (e.g., more of a static device). Returning to FIG. 30a, in step 3022, the device categorizer may generate a recommendation based on the device category. For example, the device categorizer may determine that the device is a static device. The device categorizer may also determine that the device has poor signal strength (e.g., an average signal strength below a threshold signals strength). Based on these determinations, the device categorizer may generate, such as for display on the device or another device, a recommendation for improving the signal strength. For example, one or more of the steps shown in FIGS. 10 and 11 may be performed to check the status of the connection between the device and the gateway. Examples of one or more recommendations that may be displayed on a user device are shown in, for example, FIGS. 31-33.

In step 3024, the device categorizer may determine whether to re-categorize the device, such as based on updated signal strength measurements. The device categorizer may attempt to re-categorize the device in various scenarios. For example, the device categorizer may attempt to re-categorize the device after a threshold amount of time since the last categorization has passed (e.g., after 30 minutes have passed, after one hour has passed, etc.). The device categorizer may attempt to re-categorize the device after a threshold number of new signal strength measurements have been received (e.g., 100 new signal strength measurements, 360 new signal strength measurements, etc.). The device categorizer may attempt to re-categorize the device if the calculated confidence score is below a confidence score threshold and/or the number of signal strength measurements is below a threshold number of signal strength measurements. If the device categorizer determines to re-categorize the device (step 3024: Y), the device categorizer may return to step 3002 to re-categorize the device based on updated samples. The device categorizer may also determine in step 3024 whether there are additional devices to categorize. If so, the device categorizer may return to step 3002 to categorize the additional device(s).

The system described herein may determine and track the type of devices that are connected to one or more networks. For example, if the system determines that a connected device is a particular brand of smartphone, the system may pre-populate the device type in user facing interfaces. Device fingerprinting may also allow the system to optimize users' network connections based on device type (e.g., streaming devices vs. video calling vs. appliances, etc.).

Dynamic host configuration protocol (DHCP) may be used for device fingerprinting. Some local network clients may obtain an IP address via DHCP. As each vendor implements an options string or other strings a little differently, DHCP requests may be used to identify the type of device and/or the operating system of the device. A DHCP server may send, to a client device, one or more options that indicate configuration parameters for the client device.

Figure 27:
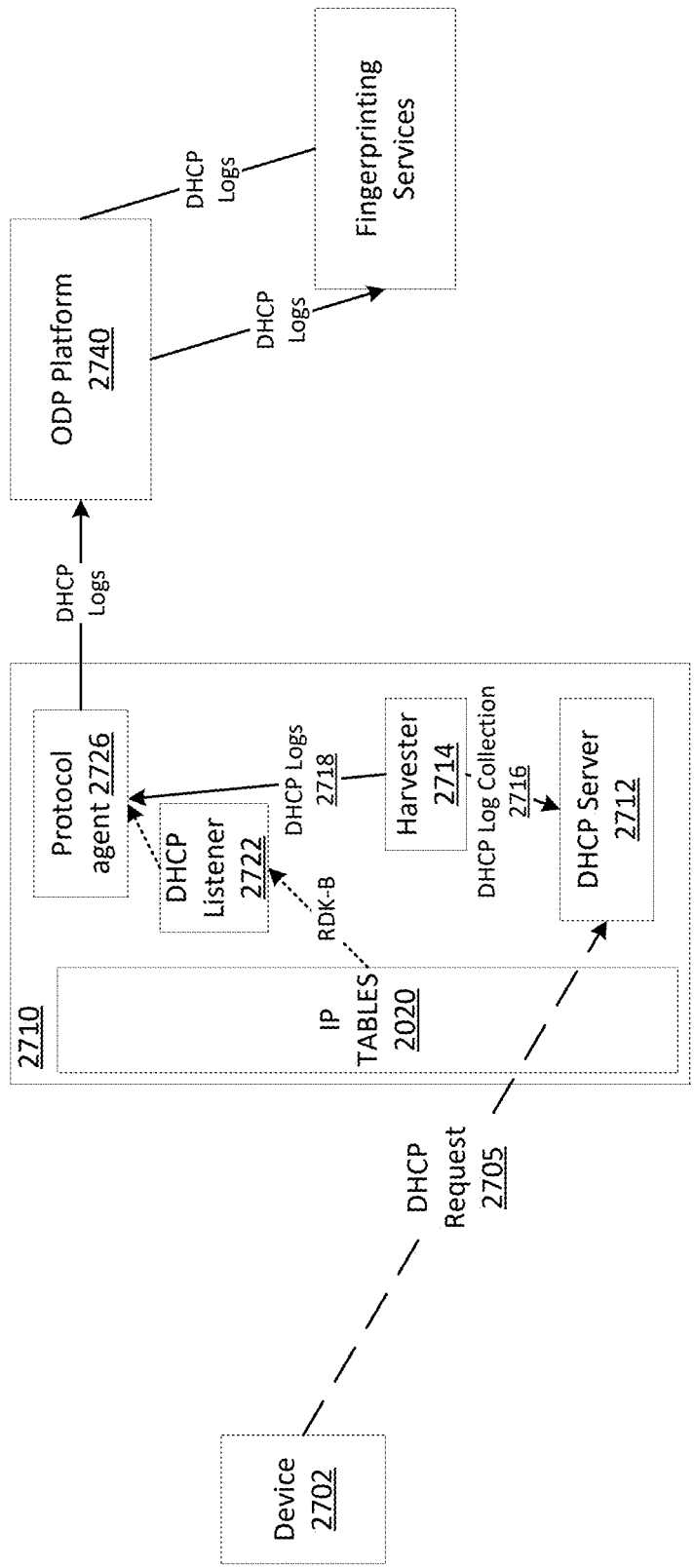
FIG. 27 shows an example system for device fingerprinting.

FIG. 27 shows an example system for device fingerprinting. Device fingerprinting may be used to determine the status of a device (e.g., a known device, an unknown device, a blocked device, a paused device, etc.). After fingerprinting the device, one or more actions may be taken. For example, a gateway device may permit a known device to connect to the internet, but may prevent a blocked device or paused device from connecting to the internet. Various approaches may be used to collect DHCP options strings for fingerprinting analysis. For example, a gateway 2710 may comprise a built-in DHCP server 2712 to log DHCP requests, such as DHCP request 2705 from a device 2702 (e.g., a known device). A harvester plugin 2714 may periodically collect 2716 these logs and send 2718 them to the ODP platform 2740 for analysis. The harvester plugin 2714 may send the logs to the ODP platform 2740 via the protocol agent 2726. One advantage of this approach is that an existing DHCP server 2710 on the gateway 2710 may be leveraged. The gateway 2710 may use IPTables 2720 to mirror DHCP user datagram protocol (UDP) traffic to a dedicated harvester application, which may forward the requests to the ODP platform 2740. Several advantages of this system exist. This system may work if another DHCP service is in use. Event driven notifications to the protocol agent 2726 may be possible because the listener service 2722 may publish messages to the protocol agent 2726 as soon as they are seen on the network. This functionality may be turned on and off at a per-device level (e.g., using MAC address-based rules in iptables).

Figure 28:
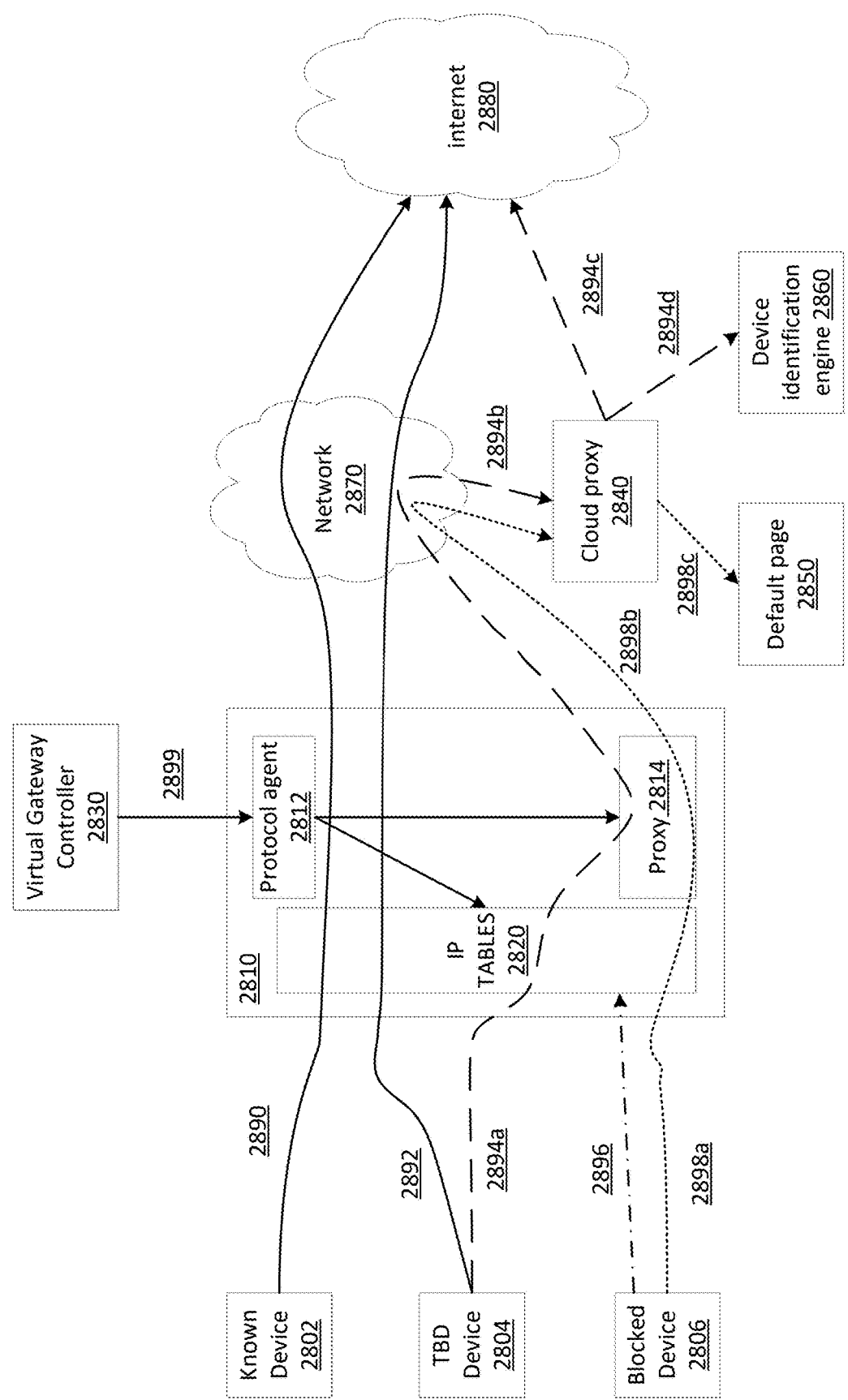
FIG. 28 shows an example system for device fingerprinting.

FIG. 28 shows an example system for device fingerprinting. The system may comprise one or more devices, such as a known device 2802, a device 2804 that has yet to be identified, a blocked device 2806, and/or other devices. The system may comprise a gateway device 2810. HTTP user agent string(s) may be used for device fingerprinting. Some HTTP clients may include a user-agent header (or other header) in HTTP requests, which may contain useful information about the device (e.g., hardware, operating system, application, etc.). The system may use the header information to identify the device and perform actions based on the identity of the device.

A known device 2802 may attempt to access the internet 2880 via the gateway 2810. Traffic 2890 from the known device 2802 may be allowed, and the known device's requests may be directed to the internet 2880. The traffic may pass through a network 2870, such as a cloud radio access network (CRAN), and on to the internet 2880.

An unknown device 2804 may attempt to access the internet 2880 via the gateway 2810. Some traffic, such as non-HTTP traffic 2892, from the unknown device 2804 may be directed to the internet 2880, similar to known devices. Other traffic 2894a, such as HTTP traffic, may be redirected to a local proxy server 2814 of the gateway 2810. The gateway 2810, such as via iptables 2820, may determine the type of traffic (e.g., non-HTTP traffic versus HTTP traffic) based on the port used for the traffic. For example, if traffic does not pass through port 80, the gateway 2810 may determine that the traffic is not HTTP traffic and may direct the traffic through to the internet 2880. If traffic passes through port 80, the gateway 2810 may determine that the traffic is HTTP traffic and may redirect the traffic to the local proxy server 2814 of the gateway 2810. Other ports may be used for HTTP traffic. Iptables 2820 rules may be used to redirect outgoing HTTP traffic to the local proxy server 2814. The local proxy server 2814 on the gateway 2810 may receive the request and may add one or more identifiers for the gateway 2810 and/or the device 2804 (e.g., gateway MAC address, connected device IP address, etc.) to header information for the request. The header information may also comprise a signature indicating that the request came from the gateway 2810 (e.g., rather than some other client). The proxy server 2814 may forward 2894b, such as via the network 2870, the HTTP request to a cloud proxy 2840, which may comprise a cluster of proxy servers. A proxy service of the cloud proxy 2840 may remove (e.g., strip off) identifying details from the request (e.g., gateway MAC address and/or device internal IP address). The proxy service may send 2894d one or more of these details (e.g., gateway MAC address and/or device internal IP address), along with the user agent string, to a device identification engine 2860 for processing and/or storage. The cloud proxy 2840 may send 2894c the request to the original request destination, such as an internet host in the internet 2880. The cloud proxy 2840 may remove the header information added by the proxy 2814 of the gateway 2810 before sending 2894c the request to the original request destination.

This system may also be used to address attempted traffic for blocked or paused devices, such as blocked device 2806. Some traffic, such as non-HTTP traffic 2896, from the blocked device 2806 may be blocked at the gateway 2810. Other traffic 2898a, such as HTTP traffic, may be redirected to the local proxy server 2814 of the gateway 2810. The local proxy server 2814 on the gateway 2810 may receive the request and may add one or more identifiers for the gateway 2810 and/or the blocked device 2806 (e.g., gateway MAC address, blocked device IP address, etc.) to header information for the request. The header information may also comprise a signature indicating that the request came from the gateway 2810 (e.g., rather than some other client). The proxy server 2814 may forward 2898b, such as via the network 2870, the HTTP request to the cloud proxy 2840. Based on the request, the cloud proxy 2840 may determine that the device 2806 is a blocked device and may re-route 2898c the blocked device's request to a default page 2850, such as a captive portal.

A virtual gateway controller 2830 may add devices to and/or remove devices from different traffic categories, such as known device, unknown device, blocked device, paused device, etc. The virtual gateway controller 2830 may send 2899, to a protocol agent 2812 of the gateway 2810, information indicating device traffic categories. The protocol agent 2812 may send the information indicating device traffic categories (or updates thereto) to iptables 2820 and/or the proxy 2814. Iptables 2820 and/or the proxy 2814 may use the information to determine whether a particular device requesting access to the internet 2880 or other resource is a known device, a to-be-determined device, a blocked device, a paused device, or another category of device. As previously explained, iptables 2820 and/or the proxy 2814 may use the device category to determine, for example, whether to direct a request to the internet 2880 and/or through the cloud proxy 2840.

Databases of device fingerprints may be used to map from DHCP options/user agent strings to a device type and/or operating system. Where the existing device databases may provide good confidence, this data may be combined with additional network data (e.g., hostnames) and user-supplied data (e.g., user has indicated this is a tablet device).

The specific device a user is using may be identified while evaluating the health of a particular network (e.g., a Wi-Fi network). The data collection platform may capture Wi-Fi signal strength metrics and other metrics, which may be keyed to an identifier of the connecting device (e.g., MAC address). This may be useful in determining the overall health of a user network, or identifying a specific device that may be having issues. As additional data about user networks is collected (e.g., through network analysis and/or user-inputted information), the system described herein may determine with great accuracy, items such as a particular device in a room (e.g., the living room) having poor coverage or a connected device (e.g., a connected thermostat) being hijacked.

The system may identify the specific device that a user is currently using. For example, the MAC addresses of devices (or other device identifiers) may be identified, so that the system may determine (e.g., without user input) which data is to be used for the user's current session. A type of web beacon may be used to identify the device.

Figure 29:
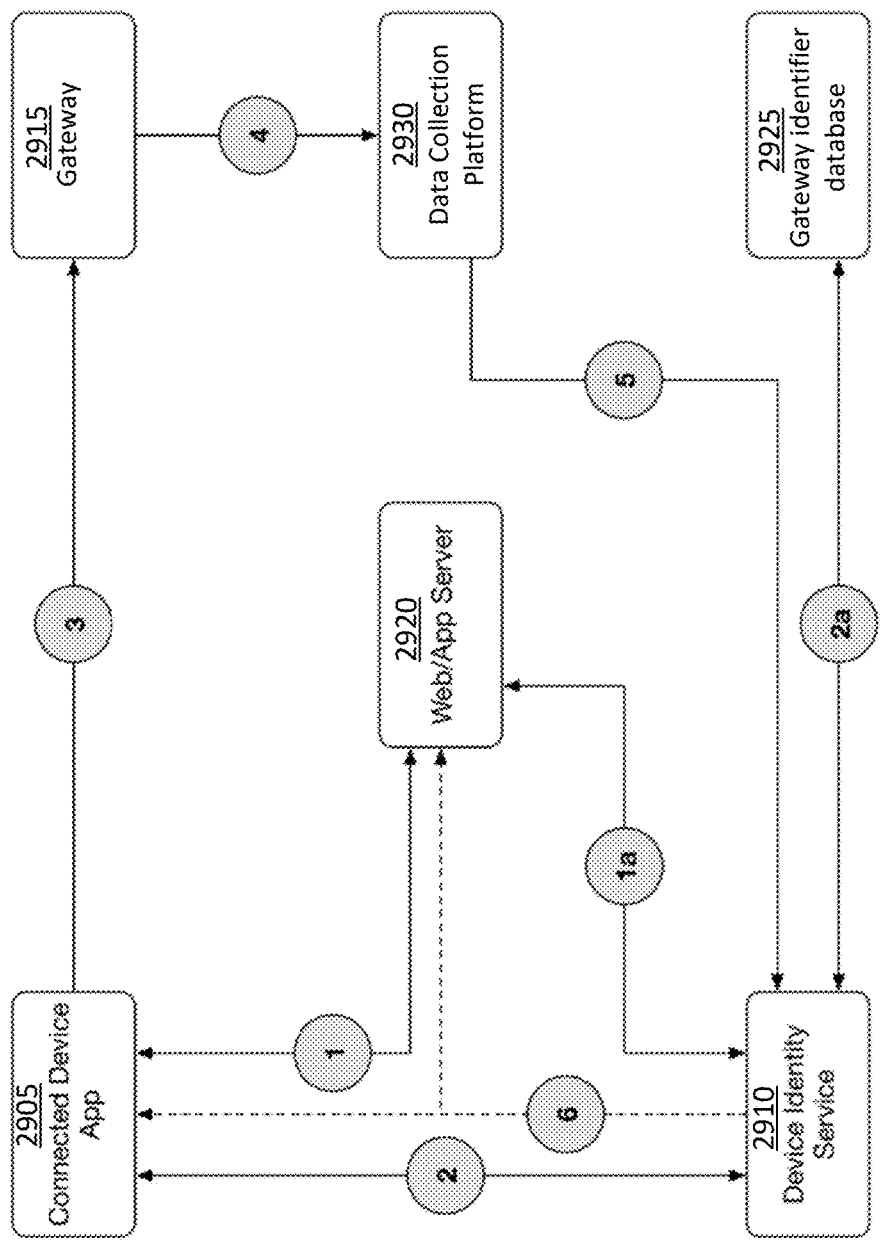
FIG. 29 shows an example system for determining a device identity.

FIG. 29 shows an example system for determining a device identity. The system may comprise a connected device with a connected device application 2905. The connected device application 2905 may comprise a web or a native application that is in use by the user. The application itself may be interested in determining the MAC address (or other identifier) of the current device, such as to automatically select the correct device if running a Wi-Fi health check. The application may make two (or more) requests in order to facilitate MAC address (or other device identifier) determination of the device. First, the connected device may send a request to a device identity service 2910 for the URL (or other identifier) of the gateway 2915. Second, the connected device application 2905 may send a request to the gateway 2915 to enable the gateway 2915 to perform an address resolution protocol (ARP) lookup between the device IP and the device MAC address. For a web page example, the web page returned by the web server may contain a script tag embedding, for example, a JavaScript snippet hosted by the device identity service. This snippet may direct the browser to download a resource from the gateway 2915. For a native application example, the request(s) may comprise, for example, GET requests for small JSON snippets.

The system may comprise a web or application server 2920. The web or application server 2920 that may be interested in determining the MAC address (or other identifier) of a specific device within a network (e.g., a home network) may initiate a MAC lookup request. There may be two or more steps in the process. If a connected device makes an initial request to the server 2920 (e.g., initial page load, application data, etc.), and the device MAC (or other identifier) is currently unknown, the web/app server 2920 may request a session identifier from the device identity service 2910 and may direct the connected device to initiate a MAC lookup flow with the device identity service 2910. The web/app server 2920 may initiate a long poll connection to the device identity service 2910, and may wait for the MAC address for the current session.

The system may comprise a device identity service 2910. The device identity service 2910 may generate a unique session ID on demand to initiate a device MAC/ID lookup. Given a request from a connected device app 2905, the device identity service 2910 may use either existing data tied to the session ID, or the connected device's external IP address to determine the current gateway 2915 the device is connected to. The device identity service 2910 may query a gateway identifier database 2925 for an internal gateway IP that the connected device is connected to. The device identity service 2910 may direct the connected device application 2905 to make a request to the gateway embedded device ID service. The device identity service 2910 may coordinate a pool of listeners to the data collection platform device ID report topic. After receiving a device ID report for a specific session, the device identity service 2910 may forward the relevant data (e.g., MAC address) to any interested listeners (e.g., long poll listeners).

Topics (e.g., KAFKA or other messaging bus topics) may be used as an interface for any user to access data extracted from the gateways. Delivery of the device reports to multiple users may be reliable, and the reports may be maintained for a period of time, so that different users may access the data at different times and/or rates. A user may subscribe to a topic and create a service user to retrieve the data. Messages may comprise the MAC of the device in question and/or the device report. A data feeder may use web hooks to extract device data into the messaging bus.

The system may comprise a gateway identifier database 2925. The internal IP address of each gateway may vary from household-to-household. The gateway identifier database 2925 may provide a fast and reliable way to determine the internal network IP address for a given gateway.

The system may comprise a gateway 2915 (and other gateways). A web server may be embedded on the gateway (e.g., with common gateway interface (CGI) capabilities), and MAC address lookups may be performed for local devices making a web request to the gateway 2915. This service may also inspect the HTTP headers sent by the device, in order to enrich the identity data about the device (E.g., determine operating system, device type, etc.). Real time MAC/ID reporting may be provided. If a device makes a request to the device ID service on a gateway, the gateway may generate a device ID report and send the device ID report to a protocol agent.

The system may comprise a data collection platform 2930. The data collection platform 2930 may manage the capture of device ID reports and make them available via a messaging bus interface.

A DNS redirect approach may be implemented to gather metadata about connected devices. For example, if certain conditions are met (e.g., a MAC address connecting to the network for the first time), the gateway may temporarily implement a captive portal style DNS redirect for some, or all requests to external services. This may allow redirected HTTP traffic to be intercepted by the identity gateway, and the HTTP headers analyzed to build up a device profile.

One or more of the following may occur in any order. With reference to FIG. 29:

1: connected device app 2905 may make a request to the web/application server 2920 to retrieve device identity URI.

1a: web/application server 2920 may get a unique session ID from the device identity service 2910 to be returned to the connected device.

2: the connected device app 2905 may use a session ID to request a beacon URI from the device identity service 2910.

2a: the device identity service 2910 may use metadata from the request in 2 (e.g., source IP address), to query the gateway identifier database 2925 for the internal gateway IP address of the current network, and may return a URI to a gateway ID service, which may be on the gateway 2915.

3: the connected device app 2905 may request a resource from gateway ID service on a network (e.g., a local network).

4: the gateway ID service may capture HTTP headers, and may determine device MAC from a local ART table. This data may be packaged into a device ID report and sent to the data collection platform 2930.

5: the device identity service 2910 may consume the device ID report from the data collection platform 2930 and may determine a session ID to MAC address mapping.

6: the device identity service 2910 may send the device MAC to the connected device app 2905 or the web/app service 2920 for further usage.

An algorithm for grouping devices (e.g., MAC address grouping) may be used. A device may be grouped if the device is a new device that connects to a network. A device MAC group table may have one or more fields, such as gateway MAC, host name, device MAC, interface type (e.g., wifi-2.4, wifi-5, Ethernet), organizational unique identifier (OUI), device unique ID (e.g., a universally unique identifier UUID, which may uniquely identify the device connected to a particular gateway; if the same device connects to a different gateway, the device may have a different UUID), whether the device needs a grouping (e.g., a boolean value), and/or a list of potential groups for the device. If an entry is created in the table, the device unique ID may be a unique value, whether the device needs grouping may be false, and/or the list of potential groups for the device may be empty. These may be the default values. The host name may comprise a device MAC.

If a device host is queried from the gateway and a device host table list is available, for each entry 'e' in the device host list, one or more of the following may be performed. One or more of the following may occur in any order.

1: lookup device MAC group table with device mac value of entry 'e'. If (an entry exists for gateway and device-mac), then create a new entry to device MAC group table with its respective values. Use the same UUID as the one already available for the existing entry, needs grouping=false, potential group with list=[ ]. The existing entry may be overwritten if interface type is also the same as the existing entry. Otherwise, go to 2.

2: lookup device MAC group table with a hostname value of entry 'e'. If (no row(s) already exists), then create a new entry to the device MAC group table with its respective values, a new UUID, needs grouping=false, potential group with list=[ ]. Otherwise, go to 3.

3: If there are one or more rows of the device MAC group table with the same hostname as of entry 'e', but the device MAC for entry 'e' is unique, call these rows as 'r'. If (interface type value for entry 'e' matches any value of rows 'r'), then create a new entry to device MAC group table with its respective values, new UUID, needs grouping=false, potential group with list=[ ]. Otherwise, go to 4.

4: compare OUI of entry 'e' with each of row 'r' OUI value. If (OUI matches against any of r), create a new entry to the device MAC group table with its respective values. use the same UUID as the one already available for r with matching OUI, needs grouping=false, potential group with list=[ ]. Otherwise, go to 5.

5: If there are one or more rows (r) of the device MAC group table with the same hostname as entry 'e', but the device MAC, interface type, OUI for entry 'e' is unique, create a new entry to the device mac group table with its respective values, UUID=" ", needs grouping=true, potential group with list=[distinct UUIDs of r].

The above algorithm may be used to create entries in a device MAC group table. Each entry may have a UUID value if the entry has needs grouping=false. Otherwise, the UUID may be empty (" "), whether the device needs grouping=true, and has a potential group with list=list of UUIDs against which the entry can be grouped. These may be verified by the user.

A Wi-Fi meter tool may be used to help users improve their Wi-Fi Performance by exploring coverage per room, diagnosing issues, and offering suggestions and/or instructions. Various use cases exist.

Figure 31A:
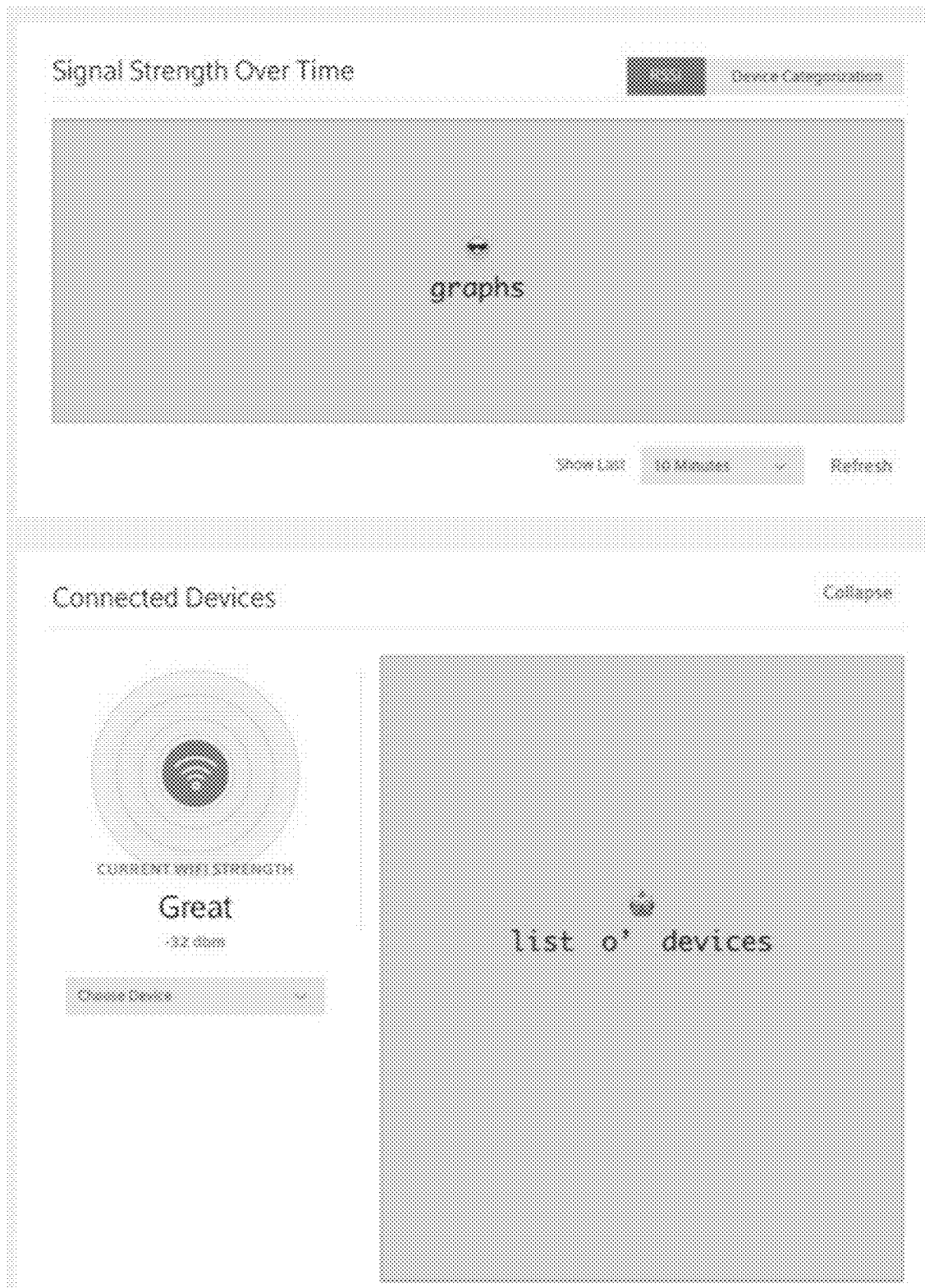
Figure 31B:
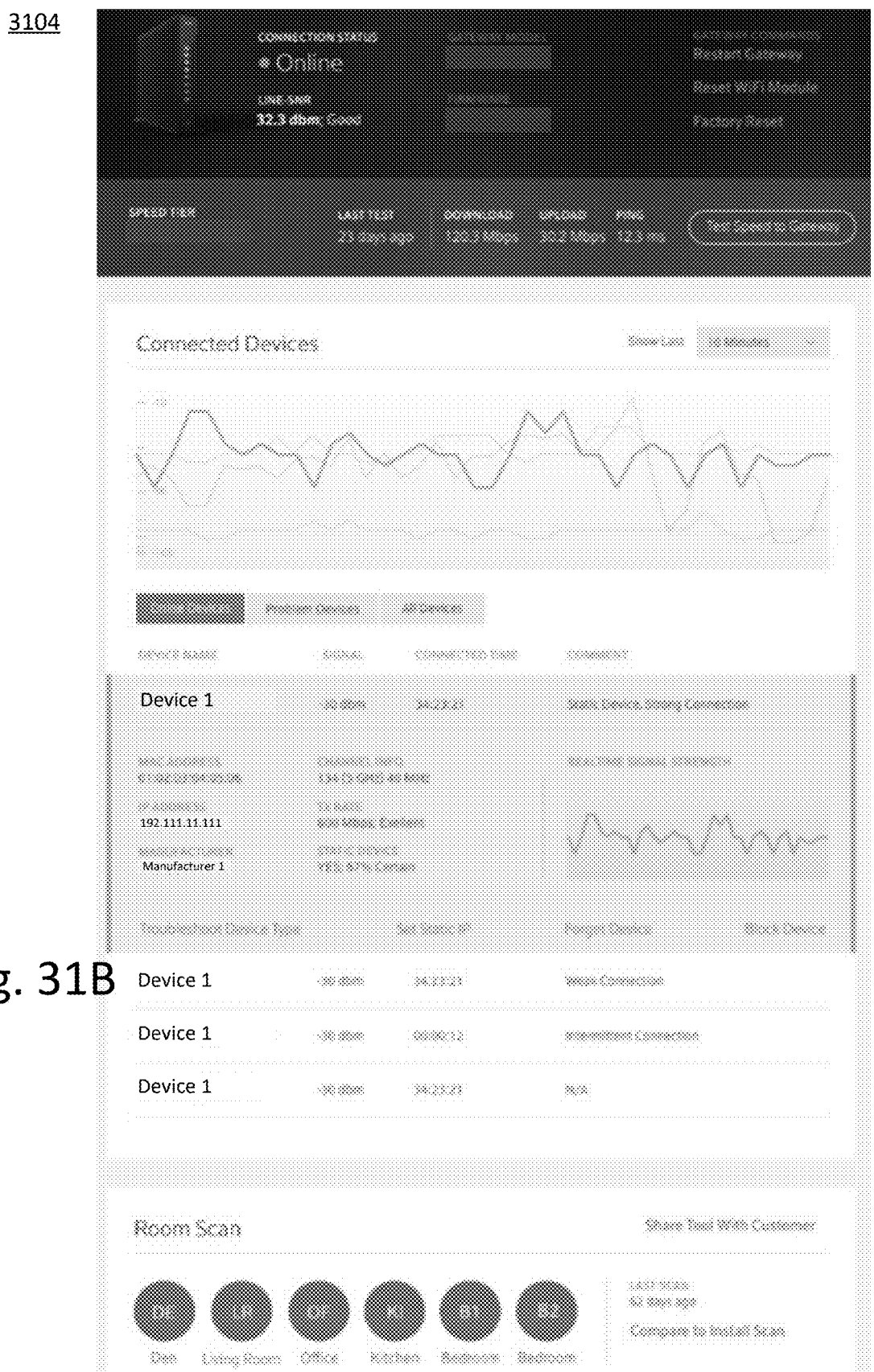
Figure 31C:
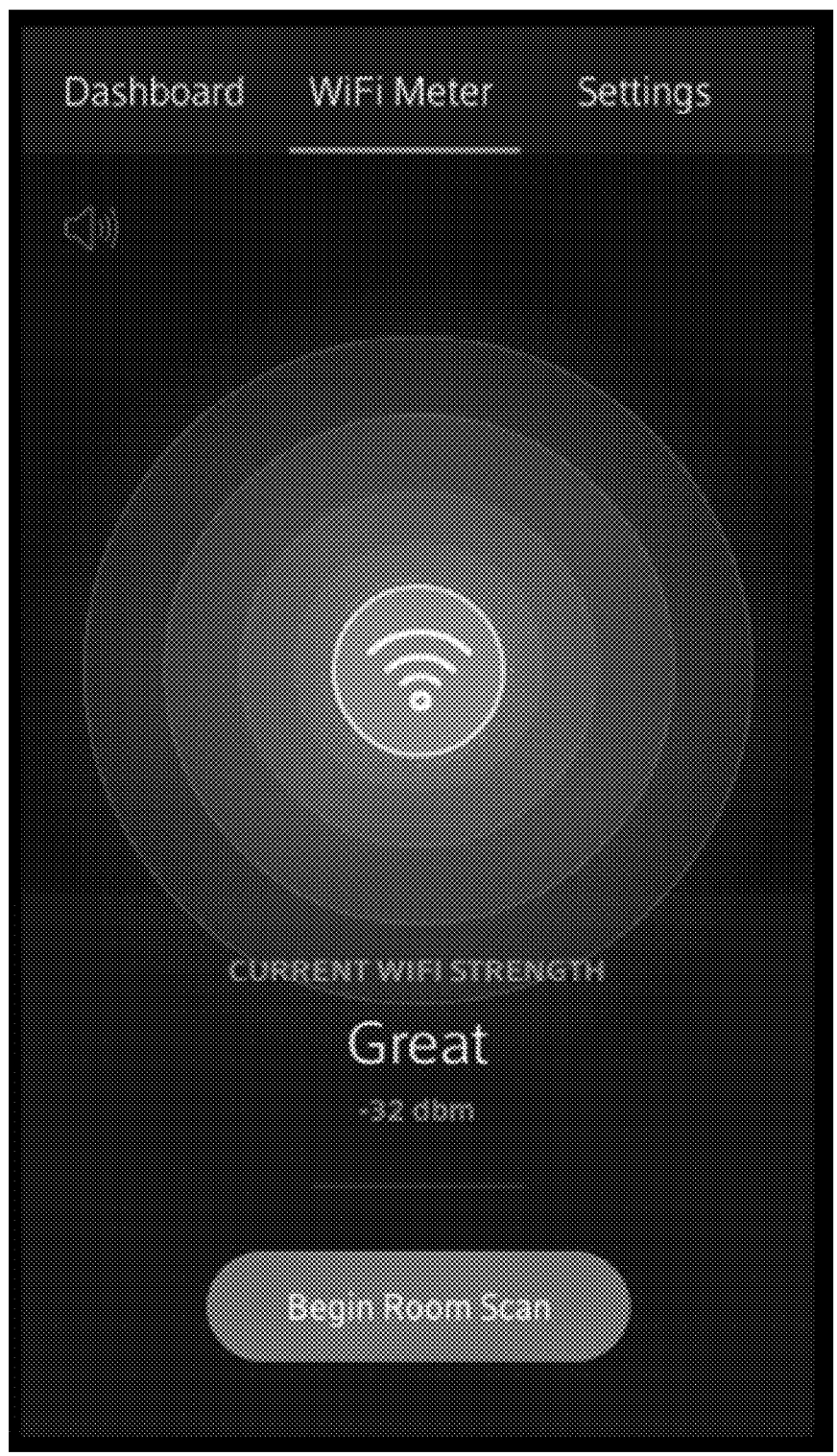

A Wi-Fi meter, which may be user facing, may indicate a current signal strength (e.g., based on gateway RSSI from device). The signal strength measurement may be updated in near real time. A user may open the Wi-Fi meter tool on the user's device, such as a mobile phone. FIG. 31C shows a user interface 3106 of the Wi-Fi meter tool, which may indicate the current signal strength between the user device and a gateway (e.g., a Wi-Fi hotspot). For example, the user interface may indicate that the current signal strength is "Great" and/or may indicate the current signal strength, such as in decibel-milliwatts (dbms) or another unit for measuring signal strength. The user interface may display a selectable option (e.g., "Begin Room Scan") for the user to begin a room scan to measure signal strengths around the room. Selection of the option to scan a room may initiate the Wi-Fi meter and may cause the user device to display the user interface shown in FIG. 31D.

The room scan, which may be user facing, may be used to optimize network (e.g., Wi-Fi network) connections. A user holding the device while it is connected to the wireless network (e.g., via a gateway device) may walk around the room to scan the room to determine signal quality around the room, such as average signal quality. The system may provide suggestions for signal improvement based on the scan. For example, the system may suggest gateway location and placement. The system may also suggest utilization of one or more network extenders. The room scan may include a tag room type/location, may capture history of scans for baseline and comparison, may generate whole home view of signal quality with specific recommendations, may provide suggested extender placement (e.g. "Place Extender near Bedroom #2"), and/or may suggest moving the gateway (e.g., "Move Gateway closer to Living Room").

Figure 31D:
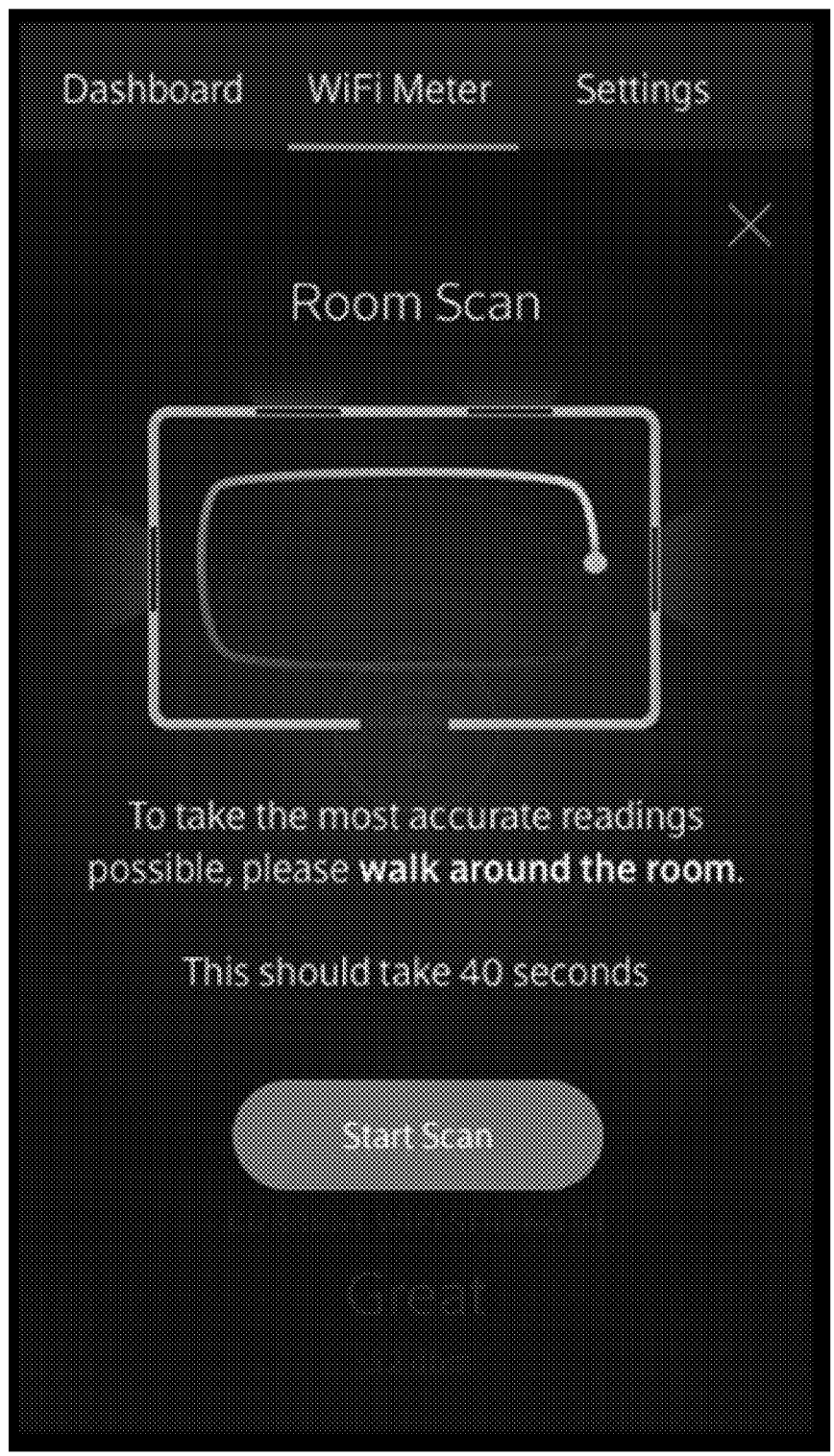

FIGS. 31D-31I show user interfaces for the room scan. FIG. 31D shows a user interface 3108 displaying instructions for the room scan. The user interface 3108 may display an estimate for how long the room scan is expected to take. The user interface 3108 may display a selectable option (e.g., "Start Scan") for the user to start a scan. Selection of the option to start a scan may cause the user device to display the user interface shown in FIG. 31E.

Figure 31E:
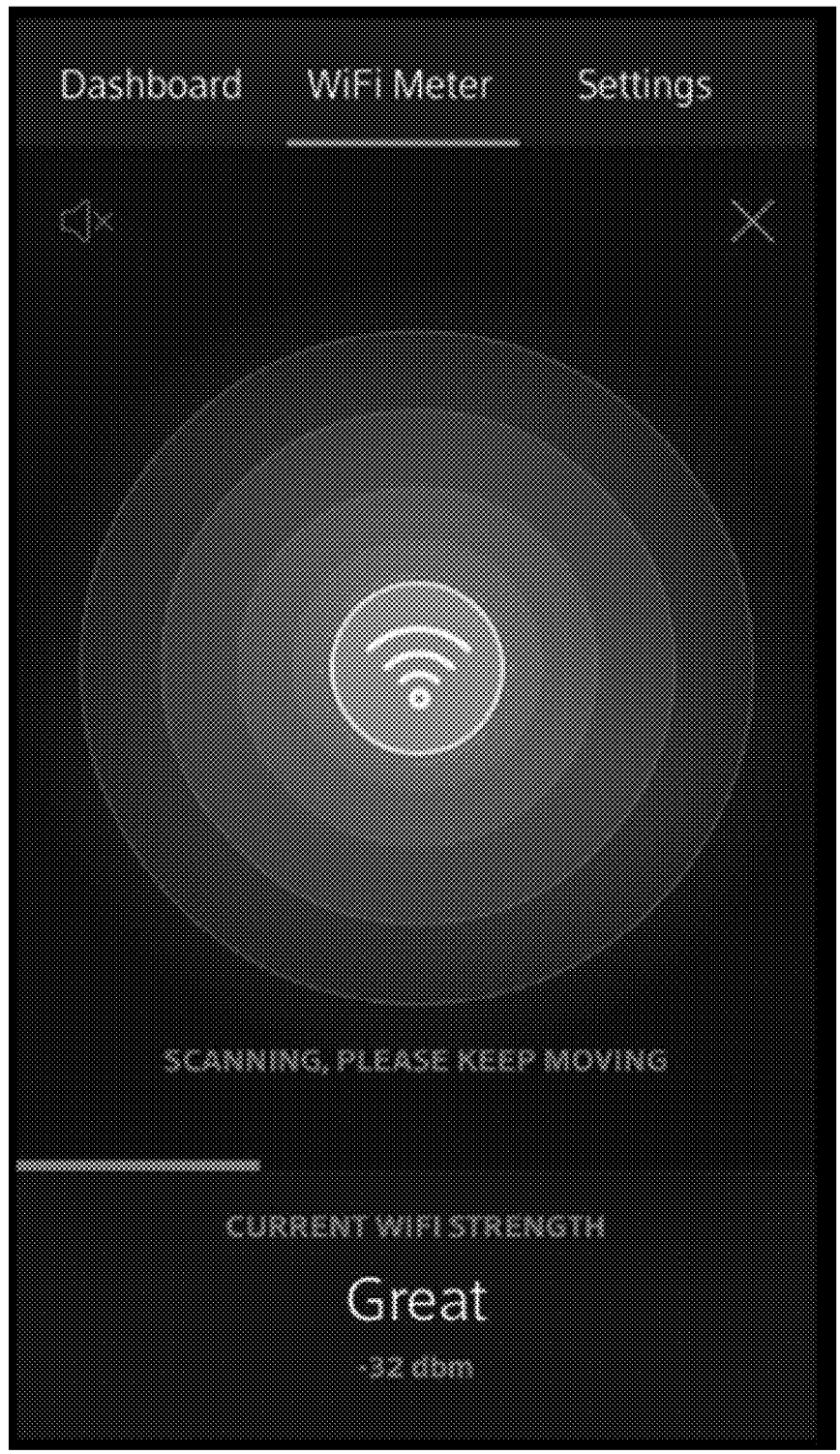

FIG. 31E shows a user interface 3110 that may be displayed during the room scan if the signal strength at a particular time during the scan is great. For example, the user interface 3110 may be displayed if the signal strength is above a first threshold signal strength. The user interface 3110 may also indicate the current signal strength. The user interface 3110 may instruct the user to move to another location in the room to continue the scan.

Figure 31F:
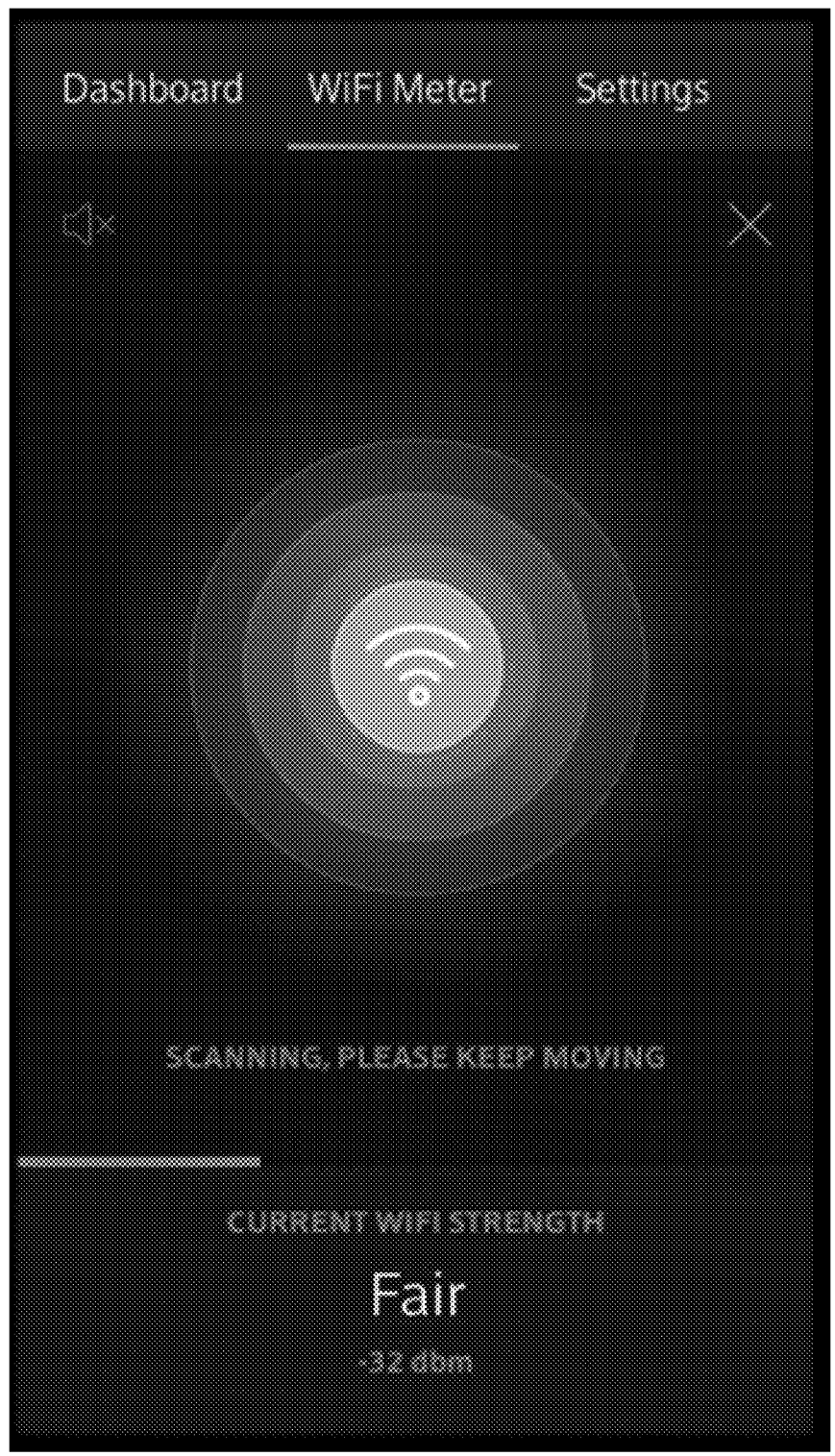

FIG. 31F shows a user interface 3112 that may be displayed during the room scan if the signal strength at a particular time during the scan is fair. For example, the user interface 3112 may be displayed if the signal strength is between a second threshold signal strength, which may be lower than the first threshold signal strength, and the first threshold signal strength. The user interface 3112 may also indicate the current signal strength. The user interface 3112 may instruct the user to move to another location in the room to continue the scan.

Figure 31G:
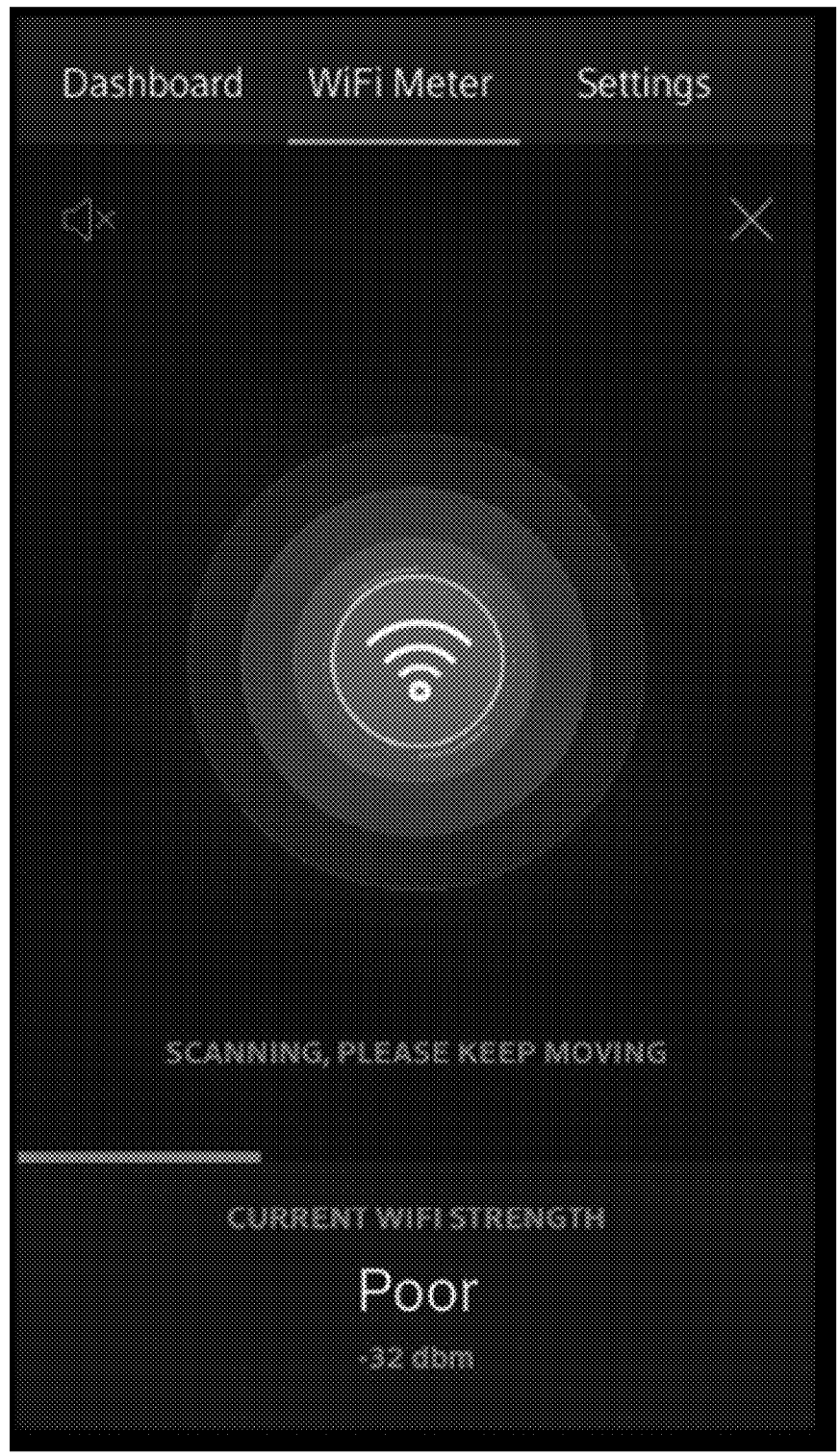

FIG. 31G shows a user interface 3114 that may be displayed during the room scan if the signal strength at a particular time during the scan is poor. For example, the user interface 3114 may be displayed if the signal strength is below the second threshold signal strength. The user interface 3114 may also indicate the current signal strength. The user interface 3114 may instruct the user to move to another location in the room to continue the scan.

During the room scan, the user may move the user device around the room, and the signal strength between the user device and the gateway may be measured. Indications of a plurality of those measurements may be displayed on the user device, and the type of user interface displayed may depend on the categorization of the signal strength (e.g., poor, fair, great, etc.). A plurality of different user interfaces may be sequentially displayed on the user device during the room scan. The room scan may end after a threshold amount of time (e.g., 40 seconds) or after a certain number of signal strength measurements have been collected.

Figure 31H:
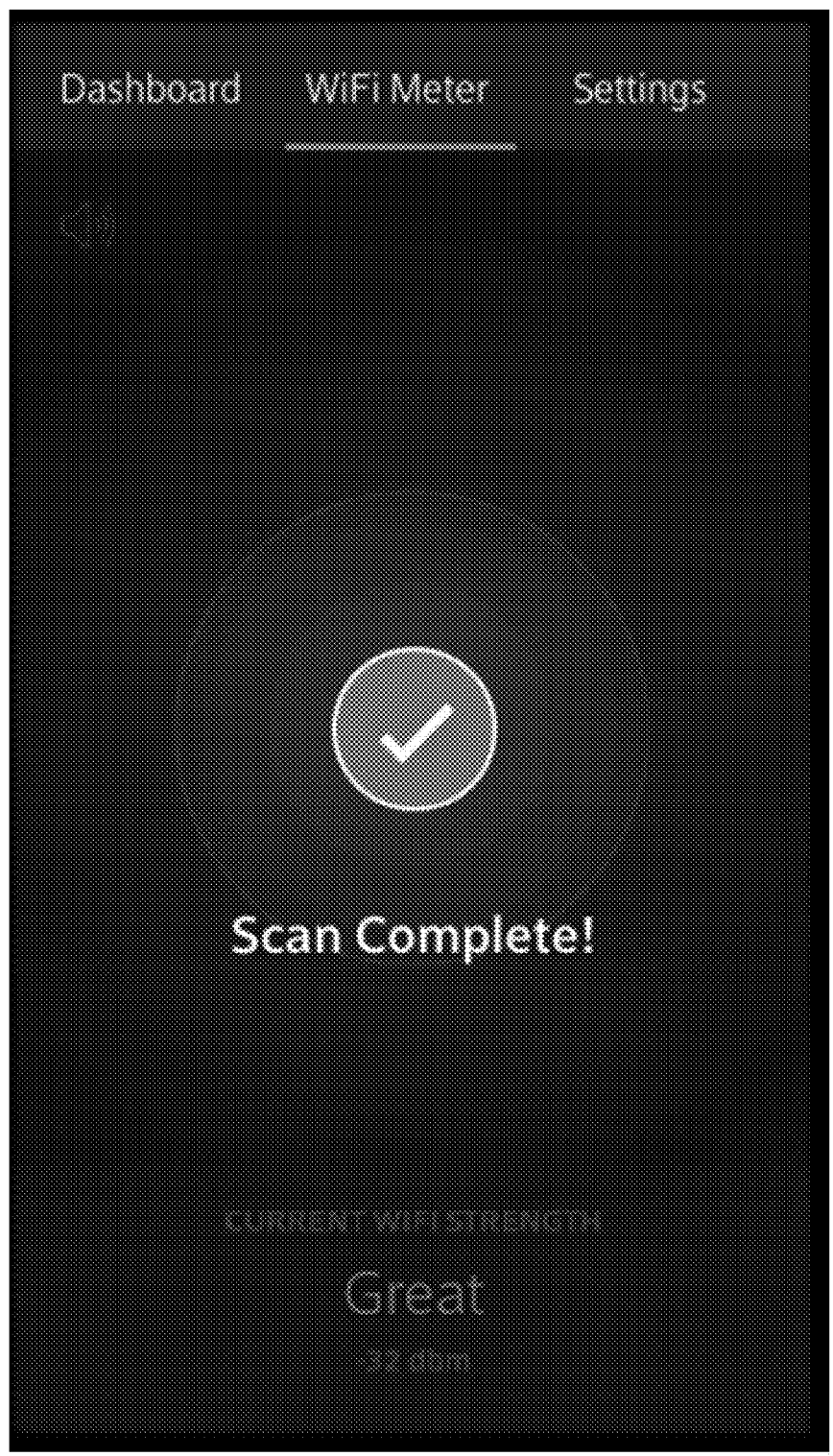

FIG. 31H shows a user interface 3116 displaying an indication that a scan is complete. The user interface 3116 may be displayed after the room scan is completed, such as after a threshold amount of time since the beginning of the room scan or after a certain number of samples have been collected during the room scan (e.g., from different locations in the room). An average signal strength for the room may be calculated.

Figure 31I:
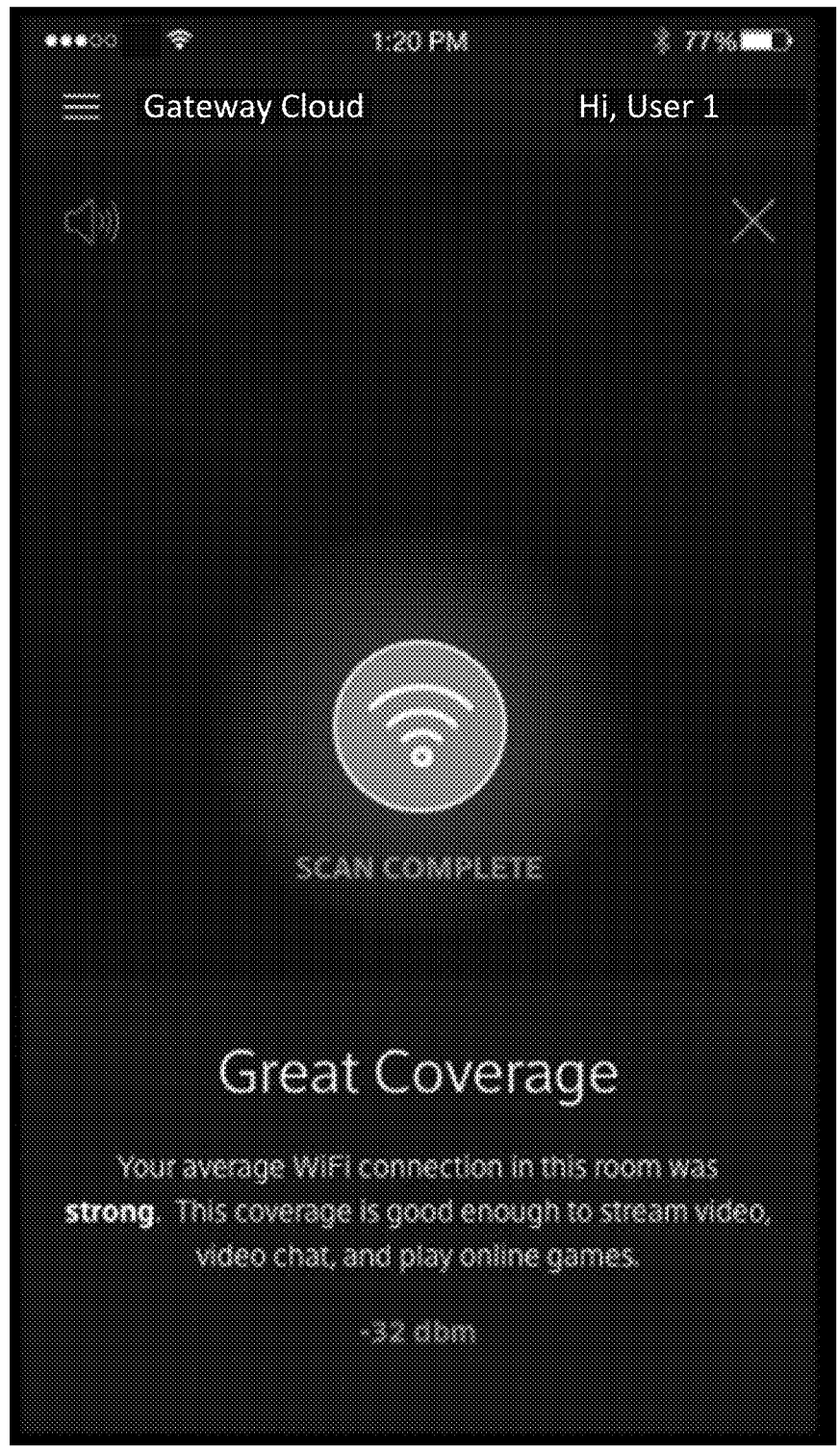

FIG. 31I shows a user interface 3118 displaying an indication that a scan is complete. The user interface 3118 may be displayed if the average signal strength measured during the scan is above a first threshold signal strength, which may be categorized as great coverage. The user interface 3118 may indicate the average signal strength measured during the scan.

FIGS. 31J and 31K show user interfaces for suggestions for improving signal strength. FIG. 31J shows a user interface 3120a displaying an indication that a scan is complete. The user interface 3120a may be displayed if the average signal strength measured during the scan is between a second threshold signal strength and the first threshold signal strength, which may be categorized as fair coverage. The user interface 3120a may indicate the average signal strength measured during the scan. FIG. 31J shows a user interface 3120b displaying one or more recommendations for improving signal strength, which may be displayed if the wireless coverage is fair. For example, the user interface 3120b may recommend that the user remove Wi-Fi obstacles, make sure that the gateway is centrally located, and/or to add an extender to expand coverage.

FIG. 31K shows a user interface 3122a displaying an indication that a scan is complete. The user interface 3122a may be displayed if the average signal strength measured during the scan is less than the second threshold signal strength, which may be categorized as poor coverage. The user interface 3122a may indicate the average signal strength measured during the scan. FIG. 31K shows a user interface 3122b displaying one or more recommendations for improving signal strength, which may be displayed if the wireless coverage is poor. For example, the user interface 3122b may recommend that the user remove Wi-Fi obstacles, make sure that the gateway is centrally located, and/or to add an extender to expand coverage.

A technician Wi-Fi portal may provide a technical view of connected devices. For example, the user interface may display a list of connected devices, alert status, static devices, current signal strength, a real time signal of a device, a time series chart of connected device signals, a plot of static devices with number of records, and average RSSI over 24 hrs. FIGS. 31a and 32b show examples of user interfaces 3102 and 3104 for the technician Wi-Fi portal.

The technician portal may include additional services and/or account information, such as information from a room scan and/or device intelligence information. The portal may provide interactive suggestions and/or troubleshooting tools. For example, the portal may suggest a gateway restart or factory reset, may perform a speed test, and/or may generate room scan information.

A technician installation application may be used to verify Wi-Fi signal in one or more rooms (e.g., all rooms). The installation application may also utilize the room scan data to set a baseline score for the user's home.

Device alerts and/or analytics may be provided. The system may generate notifications of potential issues with connected devices while streaming. The notifications may indicate chronic poor signals, such as for static devices. The system may identify older devices (e.g., 802.11 a/b/g devices) which may have slower Wi-Fi connections. Moreover, the system may suggest utilizing external adapters and/or upgrading devices. If the system does not identify older devices, the system may disable unused (or generate notifications for the user to disable) Wi-Fi bands. Various other suggestions may be provided. For example, an indicator of the current Wi-Fi signal while connected to home network may be shown in an application, such as a television streaming application. The application may indicate a current Wi-Fi Signal in the event of stream buffering or loading. The application may link to the Wi-Fi scan. The system may utilize Wi-Fi information to activate or initiate home actions, such as activating lights, door locks, etc. if devices enter or leave, such as if devices connect or disconnect from home networks.

Figure 32A:
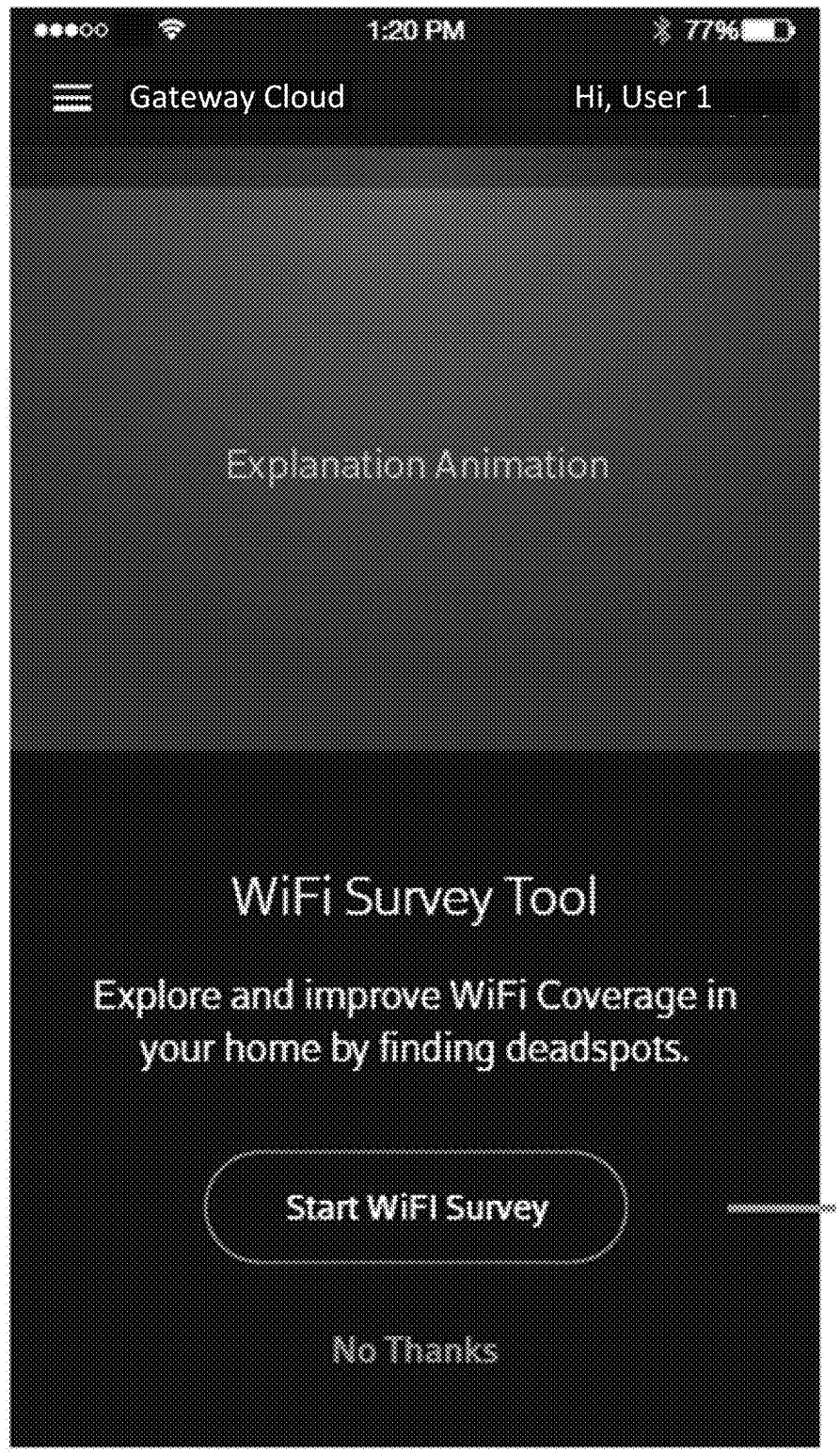
FIGS. 32A-H show user interfaces indicating measurements and analysis for network signal strength.
Figure 32B:
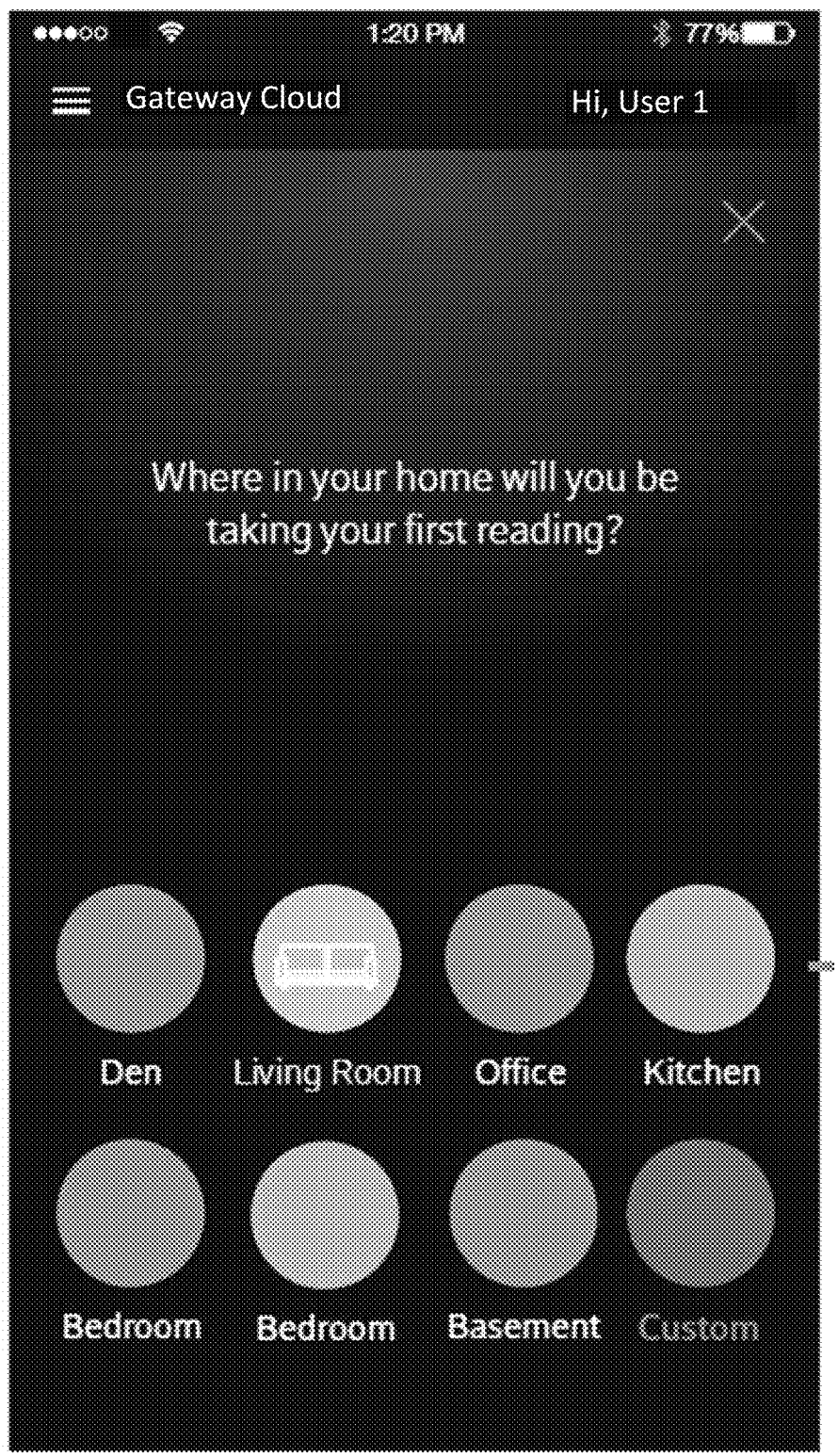

FIGS. 32A-H show user interfaces indicating measurements and analyses for network signal strength. A Wi-Fi survey tool may be used by the user to explore and/or improve Wi-Fi coverage in the user's home, such as by finding dead spots. FIG. 32A shows a user interface 3202 displaying an option to start the survey tool (e.g., the "Start WiFi Survey" option). The user interface 3202 may also display an option to exit the survey tool (e.g., the "No Thanks" option). Selecting the option to start the survey tool may cause the user device to display the user interface shown in FIG. 32B.

FIG. 32B shows a user interface 3204 displaying selectable options of different types of rooms to scan, such as a den, a living room, an office, a kitchen, a bedroom, a different bedroom, a basement, or a custom location. The user device may receive a room selection from the user. If the user selects the living room option, the user interface shown in FIG. 32C may be displayed on the user device.

Figure 32C:
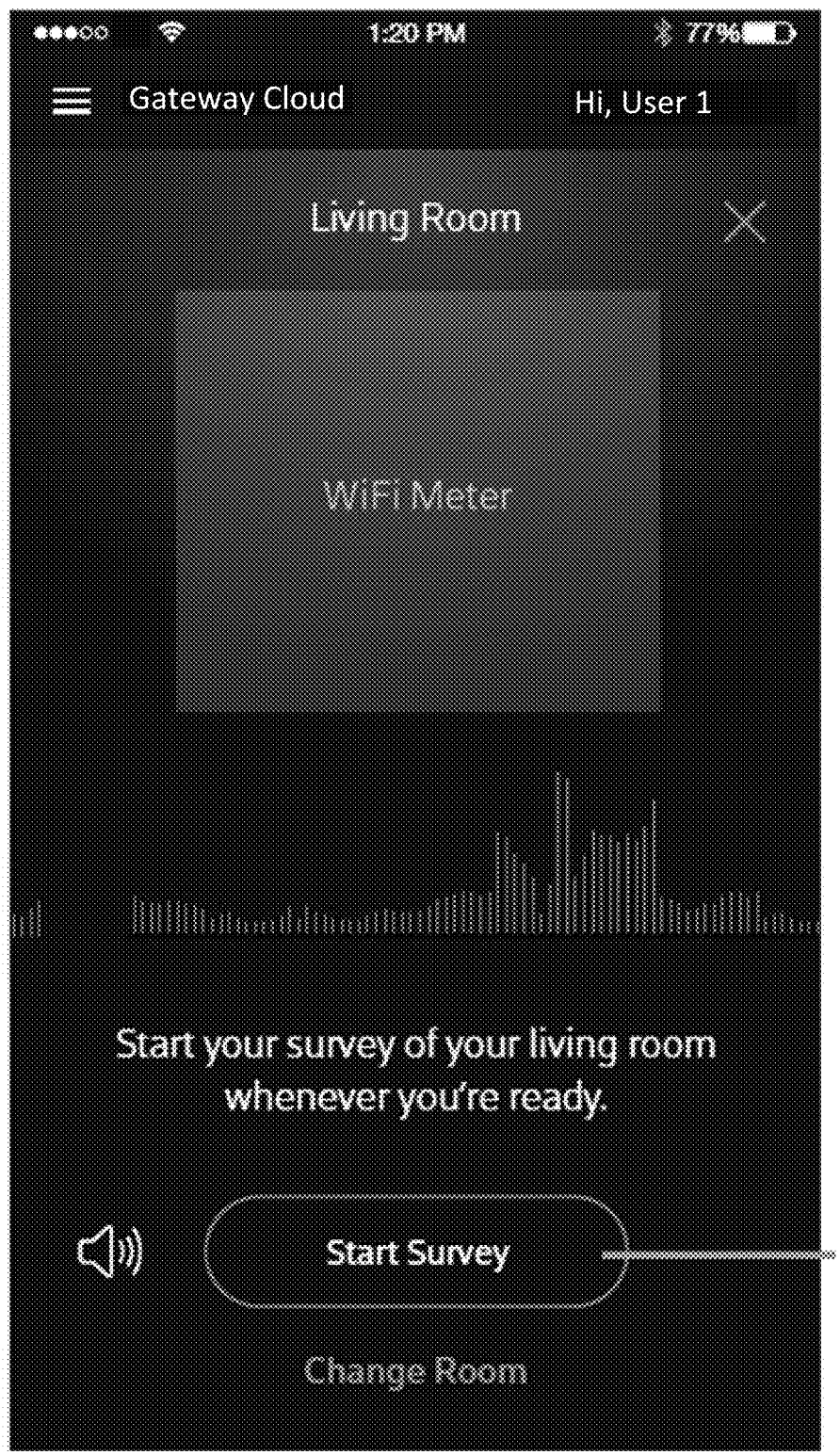

FIG. 32C shows a user interface 3206 displaying signal test options for a room, such as the living room. The user interface 3206 may display a selectable option to start the test (e.g., the "Start Survey" option). The user interface 3206 may instruct the user to select the option to start the test. If the user selects the option to start the test, the user interface shown in FIG. 32D may be displayed on the user device. The user interface 3206 may also display a selectable option to change rooms. If the user selects the option to change rooms, the user interface shown in FIG. 32B may be displayed on the user device, and the user may be able to select a different room.

Figure 32D:
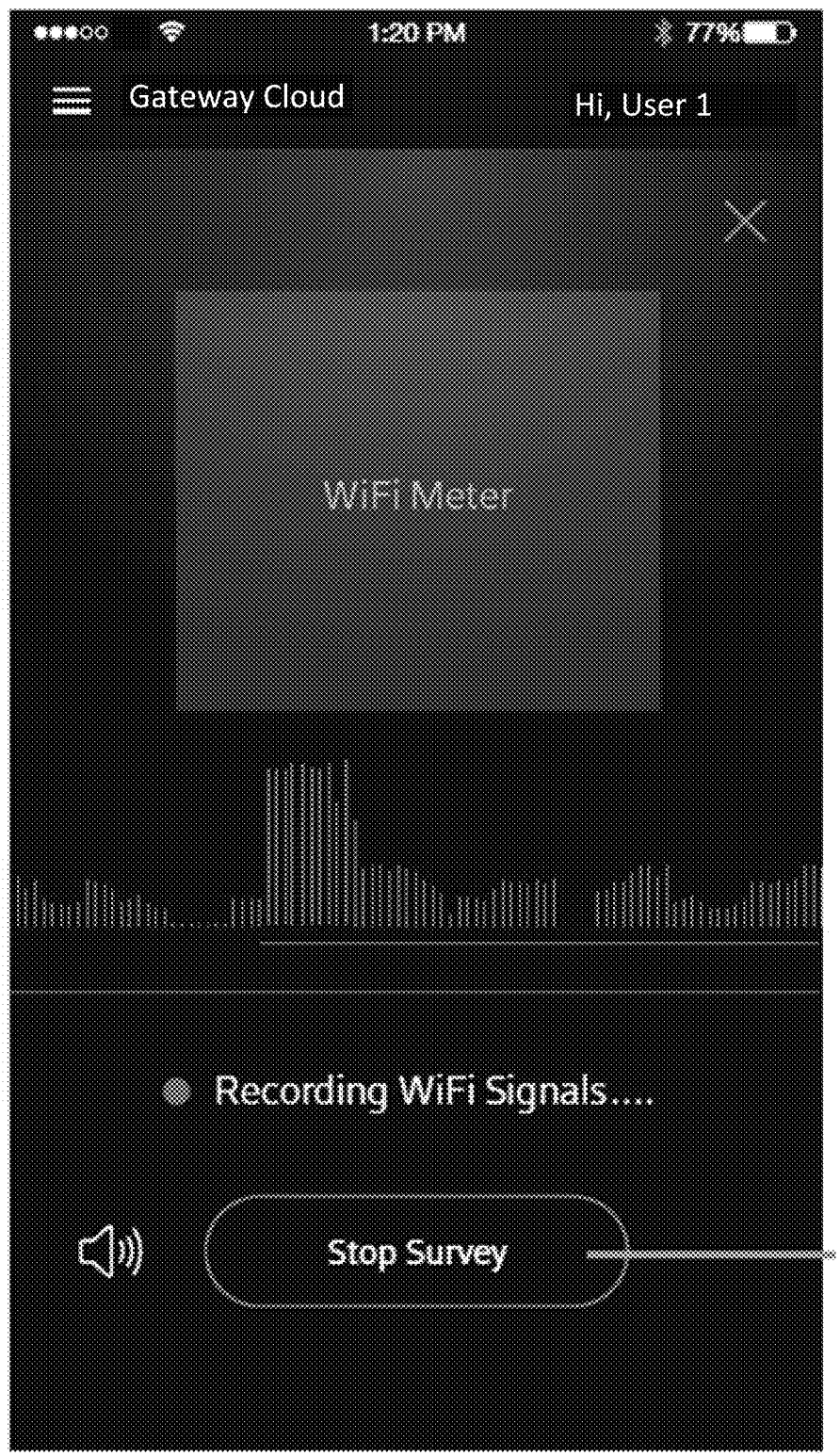

FIG. 32D shows a user interface 3208 displaying a signal test in progress. Signal strengths between the user device and the gateway may be measured during the test. The user interface 3208 may display signal strengths measured during the test, such as over a period of time. The signal strengths may be displayed as actual numbers (e.g., in dbms) or as bars having lengths that indicate the signal strength. The user interface 3208 may display a selectable option to stop the test (e.g., a "Stop Survey" option). The signal test may stop after a predetermined amount of time and/or after a certain number of samples have been taken.

Figure 32E:
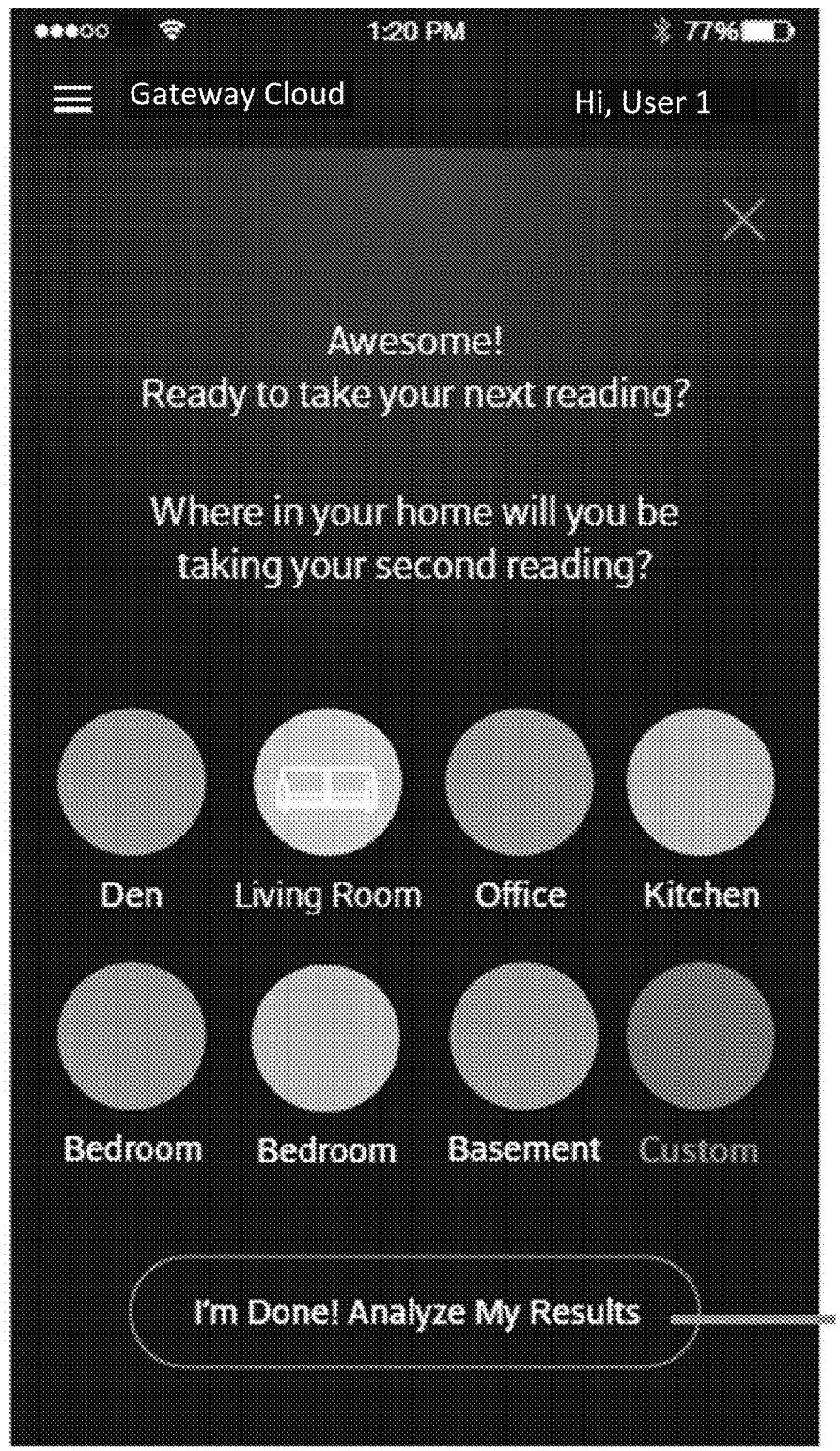

FIG. 32E shows a user interface 3210 displaying information that indicates that the signal test was completed for a particular room (e.g., the living room). The user interface 3210 may display selectable options of other types of rooms to scan, such as the den, office, kitchen, etc. The user interface 3210 may also display a selectable option for the user to scan the same room again. The user interface 3210 may display a selectable option to analyze collected results. If the user selects the option to analyze results, the user interface shown in FIG. 32F may be displayed.

Figure 32F:
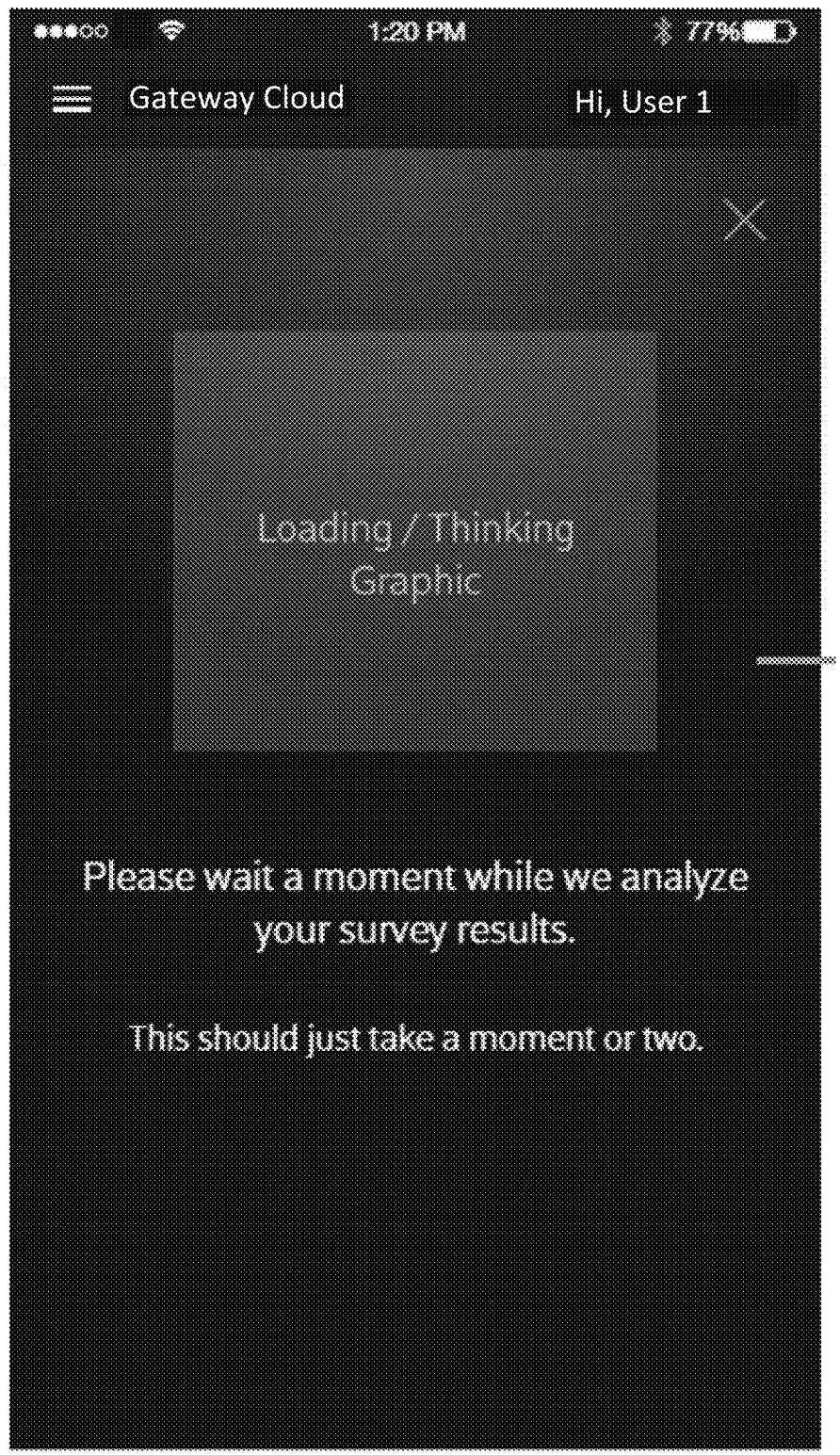

FIG. 32F shows a user interface 3212 displaying an indication that the signal test results are being analyzed. The user interface 3212 may be displayed while the signal measurements are being analyzed.

Figure 32G:
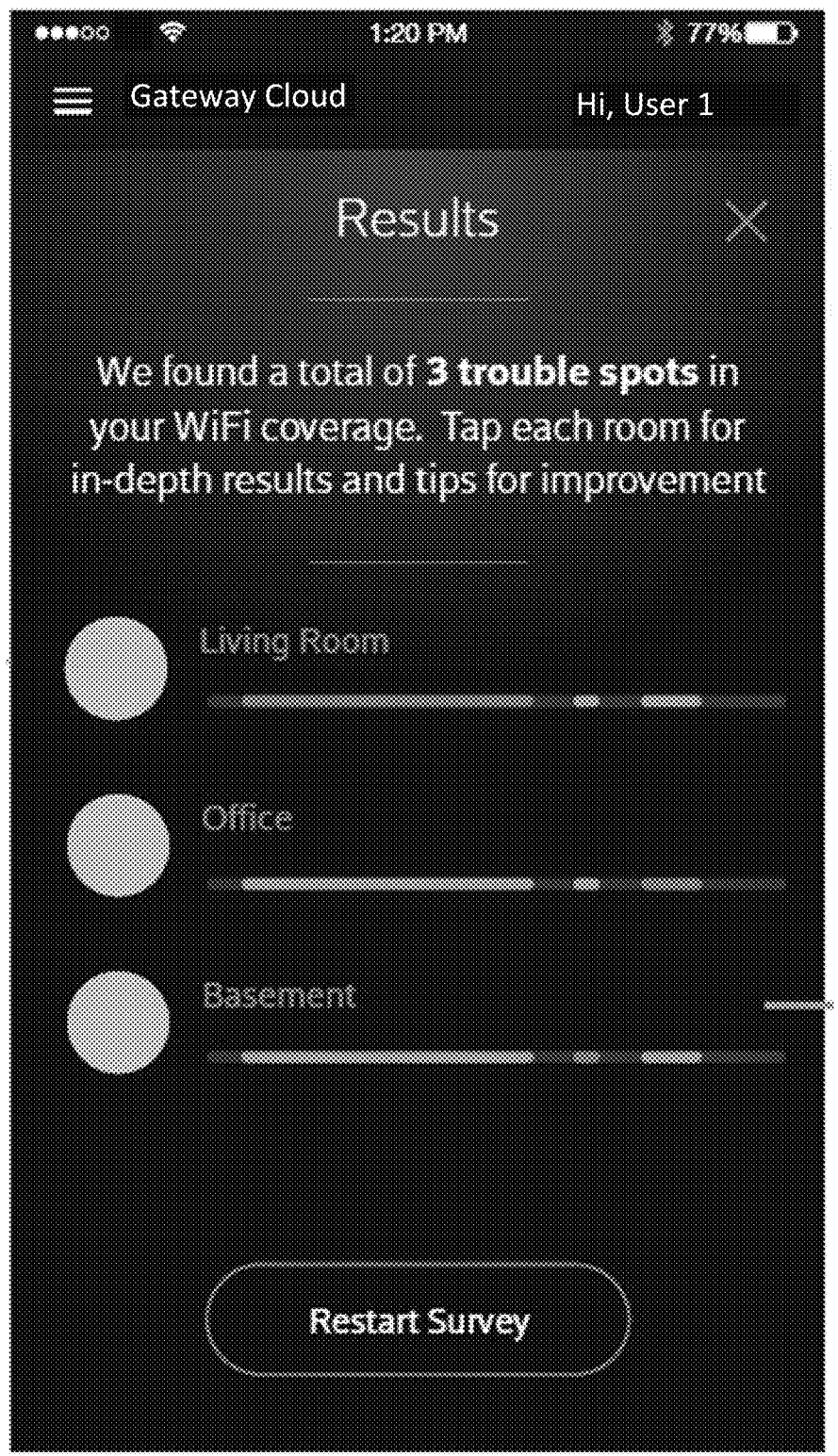

FIG. 32G shows a user interface 3214 displaying results of the signal test. The user interface 3214 may display one or more rooms that were analyzed, such as one or more rooms with wireless coverage issues. For example, the user interface 3214 may indicate that the living room, the office, and the basement may have coverage issues. The user interface 3214 may display signal strength information for each room, such as over a time period of analysis. Different colors (or other indicators) may indicate whether the signal strength at a particular time was strong (e.g., above a threshold signal strength) or poor (e.g., below a threshold signal strength). For example, red may indicate that the signal strength was poor, and green may indicate that the signal strength was strong. The user may select one of the rooms, which may cause the user device to display more information for that room. For example, if the user selects the basement option, the user interface shown in FIG. 32H may be displayed on the user device. The user interface 3214 may also display an option to restart the survey.

Figure 32H:

FIG. 32H shows a user interface 3216 displaying results of a signal test for a particular room, such as the basement. The user interface 3216 may display signal strengths measured in the room over a period of time. The user interface 3216 may also display one or more observations based on the measured signal strengths. For example, the user interface 3216 may indicate that the signal strength in the basement was fluctuating over time. The user interface 3216 may display recommendations for removing fluctuating signals, such as removing particular devices that may interfere with wireless performance (e.g., microwaves, baby monitors, older types of cordless phones, etc.). The user interface 3216 may indicate that the signal strength was low (e.g., below average). The user interface 3216 may display recommendations for improving the signal strength, such as by installing another access point closer to the room and/or moving the current access point closer to the room. The user interface 3216 may display options for the user to scroll between rooms on the list of rooms displayed on, for example, the user interface 3214 shown in FIG. 32G (e.g., living room, office, and basement). The user interface 3216 may also display an option for the user to return to the list of rooms (e.g., the user interface 3214 shown in FIG. 32G).

Figure 33A:
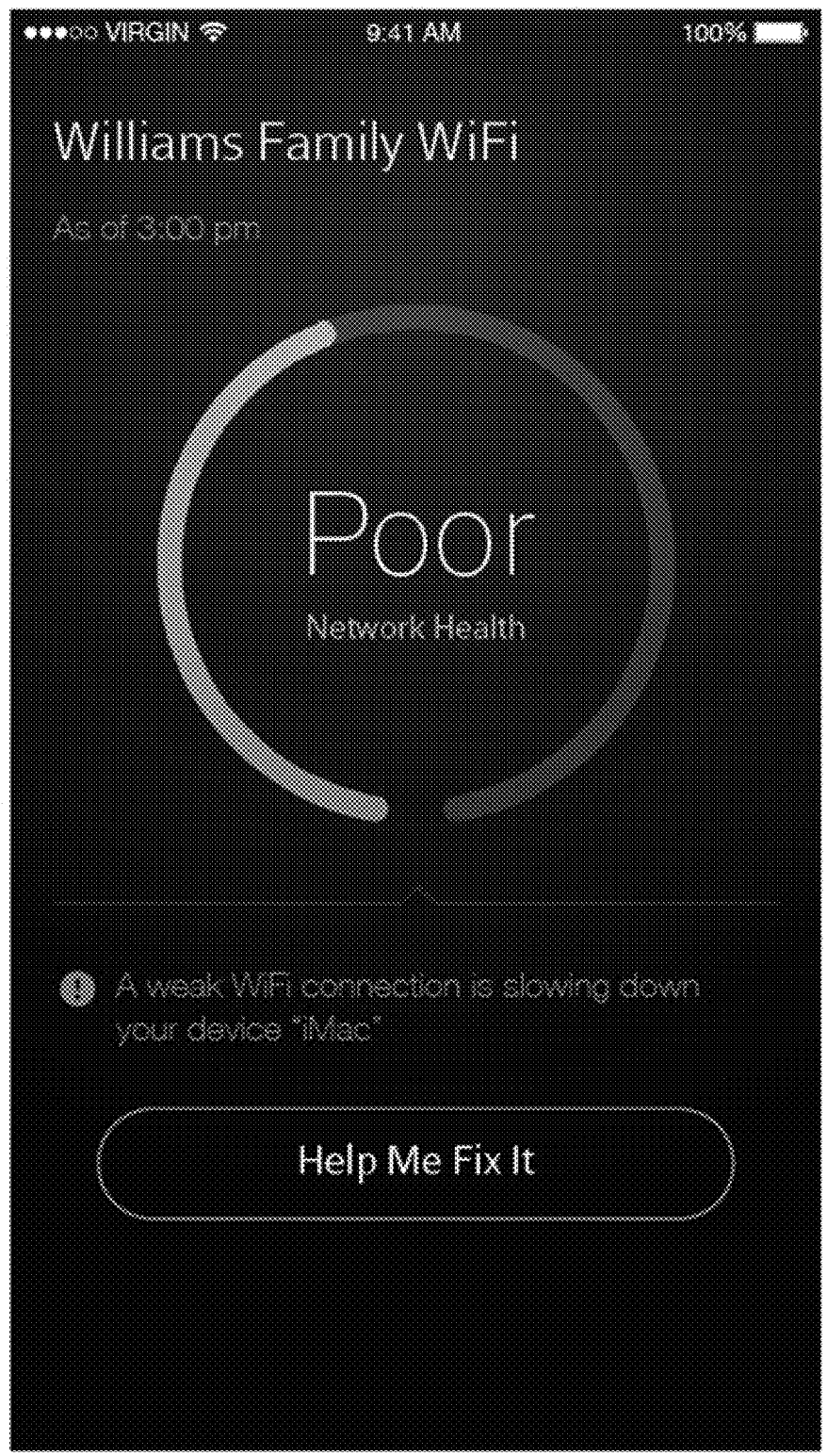
FIGS. 33A-K show additional user interfaces indicating measurements and analysis for network signal strength.

FIGS. 33A-K show additional user interfaces indicating measurements and analysis for network signal strength. FIG. 33A shows a user interface 3302 displaying an indication of network health (e.g., poor network health) and which device(s) the network health may be affecting (e.g., "iMac"). The user interface 3302 may be displayed on the device being affected by the network health (e.g., a desktop computer) or a different device, such as the user's mobile phone. If network health is poor, the user interface 3302 may display a selectable option to assist the user in fixing the poor network health (e.g., the "Help Me Fix It" option). If the user selects the option to fix the poor network health, the user interface shown in FIG. 33B may be displayed.

Figure 33B:
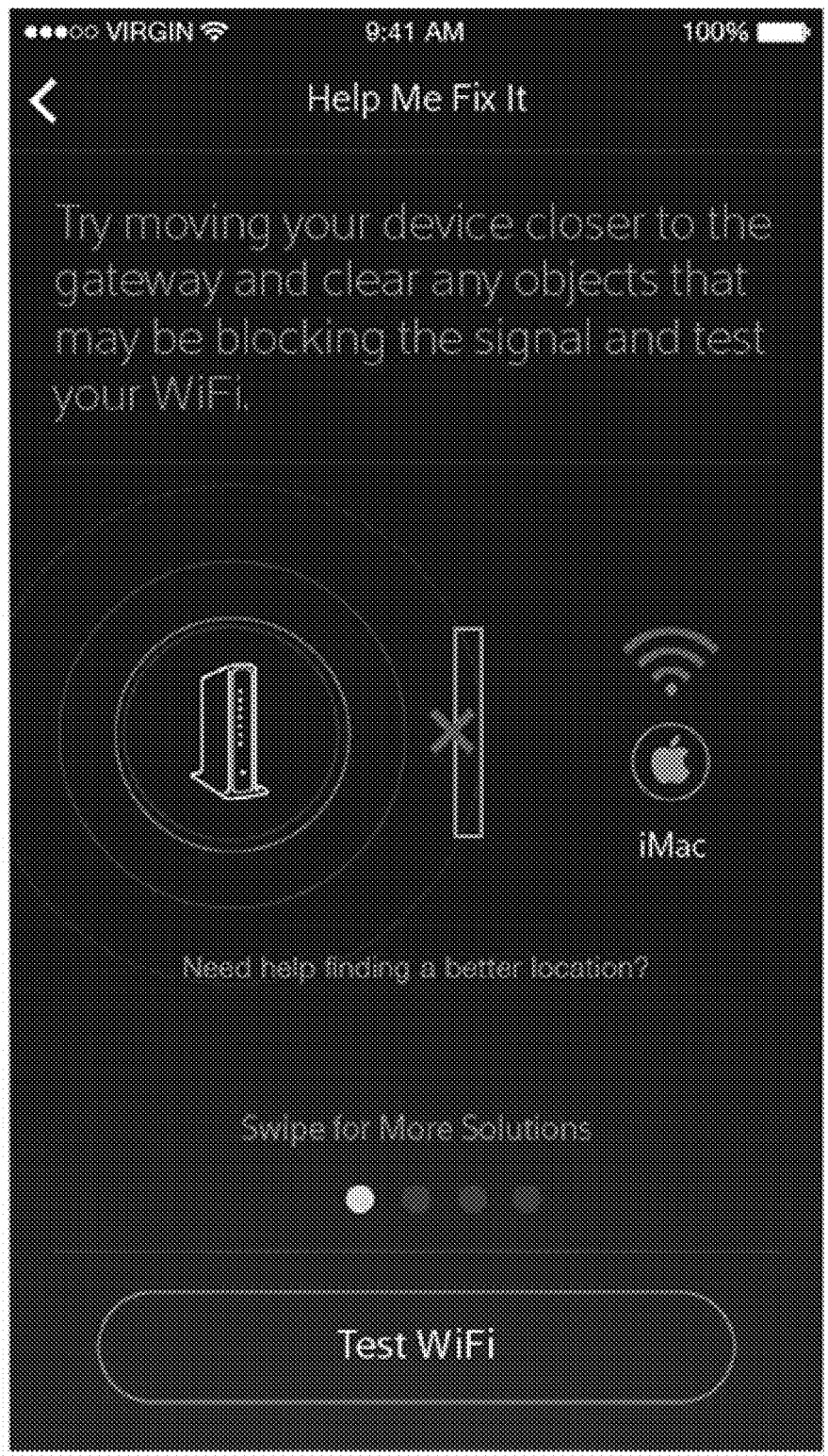

FIG. 33B shows a user interface 3304 displaying one or more recommendations for improving a network connection for a particular device. For example, the user interface 3304 may display a recommendation to move the device closer to the gateway and/or a recommendation to clear any objects that may be blocking the signal. The user interface 3304 may display an option to display more recommendations (e.g., solutions). For example, the user may swipe to view other recommendations. If the user selects the option to display another recommendation (e.g., by swiping left), the user interface shown in FIG. 33E may be displayed. The user may implement one or more of the recommendations. The user interface 3304 may display an option to test (e.g., re-test) the network connection between the device and the gateway. If the user selects the option to test the network connection, the user interface shown in FIG. 33C may be displayed.

Figure 33C:
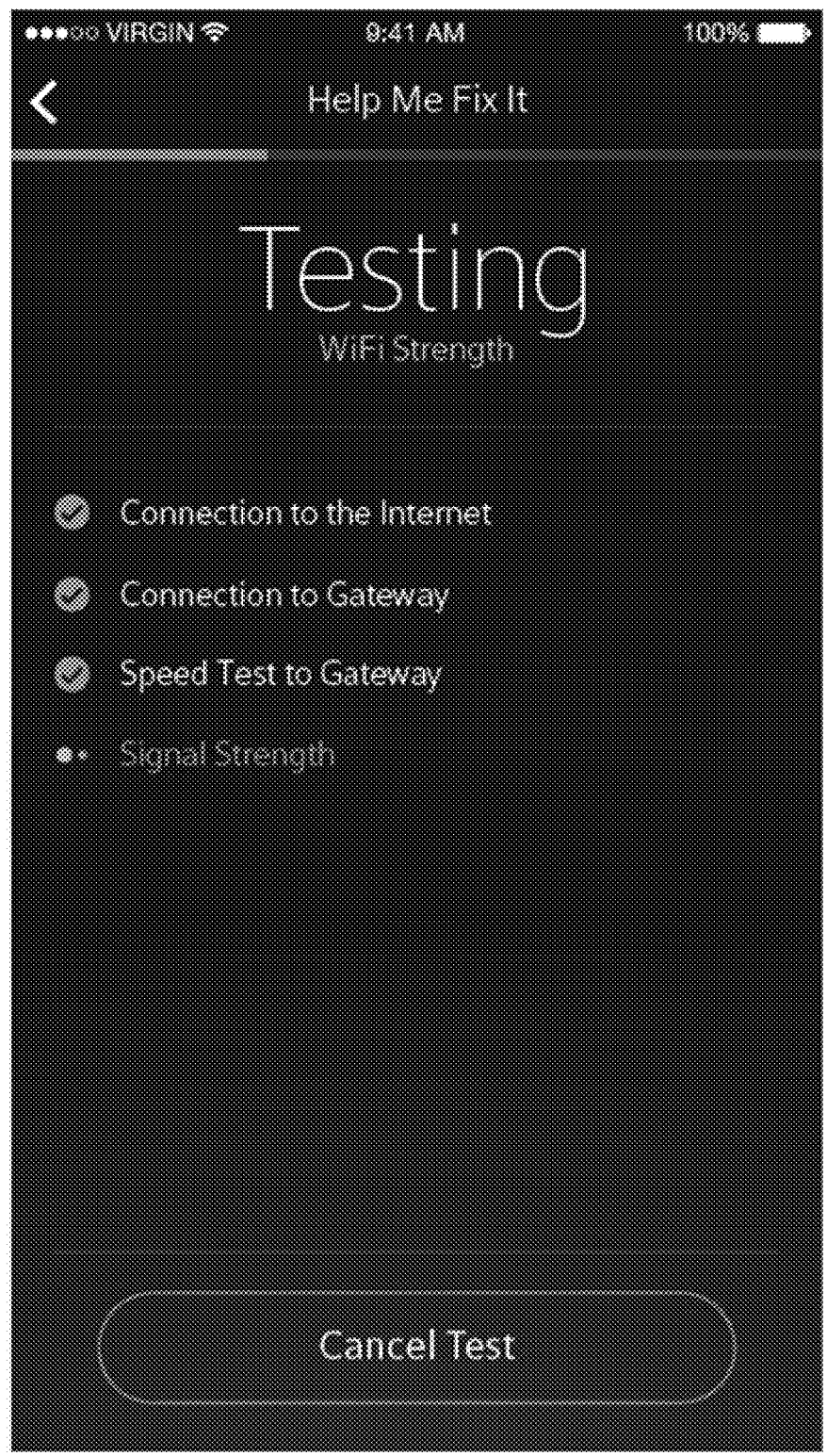

FIG. 33C shows a user interface 3306 displaying a status of a network test. The network test may comprise a plurality of tests, such as the device's connection to the internet, the device's connection to the gateway, a speed test to the gateway, and/or a signal strength between the device and the gateway. The user interface 3306 may indicate, for each of the plurality of tests, whether the test is satisfied (e.g., meets a particular metric). For example, the user interface 3306 may indicate that each of the following tests have passed: the device's connection to the internet, the device's connection to the gateway, and a speed test to the gateway. The user interface 3306 may indicate that the signal strength test is in progress. During the test, the user interface 3306 may display an option to cancel the test. After the test(s) are complete, a user interface indicating completion of the test may be displayed.

Figure 33D:
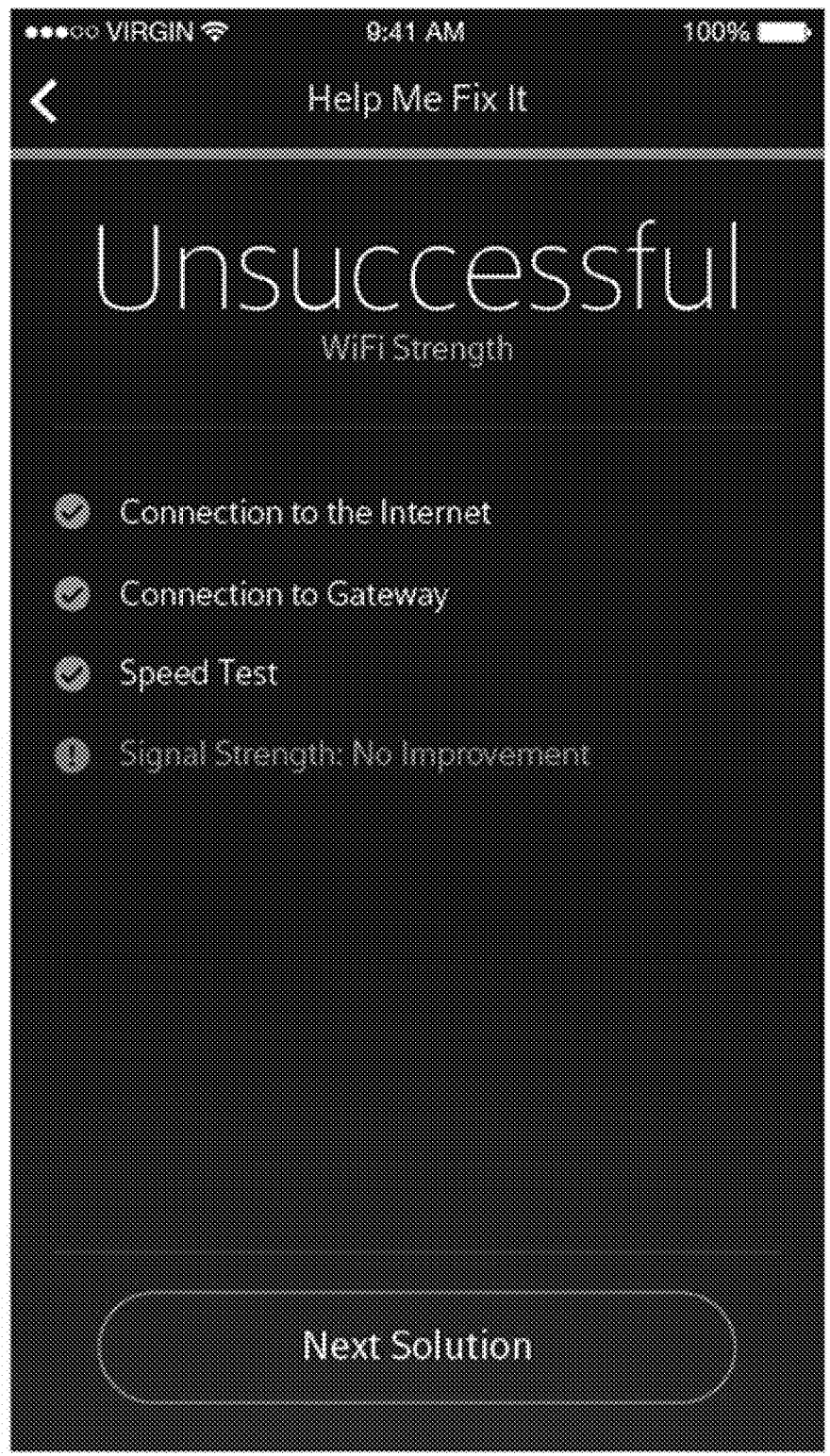

FIG. 33D shows a user interface 3308 indicating completion of a network test. The user interface 3308 may indicate that the network test was unsuccessful, such as if one test (or multiple tests) of the network test failed. For example, the user interface may indicate that there was no improvement to signal strength. The user interface 3308 may display an option for the user to try another solution. If the user selects the option to try another solution, the user interface shown in FIG. 33E may be displayed.

Figure 33E:
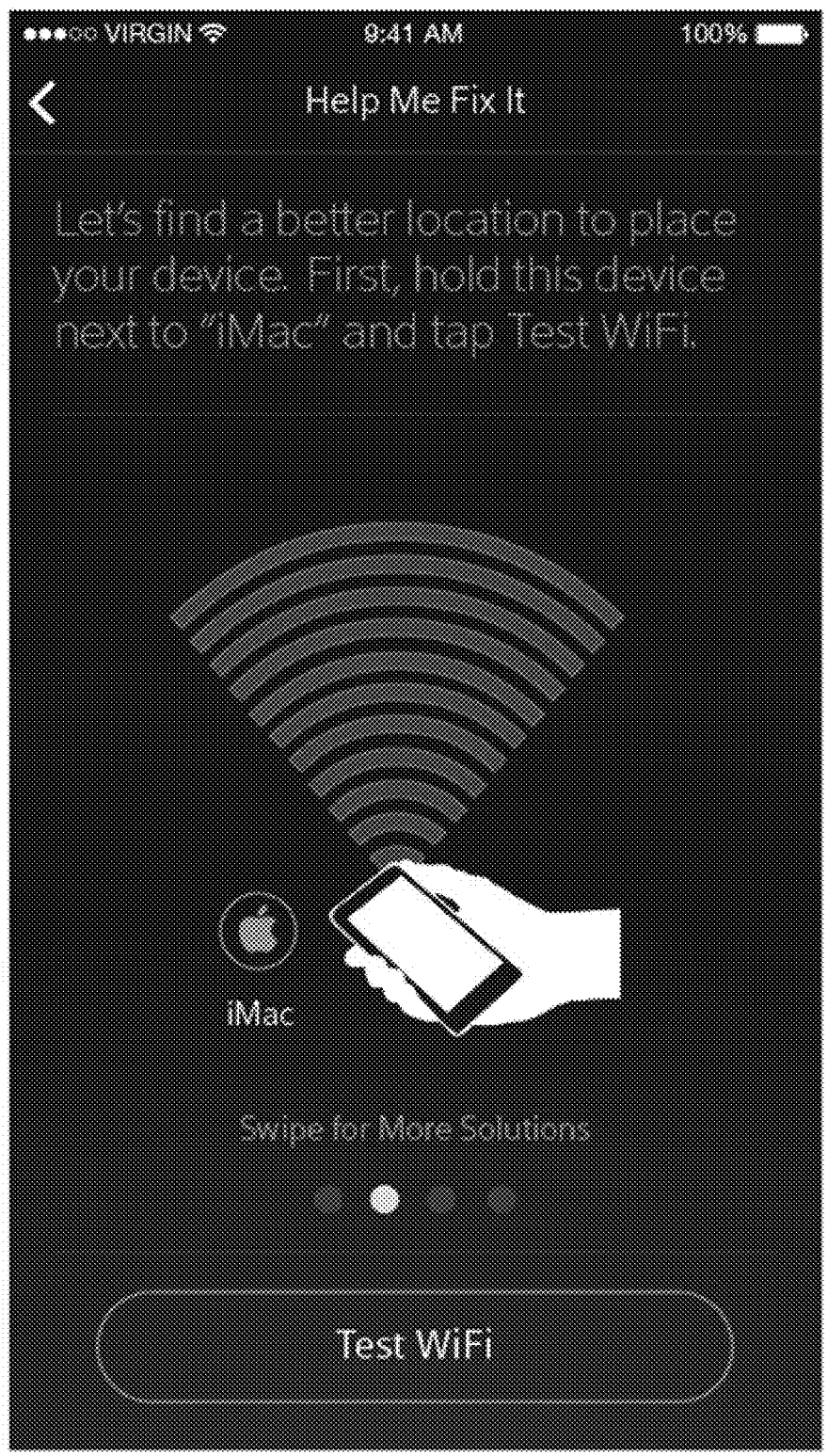

FIG. 33E shows a user interface 3310 displaying one or more recommendations for improving a network connection for a particular device. For example, the user interface 3310 may display a recommendation to assist the user in finding, for the device, a location with a stronger signal. The user device displaying the user interface 3310 may be used to improve the signal strength of the other device (e.g., a desktop computer). The user interface 3310 may display an instruction to hold the user device near the desktop computer and to select an option to test the network connection once the user device is held near the desktop computer. The user may select the option to test the network connection, and the user interface shown in FIG. 33F may be displayed.

Figure 33F:
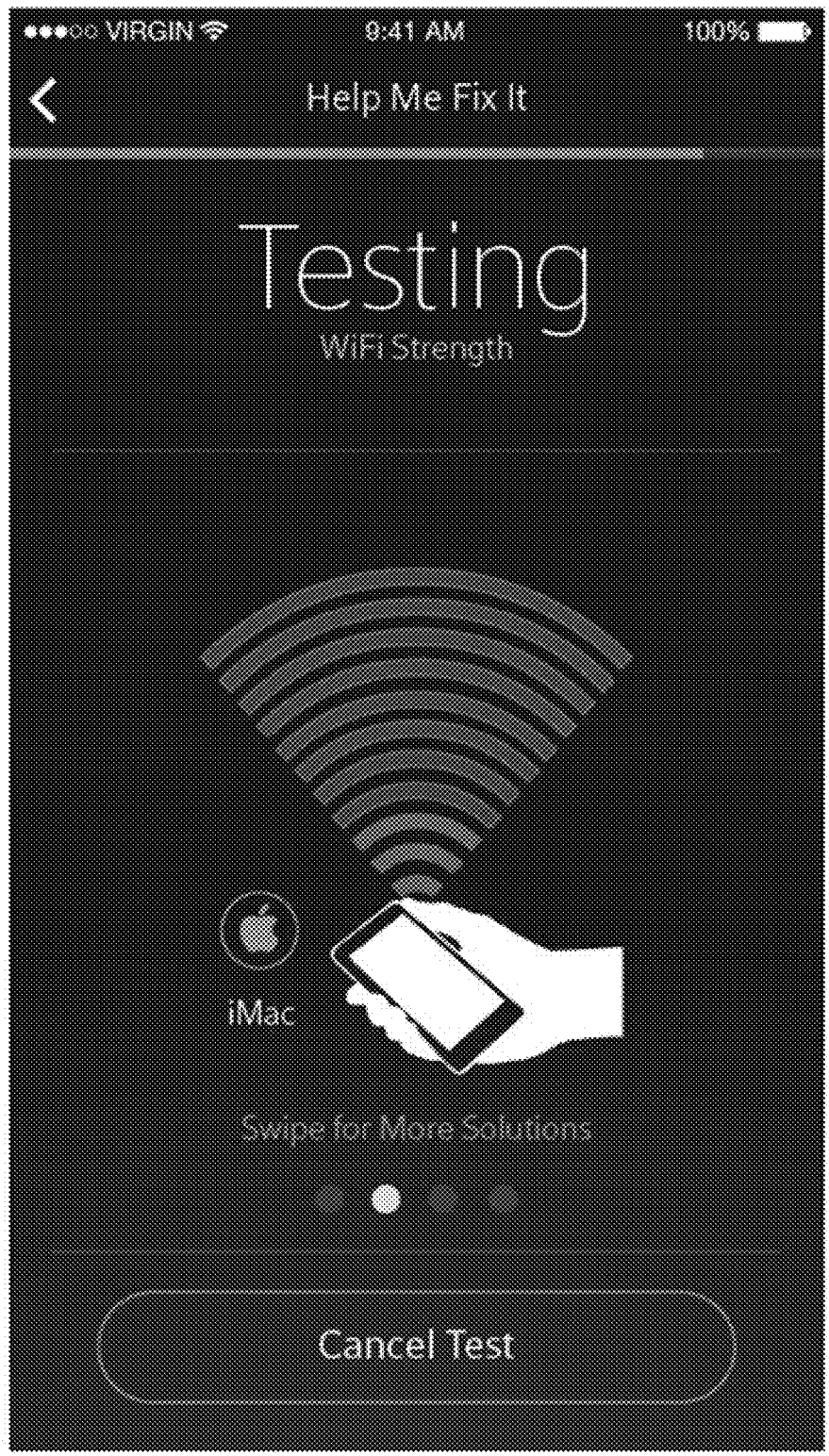

FIG. 33F shows a user interface 3312 displaying a status of a network test. The user interface 3312 may display an indication of a signal strength from a first location (e.g., the location of the desktop computer or other device being tested). During the test, the user interface 3312 may display an option to cancel the test. After the network test at the first location is complete, the user interface shown in FIG. 33G may be displayed.

Figure 33G:
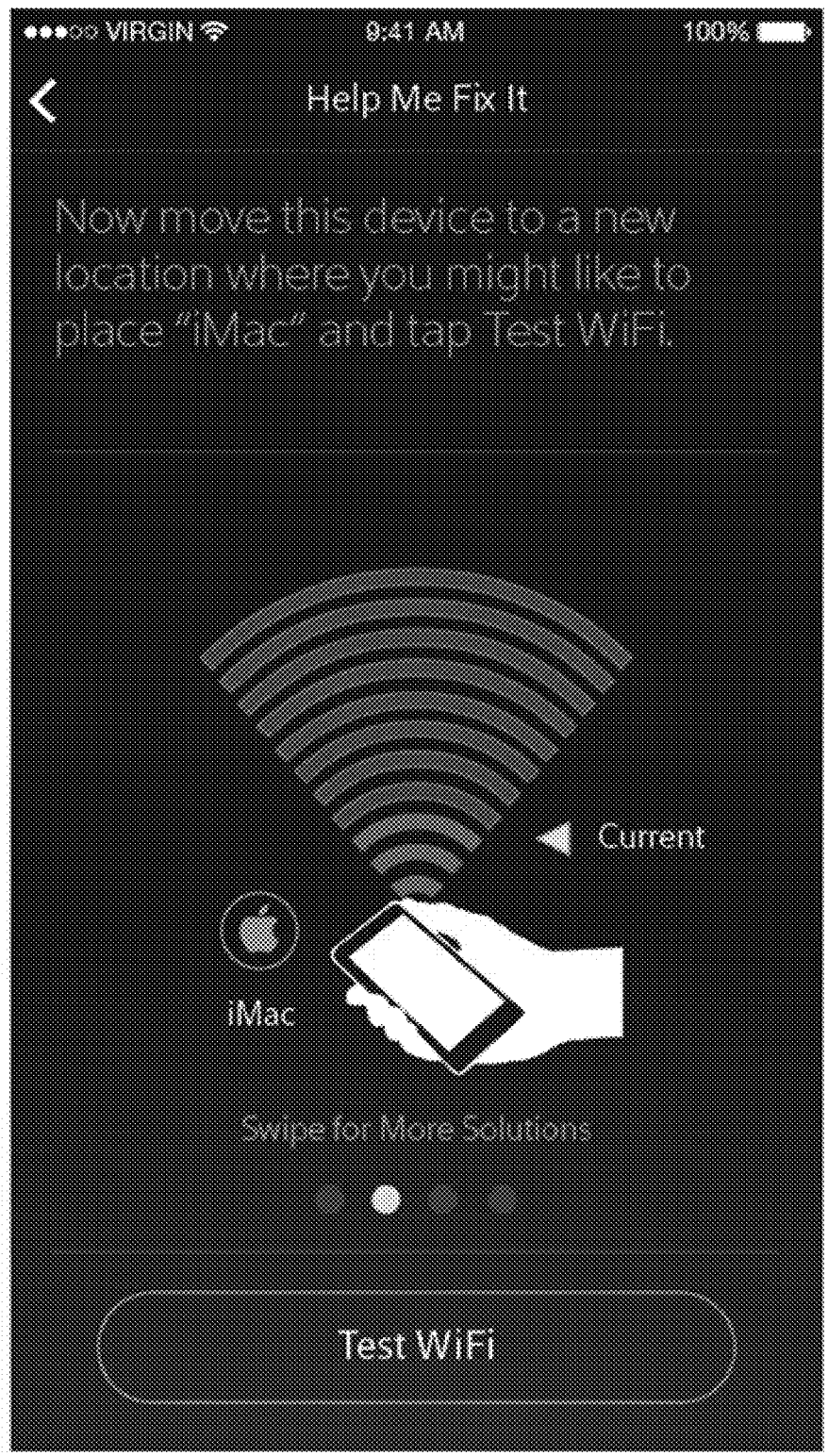

FIG. 33G shows a user interface 3314 displaying results of the network test from the first location. For example, the user interface 3314 may display an indication of the signal strength from the first location, and the signal strength may be low. The user interface 3314 may also display instructions for next steps in the test, such as to move the user device to a new potential location for the desktop computer (e.g., within the same room or in a different room) and to select the option to test the network connection at the new location. The user may select the option to test the network connection, and the user interface shown in FIG. 33H may be displayed.

Figure 33H:
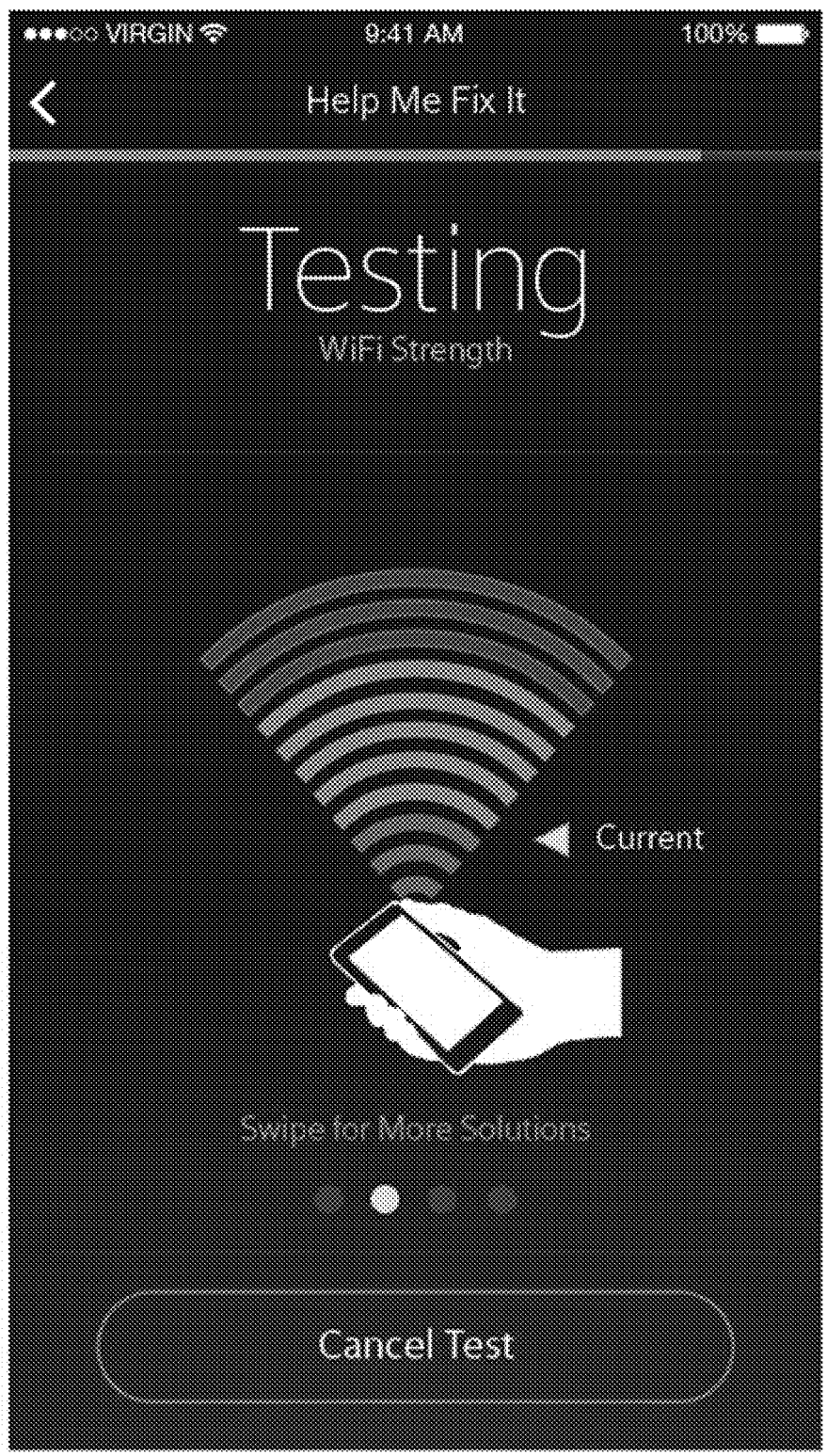

FIG. 33H shows a user interface 3316 displaying a status of a network test. The user interface 3316 may display an indication of a signal strength from the new potential location for the desktop computer (or other device being tested). The indication of the signal strength from the new location may be displayed simultaneously with the indication of the signal strength from the first location. During the test, the user interface 3316 may display an option to cancel the test. After the network test at the new location is complete, the user interface shown in FIG. 33I may be displayed.

Figure 33I:

FIG. 33I shows a user interface 3318 indicating completion of a network test. The user interface 3318 may indicate that the network test was successful. For example, the user interface 3318 may indicate that there was an improvement in signal strength from the first location to the new location.

The user interface 3318 may also display an indication of the signal strength from the first location and/or the indication of the signal strength from the new location. The user interface 3318 may display an option for the user to test again. If the user selects the option to test again, a new set of instructions for testing the connection at a different location may be displayed to the user.

Figure 33J:
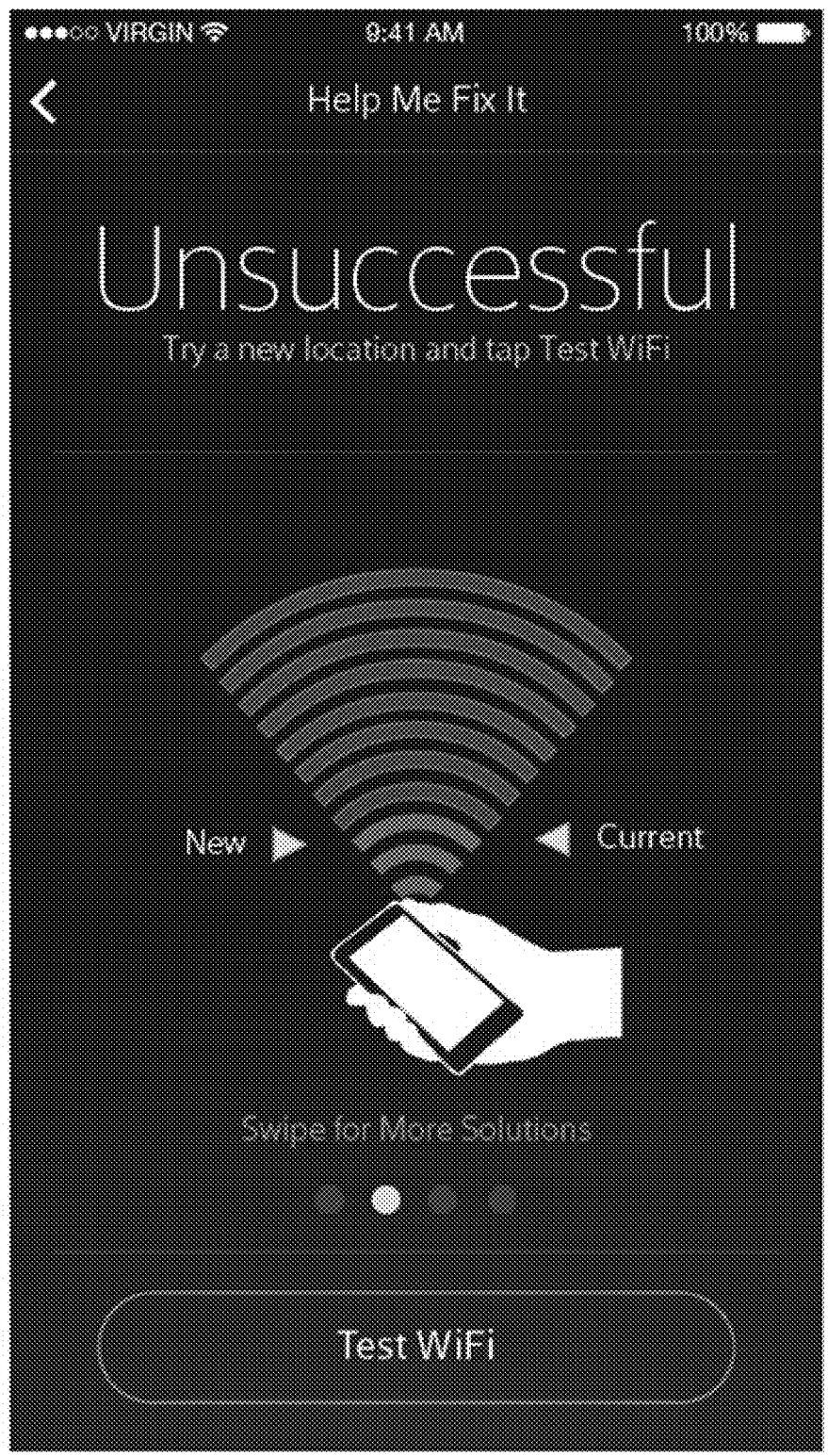

FIG. 33J shows a user interface 3320 indicating completion of a network test. The user interface 3320 may indicate that the network test was unsuccessful, such as if signal strength from the new location is not stronger than signal strength from the first location. The user interface 3320 may indicate that there was no improvement to signal strength. The user interface 3320 may display an option for the user to try another solution. The user interface 3320 may also display an option for to test the connection again.

Figure 33K:
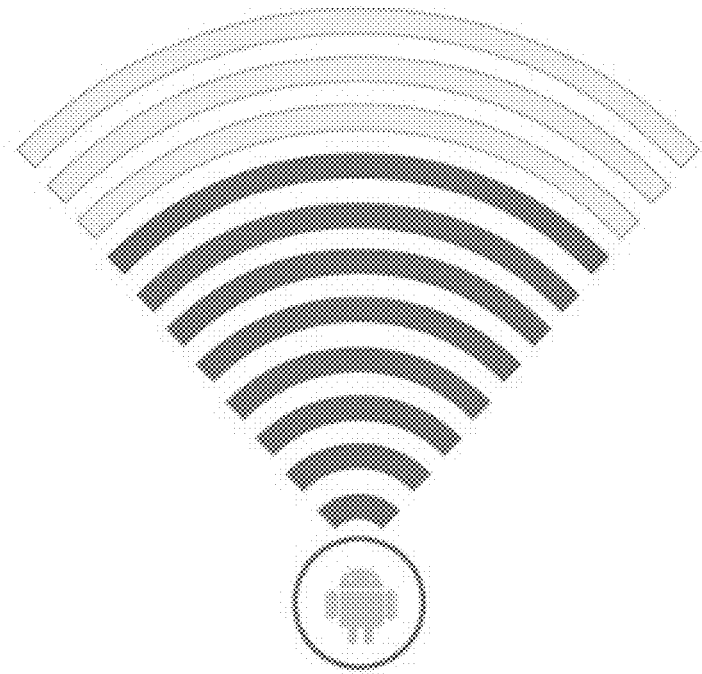

FIG. 33K shows examples 3322 of indications that may be displayed on one or more user interfaces. For example, a noise level may be indicated on a user interface. A network signal strength may be indicated on a user interface.

The system may be used to diagnose various network or device issues. For example, a device may report that it does not have a network connection. The failure of a network connection may be diagnosed as one of a plurality of issues, such as:

User's billing status (e.g., valid, delinquent, disabled)
Regional outage, which may impact the user
A cable (e.g., a DOCSIS cable) not properly connected to the gateway. The system may initiate checking network connectivity from devices to gateway and gateway to CMTS
Connecting to wrong SSID (e.g., neighbor's access point)
Wrong SSID password entered
User does not know the password. The system may check the last password reset date or time
Determine whether a plurality of (e.g., all) devices are having the issue, or if just one device is having the issue. The system may retrieve a list of connected devices from ODP
Connected via 3rd party Wi Fi router (e.g., in bridge mode)
Determine whether the gateway has a WAN IP Address
Check when the SSID and SSID/PWD was last updated A device may report that it has a slow network connection. The slow network connection may be diagnosed as one of a plurality of issues:

Determine whether entire region is experiencing slow network speeds. The system may determine the up/down throughput at the CMTS
Determine whether device is connected to a public SSID
Determine whether a channel conflict exists
Determine whether the device is connected to, for example, 2.4 GHz instead of 5 GHz
Check provisioned versus actual bandwidth
Determine how many devices are connected to the network
Check ODP telemetry data, such as bytes up, bytes down, signal strength, historical data for the same, channel utilization
Determine whether there is a known issue with device, which may be based on internal database of devices
Run speed test from gateway or request the user to run speed test from the device The system may collect latency measurements across in-home devices, to CMTS, speed test server, and common web address. A ping test may be performed to determine latency, jitter, and/or packet loss. The measurements of latency to the different components (e.g., in-home devices, CMTS, speed test, websites) in a single object, sequentially and in a very short period of time to enable comparing and determining bottlenecks Ability to flag latency tests where duration is more than x standard deviation away from the long term average for the different components where latency is measured. A ping test may be performed to determine latency, jitter, and/or packet loss.

The system may determine the number of devices by protocol type. For example, the system may count the number of devices that are sending or receiving voice, video, peer-to-peer, video monitoring, game downloads, cloud storage, etc. at a given time.

The system may utilize byte counters, such as by enabling cumulative byte counters by protocol.

The system may analyze a historical trend of data, such as bytes up/down by device on the network, to see whether the current issue is a recent issue or an on-going issue. They system may collect traffic telemetry information from ODP, downlink speed, downlink load, uplink speed, uplink load, device client table, channels in use, SNR, MCS index (e.g., table), SSID MAC for networks and/or gateway MAC.

Lights (e.g., LED lights) or other indicators on a gateway may keep cycling, with no internet connection. The indicator cycling may be diagnosed as one of a plurality of issues:

The user might not be able to get access to the internet via their wireless connected device(s), as well as their Ethernet connected device(s). The system may measure DOCSIS upstream transmit power, DOCSIS upstream signal to noise, DOCSIS upstream receive power, DOCSIS downstream receive power, DOCSIS downstream receive signal to noise, and the like.

Historical data may be used to evaluate various parameters, such as DOCSIS upstream transmit power, DOCSIS upstream signal to noise, DOCSIS upstream receive power, DOCSIS downstream receive power, DOCSIS downstream receive signal to noise.

A network (e.g., Wi-Fi) connection may keep dropping. The network connection drop may be diagnosed as one of a plurality of issues. Historical information from ODP may be analyzed to understand how many times the device has rebooted and the time it was rebooted. For multitenant buildings, it may be possible that a device could be connected to multiple networks. The system may capture the gateway MAC and SSID MAC addresses for the 2.4 and 5.0 networks to determine the transition pattern of the gateway in question. The system may also capture RSSI, client table, SSID names, reboot count, channels in use, SNR (e.g., RSSI minus noise), MCS index (e.g., table), time stamp of IP table update (e.g., DHCP).

Video may be distorted and/or the user may be receiving pixelated video. The distorted and/or pixelated video may be diagnosed as one of a plurality of issues. The system may look at the historical MoCA PHY rate of each node in the MoCA network to understand if something was introduced to the user's home environment to cause disruption. In addition, if MoCA was turned on (and is causing an issue) the system may determine when it was turned on and then potentially turn it off to resolve the issue. The system may measure the MoCA PHY rate, client table, MoCA Status, channels in use, and the like.

Examples described herein may provide a network intrusion detection system (IDS), such as home intrusion detection (HID) and/or an intrusion prevention system (IPS), which may work in conjunction with other wireless access points, gateways, and routers. The HID may be performed in the cloud, and IPS may be performed in the appliance. The packets received by and transmitted out of the appliance may be analyzed, and metadata information related to suspicious packets may be sent to the cloud for behavioral analysis. Devices connected to wireless access point(s) or other types of gateway(s) may be monitored, and a number of security services may be offered to the end-user. The security system may comprise a security device, which may be integrated with a gateway, such that both security device and gateway functionality may be utilized. The gateway may be connected to the security device and/or device cloud in a Dynamic Host Configuration Protocol (DHCP) mode or other network management protocol mode. The security system may comprise a firewall that may be managed by an agent and/or cloud. The agent may comprise a software component that runs on the firewall, but may be managed indirectly through a cloud API. The cloud may comprise a system as a service (SaaS) entity that provides ReST-style APIs to manage the firewall.

A security device may be set up. First, an agent may be registered to a user (e.g., via POST/agents/register). The gateway MAC address and/or gateway public IP address may be transmitted and/or used for this registration process. The security mode of the device may be changed from standby to DHCP (e.g., via PUT/agents/:id/mode). DHCP settings may be applied onto the security device. Second, the DHCP server in the router may be switched off. Third, the security device may be rebooted (e.g., via POST/agents/:id/reboot), or the user may manually unplug for, e.g., 30 seconds. Fourth, the security mode of the device may be checked (e.g., via GET/agents/:id) to verify proper setup. Fifth, the DHCP settings may be defined and set up based on an existing gateway setting. These settings may include network mask, start IP, end IP, primary DNS IP, and/or secondary DNS IP. The agent may have a number of modes (e.g., DHCP, standby, bridge, unspecified) and/or states (e.g., unregistered, disabled, enabled). During and post setup, a subsequent verification of the states may be performed, and transition of states and modes may be managed.

FIG. 34 shows an example system and method of adding a security device. In 3401, a user, via the user interface, may add a security device. In 3402, the core may call an API for adding the security device (e.g., register a new security device). In 3403, the device cloud may get agent information. In 3404, the security device may indicate registration of a new agent. In 3405, the device cloud may send an acknowledgement, such as by responding with a 200 OK message.

FIG. 35 shows an example system and method of authentication and user creation in a security device cloud. In 3501, the device cloud may be connected with an authentication service, and a user ID and/or serial number may be sent (e.g., via a POST message). The message may include a gateway MAC address, a gateway Public IP, and/or a user ID. In 3502, the device cloud may respond with a token ID.

Figure 36:
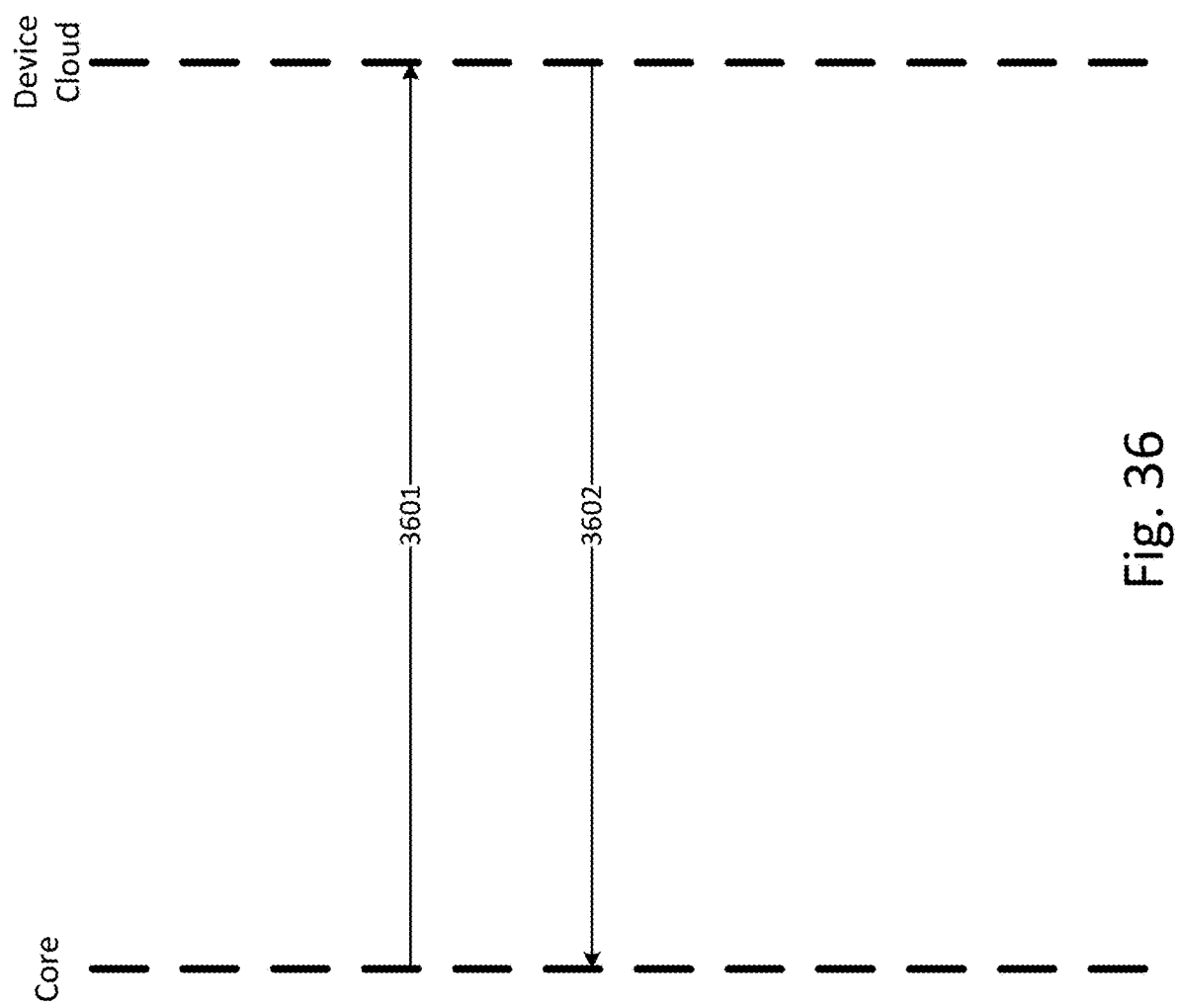
FIG. 36 shows an example system and method of updating firmware.

FIG. 36 shows an example system and method of updating firmware. In 3601, the core may send a request to update firmware and/or configuration for a security device. In 3602, the device cloud may respond with an acknowledgement of updating the firmware and/or configuration.

Figure 37:
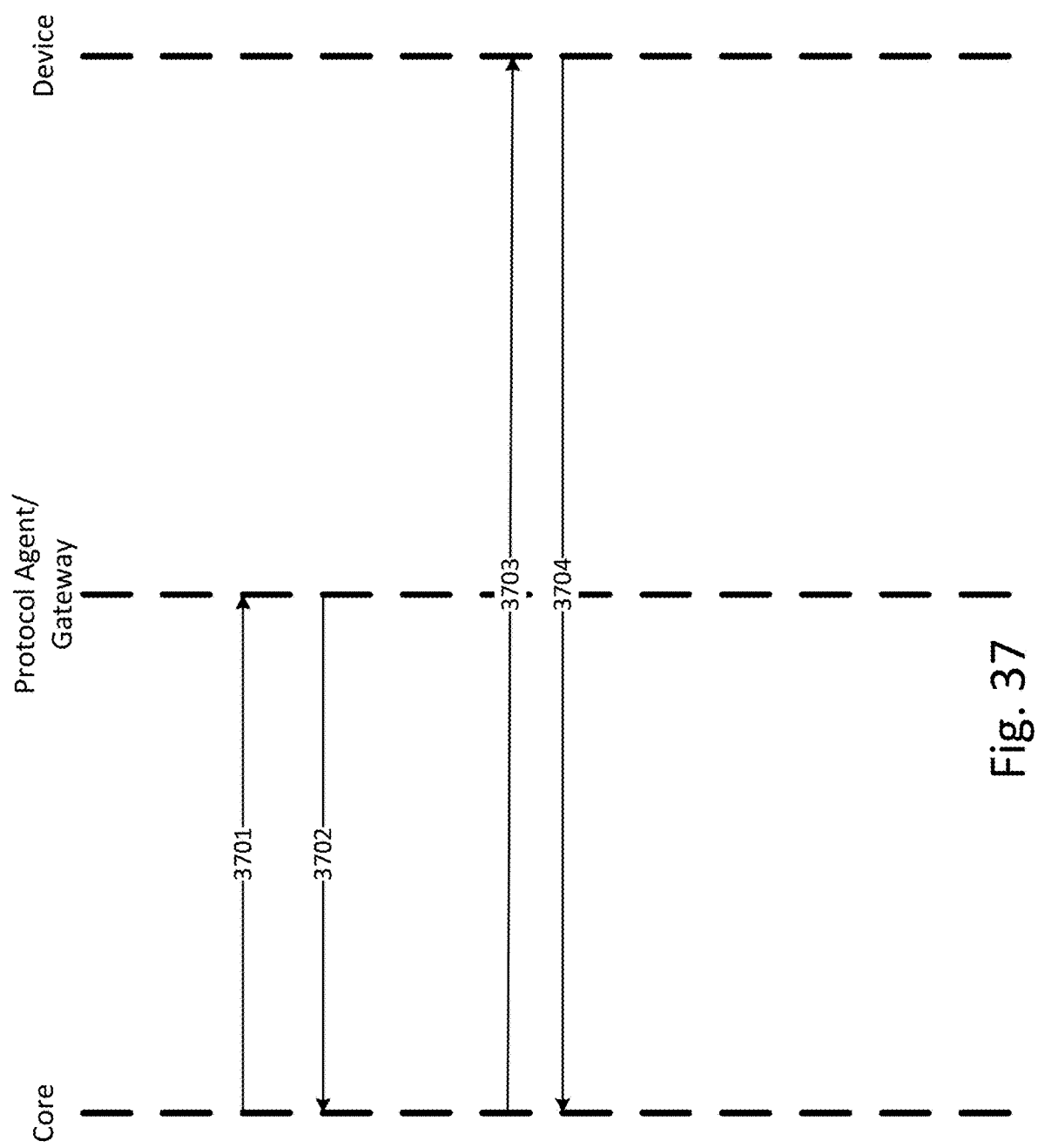
FIG. 37 shows an example system and method of DHCP configuration.

FIG. 37 shows an example system and method of DHCP configuration. In 3701, the core may send a DHCP disable. In 3702, the gateway and/or protocol agent may respond with an acknowledgement message (e.g., a 201 OK message). In 3703, the core may send an enable DHCP message with, for example a mode of DHCP. In 3704, the device may respond with an acknowledgement message (e.g., a 200 OK message).

Figure 38:
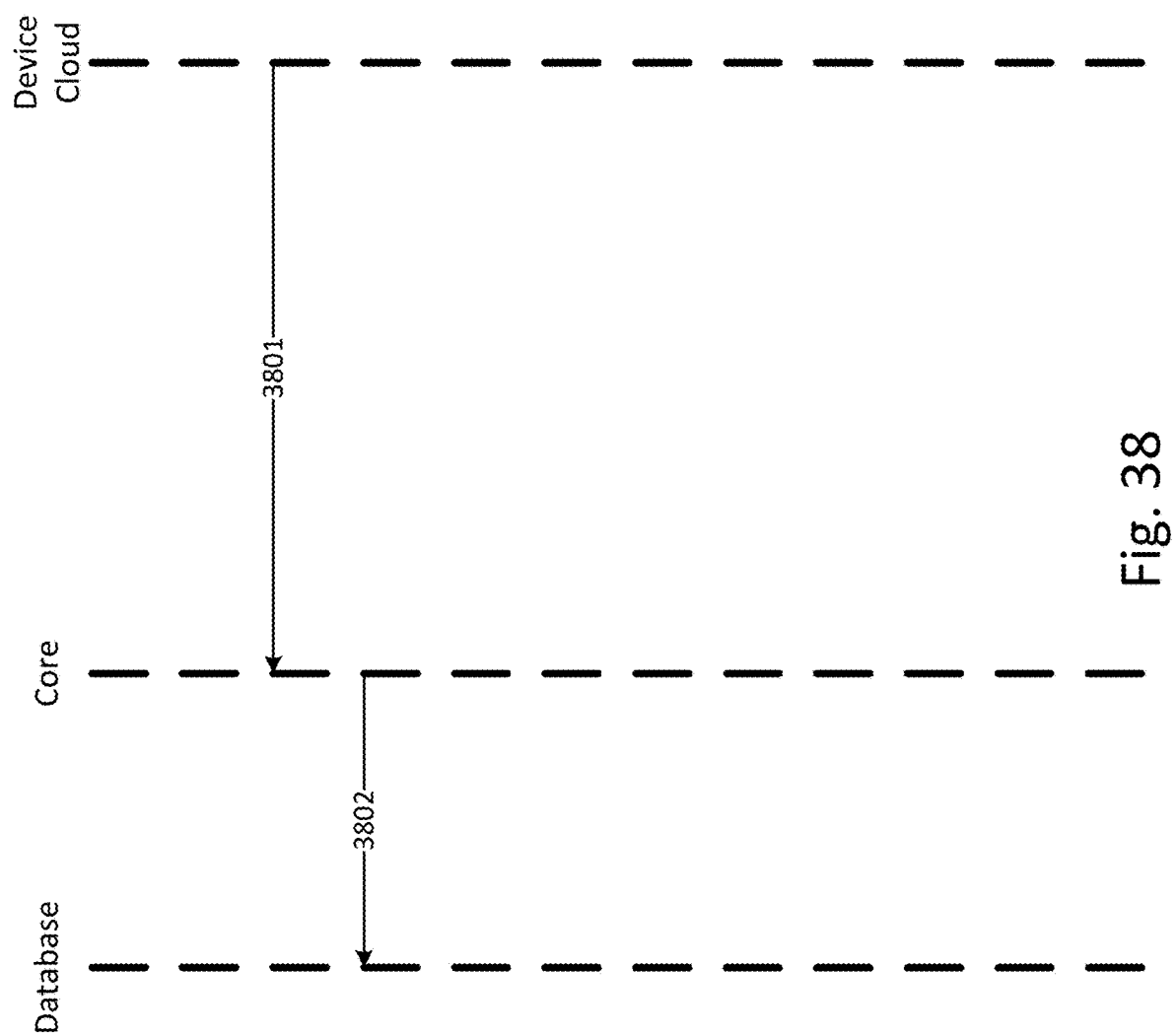
FIG. 38 shows an example system and method of generating a new device notification.

FIG. 38 shows an example system and method of generating a new device notification. In 3801, the device cloud may send a notification related to new or disconnected device details (e.g., model, operating system, etc.). In 3802, the core may send a request to update a database with the device details.

Figure 39:
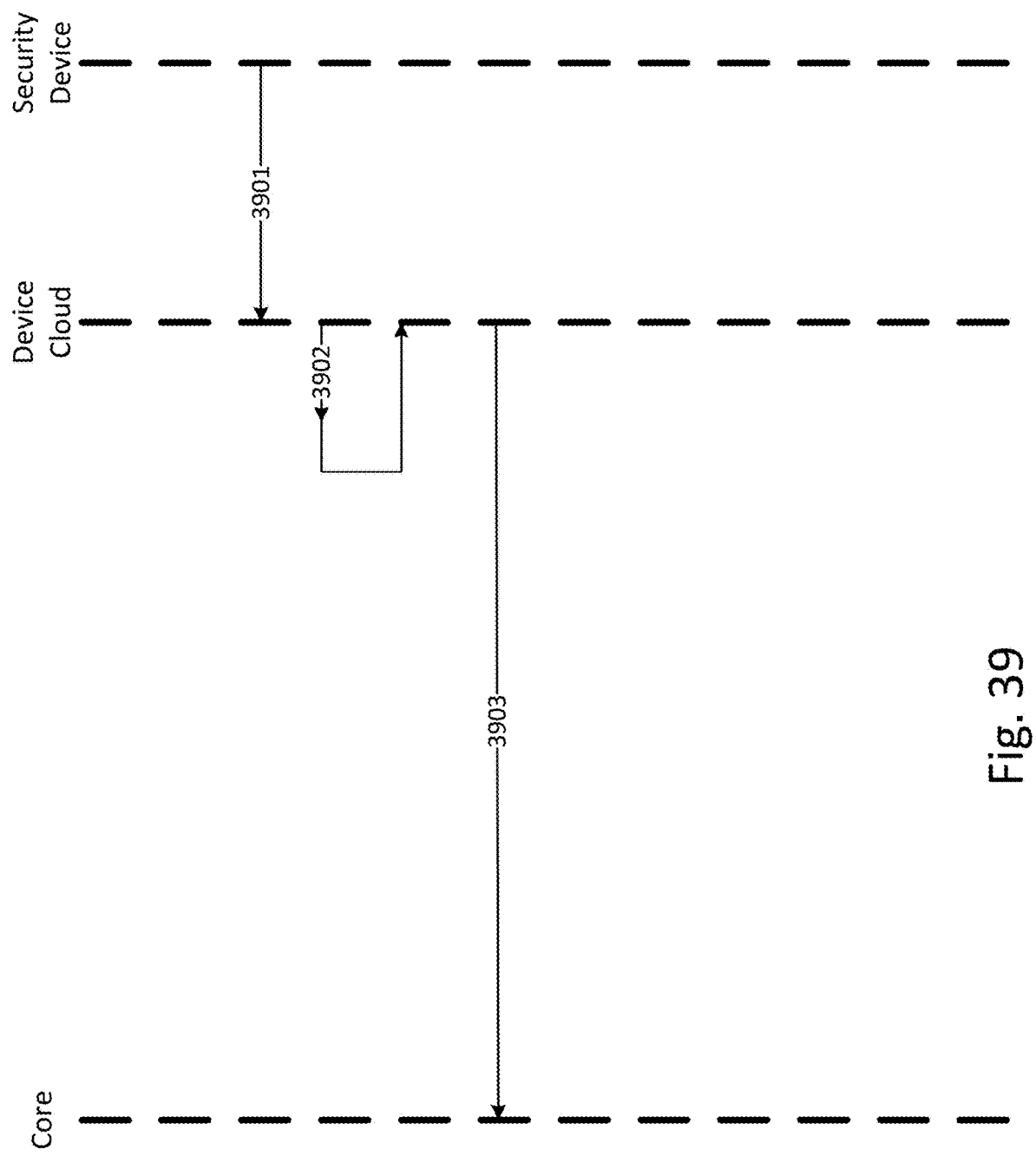
FIG. 39 shows an example system and method of generating a threat notification.

FIG. 39 shows an example system and method of generating a threat notification. In 3901, the security device may send a packet comprising metadata. In 3902, the device cloud may analyze the metadata and determine whether any threat has been found. If a threat has been found, the device cloud may determine to inform the core via, for example, a notification event. In 3903, the device cloud may send a threat notification with a threat ID (and other details).

Figure 40:
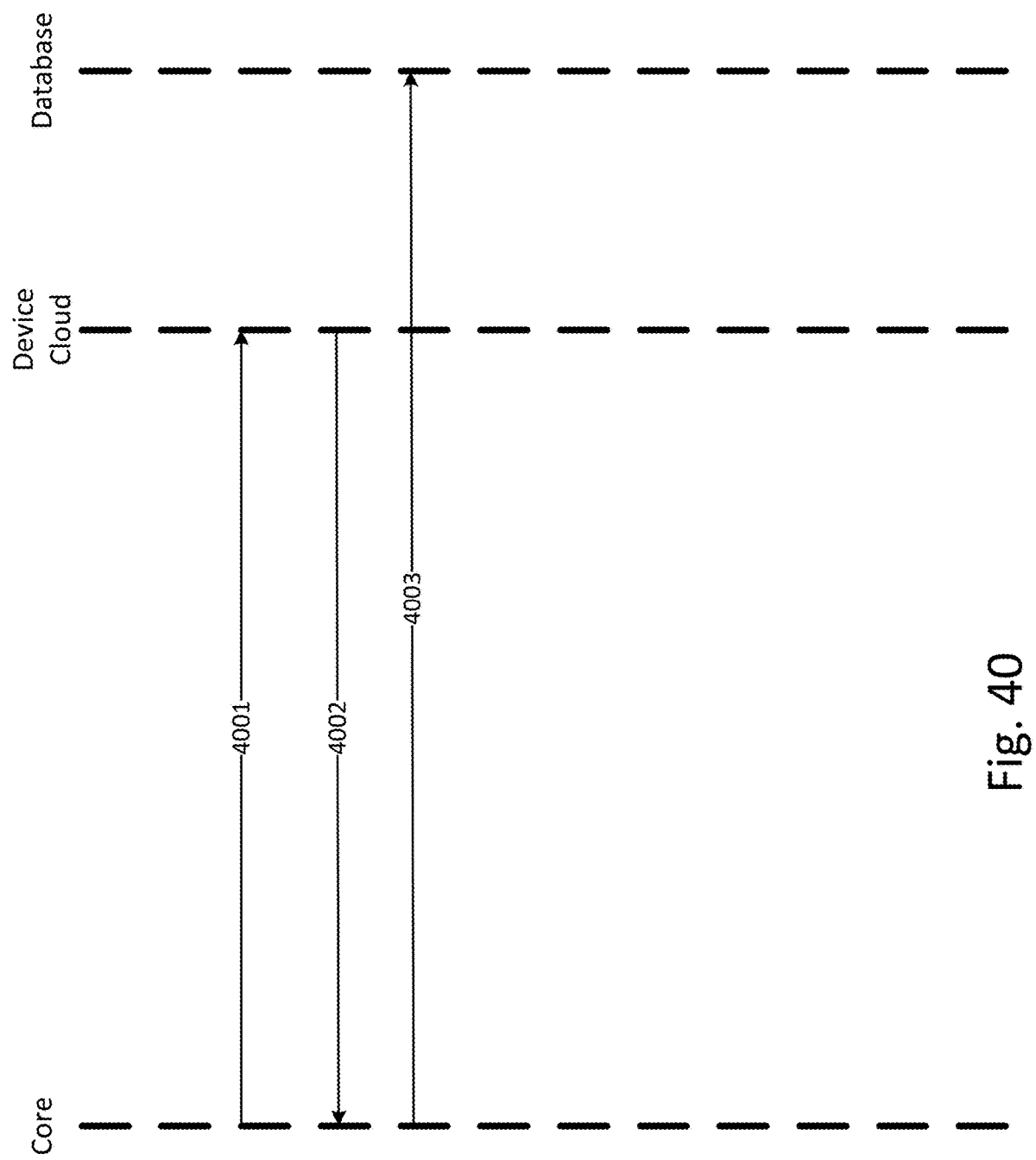
FIG. 40 shows an example system and method of accessing a list of connected devices.

FIG. 40 shows an example system and method of accessing a list of connected devices. In 4001, the core may send a request for a list of connected devices. In 4002, the device cloud may send information for connected devices (e.g., all connected devices or all connected devices for a gateway). In 4003, the core may send a request to update the database with device details.

To reduce the risk of attacks coming via a Wi-Fi network or other network, an enhanced digital security service may offer a user the opportunity to activate an option for the Wi-Fi or other network. In an away mode (or other security mode), one or more (e.g., a plurality of) unknown devices may be prevented from connecting to the Wi-Fi network. Unknown devices may be devices that have not connected before to the network (e.g., have never connected to the network and/or have not connected to the network for a threshold amount of time) and/or that have been manually removed from the known device list in the service. One or more known devices may be able to remain connected to and/or connect to the Wi-Fi network. The away mode feature may be extended to other types of radios and/or protocols (e.g., non-Wi-Fi radios and/or protocols), including, for example, Zigbee, Bluetooth, and Z-Wave.

Figure 51B:
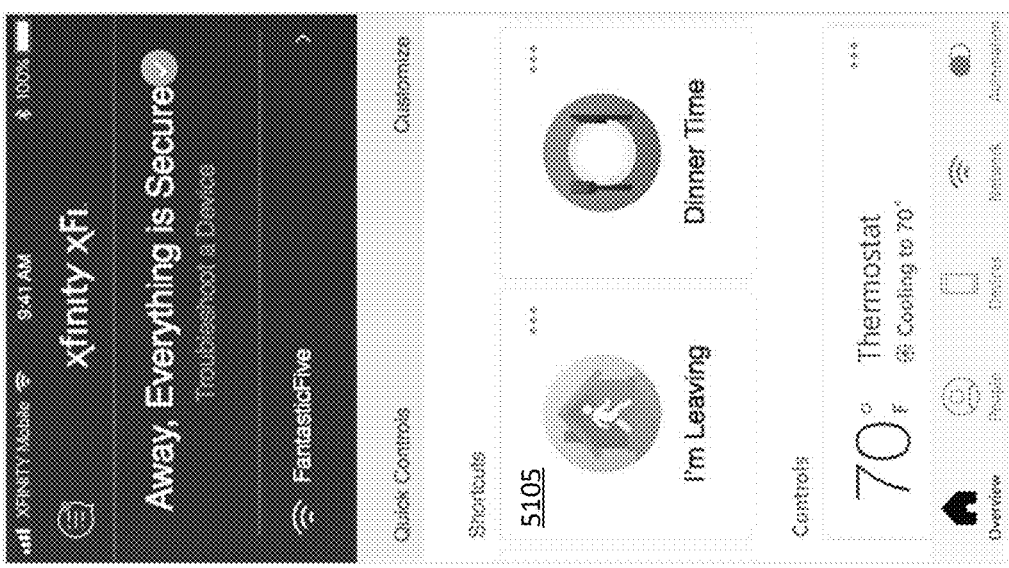
FIG. 51B shows a user interface indicating an option for entering a mode, such as a secure connect mode.
Figure 51A:
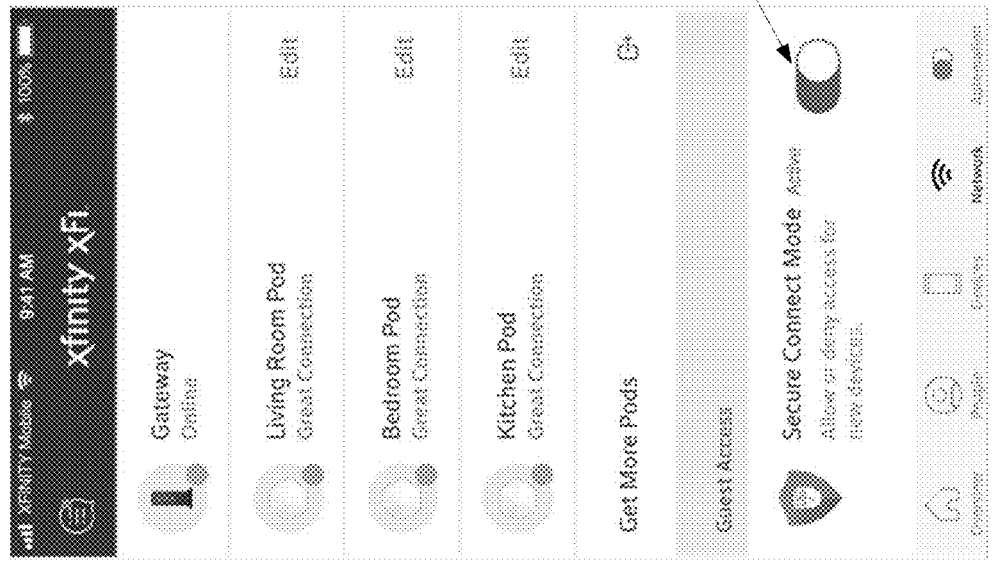
FIG. 51A shows a user interface indicating options for viewing and/or selecting mode(s) for a network.

Each device may be recognized by its unique media access control (MAC) address, an IP address, or other unique identifier. A computing device, such as a gateway device, may whitelist a plurality (e.g., all) known devices (e.g., devices that have previously successfully connected to the network). If a user selects an away mode option, new MAC addresses (or other unique device identifiers) identified by the network may be compared to the whitelist and rejected after a connection attempt. On the other hand, if a known device attempts to connect to the network, the computing device may compare an identifier for the known device to the whitelist. The known device may be granted access to the network based on the comparison. FIG. 51A shows a user interface 5100 indicating options for viewing and/or selecting mode(s) for a network. The user interface 5100 may display one or more selectable options for entering different modes. For example, an option 5105 for a first mode (e.g., away mode) may be displayed. Selecting the option 5105 may cause the user device to transmit an instruction, such as to a gateway device, to enter into an away mode.

In another mode (e.g., a secure connect mode), new devices may be automatically paused until they are manually permitted to connect to (or otherwise be granted access to) the network. The permission to connect may be granted via an in-application notification. FIG. 51B shows a user interface 5120 indicating an option for entering a mode, such as a secure connect mode. The user interface 5120 may display a selectable option for entering or exiting a secure connect mode. For example, an option 5125 (e.g., a toggle option) to enter a secure connect mode may be displayed. Selecting the option 5125 may cause the user device to transmit an instruction, such as to a gateway device, to enter into the secure connect mode. Selecting the option 5125 again may cause the user device to transmit an instruction, such as to a gateway device, to leave the secure connect mode.

A gateway device may implement a device identifier filter, such as a driver and/or hardware abstraction layer (HAL)-level MAC address filter. Additionally or alternatively, the gateway device may implement IP-level blocking, such as using an IP table. A protocol, such as TR-181 protocol or another cable standard protocol, may be used to toggle the away mode.

Representational state transfer (REST) application program interfaces (APIs) may be provided for applications in the cloud by one or more cloud devices to enable or disable the away mode. The REST API may call a TR-181 (or any other protocol) to toggle the away mode. Additionally or alternatively, MAC filter whitelisting may also be stored in one or more cloud devices.

One or more user interfaces may have a manual away mode toggle. Additionally or alternatively, based on the location of a user device, such as a mobile phone, the away mode may be enabled and/or disabled automatically. For example, an IP range-based solution may be used, and the location of the user device may be determined based on its IP address. A geolocation solution may be used, and the location of the user device may be determined based on, for example, location services and/or Wi-Fi signals, cellular signals, Bluetooth signals, etc. sent or received by the user device. If the user device is greater than a threshold distance from the home and/or gateway device, the away mode may be enabled automatically. If the user device is within a threshold distance from the home and/or gateway device, away mode may be disabled automatically.

A method described herein may comprise after receiving a request to activate a security mode for a network, activating, by a computing device, the security mode for the network. The method may comprise, during the security mode for the network, receiving, from a device, a request to connect to the network. Based on a determination that the device did not previously connect to the network, the request to connect to the network may be denied.

The method may comprise, during the security mode for the network, receiving, from a second device, a request to connect to the network. The method may comprise, based on a determination that the second device previously connected to the network, granting the request, from the second device, to connect to the network.

An enhanced digital security service may detect and/or block any harmful interaction(s) between devices connected to the network (e.g., a home network) and the internet. For example, a computing device may monitor data traffic (e.g., all data traffic) in the network to detect and/or block malicious intrusion attempts or otherwise atypical device behavior.

The target device and malware may be identified and/or isolated. After the target device and malware are identified and/or isolated, the device subject to the attack may be automatically protected. The harmful device interaction may be isolated, but other network interactions may continue to work as normal, so that, for example, a user's digital home may continue to be connected.

After the target device and malware are identified and/or isolated, a notification may be sent. For example, the enhanced digital security service may provide the user with specific information related to the threat and/or the steps taken by the system to remediate the threat. The system may guide the end-user through a series of additional steps (e.g., a firmware upgrade, a device restart, etc.) intended to address the root cause of the issue. For example, the system may tie remediation actions for an immediate threat to the root cause of security issues. Traditional security solutions like antivirus software may work in the background, addressing threats but providing little to no guidance to the end-user on avoiding future problems. Through a user interface (UI), the system may communicate the actions taken by the system in a consumer-friendly way, including recommended actions for averting such events in future (e.g., updating device firmware or performing some other action).

Figures 42A, 42B:
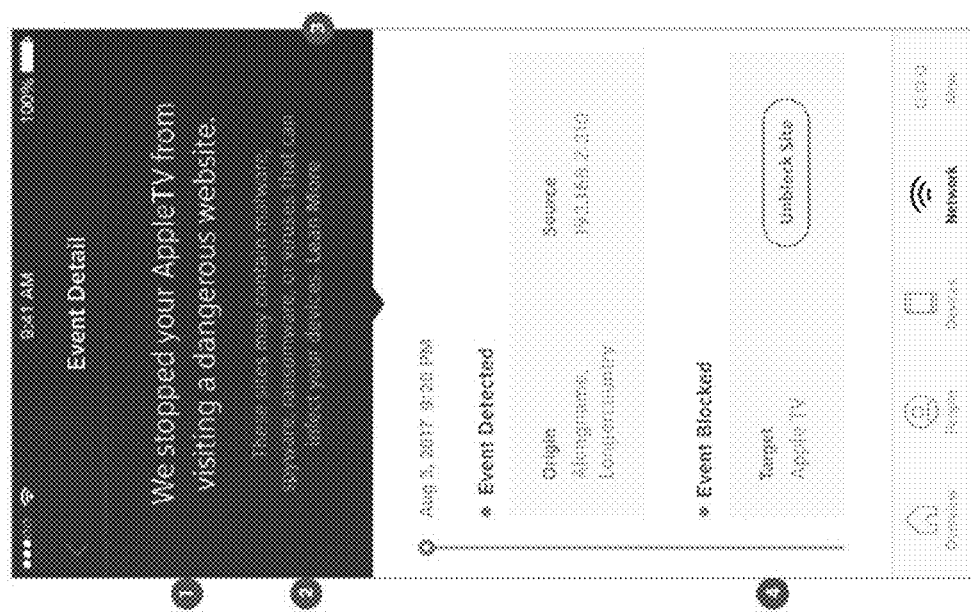
FIGS. 42A-B show user interfaces indicating event details.

FIGS. 42A-B show user interfaces 4210 and 4220 indicating event details. These screens may comprise a general layout for an event, such as a security event. One or more of the user interfaces 4210 and 4220 may be displayed on a user device after a security event has occurred and/or after the security event has been addressed. They may show a series of dynamic information around the event details. For example, the user interface 4210 may indicate that a device was blocked from visiting a dangerous website. The user interface 4220 may indicate that a device was blocked from participating in a denial of service attack.

1. event header: this may comprise a short header describing the nature of the event. The device indicated "Apple TV" may comprise dynamic text that may be replaced with the target device <name>. The event header may also indicate the type of security event (e.g., a device attempting to visit a dangerous website).

2. event description: this may comprise a dynamic description of the event. Each type of event may have a corresponding description. For example, if the event comprises a device attempting to visit a dangerous website, a corresponding description may indicate that the website may contain malware, spyware, ransomware, or viruses that can infect the user's devices.

3. learn more: this may go to a threat glossary. The threat glossary may include information for a plurality of different threats, and the threat glossary may be tagged so that the user may be sent to additional information regarding the threat.

4. unblock website: this button may kick off an allow event confirmation screen. This option may be displayed if access to a website was blocked.

5. improve security: this button may kick off an improve security tip card flow. Examples of tip cards will be described in further detail below.

Figure 43B:
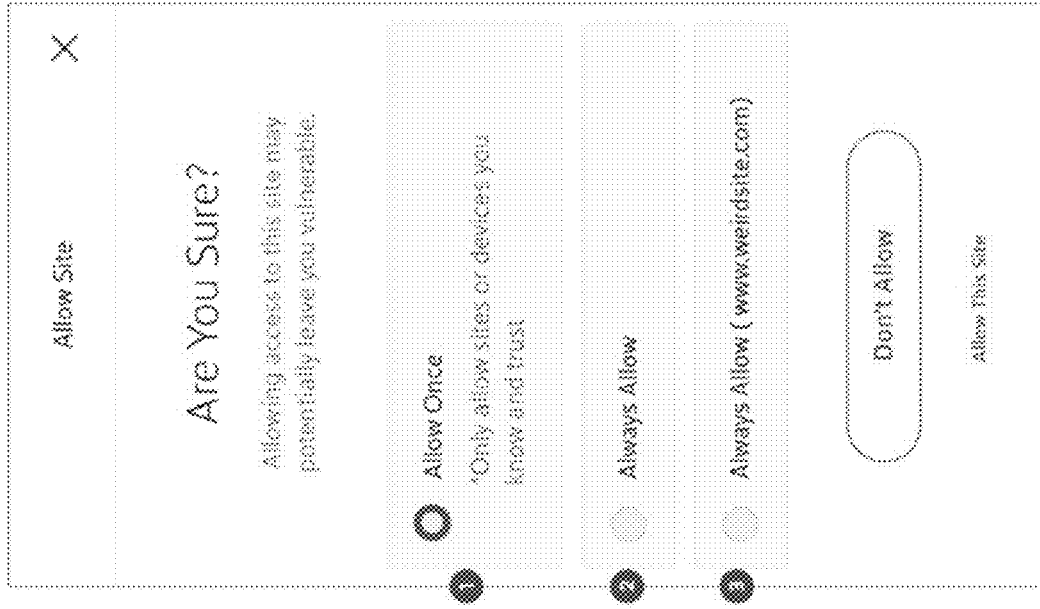
FIGS. 43A-B show user interfaces indicating allow event confirmation.
Figure 43A:
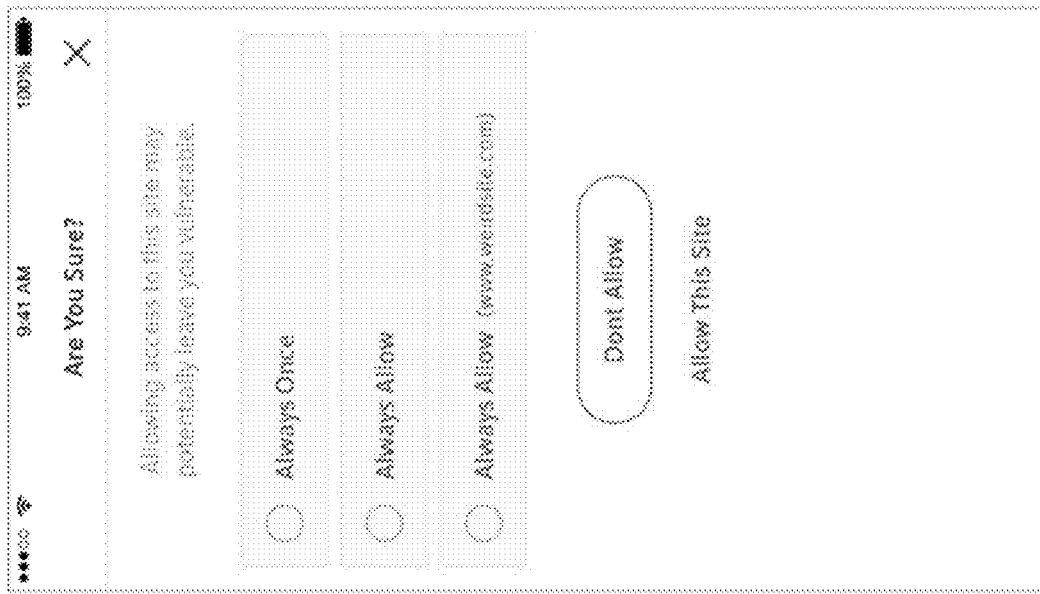

FIGS. 43A-B show user interfaces 4310 and 4320 indicating allow event confirmation. This may be where the user decides the length of time to allow an event to occur in the future. On clicking a radio button, the corresponding row may expand to include, for example, the text "Only allow sites or devices you know or trust" or other similar text.

1. allow once: if selected, this may allow the event to happen during the current session 2. always allow: if selected, this may allow the event to occur any time, from any source 3. always allow <source>: if selected, this may allow the event to occur any time, from source indicated (e.g., a website). The user interfaces 4310 and 4320 may also display options to not allow the website.

Figure 44:
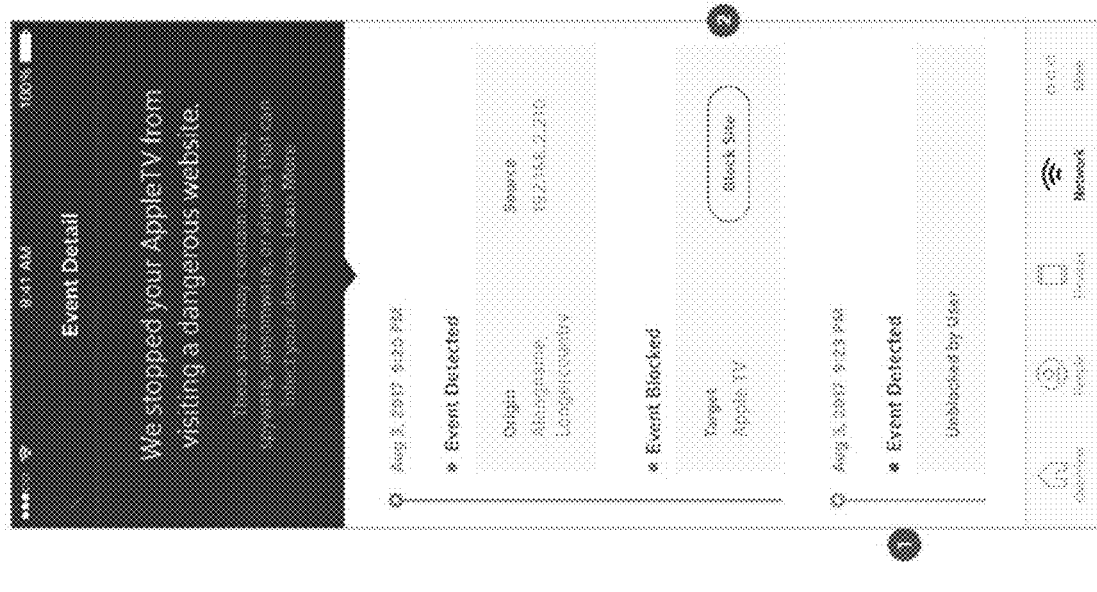
FIG. 44 shows a user interface indicating event detail.

FIG. 44 shows a user interface 4400 indicating event detail. This screen may comprise a general layout for an event. It may show a series of dynamic information around the event details.

1. event detected: this information may appear in the timeline after the user allows the blocked site.

2. block site: may allow site changes to block site once the user has allowed the site FIGS. 45A-D show user interfaces indicating tips. Tip cards may help users perform a series of actions to further their security protection. The tip cards may be launched if the user taps help me resolve this from the threat detail or the dashboard. Selecting the exit button 4505 may cause the user device to exit the tip cards to another screen, such as an overview screen. Selecting the next button 4510 may cause the device to display the next tip. Selecting the finish button 4565 may cause the user device to exit the tip cards to another screen, such as the overview screen.

Figure 52B:
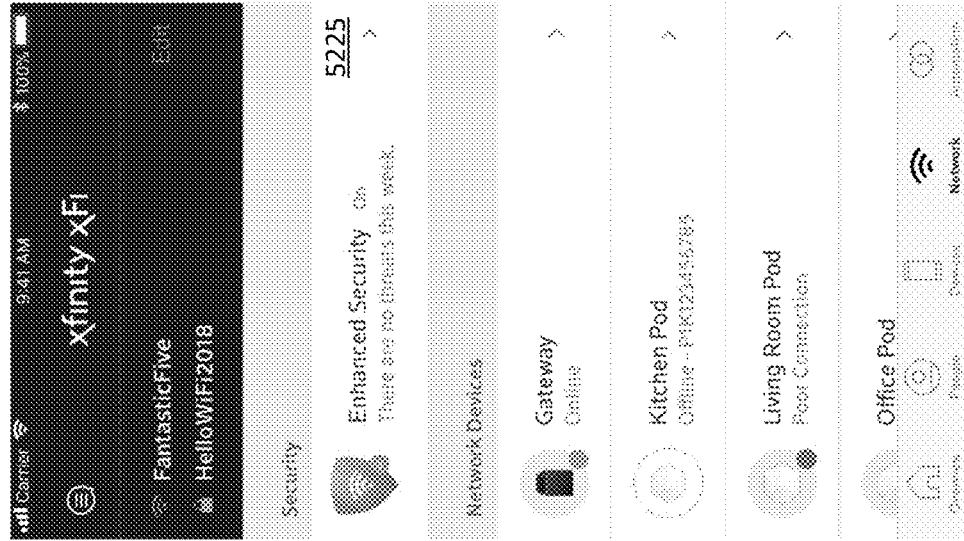
FIG. 52B shows a user interface displaying one of more network devices.
Figure 52A:
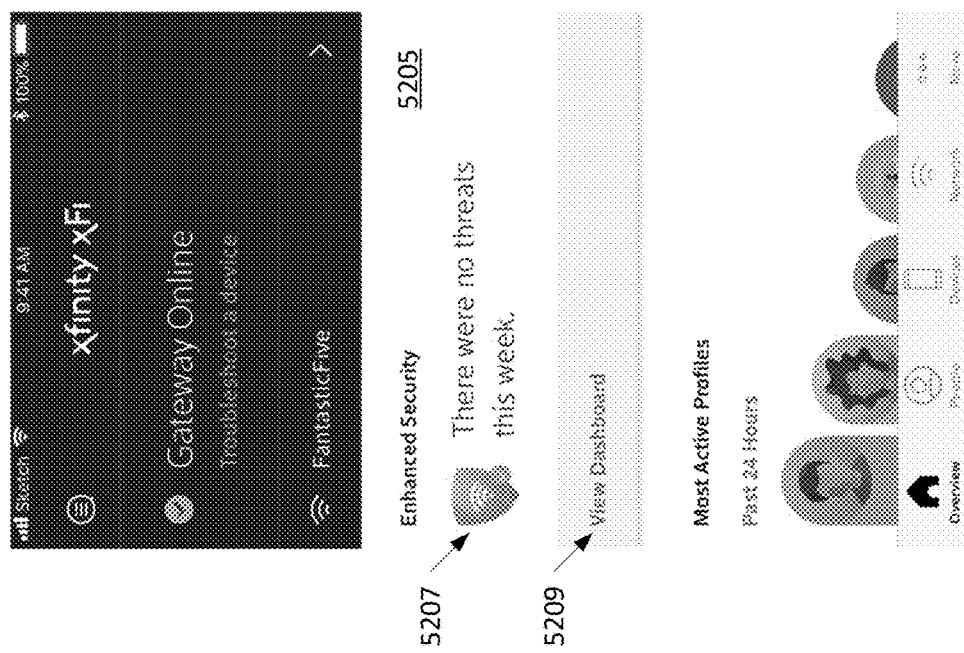
FIG. 52A shows a user interface displaying an overview of enhanced security features.

FIG. 52A shows a user interface 5200 displaying an overview of enhanced security features. Various security states may occur, and information displayed on the user interface 5200 may vary based on the different security states (e.g., no threats, all resolved, single action, multiple action required, etc.). The user interface 5200 may display information indicating whether any threats occurred during a period of time (e.g., one week) and/or how many threats occurred during the time period. For example, a network status message may indicate that the network is safe if there are no open threats for a user to resolve. If there are one or more active threats, the text may indicate that action is required. A dynamic content area 5207 of the user interface 5200 may display dynamic image and/or text. If threats have been resolved, a no threats icon may be displayed. If there are one or more active threats, then a threats icon may be displayed. If no threats occurred in the last 7 days, dynamic messaging may display as, for example, there were no threats this week. If threats (e.g., all threats) in the last 7 days were resolved, dynamic messaging may display as, for example, threats have been resolved this week. If one threat is to be resolved, dynamic messaging may display as, for example, one threat requires your follow up. If multiple threats are to be resolved, dynamic messaging may display as, for example, multiple threats require your follow up. Dynamic information 5209, which may be call to actions, may display information depending on the status of the network. For example, if no threats occurred in the last 7 days, the information 5209 may display an option to view a dashboard. If threats in the last 7 days were resolved, the information 5209 may display an option to view a dashboard. If one threat is to be resolved, the information 5209 may display an option to view threat details and/or an option to view a dashboard. If multiple threats are to be resolved, the information 5209 may display an option to view threats (e.g., all threats) and/or an option to view a dashboard. Selecting the option 5205 may cause the user device to display one or more of the user interfaces shown in FIGS. 53A-C, as will be described in further detail below.

FIG. 52B shows a user interface 5220 displaying one of more network devices. The gateway device may be in one of four states (or any other number of states), such as no threats, resolved, single action, and/or multiple action required. A content area 5225 may display dynamic image(s) and/or text. For example, if threats (e.g., all threats) have been resolved, a no threats icon may be displayed. If there are one or more active threats, then a threats icon may be displayed. Dynamic messaging may indicate, for example, that there were no threats this week if there were no threats in the last 7 days. If there are no threats, selection of the option 5225 may cause the user device to display an enhanced security dashboard. If threats (e.g., all threats) in the last 7 days were resolved, the messaging may indicate that threats have been resolved this week. If one threat is to be resolved, the messaging may indicate that one threat requires the user's follow up. If there is one threat, selection of the option 5225 may cause the user device to display threat detail(s) of the active threat. If multiple threats are to be resolved, the messaging may indicate that multiple threats require the user's follow up. If there are multiple threats, selection of the option 5225 may cause the user device to display an action list. Selecting the option 5225 may cause the user device to display one or more of the user interfaces shown in FIGS. 53A-C.

Figure 53C:
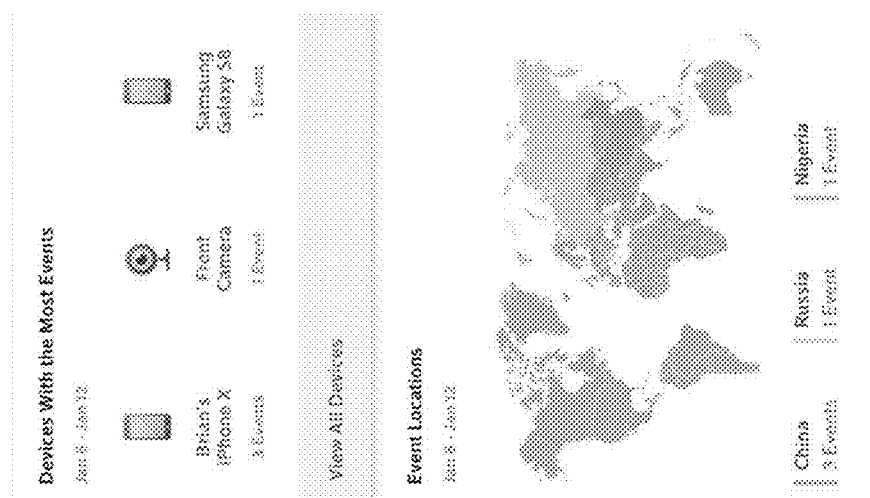
FIGS. 53A-C show user interfaces displaying one or more resolved events.
Figure 53B:
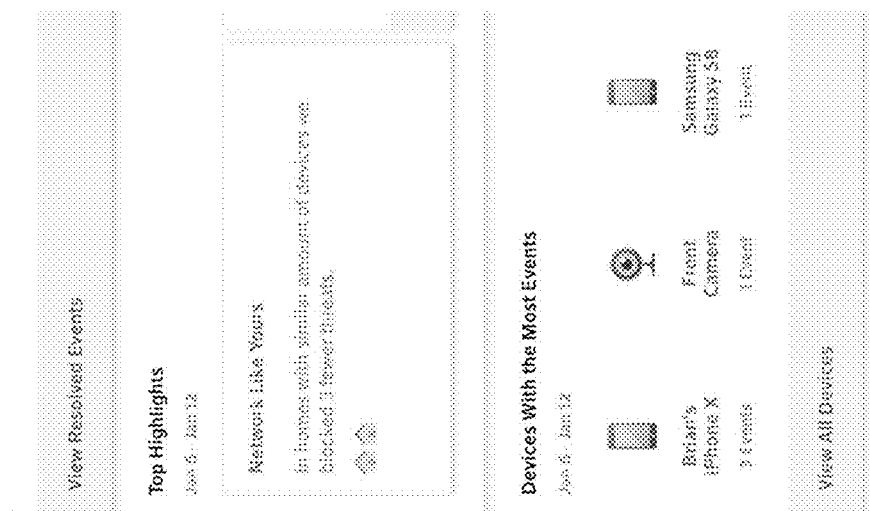
Figure 53A:
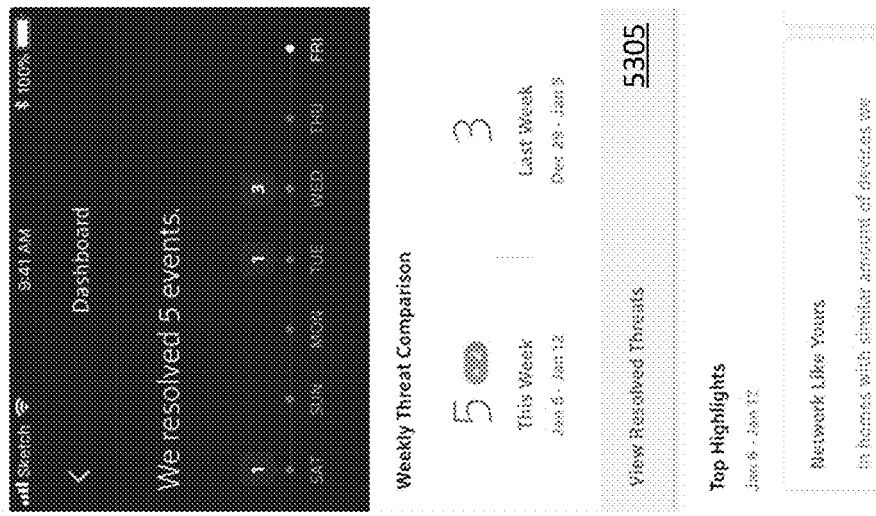

FIGS. 53A-C show user interfaces displaying one or more resolved events. Selecting the option 5305 may cause the user device to display the user interface shown in FIG. 54.

Figure 54:
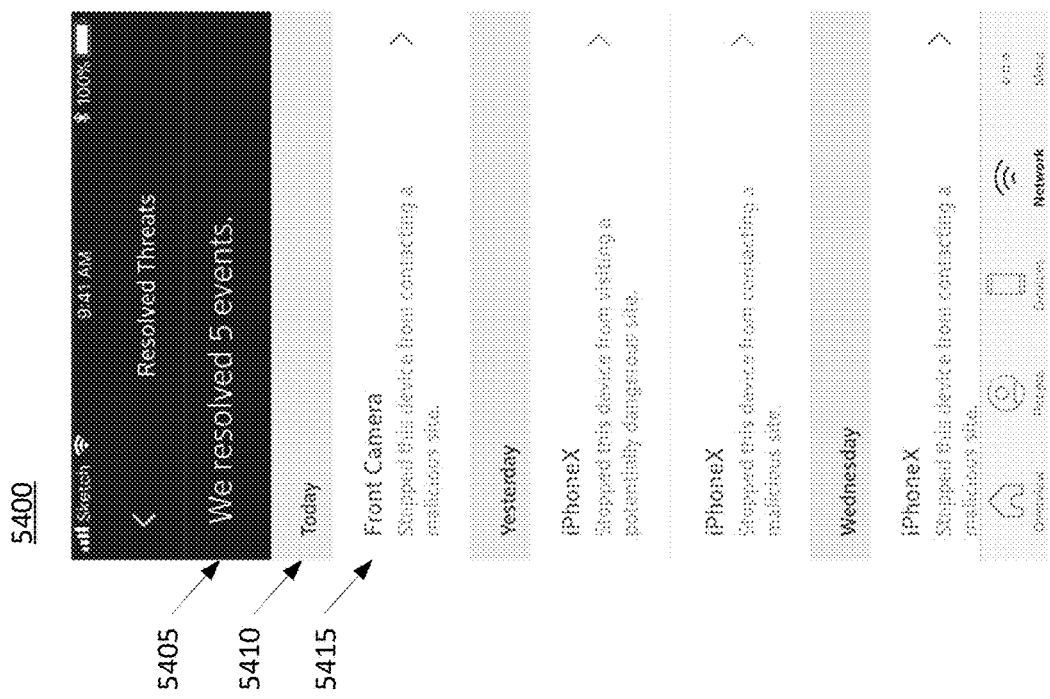
FIG. 54 shows a user interface displaying one or more resolved events.

FIG. 54 shows a user interface 5400 displaying one or more resolved events. For example, data security threats may be blocked. A resolved threats list may list threats that have been resolved by a gateway device, cloud device, and/or the user. Blocked total information 5405 may display a total number of resolved threats that were blocked for, for example, the last 7 days (e.g., rolling week) or another time period. A list 5410 may indicate threats from most recent to oldest, such as for the last 7 days. Each row 5415 may be titled by the device that was attacked. The threat may be described and/or displayed, such as below the device name. Selecting the threat row 5415 may cause the user device to display a corresponding threat detail screen.

Examples described herein may provide guided remediation of digital threats.

FIG. 55A shows a user interface 5500 displaying an overview of enhanced security features. The user interface 5500 may indicate 5505 that one or more threats exist. Selecting the option 5505 may cause the user device to display the one or more threats, such as via the user interface shown in FIG. 56A, as will be described in further detail below.

FIG. 55B shows a user interface 5520 displaying one or more network devices. The user interface 5520 may indicate 5525 that one or more threats exist. Selecting the option 5525 may cause the user device to display the one or more threats, such as via the user interface shown in FIG. 56A.

FIG. 56A shows a user interface 5600 displaying one or more threats. The user interface 5600 may display an action list item 5605. Tapping anywhere on this list row may bring the user to a threat detail associated with this item. The user interface 5600 may display a help me resolve option 5610. Tapping the help me resolve option may take the user to tip cards for this threat. The user interface 5600 may display a more details option 5615. Tapping the more details option may take the user to the threat detail for this item. For example, selecting the option 5615 (and/or elsewhere on the list row) may cause the user device to display the user interface shown in FIG. 56B.

FIG. 56B shows a user interface 5620 displaying one or more recommended actions and/or threat details. The user interface 5620 may indicate a device entity 5625. The user interface 5620 may indicate a device owner 5630. This may be the device owner at the time of the attack. If the device owner changes before or after the attack, the indication 5630 may indicate the device owner at the time of the attack. The user interface 5620 may display an option to allow a site. Selecting the option may bring the user to an allow event confirmation screen. The user interface 5620 may comprise an option 5635 for more details. Selecting the option 5635 may bring the user to a threat glossary. The threat glossary may be anchor tagged so the user is sent to relevant information regarding their attack. The user interface 5620 may display a help me resolve option 5640. Selecting this option may bring the user to one or more tip cards. The user interface 5620 may comprise an action taken already option 5645. Selecting this option may clear the notification, and may move the threat into the non-action threat list, unless a threat is detected again.

FIGS. 56C-D show user interfaces displaying one or more options for allowing events. For example the user interface 5650 may comprise an allow event confirmation screen. Using the screen, the user may decide a length of time to allow an event to occur in the future. On clicking a radio button (or other GUI element), the row may expand to include, for example, the text only allow sites or devices you know or trust. A selectable option 5655 may allow the event to happen during the current session. A selectable option 5660 may allow the event to occur at any time, such as from any source.

A method described herein may comprise monitoring data traffic associated with a device connected to a network. The method may comprise, based on the monitoring, determining, by a computing device, a data security threat associated with the device. The method may comprise, based on determining the data security threat, preventing data traffic associated with the device and via the network. The method may comprise generating, for display via a user device, one or more of an indication of the preventing the data traffic or one or more recommendations for preventing the data security threat.

Elements used to provide a network security service might be activated with a single physical or virtual button. The user might not need to install new hardware, download a new application, and/or install software on any device. For example, security software, including device identification capabilities and other features, may be integrated into the firmware of a gateway device. Activation of the security solution may be enabled by one touch in, for example, a UI for the service. This may obviate the need for user actions required by other solutions (e.g., security-specific hardware that requires installation, registration, and setup actions for each new device added to the network).

Examples may be implemented by a gateway device, such as in the gateway firmware. The gateway device may include, for example, intrusion detection system (IDS) and intrusion protection system (IPS) software agent(s). The software agent(s) may be resident in the firmware of the gateway (e.g., in an internet gateway) in each customer premises. The gateway device may include a threat management engine hosted as a cloud service that maintains an updated (e.g., continuously updated) list of active threats. A protocol may allow communication between the agent on the gateway device and the cloud service. Activation and back office services may support on demand activation, such as subscription terms acceptance and billing.

There may be a high level of integration of these technical components, and the security features may be available for subscribers, on demand, through the security service UI. Activation of the security solution may be enabled by one touch in the security service UI. Accordingly, this may reduce or obviate the need for user actions used by other solutions, such as one or more of security-specific hardware that requires installation, registration, and setup actions for each new device added to the network.

Figure 57:
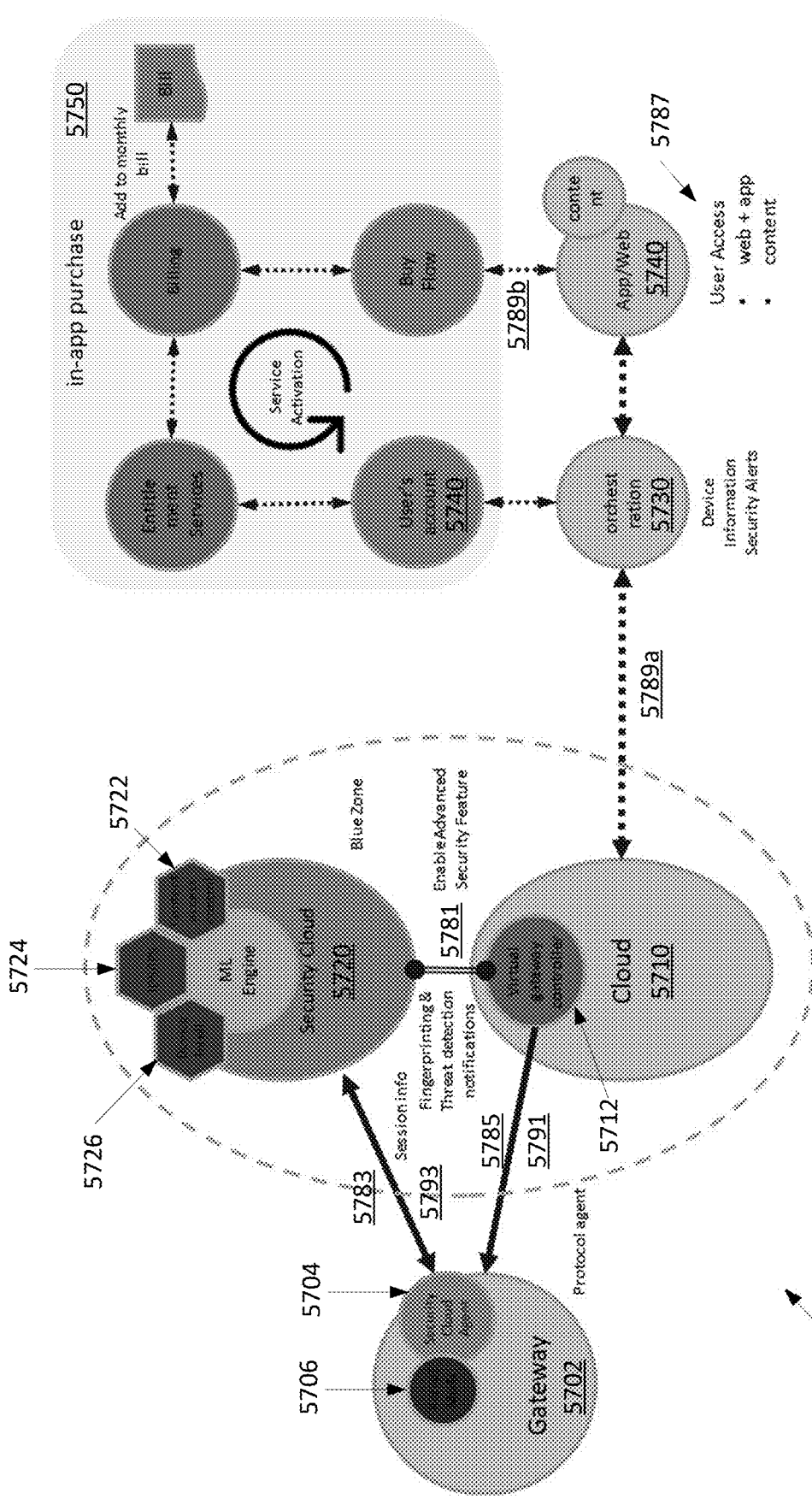
FIG. 57 shows an example architecture used for configuration, installation, and/or activation of a network security service.

FIG. 57 shows an example architecture 5700 used for configuration, installation, and/or activation of a network security service. The architecture 5700 may comprise a network security service entity 5720 (e.g., provider, such as a security cloud provider). The network security service entity 5720 may comprise an artificial intelligence (AI) component. The security cloud 5720 (or other network security service entity) may be linked with another cloud, such as cloud 5710, to facilitate simplicity of purchases and no or minimal additional configuration used to activate additional security features. A gateway 5702 may comprise a security cloud agent 5704. The security cloud agent 5704 may comprise network security software integrated into firmware of the gateway 5702. The security cloud agent 5704 may be used by the gateway 5702 to communicate 5783 with the security cloud 5720, such as after additional security features are activated. The gateway 5702 may comprise kernel modifications 5706, which may comprise changes to firmware code on the gateway 5702 used to accept the security cloud agent 5704. The cloud 5710 may communicate 5785 with the gateway 5702 via a virtual gateway controller 5712. The cloud 5710 may also be linked 5781 to the security cloud 5720 via the virtual gateway controller 5712 of the cloud 5710. As previously explained, data associated with device fingerprinting and/or data associated with threat detection notifications may be transmitted 5781 between the security cloud 5720 and the cloud 5710.

Advanced security feature(s) may be requested by a user, such as by the user clicking a button, on a user interface displayed on a user device, to activate advanced security features. For example, the user may select 5787, via an application 5740 on the user device, an option to activate advanced security features. After the user selects 5787 the option to activate advanced security features, the user device may transmit 5789a, to the cloud 5710, the request. The request may be transmitted to the cloud 5710 via a network associated with the gateway 5702 if the user device is connected to the network associated with the gateway 5702 or may be transmitted to the cloud 5710 via a different network. The request may be transmitted through an in-app purchase process 5750. The user request may initiate a service activation process, which may update billing information for the user, update entitlement services for the user, and/or update the user's account 5740. The activation request may be transmitted, from the user device, to an orchestration module 5730. The orchestration module 5730 may receive the request to activate advanced security features. The orchestration module 5730 may comprise middleware between the client interface (e.g., user device application) and various sources of data, such as the user's account 5740, the cloud 5710, or other sources of data. The orchestration module 5730 may transmit 5789a, to the cloud 5710, a request to activate advanced security features. The cloud 5710 may receive the request and may drive a subscription process to activate the advanced security features. For example, data indicating the request may be transmitted between the cloud 5710 and the security cloud 5720. After receiving, from the orchestration module 5730, the request to activate advanced security features, the cloud 5710, via the virtual gateway controller 5712, may transmit 5791, to the gateway 5702, an instruction to activate the advanced security features, such as by activating the security agent 5704 or a feature of the security cloud agent 5704. After activation of the security agent 5704 and/or activation of advanced security features at the gateway 5702, the gateway 5702, via the security cloud agent 5704, may transmit 5793, to the security cloud 5720 a request to activate the advanced security features at the security cloud 5720. The security cloud 5720 may transmit an indication that the network security service has been activated, and the cloud 5710 may receive the indication.

The virtual gateway controller 5712 may comprise backend software that links the gateway 5702 to various cloud storage services, such as the security cloud 5720. The virtual gateway controller 5712 may keep the gateway 5702 updated with network information, such as the latest network threats identified by network security software running in the security cloud 5720. Security services running in the security cloud include, for example, content access control service 5722, intrusion detection system (IDS) and/or intrusion prevention system (IPS) 5724, and/or device intelligence service 5726.

As explained above, the architecture 5700 may comprise an orchestration module 5730, which may comprise middleware between the client interface and various sources of data the user might call up. For example, if the user selects a list of devices attached to their home network, the client/UI may send the request to the orchestration module 5730, which may call out to one or more databases where the device information is stored and/or may compile the information into a readable form by the UI. A user's account module 5740 may manage the user's account across various applications. For example, it may serve up information such as username, account number, physical address of the customer premises, and other profile information. The user's account 5740 may be updated with information indicative of advanced security features after advanced security features have been activated for the gateway 5702.

Figure 46:
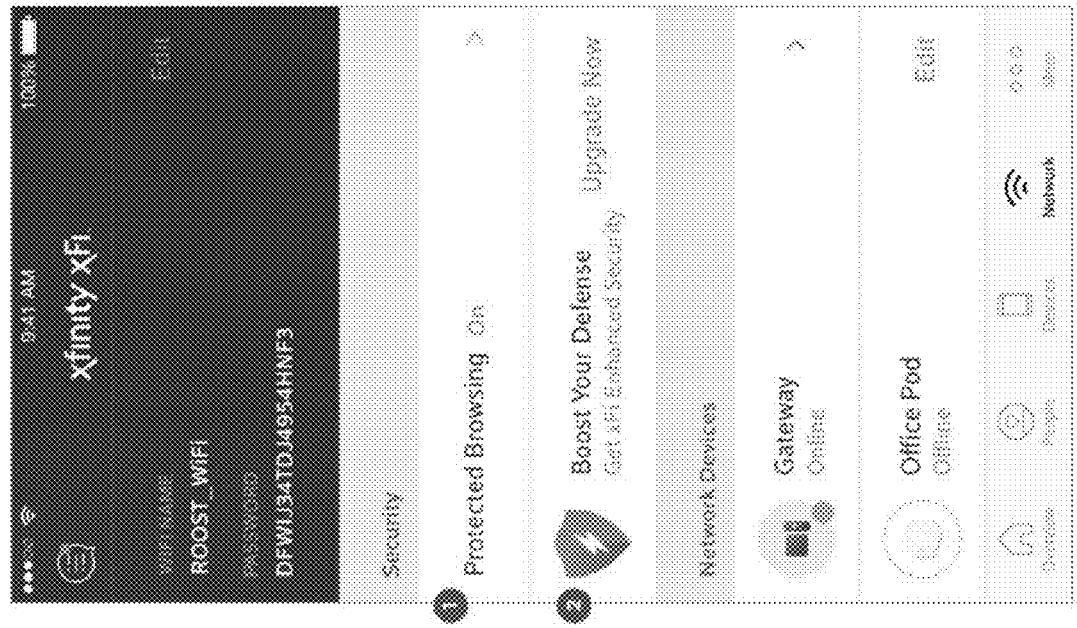
FIG. 46 shows a user interface indicating a network tab.

FIG. 46 shows a user interface 4600 indicating a network tab. Advanced security may be housed within the network tab, and may be accessible once the user upgrades his or her account.

1. protected browsing: there may be two outlets to upgrading the security service. One of them may be through the protected browsing page.

2. boost your defense option: this may be a point of launch for the upgrade flow.

Figure 47B:
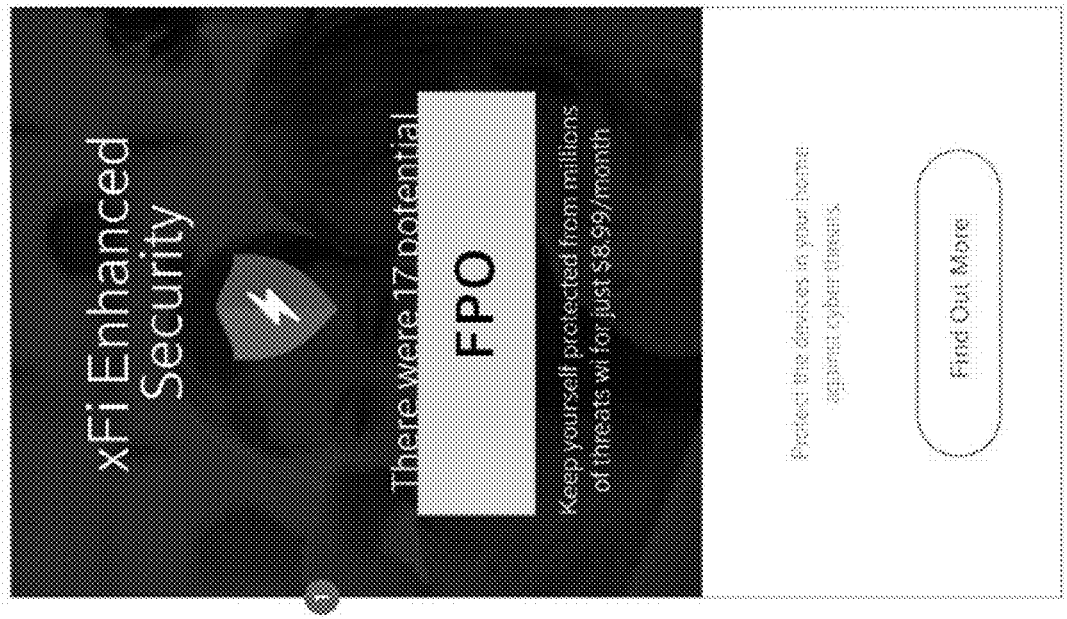
FIGS. 47A-B show user interfaces indicating protected browsing and boost your defense.
Figure 47A:
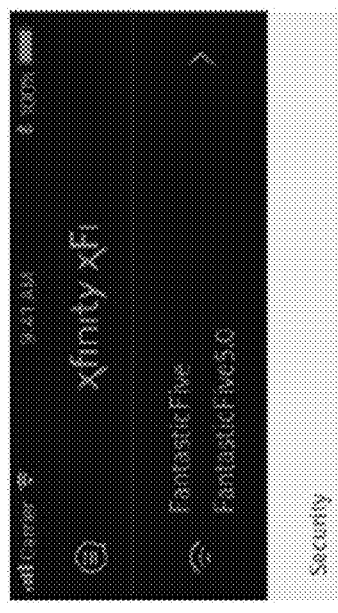

FIGS. 47A-B show user interfaces 4700 and 4720 indicating protected browsing and boost your defense. Advanced security may be housed within the network tab, and may be accessible once the user upgrades his or her account. The upgrade process may include an upgrade option to boost your defense.

Figure 48:
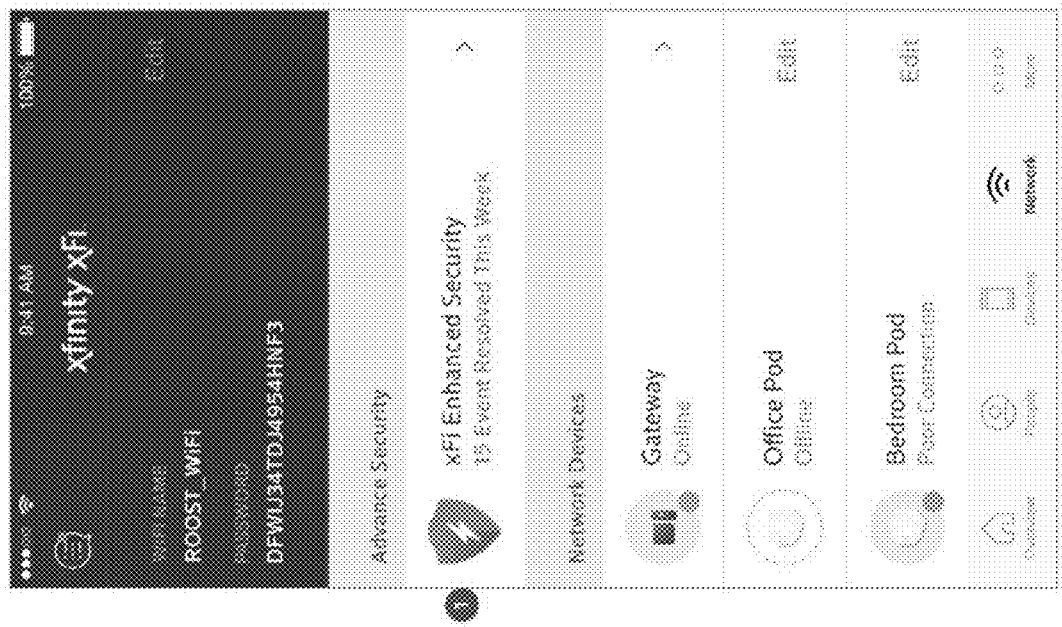
FIG. 48 shows a user interface indicating a network tab.

FIG. 48 shows a user interface 4800 indicating a network tab. Advanced security may be housed within the network tab, and may be accessible once the user upgrades his or her account.

1. defend tab: may reflect weekly activity in advanced security. May launch the dashboard.

Figures 49A, 49B:
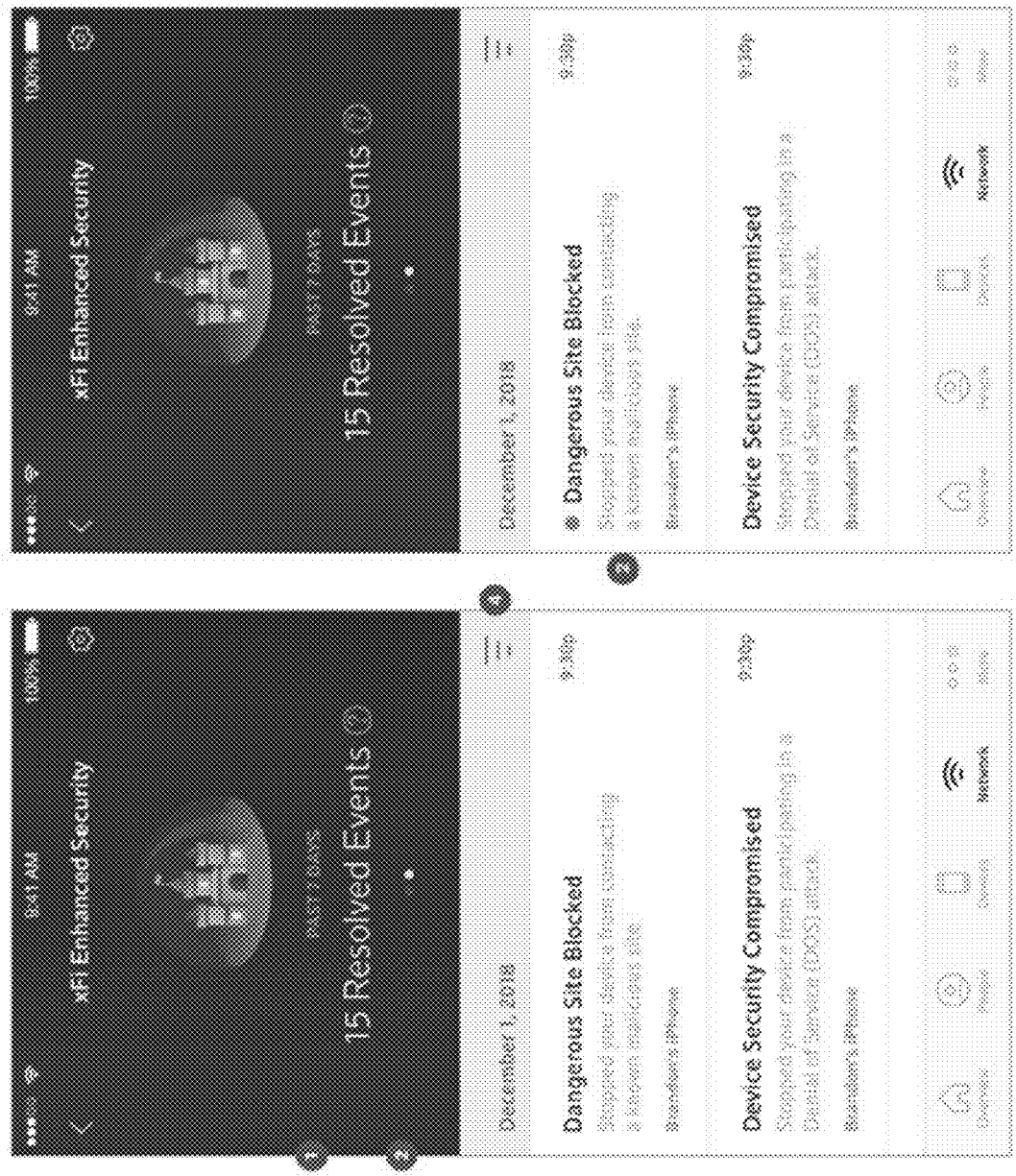
FIGS. 49A-B show user interfaces indicating a dashboard.

FIGS. 49A-B show user interfaces 4900 and 4920 indicating a dashboard. This may be a net protection screen. The image may be static, and the accompanying data may be dynamic.

1. time span: swiping this area left or right may tab between different time spans, such as past 7 days and past 30 days 2. defend glossary: tapping the question mark may launch a security service glossary.

3. new event: if an event happens, but has not been viewed by the user, a blue (or other color) indicator may appear. The indicator may remain until a user has viewed the event.

4. filter: may bring up a view that filters entries by type of threat, date, device, etc.

Figure 50:
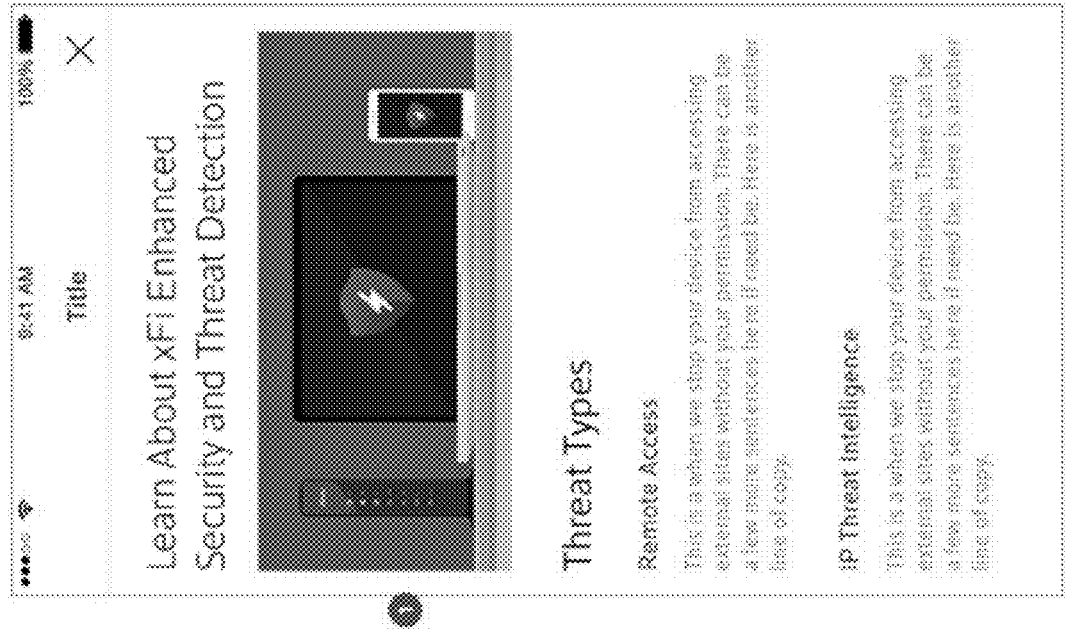
FIG. 50 shows a user interface indicating a security glossary.

FIG. 50 shows a user interface 5000 indicating a security glossary. The user interface may display a scrollable glossary with terms and descriptions.

1. security video: video that may give, for example, an overview of the net protection service.

Figures 58A, 58B, 58C:
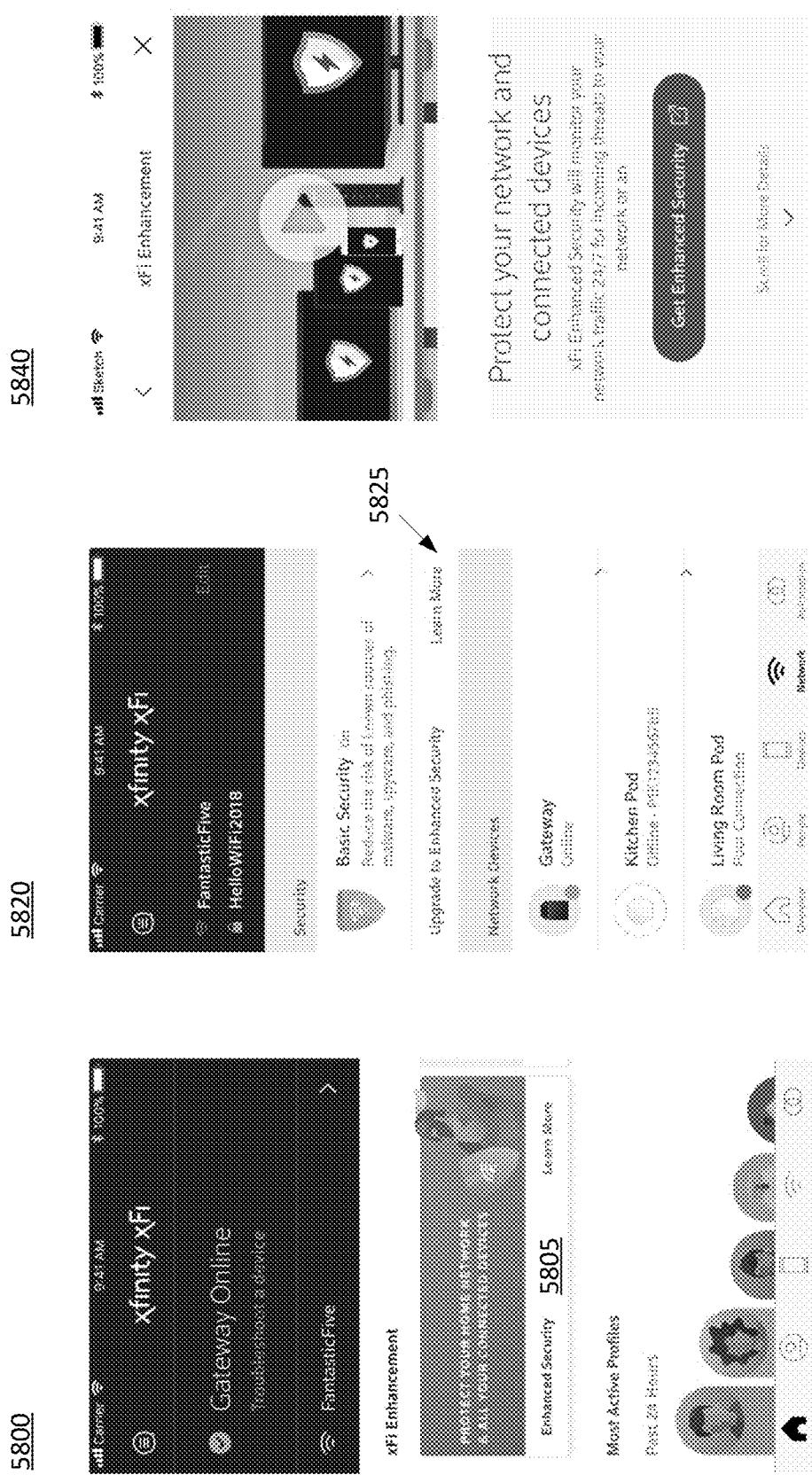
FIG. 58A shows a user interface displaying an enhancement option.
FIG. 58B shows a user interface displaying one of more network devices.
FIG. 58C shows a user interface displaying an enhancement option.

FIG. 58A shows a user interface 5800 displaying an enhancement option. Selecting the option 5805 may cause the user device to display the user interface shown in FIG. 58C.

FIG. 58B shows a user interface 5820 displaying one of more network devices. Selecting the option 5825 may cause the user device to display the user interface shown in FIG. 58C.

FIG. 58C shows a user interface 5840 displaying an enhancement option.

Intrusion detection and/or intrusion prevention features described herein may be used to detect and/or block unauthorized access from an external network (e.g., internet) to one or more devices connected to an internal network (e.g., an in-home network). The gateway device or cloud device may monitor data traffic in the home network to detect and/or block malicious attempts, such as for eavesdropping, data modification, identity spoofing (e.g., IP address spoofing), password-based attacks, man-in-the-middle attack, compromised-key attack, sniffer attack, or other malicious activities.

Figure 59A:
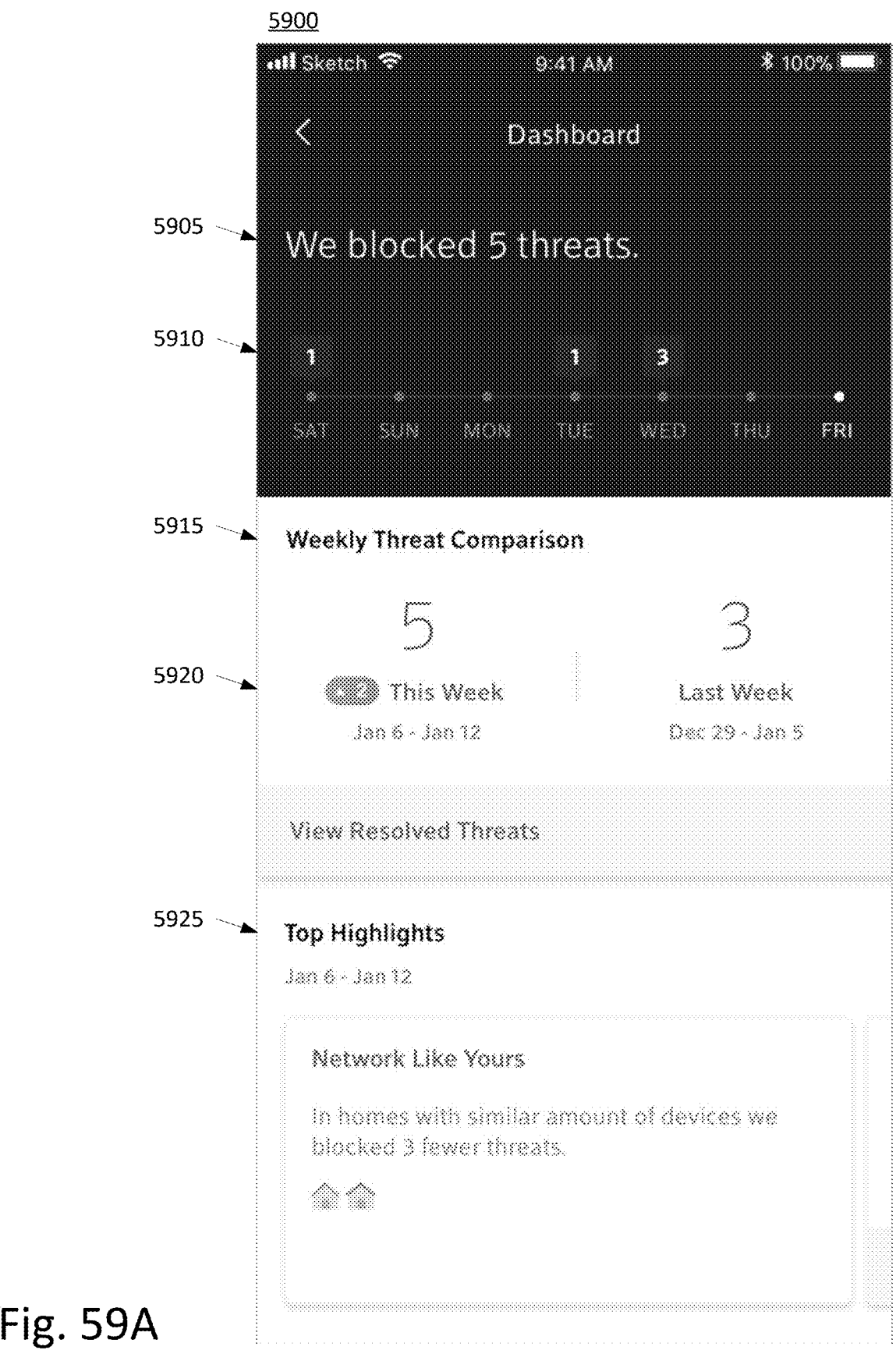
FIGS. 59A-B show a user interface displaying one or more actions taken by the gateway device or cloud device to detect and/or prevent intrusions.
Figure 59B:
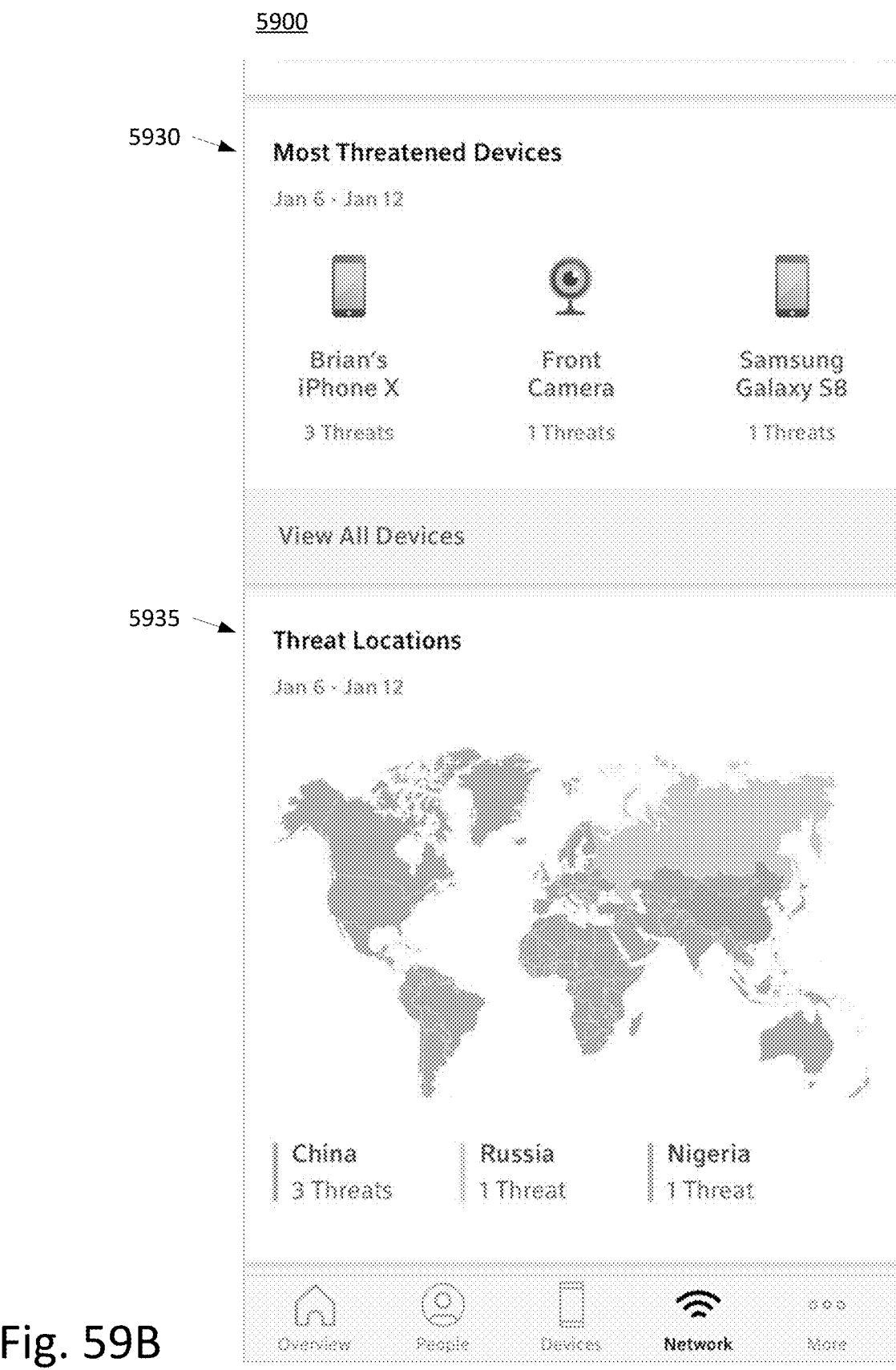

FIGS. 59*a-b* show a user interface 5900 displaying one or more actions taken by the gateway device or cloud device to detect and/or prevent intrusions. With reference to FIG. 59*a*, information 5905 may indicate a number of threats blocked. For example, information 5905 may indicate the total number of threats that have been blocked for a current rolling 7 days. Information 5910 may indicate a timeline of threats. For example, information 5910 may indicate a rolling 7 day time line that displays the number of threats that occurred on each day within the rolling 7 days. The current day may be the right-most day (e.g., Friday). A follow up link may be included. The link may display if threats within an action list are to be resolved. The follow up link may link to the action list. A threat flag may be included. The threat flag may comprise a dynamic element that displays if threats happened on the corresponding day. The number of threats may be dynamically display within the flag. Threats (e.g., resolved or requiring follow up) for the day may be displayed. A threat flag alert may be included. The threat flag alert may comprise a dynamic element that displays if a threat requiring follow up happened on that day. If threats are resolved for that day, then the alert might not be displayed for that day. If the user receives no threats for the time period (e.g., current rolling 7 day period), the timeline and diagnosis components may be displayed. The threatened devices and threat location modules may be hidden. If the user receives no threats for the current rolling 7 day period, the user may be displayed information about their network and prompted to learn more about security.

Information 5915 may indicate a comparison of threats during a first period of time (e.g., this week) to threats during a second period of time (e.g., last week). For example, the information 5915 may display a comparison of the threat totals from the current rolling 7 day period to threat totals from the previous rolling 7 day period. Information 5920 may indicate a threat trend (e.g., a week to week trend, a day to day trend, etc.) For example, the information 5920 may display a dynamic number. A particular color icon (e.g., a red icon) may be displayed if threats have increased, along with the number of threats have increased by. A different color icon (e.g., a blue icon) may be displayed if threats have gone down. Information 5925 may indicate highlights (e.g., top highlights). For example, the information 5925 may comprise content that gives the user insight into the type of threats the user receives and/or contextual information for how they compare to other homes and/or users. With reference to FIG. 59b, information 5930 may indicate threatened devices (e.g., most threatened devices). For example, the information 5930 may list the top 3 most threatened devices for the past 7 days. This list may contain one or more devices, such as 3 devices. The list may comprise 1 or 2 devices if a total of 3 devices were not threatened for the previous 7 days. Information 5935 may indicate one or more threat locations. For example, the information 5935 may comprise a map view that displays, e.g., the top 3 countries that the user has received threats from during the current rolling 7 day period.

A method described herein may comprise generating, for display via a user device, a graphical user interface comprising an option to configure and activate a network security service. The method may comprise receiving, via the user device, a selection of the option to configure and activate the network security service. After receiving the selection of the option to configure and activate the network security service, a gateway device may initiate configuration and activation of the network security service.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, or other optical disk storage, magnetic cassettes, magnetic tape, magnetic storage, and the like.

Additionally or alternatively, the methods and features recited herein may be implemented through one or more Integrated Circuits (ICs). An IC may, for example, be a microprocessor that accesses programming instructions or other data stored in a ROM. A ROM may store program instructions that cause an IC to perform operations according to one or more of the methods described herein. One or more of the methods described herein may be hardwired into an IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
    sending, by a computing device, a request to activate a network security service, on a network security service entity external to a gateway device, for a first network associated with the gateway device;
    sending, by the computing device to the gateway device, an instruction to activate a security agent configured to execute on the gateway device to support the network security service;
    causing, after receiving an indication that the network security service has been activated, modification, of an application on a user device associated with the gateway device, with information indicative of activation of the network security service; and
    receiving, by the computing device and from the network security service entity, an indication of one or more network security threats associated with one or more devices connected to the first network.

2. The method of claim 1, further comprising:
    monitoring, after activation of the network security service, data traffic associated with the one or more devices connected to the first network; and
    blocking, based on the monitoring and the indication of the one or more network security threats, a device, of the one or more devices, from connecting to the gateway device.

3. The method of claim 1, wherein the computing device is in a first cloud network in communication with the first network via the gateway device, and wherein the network security service entity is in a second cloud network linked to the first cloud network via the computing device.

4. The method of claim 1, further comprising:
    causing output, via the application on the user device, of data indicating:
        a plurality of devices associated with the gateway device, and
        a quantity of network security threats associated with each device of the plurality of devices.

5. The method of claim 1, wherein the instruction comprises an instruction to deactivate a dynamic host configuration protocol service.

6. The method of claim 1, wherein the sending the request to activate the network security service comprises requesting the network security service to block unauthorized access from an external network to one or more devices connected to the first network.

7. The method of claim 1, further comprising causing output, via the application on the user device, of an interface indicating that a device, of the one or more devices, was disconnected from the first network.

8. The method of claim 1, further comprising causing output, via the application on the user device, of an interface indicating that a device, of the one or more devices, was blocked from receiving a requested resource.

9. The method of claim 1, further causing, based on the one or more network security threats, redirecting of a request, for a resource, from a device of the one or more devices to a proxy for the resource.

10. The method of claim 1, further comprising causing output, via the user device, of an interface indicating an option to perform one or more of:
    allow access to a blocked resource, or
    download or update software on a device of the one or more devices.

11. The method of claim 1, further comprising causing output, via the user device, of an interface indicating an option to view one or more of:
    devices associated with a quantity of network security threats,
    one or more locations of the one or more devices associated with the one or more network security threats, or
    quantities of network security threat associated with similar premises to a premises associated with the gateway device.

12. The method of claim 1, wherein the sending the request is based on receiving:
an indication of a one-touch selection, on an interface of the application on the user device, to activate the network security service.

13. The method of claim 1, further comprising sending, by the computing device to the gateway device, information for determining whether a request, from a second computing device to the gateway device, for a resource, should be:
directed to the resource,
redirected to a proxy of the resource; or
blocked.

14. The method of claim 1, wherein the network security service is configured to, based on being activated for the first network, perform one or of more of:
content access control;
intrusion detection;
intrusion prevention;
devices fingerprinting; or
device intelligence.

15. A method comprising:
sending, by a gateway device, a request to activate a network security service at a security device, wherein the activated network security service protects a network associated with the gateway device;
activating, on the gateway device, a network security agent for communication with the security device;
receiving, by the gateway device and from the network security service, an indication of one or more network security threats associated with one or more devices associated with the gateway device; and
based on the received indication of the one or more network security threats, redirecting a request, for a resource, from a device of the one or more devices to a proxy for the resource.

16. The method of claim 15, wherein the activating comprises activating, using firmware of the gateway device, the network security agent.

17. The method of claim 15, further comprising:
sending, to a mobile device associated with the gateway device, information to cause output of data indicating:
a plurality of devices associated with the gateway device, and
a quantity of network security threats associated with each device of the plurality of devices.

18. The method of claim 15, further comprising:
causing output, via a user device associated with the gateway device, of data indicating one or more origination locations of the one or more network security threats.

19. The method of claim 15, wherein receiving the indication of one or more network security threats comprises receiving, via the network security agent and from a security cloud network associated with the network security service, the indication of one or more network security threats.

20. The method of claim 15, further comprising receiving, by the gateway device and via a selection of a single graphical user interface option to activate the network security service, a request to activate the network security service.

21. The method of claim 15, further comprising:
sending, by the gateway device, data transmitted or received by the one or more devices associated with the gateway device, wherein the receiving the indication of the one or more network security threats is based on the data.

22. The method of claim 15, further comprising receiving, via the activated network security agent, information for determining whether the request for the resource should be:
directed to the resource,
redirected to the proxy of the resource; or
blocked.

23. A method comprising:
storing, by a computing device, configuration parameters of a gateway device;
determining, by the computing device, that a security service is available, on an entity external to the gateway device, for protecting a network associated with the gateway device;
sending, by the computing device, to the gateway device, based on determining that the security service is available, and based on the configuration parameters indicating a network security agent is configured to execute on the gateway device to support the security service, an instruction to execute the network security agent;
modifying, based on the sending the instruction, the configuration parameter to indicate the network security agent is executing on the gateway device; and
receiving, by the computing device and from the entity, an indication of one or more network security threats associated with one or more devices connected to the network.

24. The method of claim 23, further comprising receiving a request to activate the security service, wherein the request is based on a single selection of an option, to activate the security service, output by a second user device associated with the gateway device.

25. The method of claim 23, further comprising sending, to the entity and based on an entitlement, an instruction to activate the security service such that the network security agent becomes configured to enable the entitlement.

* * * * *